US012328537B2

(12) United States Patent
Yoshino

(10) Patent No.: US 12,328,537 B2
(45) Date of Patent: Jun. 10, 2025

(54) OPTICAL COMMUNICATION APPARATUS, OPTICAL COMMUNICATION SYSTEM AND OPTICAL COMMUNICATION METHOD

(71) Applicant: NIPPON TELEGRAPH AND TELEPHONE CORPORATION, Tokyo (JP)

(72) Inventor: Manabu Yoshino, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 234 days.

(21) Appl. No.: 18/033,538

(22) PCT Filed: Oct. 30, 2020

(86) PCT No.: PCT/JP2020/040988
§ 371 (c)(1),
(2) Date: Apr. 24, 2023

(87) PCT Pub. No.: WO2022/091392
PCT Pub. Date: May 5, 2022

(65) Prior Publication Data
US 2023/0421933 A1 Dec. 28, 2023

(51) Int. Cl.
*H04Q 11/00* (2006.01)
(52) U.S. Cl.
CPC . *H04Q 11/0067* (2013.01); *H04Q 2011/0083* (2013.01); *H04Q 2011/0086* (2013.01)
(58) Field of Classification Search
CPC .............................................. H04Q 11/0067
See application file for complete search history.

(56) References Cited

U.S. PATENT DOCUMENTS

| 5,457,556 A * | 10/1995 | Shiragaki | H04Q 3/0079 |
| | | | 398/79 |
| 6,404,940 B1 * | 6/2002 | Tsuyama | H04Q 11/0005 |
| | | | 385/24 |
| 7,310,479 B2 * | 12/2007 | Lee | H04Q 11/0005 |
| | | | 398/45 |

OTHER PUBLICATIONS

Telecommunication Standardization Sector of ITU, Digital sections and digital line system—Optical line systems for local and access networks, A broadband optical access system with increased service capability by wavelength allocation, ITU-T G.983.3, Series G: Transmission Systems and Media, Digital Systems and Networks, Mar. 2001.

(Continued)

*Primary Examiner* — Shi K Li
(74) *Attorney, Agent, or Firm* — Harness, Dickey & Pierce, P.L.C.

(57) ABSTRACT

An optical communication device includes an optical switch that outputs an optical signal input from one of a plurality of transmission lines to another transmission line among the plurality of transmission lines, a monitoring unit that relays an optical signal in a transmission line on a side where the optical signal is output from the optical switch, a blocking unit that blocks transmission of an optical signal output from the monitoring unit, a wavelength controller that allocates a wavelength and the like that are a wavelength, a time, a polarization, a mode, a code, a frequency, a core, a core wire, or a combination thereof to an optical signal of a subscriber device via the monitoring unit, and an optical switch controller that controls the optical switch such that the optical signal input from the transmission line to the optical switch is output to the another transmission line, and cancels the blocking by the blocking unit.

7 Claims, 74 Drawing Sheets

(56) References Cited

OTHER PUBLICATIONS

Telecommunication Standardization Sector of ITU, Digital sections and digital line system—Optical line systems for local and access networks, 40-Gigabit-capable passive optical networks(NG-PON2): General requirements, ITU-T G.989.1, Series G: Transmission Systems and Media, Digital Systems and Networks, Mar. 2013.
Optoelectronics Industry and Technology Development Association (Japan), Fiber optic active components and devices—Performance standards—GPON transceivers, OITDA standard OITDA/TP 20/AD: 2015 1st edition, Feb. 2015.

* cited by examiner

Fig. 39

| PORT NUMBER | CONNECTION DEVICE |
|---|---|
| 1 | TRANSCEIVER 1x |
| 2 | AWG#1 port #3 |
| 3 | FREE |
| ⋮ | ⋮ |
| XXX | YYY |

Fig. 40

|        | λ1       | λ2       | λ3      |
|--------|----------|----------|---------|
| USER 1 | TRANSMIT | RECEIVE  | FAILURE |
| USER 2 | FREE     | FREE     | RECEIVE |
| USER 3 | FREE     | TRANSMIT | FREE    |

Fig. 41

|         | $\lambda 1$ | $\lambda 2$ | $\lambda 3$ |
|---------|--------|--------|---------|
| GROUND A | IN USE | IN USE | FAILURE |
| GROUND B | FREE   | FREE   | IN USE  |
| GROUND C | FREE   | IN USE | FREE    |

OPTICAL COMMUNICATION APPARATUS, OPTICAL COMMUNICATION SYSTEM AND OPTICAL COMMUNICATION METHOD

CROSS-REFERENCE TO RELATED APPLICATIONS

This application is a 371 U.S. National Phase of International Application No. PCT/JP2020/040988, filed on Oct. 30, 2020. The entire disclosure of the above application is incorporated herein by reference.

TECHNICAL FIELD

The present invention relates to an optical communication device, an optical communication system, and an optical communication method.

BACKGROUND ART

A network that provides a high-speed Internet by using fiber to the home (FTTH) or a mobile service is inefficient in terms of operation because the network is independently constructed for each service. Therefore, an optical access system that accommodates a plurality of services with one device has been proposed (refer to, for example, Non Patent Literature 1). In order to realize an optical access system capable of accommodating multiple services, a passive optical network (PON) or a wavelength division multiplexing (WDM)-PON using a plurality of wavelengths has been standardized by the International Telecommunication Union-Telecommunication Standardization Sector (ITU-T) (refer to, for example, Non Patent Literature 2).

On the other hand, an existing optical access system includes a device on a subscriber side and a terminal device on a station side, and communication between the devices is connected to a higher network such as a core network via the terminal device. The device on the subscriber side is, for example, an optical network unit (ONU). Connection to the core network is performed via the terminal device in a device on the station side. The terminal device is, for example, an optical line terminal (OLT). In optical access connected to the core network through packet exchange, a process of adding or deleting user information or destination information to or from a signal, a routing process, and the like are performed on the signal. When user information or destination information is added or deleted, an optical signal may be converted temporarily into an electrical signal. In this case, a certain delay occurs in communication. When an amount of data increases, signals are stored in a buffer, and priority control or the like may be performed. This further increases the delay. When the delay increases, the quality of an optical service greatly decreases. Therefore, it is important to reduce the delay as much as possible.

In order to improve quality of an optical service and provide various services in an optical access network, delays that occur need to be reduced. By using an optical switch or the like capable of performing processing such as routing without converting an optical signal into an electrical signal, a delay can be greatly reduced.

CITATION LIST

Non Patent Literature

Non Patent Literature 1: "ITU-T G.983.3", International Telecommunication Union, 2001

Non Patent Literature 2: "ITU-T G.989.1", International Telecommunication Union, 2013

SUMMARY OF INVENTION

Technical Problem

Incidentally, in routing using an optical switch, it is necessary to set a path of an optical signal according to a transfer destination on a path to a communication destination of a device on a subscriber side, and further to perform setting (wavelength or the like) of a transceiver of the device on the subscriber side. In a case where routing of multicast, broadcast, or return communication using an optical switch is applied to optical access, it is desired to reduce the number of ports used for routing in order to connect many devices.

In view of the above circumstances, an object of the present invention is to provide a technique capable of relaying an optical signal to a destination while reducing the number of ports to be used.

Solution to Problem

According to an aspect of the present invention, there is provided an optical communication device including an optical switch that outputs an optical signal input from one of a plurality of transmission lines to another transmission line among the plurality of transmission lines; a monitoring unit that relays an optical signal in a transmission line on a side where the optical signal is output from the optical switch; a blocking unit that blocks transmission of an optical signal output from the monitoring unit; a wavelength controller that allocates a wavelength and the like that are a wavelength, a time, a polarization, a mode, a code, a frequency, a core, a core wire, or a combination thereof to an optical signal of a subscriber device via the monitoring unit; and an optical switch controller that controls the optical switch such that the optical signal input from the transmission line to the optical switch is output to the another transmission line, and cancels the blocking by the blocking unit.

According to another aspect of the present invention, there is provided an optical communication device including a first optical switch that outputs an optical signal input from one of a plurality of transmission lines to another transmission line among the plurality of transmission lines; a second optical switch that is cascade-connected to the first optical switch; a monitoring unit that relays an optical signal in a transmission line on a side where the optical signal is output from the first optical switch or the second optical switch;
   a blocking unit that blocks transmission of an optical signal output from the monitoring unit; a wavelength controller that allocates a wavelength and the like that are a wavelength, a time, a polarization, a mode, a code, a frequency, a core, a core wire, or a combination thereof to an optical signal of a subscriber device; and an optical switch controller that controls the first optical switch and the second optical switch such that the optical signal input from the transmission line to the first optical switch is output to the another transmission line, and cancels the blocking by the blocking unit.

According to still another aspect of the present invention, there is provided an optical communication system including a plurality of subscriber devices; and the above optical communication device.

According to still another aspect of the present invention, there is provided an optical communication method executed by an optical communication device, including an optical switch step of outputting an optical signal input from one of a plurality of transmission lines to another transmission line among the plurality of transmission lines; a monitoring step of relaying an optical signal in a transmission line on a side where the optical signal is output from the optical switch; a blocking step of blocking transmission of an optical signal output in the monitoring step; a wavelength control step of allocating a wavelength and the like that are a wavelength, a time, a polarization, a mode, a code, a frequency, a core, a core wire, or a combination thereof to an optical signal of a subscriber device; and an optical switch control step of controlling the optical switch such that an optical signal input from the transmission line to the optical switch is output to the another transmission line, and canceling the blocking.

Advantageous Effects of Invention

According to the present invention, it is possible to relay an optical signal to a destination while reducing the number of ports to be used.

BRIEF DESCRIPTION OF DRAWINGS

FIG. 39 is a diagram illustrating an example of a SW connection table according to the same configuration example.

FIG. 40 is a diagram illustrating an example of a user wavelength table according to the same configuration example.

FIG. 41 is a diagram illustrating an example of an inter-station wavelength table according to the same configuration example.

DESCRIPTION OF EMBODIMENTS

Figure 1:
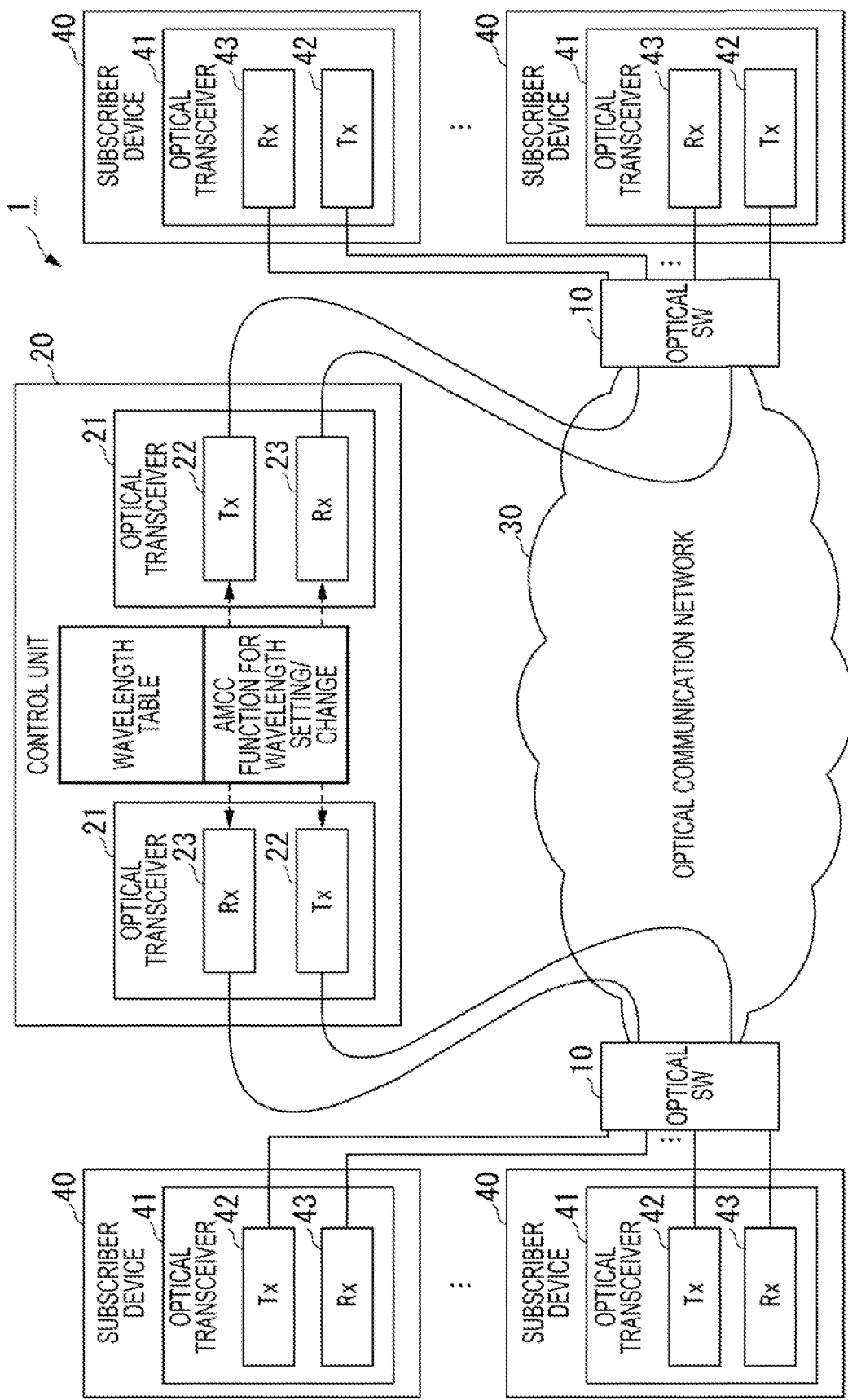
FIG. 1 is a diagram illustrating a basic configuration example of an optical communication system according to an embodiment.

Hereinafter, embodiments of the present invention will be described in detail with reference to the drawings. The same constituents are denoted by the same reference numerals throughout the drawings, and description thereof will not be made. In the following description, first, a basic configuration in the present invention will be described, and then specific embodiments will be described.
(Basic Configuration)

First, a basic configuration of the present invention will be described with reference to FIGS. 1 to 41.

FIG. 1 is a diagram illustrating a basic configuration example of an optical communication system 1 of the present embodiment. The optical communication system 1 includes one or a plurality of optical switches (SWs) 10. Although two optical SWs 10 are illustrated in the drawing, the number of optical SWs 10 is freely selected. The optical SWs 10 are connected to a control unit 20.

In a case where the optical SW 10 is controlled with an optical signal, the optical SW 10 includes at least an optical receiver that receives an optical signal, but description thereof will be omitted in the following description.

The optical SW 10 communicates with another optical SW 10 via an optical communication network 30. For example, a WDM network including various topologies can be used as the optical communication network 30. One or more subscriber devices 40 are connected to the optical SW 10. The subscriber device 40 is connected to the optical SW 10 via, for example, an optical access network such as a PON. The subscriber device 40 has an optical transceiver 41. The optical transceiver 41 is a configuration example of an optical transmission unit and an optical reception unit in a subscriber device. The optical transceiver 41 includes an optical transmitter (Tx) 42 and an optical receiver (Rx) 43. The optical transceiver 41 is a wavelength tunable optical transceiver. As the optical transceiver 41, for example, a conventional optical transceiver with an auxiliary management and control channel (AMCC) function may be used.

The control unit 20 (an operation system (OpS) or the like may be included therein, or the OpS may include the control unit 20; the same applies hereinafter) may be connected to any port of the optical SW 10, for example, a port 2. The control unit 20 may be installed in a building different from that of the optical SW 10 and connected to the optical SW 10 or an optical SW controller (not illustrated in FIG. 1) via a network. The control unit 20 may be connected to a port that is not connected to the subscriber device 40, another optical SW 10, a higher network, a transmission line to another ground, or the like among the ports of the optical SW 10. The control unit 20 may be installed for each optical SW 10 or may be installed for the plurality of optical SWs 10.

In a case where the control unit 20 controls the optical SW 10 with an optical signal, the control unit 20 includes one or a plurality of optical transceivers 21. The optical transceiver 21 is a configuration example of an optical transmission unit and an optical reception unit in the control unit 20. The optical transceiver 21 includes an optical transmitter (Tx) 22 and an optical receiver (Rx) 23. The optical transceiver 21 is a variable wavelength optical transceiver. The case where there are a plurality of optical transceivers 21 is suitable for a case where a connectable port is different for each port of the optical SW 10, a case where ports for controlling the optical SW 10 and the subscriber device 40 are different, a case where a control target is at least one of the plurality of optical SWs 10 or the subscriber device 40 connected to the plurality of optical SWs 10 and connectable ports are different, or the like. A single optical transceiver may be employed by providing connection using a transmission line in a case where there are a plurality of optical SWs 10, and providing return connection using a return transmission line or the like that will be described later in a case where ports are different. When the control unit includes a transmitter and the subscriber device includes a receiver, a transmission side of the control unit 20 is connected to a reception side of the subscriber device 40, and when the control unit 20 includes a receiver and the subscriber device 40 includes a transmitter, the reception side of the control unit 20 is connected to the transmission side of the subscriber device 40.

In a case where only an optical transceiver or a modulation unit of the monitoring unit that will be described later is used, the optical transceiver does not have to be provided. In a case where the control unit 20 controls the subscriber device 40 with an optical signal, when the control unit 20 performs a wavelength allocation process or the like on the subscriber device 40 with an optical signal via the optical SW 10, the optical SW 10 is controlled to transmit and receive an optical signal between the subscriber device 40 and the control unit 20, and after the wavelength allocation process, the optical SW 10 is controlled to output the optical signal input from a transmission line to a port corresponding to a transfer destination specified by a subscriber, the subscriber device 40, a port of the optical SW 10, a wavelength of the optical signal, a combination of the subscriber device 40 and the wavelength of the optical signal, a combination of the port and the wavelength of the optical signal, or the like.

In a case where the wavelength allocation process or the like is performed via the monitoring unit at the preceding stage with respect to the optical SW 10, the optical SW 10 is controlled to transmit and receive an optical signal between the monitoring unit and the subscriber device 40, and output the optical signal to a port corresponding to a specified transfer destination after the allocation process.

In a case where the wavelength allocation process or the like is performed via the monitoring unit at the subsequent stage with respect to the optical SW 10, the optical SW 10 is controlled to output an optical signal to a port corresponding to a specified transfer destination, the optical signal is transmitted and received between the monitoring unit and the subscriber device 40 in a state in which the output from the port is blocked by a blocking unit, and after the allocation process, the blocking is canceled.

In a case where the wavelength allocation process or the like is performed before connection to the optical SW 10, after the wavelength allocation process, the optical SW 10 is controlled to output an optical signal to a port corresponding to a specified transfer destination.

The control unit 20 has or is connected to a management database (DB) such as a SW connection table and a wavelength table.

In a case where the control unit 20 is connected to the management DB, information regarding a user and a use wavelength is exchanged with the management DB. The management DB stores a use wavelength, destination information, and transfer destination information of each user. For example, in a case of a ground A or the like, the destination and the transfer destination are represented by the ground A and a ground B, and in a case of the subscriber device 40 or the like, the destination and the transfer destination are represented by an identifier of the subscriber device 40, or an identifier of a transmission line thereof or a port to which the device is connected, an identifier of a device through which a signal passes on the way, a component thereof, or a function thereof, or an identifier of a port to which the device or the component is connected. The management DB manages information regarding a user connected to the optical access system.

The SW connection table indicates a connection destination of each port of the optical SW 10. That is, a port to and from which an optical signal is input and output can be used as information for identifying a subscriber device, a control unit, a monitoring unit, a ground, or the like that is a transmission source or a transmission destination of the optical signal.

The wavelength table is data indicating a wavelength allocated to each subscriber device 40 or the like. The wavelength table may be divided into a user wavelength table and an inter-station wavelength table.

The user wavelength table indicates, for example, a wavelength used for user transmission, a wavelength used for reception, an available wavelength not being used for transmission and reception, and a wavelength that cannot be used due to a failure.

The inter-station wavelength table indicates, for example, a wavelength that a certain ground uses for communication with each of other grounds, an available wavelength that is not used for communication with each of the other grounds, and a wavelength that cannot be used for communication with each of the other grounds due to a failure.

In order to allocate a wavelength corresponding to a transfer destination on a path to a communication destination to the subscriber device 40, first, an optical transceiver of the subscriber device 40 or the like and the optical transceiver of the control unit 20 communicate with each other. The control unit 20 refers to the wavelength table and selects a wavelength to be allocated to the subscriber device 40 or the like according to a transfer destination on a path to a communication destination.

For example, a wavelength controller of the control unit 20 refers to information indicating a wavelength used by a user or a service, and allocates the wavelength to be used by the user. The wavelength controller manages and controls information regarding which user is connected to which port of the optical SW 10 and which wavelength is used by sharing each piece of connection information.

When a wavelength is selected, in a case where the wavelength is multiplexed in a section configuring an intermediate path and identification is performed by using a wavelength, a free wavelength in the section configuring the path is an available wavelength, and the wavelength is selected from among available wavelengths.

On the other hand, in a case where it is not necessary to consider a free wavelength in a section in which wavelength multiplexing is not performed in the section configuring an intermediate path, and identification and branching are not performed by using only a wavelength (for example, time division multiplexing, code division multiplexing, mode division multiplexing, core division multiplexing, core wire multiplexing, space division multiplexing, frequency division multiplexing, polarization division multiplexing, or a combination thereof, or a combination thereof and wavelength division multiplexing), a wavelength that is not a free wavelength in the section may also be selected as an available wavelength if identification and branching are possible in the section. In a case where wavelength conversion is performed in the middle of a path, a free wavelength in a section configuring a path to wavelength conversion or a free wavelength when a wavelength is not multiplexed or identification and branching are not performed by using only a wavelength in a section configuring an intermediate path before wavelength conversion does not have to be selected.

As described above, since the wavelength to be selected does not depend only on a usage status of the wavelength in the section configuring the intermediate path, it is desirable that the wavelength table indicates available wavelengths in consideration of not only a free wavelength but also a combination with another multiplexing. Since an available wavelength depends on a usage status or a multiplexing status of a section configuring an intermediate path, the control unit can use AND of available wavelengths of sections configuring the path (alternatively, OR of wavelengths that cannot be identified or separated by factors other than a wavelength).

In a case where destination ports of the optical SW 10 are set by the subscriber device 40 that transmits an optical signal and a wavelength, and the ports of the optical SW 10 are divided into two groups, for example, a port 1 and a port 2, and connection is made between the groups and is not made within the group, available wavelengths may be different in a direction from the port 1 which is one group to the port 2 which is the other group and a direction from the port 2 which is the other group to the port 1 which is one group.

In a case where the same control unit controls or manages all the sections configuring the path, the wavelength allocation process is closed. However, in a case where a plurality of control units or an external device controls or manages all the sections, the wavelength allocation process may be controlled by operating in cooperation, or by receiving use authority for the wavelength table itself in which available wavelengths are known or values thereof.

The control unit 20 sets the selected wavelength in the subscriber device 40 by using a control signal. Thereafter, the control unit 20 sets the optical SW 10 to perform outputting according to a destination or a transfer destination of the optical signal transmitted from the subscriber device 40.

In a case where the subscriber devices 40 oppose each other via the optical SW 10, this connects the opposing subscriber devices 40. In a case where a signal passes through a device, a component, or a functional unit in the middle of the path connected between the subscriber devices 40, connection is made after the signal passes through the device, the component, or the functional unit. The optical SW 10 may connect the subscriber device 40, the device, the component, or the functional unit through which the signal passes, and the opposing subscriber device 40 with the same wavelength as light or after performing photoelectric conversion or other processes, or may connect them with different wavelengths in at least some paths as light or after performing photoelectric conversion or other processes. For example, in a case where a device, a component, or a functional unit through a signal passes in the middle of the path and both subscriber devices are connected to the same optical SW, routing is performed from the subscriber device to the next device, component, or function through which the signal passes, from the device, the component, or the function through which the signal passes to the next device, component, or function through which the signal passes, or from the last device, component, or function through which the signal passes to the opposing subscriber device. Routing from the subscriber device that is a communication source to the opposing subscriber device that is a communication partner is a setting in a case where a signal does not pass through a device, a component, or a function through which the signal is required to pass. In routing, identification of multiplexing processes of wavelengths or the like may be applied to parameters, in addition to a transmission source and a destination or a transfer destination including transmission source and an intermediate path. This is suitable in a case where a routing destination aggregates and transmits a plurality of optical signals having different wavelengths or optical frequencies in the same station or in an optical SW or the like at another ground, or a case where a plurality of optical signals having different wavelengths or optical frequencies is demultiplexed and distributed to different devices, components, functions, or subscriber devices.

The control unit 20 allocates a wavelength used for communication by the subscriber device 40 by using, for example, an AMCC function using a control signal that is slower than a main signal that is an optical signal between the subscriber devices 40 and can be superimposed on the main signal. Hereinafter, communication between the subscriber device 40 and the control unit 20 will be exemplified by the AMCC function, but the present invention is not limited thereto. In particular, in a case where initial setting or setting change of a wavelength or the like is performed in a state in which the main signal is not received by the opposing device, the control signal may not use another AMCC or the like different from the main signal, and may be exchanged as the main signal. Exchange may be performed according to any modulation method as long as the modulation method can be realized by functions of the subscriber device 40 and the control unit 20.

For example, in order to allocate a wavelength corresponding to a transfer destination on a path to a communication destination to the subscriber device 40, first, the optical transceiver 41 of the subscriber device 40 and the optical transceiver 21 of the control unit 20 perform communication by using the AMCC. The control unit 20 refers to the wavelength table and selects a wavelength to be allocated to the subscriber device 40 according to the transfer destination on the path to the communication destination. As an example, the control unit 20 selects a wavelength from among free wavelengths that are not used in other paths in a link for wavelength multiplexing on the path. The control unit 20 may allocate individual wavelengths to the respective subscriber devices 40. The control unit 20 sets the selected wavelength in the subscriber device 40 by using a control signal using the AMCC. Thereafter, the control unit 20 switches the optical SW 10 to output the optical signal transmitted from the subscriber device 40 to a transmission line corresponding to the transfer destination on the path to the communication destination.

The control unit 20 may control the optical switch to perform routing according to destination information. As the destination information, a state such as a set including a subscriber device, a wavelength, an input port, and an output port, or a set including a subscriber device, an input port, or an output port and a wavelength may be used.

The following embodiment will be mainly described in a case where a set including a subscriber device and a wavelength is used as destination information.

Consequently, the opposing subscriber devices 40 are connected.

The control unit 20 may perform a wavelength change process of instructing the subscriber device 40 to which the wavelength has been allocated to change the wavelength. For example, the target subscriber device 40 is specified on the basis of monitoring information output from a monitoring unit that will be described later, and the wavelength change process is performed on the specified subscriber device 40.

The instruction from the control unit 20 to the subscriber device 40 may be given on a path at the time of initial setting, or may be given by the monitoring unit or the like.

The control unit 20 controls the optical SW 10 or a blocking unit, if any, such that the optical signal of the target subscriber device 40 is not transmitted during the wavelength change. In a case where the control unit 20 directly controls the subscriber device 40 by an optical signal, the optical SW 10 is controlled such that the optical signal is transmitted and received between the subscriber device 40 and the wavelength controller.

For example, in a case where there is no other influence on the output side before the wavelength change, an output port is switched after the wavelength change, and in a case where there is no other influence on the output side after the wavelength change, the output port is switched before the wavelength change. The transmission may be stopped by a device other than the optical SW 10.

For example, a transmission line from the optical SW 10 to the subscriber device 40 or with the subscriber device 40 is removed, and connection is reestablished after the setting. Alternatively, a transmission line, the optical SW 10, a combining/branching device, a multiplexer/demultiplexer, and a blocking unit at a connection point thereof are provided, and the blocking unit performs blocking before wavelength change, and performs setting before or after switching the output port as necessary to cancel the blocking.

For example, after the wavelength change process, the optical SW controller controls the optical SW 10 to output an optical signal having the changed wavelength from the subscriber device 40 from the port 2 according to a communication destination or a transfer destination.

At the time of wavelength switching, for example, in a case where the wavelength switching affects another subscriber device 40, the optical output in the path is blocked. Specifically, transmission of the optical signal is stopped, the connection to the optical SW 10 is canceled, the connection from the input side to the output side of the optical SW 10 is canceled, and the optical signal is blocked by, for example, a blocking unit included in a monitoring unit of a shutter or the like.

In the wavelength allocation process, the optical SW controller controls the path in the optical SW 10 such that the optical SW 10 does not transmit the optical signal of the subscriber device 40 that is a wavelength allocation target. That is, the optical SW controller controls the path in the optical SW 10 such that the optical signal transmitted from the subscriber device 40 is not output to a port (another port) other than the port connected to the monitoring unit of the subscriber device 40 that is a wavelength allocation target.

In a case where there is no particular influence even if an output destination of the optical SW 10 is switched before the wavelength is set (before the wavelength is allocated), the optical SW controller may switch the output destination of the optical SW 10 before the wavelength is changed. At the time of the wavelength allocation process, a functional unit other than the optical SW 10 may stop transmission of the optical signal transmitted from the subscriber device 40.

In a case where the wavelength switching is associated with switching of the optical SW 10 and the wavelength is switched in a state in which the optical SW 10 is connected to the path before or after the switching, there is no influence.

The wavelength allocation process (wavelength setting) and the path setting process are executed in this order. The optical SW controller switches an output destination (path) of the optical SW 10 after the wavelength change such that there is no particular influence even if the output destination of the optical SW 10 is switched.

For example, in a case where a first port and a first wavelength "λ1" are used before switching, and a second port and a second wavelength "λ2" are used after switching, the following may be used.

(1) In a case where there is no subscriber device 40 using the first port and the second wavelength "λ2":

Switching from the first wavelength "λ1" to the second wavelength "λ2" at the first port has no influence. In this case, it is possible to perform wavelength switching before port switching.

(2) In a case where there is the subscriber device 40 using the first port and the second wavelength "λ2":

Switching from the first wavelength "λ1" to the second wavelength "λ2" at the first port has influence. In this case, it is not possible to perform wavelength switching before port switching.

(3) In a case where there is no subscriber device 40 using the second port and the first wavelength "λ1":

Switching from the first wavelength "λ1" to the second wavelength "λ2" at the second port has no influence. In this case, it is possible to perform wavelength switching before port switching.

(4) In a case where there is the subscriber device 40 using the second port and the first wavelength "λ1":

Switching from the first wavelength "λ1" to the second wavelength "λ2" at the second port has influence. In this case, it is not possible to perform wavelength switching before port switching.

In the above "(1)" and "(3) or (4)", wavelength switching can be performed before port switching.

In the above "(1) or (2)" and "(3)", wavelength switching can be performed before port switching.

In the above "(2)" and "(4)", wavelength switching cannot be performed before port switching, and it is necessary to stop or block an optical signal.

In the wavelength allocation process, the wavelength controller executes the wavelength allocation process on the subscriber device 40 that is a wavelength allocation target via the monitoring unit. For example, the wavelength controller executes a process of allocating the same wavelength as or a new wavelength different from a wavelength used when the abnormality is detected on the subscriber device 40 that is a wavelength allocation target.

In the path setting process, the optical switch controller controls the path in the optical SW 10 such that the subscriber device 40 that is a wavelength allocation target is connected to a port (another port) other than the port connected to the monitoring unit of the subscriber device 40 that is a wavelength allocation target. For example, the optical switch controller controls the optical SW 10 to output an optical signal input from a transmission line of the subscriber device 40 that is a wavelength allocation target to a port (another port) specified according to a transfer destination. Here, the transfer destination is specified according to a subscriber, the subscriber device 40, the port of the optical SW 10, a wavelength of the optical signal, a combination of the subscriber device 40 and the wavelength of the optical signal, a combination of the port 1 and the wavelength of the optical signal, or the like.

The optical SW 10 is provided in, for example, an optical gateway (GW). An example of the optical SW 10 provided in the optical GW will be described with reference to FIGS. 2 to 15.

Figure 2:
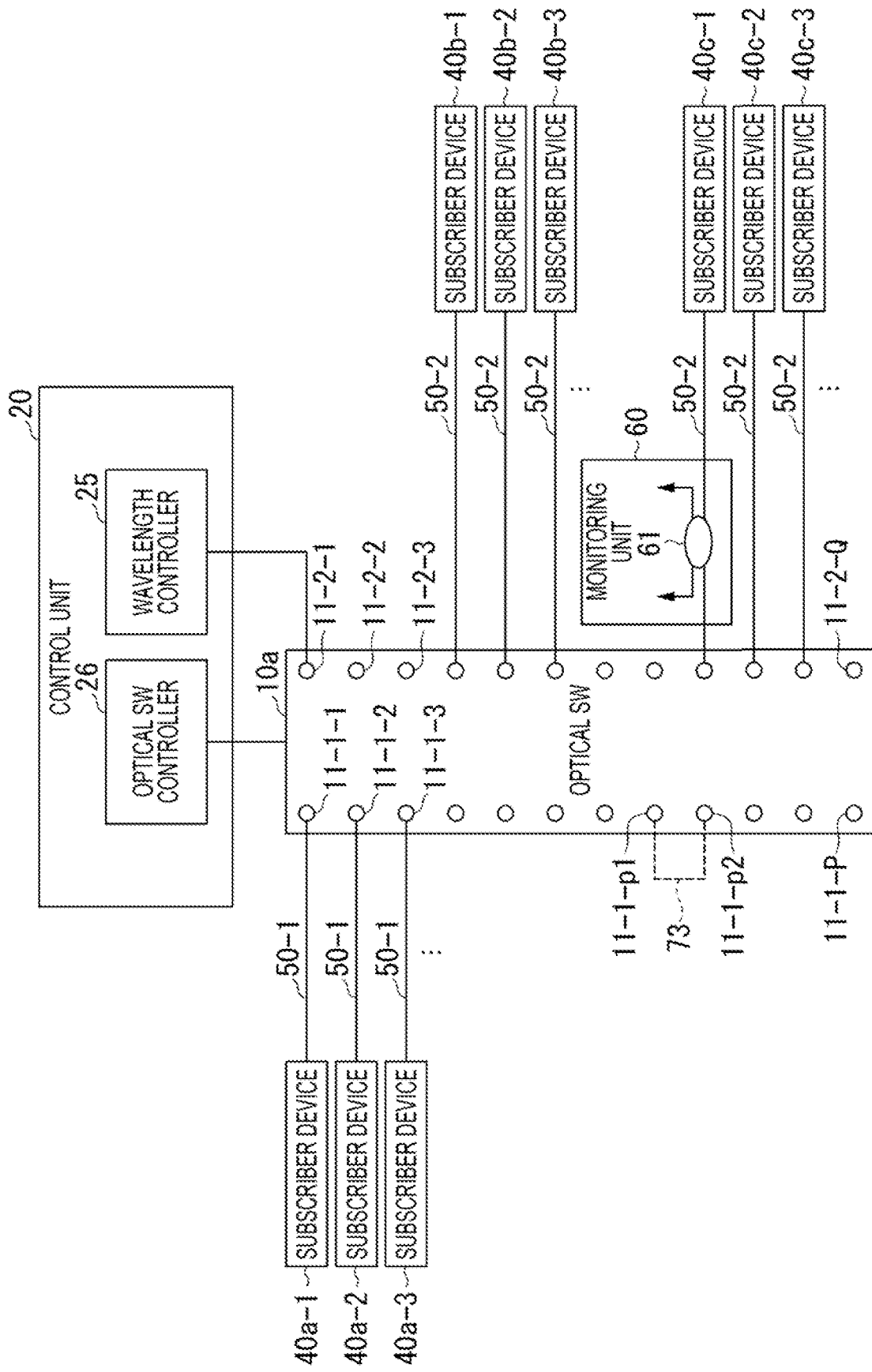
FIG. 2 is a diagram illustrating an example of an optical SW according to a basic configuration.

FIG. 2 is a diagram illustrating a configuration example of an optical SW 10a. The optical SW 10a is connected to the plurality of transmission lines 50, and outputs an optical signal input from any of the transmission lines 50 to the other transmission line 50. The transmission line 50 is, for example, an optical fiber. The optical SW 10a includes ports 11-1-1 to 11-1-P (where P is an integer of 1 or more) and ports 11-2-1 to 11-2-Q (where Q is an integer of 1 or more, and at least one of P and Q is 2 or more). In a case where any of the ports 11-1-1 to 11-1-P is not specified, the ports will be collectively referred to as a port 11-1, and in a case where any of the ports 11-2-1 to 11-2-Q is not specified, the ports will be collectively referred to as a port 11-2. A transmission line 50 connected to the port 11-1 will be referred to as a transmission line 50-1, and the transmission line 50 connected to the port 11-2 will be referred to as a transmission line 50-2.

Each port 11-1 is connected to the subscriber device 40 via the transmission line 50-1. Each port 11-2 is connected to the subscriber device 40 via the transmission line 50-2. The subscriber device 40 is, for example, an ONU. The transmission line 50-2 may be connected to an optical communication network 30 that is a higher network. In this case, a direction of the subscriber device 40 connected via the transmission line 50-1 is a downlink direction, and a direction of the higher network connected via the transmission line 50-2 is an uplink direction. The transmission line 50-2 may include an optical communication device such as another optical SW 10.

The ports 11-1-1, 11-1-2, 11-1-3, . . . are respectively connected to the subscriber devices 40a-1, 40a-2, 40a-3, . . . that are the subscriber devices 40 at the ground A via transmission lines 50-1. Any one of the ports 11-2 (in the same figure, the port 11-2-1) is connected to a wavelength controller 25 that will be described later. Some ports 11-2-i, 11-2-(i+1), 11-2-(i+2), . . . are respectively connected to the subscriber devices 40b-1, 40b-2, 40b-3, . . . that are the subscriber devices 40 at the ground B via the transmission line 50-2 (where i is an integer of 2 or more). Some ports 11-2-j, 11-2-(j+1), 11-2-(j+2), . . . different from the ports 11-2 connected to the subscriber devices 40 at the ground B are respectively connected to the subscriber devices 40c-1, 40c-2, 40c-3, . . . that are the subscriber devices 40 at the ground C via the transmission line 50-2 (where j is an integer of 2 or more). The optical SW 10a outputs an optical signal input from the port 11-1 to the port 11-2, and outputs an optical signal input from the port 11-2 to the port 11-1. Here, an optical communication device such as another optical SW or the optical communication network 30 may be interposed between the subscriber device 40 at the ground A, and the subscriber device 40 at the ground B and the subscriber device 40 at the ground C.

The optical SW 10a is connected to the control unit 20. The control unit 20 includes the wavelength controller 25 and the optical SW controller 26. The wavelength controller 25 performs a wavelength allocation process of receiving a wavelength allocation request from the subscriber device 40 by using an optical signal, allocating a wavelength corresponding to a transfer destination on a path to a communication destination to the subscriber device 40 that has transmitted the request, and notifying the subscriber device 40 of the allocated wavelength by using an optical signal. For example, the wavelength controller 25 may dynamically allocate a wavelength corresponding to a transfer destination on a path to a communication destination to the subscriber device 40 that has transmitted the request. For optical signals transmitted and received between the wavelength controller 25 and the subscriber device 40, it is desirable to use a control signal superposition method that does not depend on a communication protocol of an optical signal (main signal) between the subscriber devices 40. For optical signals transmitted and received between the wavelength controller 25 and the subscriber device 40, for example, a protocol-free AMCC is used. A main signal may be transmitted and received and set without using a control signal superimposed by the AMCC or the like.

While the wavelength allocation process is being executed, the optical SW controller 26 controls the optical SW 10a such that optical signals are transmitted and received between the subscriber device 40 and the wavelength controller 25. After the wavelength allocation process, the optical SW controller 26 controls the optical SW 10a to output the optical signal input from the transmission line 50 to the transmission line 50-2 corresponding to a transfer destination on a path to a communication destination specified by a combination of the subscriber device 40 that has transmitted the input optical signal and a wavelength of the input optical signal.

Each transmission line 50-2 includes a monitoring unit 60. In the same figure, only one monitoring unit 60 is illustrated. The monitoring unit 60 includes a power splitter 61. The power splitter 61 branches an optical signal transmitted through the transmission line 50-2. The monitoring unit 60 monitors the optical signal branched by the power splitter 61. The monitoring unit 60 generates monitoring information based on a monitoring result and outputs the generated monitoring information. The monitoring information is information indicating a monitoring result or information obtained from the monitoring result. For example, when an abnormality or the like of a communication status between the subscriber devices 40 is detected according to a change request from the subscriber device 40 using a control signal or by monitoring an optical signal, monitoring information in which the fact that the abnormality in the communication status has occurred and information for specifying the subscriber device 40 in which the abnormality in the communication status has occurred are set is output. Examples of the abnormality in the communication status include a wavelength shift, an increase or decrease in output, and a communication abnormality (error). An example of an output destination of the monitoring information is the control unit 20. In a case where the abnormality is detected, the control unit 20 controls the optical SW 10, the monitoring unit, or the blocking unit such that the optical signal of the target subscriber device 40 is not transmitted. In a case where the control unit 20 directly controls the subscriber device 40 with an optical signal, the optical SW 10 is controlled to connect the subscriber device 40 to the control unit 20 again. The control unit 20 performs a process of allocating the same wavelength as or a new wavelength different from the wavelength at the time of detection of the abnormality, similarly to when the new subscriber device 40 is connected. Consequently, the optical SW 10 inputs an optical signal having the wavelength before or after the change from the subscriber device 40 to a port of the subscriber device 40 before the change. In a case where the connection in the optical SW is not recovered from the abnormal state even when a predetermined process such as restart or reallocation is performed a predetermined number of times due to a failure, a Rogue ONU, or the like, or from an identification number or a behavior of a subscriber device registered in a blacklist or performing a similar operation in the past, the connection in the optical SW may be released, the connection may be blocked by a blocking unit, or setting, connection, or transfer may be stopped. During communication with another subscriber device 40, the power splitter 61 may branch a control signal transmitted by the subscriber device 40 or superimpose and output the control signal to the subscriber device 40 or the like.

In a case where the subscriber device 40 is connected to the transmission line 50-2, the control unit 20 may be connected to the port 11-1. Alternatively, in a case where the subscriber device 40 is connected to the transmission line 50-2, the subscriber device 40 connected to the transmission line 50-2 may be connected to the control unit 20 via a return transmission line 73. The return transmission line 73 is an optical fiber, an optical switch, an optical combining/branching device, or an optical multiplexer/demultiplexer that inputs an optical signal output from the port 11-1-$p1$ to another port 11-1-$p2$ (where p1 and p2 are integers of 1 or more and P or less). In this case, the optical signal transmitted from the subscriber device 40$b$ or 40$c$ is input to the optical SW 10$a$ via the transmission line 50-2. The optical SW 10$a$ outputs the optical signal input from the transmission line 50-2 to the port 11-1-$p1$, and receives the optical signal transmitted through the return transmission line 73 from the port 11-1-$p2$. The optical SW 10$a$ outputs the optical signal input from the port 11-1-$p2$ to the control unit 20 from the port 11-2-1. As a result, the subscriber device 40$b$ or 40$c$ and the control unit 20 are connected.

The wavelength controller 25 may perform a wavelength change process of instructing the subscriber device 40 subjected to the wavelength allocation process to change the wavelength or the like. Here, the wavelength change process will be described by an example in which the subscriber device 40 communicates with the control unit with the monitoring information as a trigger. For example, the wavelength controller 25 specifies the subscriber device 40 that is a wavelength change target on the basis of the monitoring information output from the monitoring unit 60, and performs a wavelength change process on the specified subscriber device 40. The optical SW controller 26 controls the optical SW 10$a$ such that an optical signal is transmitted and received between the subscriber device 40 and the wavelength controller 25 during the wavelength change process. After the wavelength change process, the optical SW controller 26 controls the optical SW 10$a$ to output the optical signal transmitted from the subscriber device 40 at the changed wavelength to the transmission line 50-2 corresponding to the transfer destination on the path to the communication destination. For example, after the wavelength change process, the optical SW controller 26 controls the optical SW 10$a$ to output the optical signal having the changed wavelength from the subscriber device 40 to the transmission line 50-2 corresponding to the transfer destination on the path to the communication destination used for a combination of the subscriber device 40 that is a transmission source and the wavelength before the change. Alternatively, the optical SW 10$a$ may be controlled to output the optical signal having the changed wavelength to the transmission line 50-2 different from that before the wavelength change. In this case, before and after the wavelength change process, the subscriber devices 40 that are transfer destinations on the path to the communication destination are different. The wavelength controller 25 may receive a wavelength change request from the subscriber device 40 during communication or after the end of communication, and perform a wavelength change process on the subscriber device 40 that is a request source. Both the wavelength used for transmission and the wavelength used for reception by the subscriber device 40 may be changed by the wavelength change process, or either thereof may be changed.

The monitoring information used in the wavelength changing process may be, for example, a change request from the subscriber device 40 using a control signal, an abnormality in a communication status such as a wavelength deviation, an increase or decrease in output, or a communication abnormality (error), a deviation from designation, setting, or an allowable range of a wavelength, a modulation method, a protocol, or the like to be used, use of an unallocated wavelength, or abnormality detection such as signal interruption. The monitoring information may be a trigger other than a monitoring signal, for example, a change request for a transmission destination or the like via a main signal or via a signal not passing through an optical SW, or may be a request for abnormality detection, stoppage, or change from a device inside or outside a network, such as a transmission line or a management system. In a case where abnormality detection, stop, or change is requested and the wavelength or the like is not changed to a designated, set, or allowable range, the subscriber device 40 may be interrupted by a shutter or the like in a state in which an instruction or a signal for restart or the like is connected to the control unit or a signal is not output to the transmission line. The exchange between the control unit 20 and the subscriber device 40 may be performed by using an AMCC or may be performed by using a main signal. In a case where the subscriber device 40 is not compatible with an AMCC, it is preferable to use the main signal. In a case where a wavelength or the like before the switching does not adversely affect an opposing device before the switching, a path with the opposing subscriber device 40 may be set by the monitoring unit or the like while being connected without being switched to the control unit 20. In a case where the wavelength or the like after the switching does not adversely affect the opposing device after the switching, the path with the opposing subscriber device 40 may be set by the monitoring unit or the like after being switched without being switched to the control unit 20.

Figure 3:
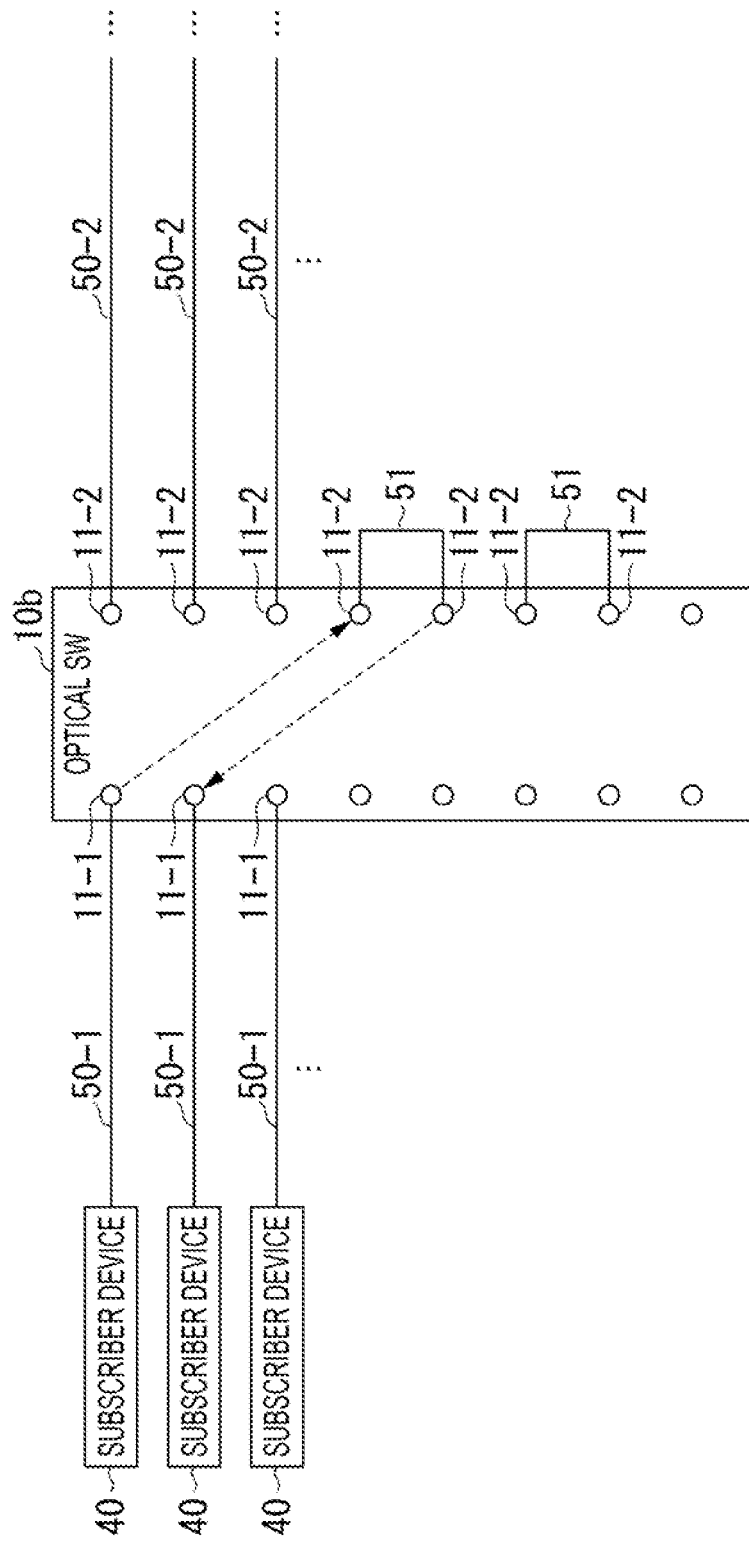
FIG. 3 is a diagram illustrating an example of an optical SW according to a basic configuration.

FIG. 3 is a diagram illustrating a configuration example of an optical SW 10$b$ having a return circuit for return communication. In the same figure, the same portions as those of the optical SW 10$a$ illustrated in FIG. 2 are denoted by the same reference numerals, and the description thereof will be omitted. In FIG. 3, the control unit 20 is not illustrated. In the following description as well, description of the control unit 20 will be omitted in the drawings when it is not particularly necessary. The optical SW 10*b* is connected to a return transmission line 51. The return transmission line 51 is an optical fiber, an optical switch, an optical combining/branching device, or an optical multiplexer/demultiplexer that inputs an optical signal output from the port 11-2 to another port 11-2. Consequently, the optical SW 10*b* enables return communication.

In a case where a port that is an output destination of the optical signal is set by a combination of the subscriber device 40 that is a transmission source and the wavelength, a destination may be different between a direction from the port 11-1 to the port 11-2 to which the return transmission line 51 is connected and a direction from the port 11-2 to which the return transmission line 51 is connected to the port 11-1.

Figure 4:
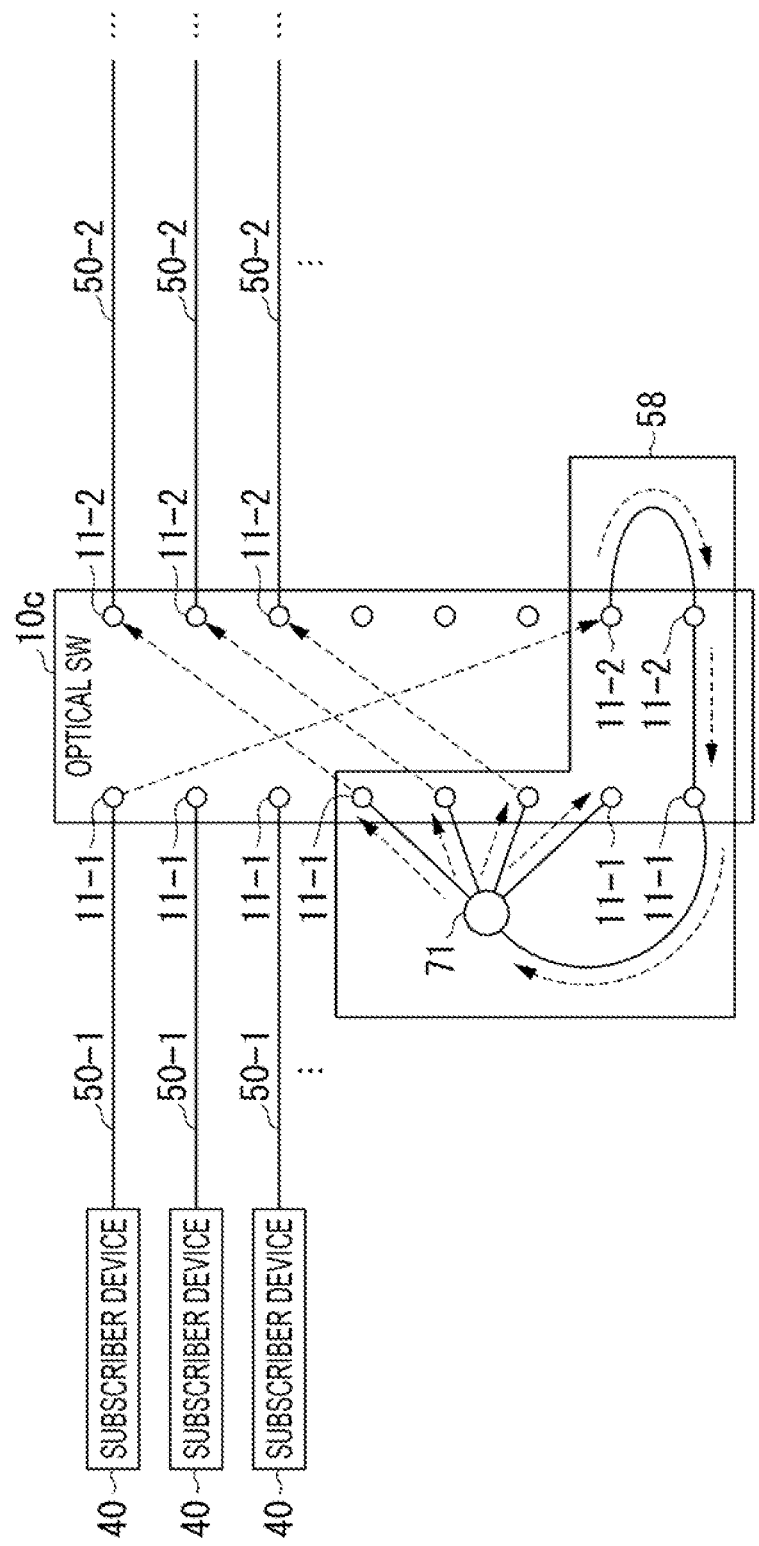
FIG. 4 is a diagram illustrating an example of an optical SW according to a basic configuration.

FIG. 4 is a diagram illustrating a configuration example of the optical SW 10*c* that performs uplink multicast using a one to one return transmission line and a one to other return transmission line opposing each other. In the same figure, the same portions as those of the optical SW 10*a* illustrated in FIG. 2 are denoted by the same reference numerals, and the description thereof will be omitted. The optical SW 10*c* includes a distribution unit 58 that distributes an optical signal output from the port 11-2 into a plurality of signals and inputs the plurality of distributed optical signals to different ports 11-1. In FIG. 4, the optical SW 10*c* inputs the optical signal output from the port 11-2 to the other port 11-2 via the return transmission line. The optical SW 10*c* outputs the input optical signal to the port 11-1 to which a 1×N power splitter 71 is connected. The optical signal output from the port 11-1 is distributed by the power splitter 71 and input to a plurality of other ports 11-1. The optical SW 10*c* outputs the optical signals input from the plurality of ports 11-1 to different ports 11-2, respectively. Bidirectional communication may also be performed. The optical signal in the downlink direction is routed in a reverse direction to the uplink direction.

The optical SW 10*c* may receive an optical signal having a plurality of wavelengths from the port 11-1. In this case, the optical SW 10*c* distributes the optical signal having a plurality of wavelengths input from the port 11-1 by using the distribution unit 58, and outputs the distributed optical signals to the respective subscriber devices 40 connected to the ports 11-2 or transmission lines connected to other grounds. The subscriber device 40 connected to the port 11-2 selects and receives an optical signal having a predetermined wavelength among optical signals having a plurality of wavelengths. The transmission lines connected to the other grounds may transmit optical signals having a plurality of wavelengths without any change or may transmit optical signals having wavelengths selected by a WDM device illustrated in FIG. 6 that will be described later.

Figure 5:
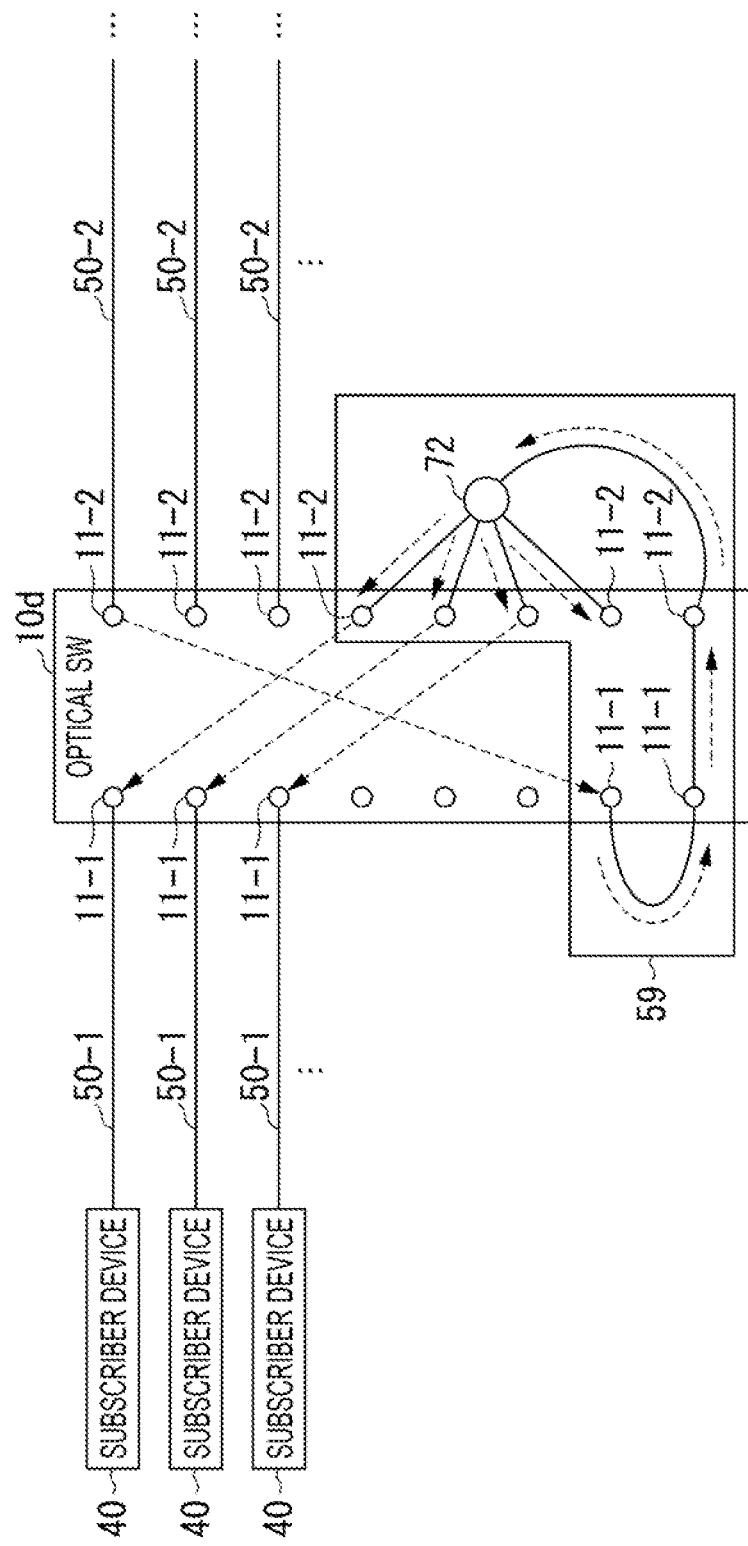
FIG. 5 is a diagram illustrating an example of an optical SW according to a basic configuration.

FIG. 5 is a diagram illustrating a configuration example of the optical SW 10*d* that performs downlink multicast. In the same figure, the same portions as those of the optical SW 10*a* illustrated in FIG. 2 are denoted by the same reference numerals, and the description thereof will be omitted. The optical SW 10*d* includes a distribution unit 59 that distributes an optical signal output from the port 11-1 into a plurality of signals and inputs the plurality of distributed optical signals to different ports 11-2, respectively. In FIG. 5, the optical SW 10*d* inputs the optical signal output from the port 11-1 to another port 11-1 via a return transmission line. The optical SW 10*d* outputs the input optical signal to the port 11-2 to which a 1×N power splitter 72 is connected. The optical signal output from the port 11-2 is distributed by the power splitter 72 and input to the plurality of different ports 11-2. The optical SW 10*d* outputs the optical signals input from the plurality of ports 11-2 to different ports 11-1, respectively.

An optical signal having a plurality of wavelengths may be input to the optical SW 10*d* from the port 11-2. In this case, in the optical SW 10*d*, the optical signal having a plurality of wavelengths input from the port 11-2 is distributed by the distribution unit 59, and the distributed optical signals are output to the respective subscriber devices 40 connected to the ports 11-1. Each of the subscriber devices 40 connected to the ports 11-1 selects and receives an optical signal having a predetermined wavelength from among the received optical signals having a plurality of wavelengths.

Figure 6:
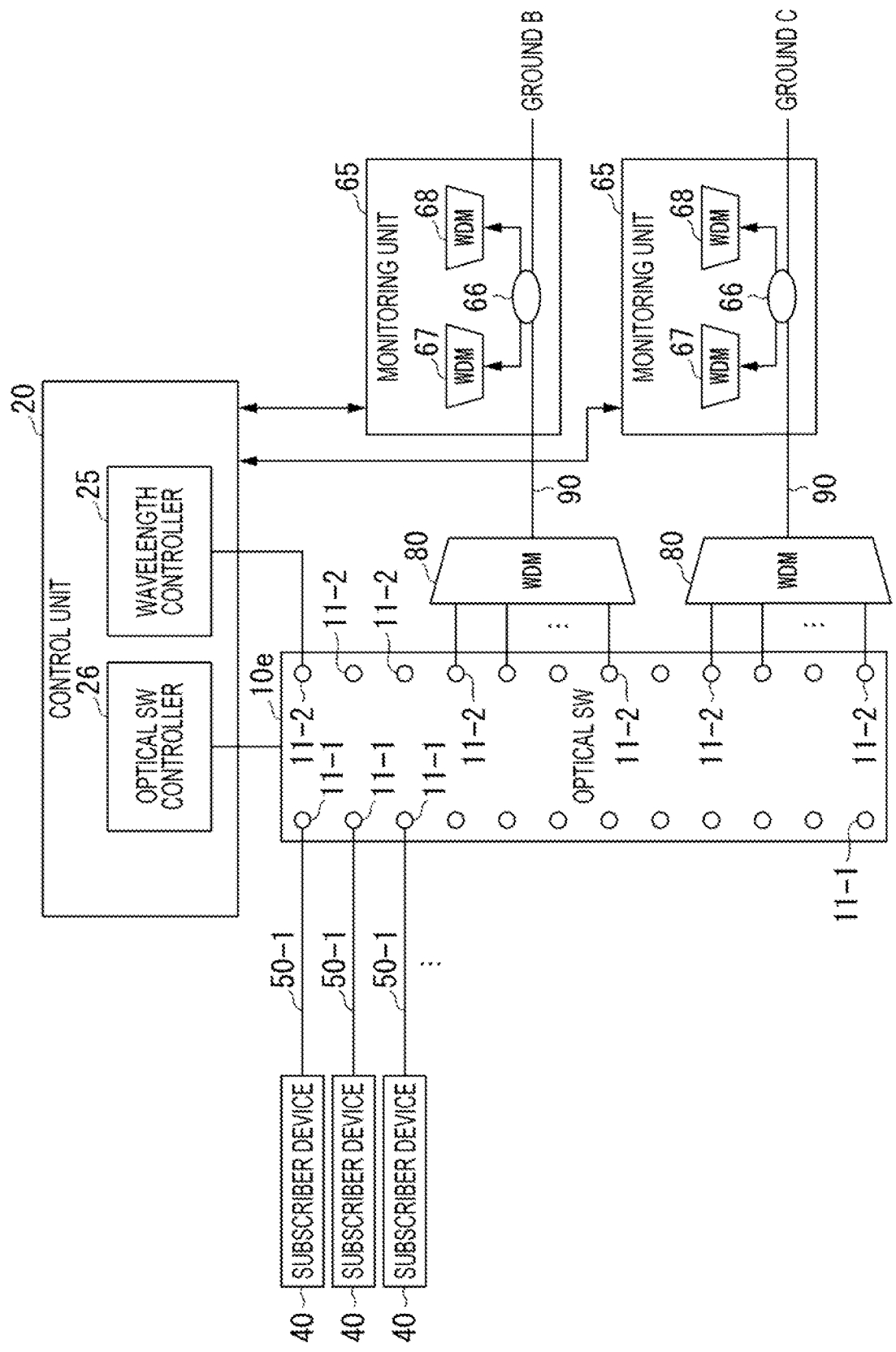
FIG. 6 is a diagram illustrating an example of an optical SW according to a basic configuration.

FIG. 6 is a diagram illustrating a configuration example of an optical SW 10*e* that performs WDM transmission. In the same figure, the same portions as those of the optical SW 10*a* illustrated in FIG. 2 are denoted by the same reference numerals, and the description thereof will be omitted. The optical SW 10*e* is connected to one or more WDM devices 80. The WDM device 80 is an example of a multiplexer/demultiplexer. The WDM device 80 multiplexes optical signals having different wavelengths output from the plurality of ports 11-2 and outputs a multiplexed optical signal to a multiplex communication transmission line 90. The WDM device 80 demultiplexes an optical signal received via the multiplex communication transmission line 90 according to wavelengths, and inputs the demultiplexed optical signals to the plurality of ports 11-2. As described above, the WDM device 80 has functions of a multiplexing device and a demultiplexing device. As a function of the multiplexing device, optical signals having different wavelengths output from the plurality of ports 11-2 of the optical SW 10*e* are multiplexed and output to the multiplex communication transmission line 90. As a function of the demultiplexing device, an optical signal received via the multiplex communication transmission line 90 is demultiplexed according to wavelengths, and the demultiplexed optical signals are respectively input to a plurality of different ports 11-2 of the optical SW 10*e*. The optical SW 10*e* that performs WDM transmission may connect the return transmission line 51 illustrated in FIG. 3 to the port 11-2 that is not connected to the WDM device 80.

The multiplex communication transmission line 90 includes a monitoring unit 65. The monitoring unit 65 includes a power splitter 66 and WDM devices 67 and 68. The power splitter 66 branches an optical signal transmitted through the multiplex communication transmission line 90. The WDM device 67 demultiplexes an uplink optical signal branched by the power splitter 66. The WDM device 68 demultiplexes a downlink optical signal branched by the power splitter 66. The monitoring unit 65 monitors optical signals demultiplexed by the WDM device 67 and the WDM device 68. The monitoring unit 65 generates monitoring information based on a monitoring result and outputs the generated monitoring information.

The monitoring unit 65 may include a power splitter 69 in each of the transmission lines between the ports 11-2 and the WDM device 80. The power splitter 69 branches an optical signal transmitted through the transmission line between the port 11-2 and the WDM device 80, and outputs the branched optical signal to the control unit 20.

The wavelength controller 25 may perform a wavelength change process of instructing the subscriber device 40 subjected to the wavelength allocation process to change a wavelength. For example, the wavelength controller 25 specifies the subscriber device 40 that is a wavelength change target on the basis of the monitoring information output from the monitoring unit 65, and performs a wavelength change process on the specified subscriber device 40. The optical SW controller 26 controls, for example, reconnects the optical SW 10e via the monitoring unit such that optical signals are transmitted and received between the subscriber device 40 and the wavelength controller 25 during the wavelength change process. In a case where an optical signal having the changed wavelength is input from the subscriber device 40 after the wavelength change process, the optical SW controller 26 controls the optical SW 10e to output the input optical signal from the port 11-2 corresponding to the transfer destination on the path to the communication destination. The wavelength controller 25 may receive a wavelength change request from the subscriber device 40 during communication or after the end of communication, and perform a wavelength change process on the subscriber device 40 that is a request source.

Figure 7:
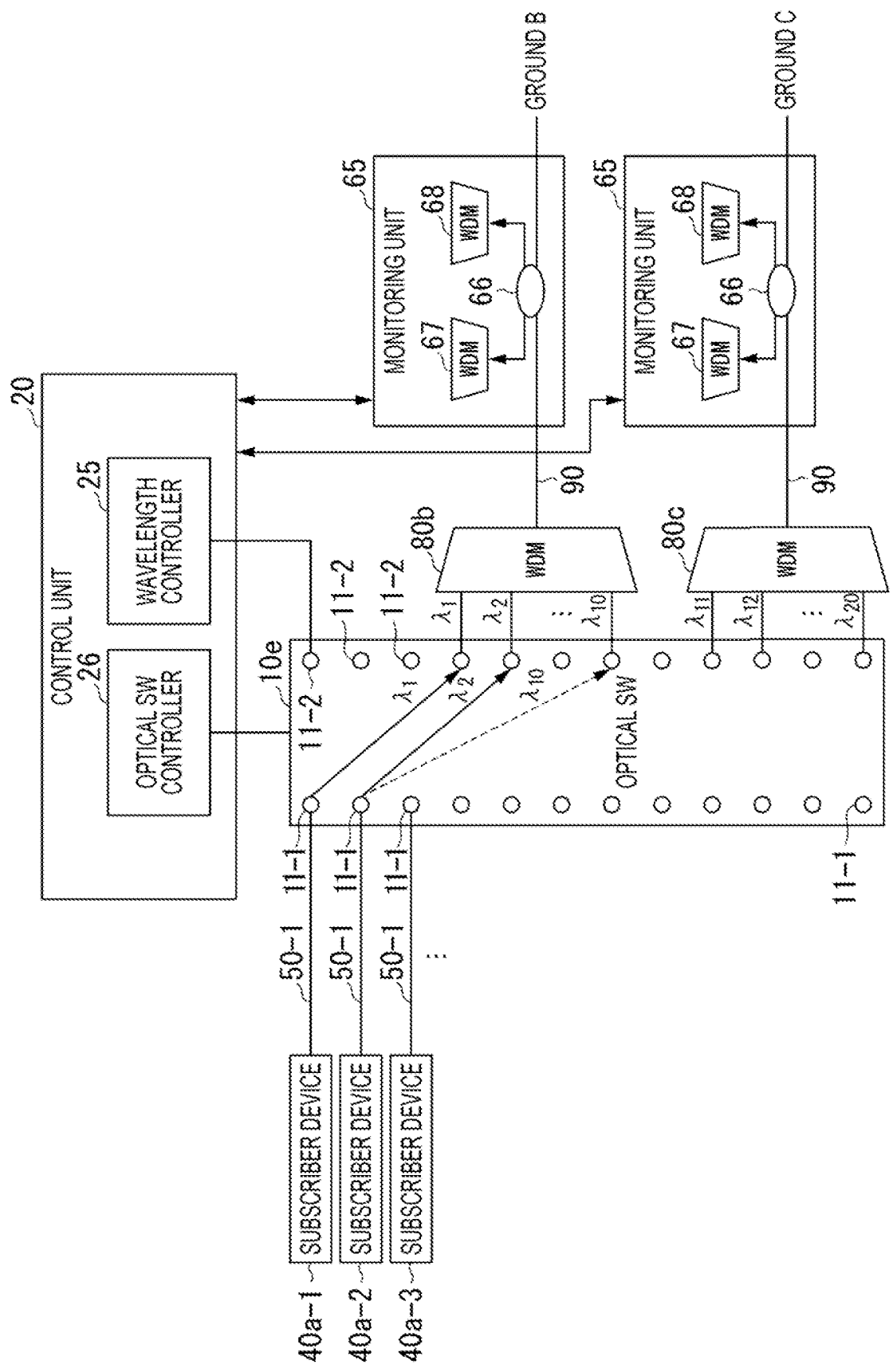
FIG. 7 is a diagram illustrating an example of routing before wavelength change in the optical SW according to the basic configuration.
Figure 8:
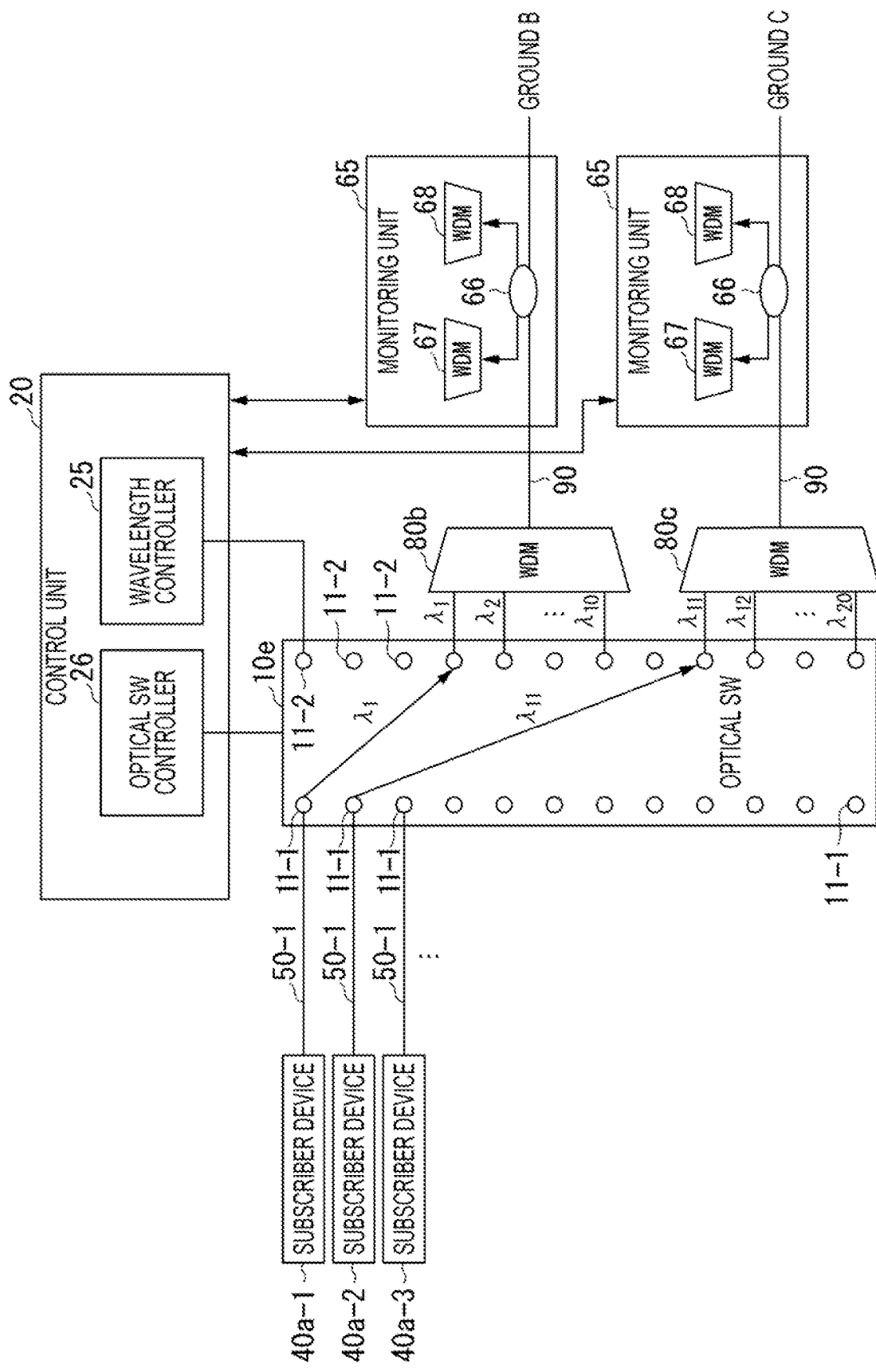
FIG. 8 is a diagram illustrating an example of routing after wavelength change in the optical SW according to the basic configuration.

An example of wavelength change in the optical SW 10e will be described with reference to FIGS. 7 and 8. FIG. 7 is a diagram illustrating an example of routing before wavelength change in the optical SW 10e. The optical SW 10e is connected to the subscriber devices 40a-1, 40a-2, 40a-3 . . . that are subscriber devices 40 at the ground A. The WDM device 80 connected to the ground B will be referred to as a WDM device 80b, and the WDM device 80 connected to the ground C will be referred to as a WDM device 80c. The WDM device 80b transmits and receives optical signals having wavelengths $\lambda_1$ to $\lambda_{10}$ to and from the optical SW 10e, and the WDM device 80c transmits and receives optical signals having wavelengths $\lambda_{11}$ to $\lambda_{20}$ to and from the optical SW 10e.

In FIG. 7, before the wavelength change, the optical SW 10e outputs the optical signal having the wavelength $\lambda_1$ input from the subscriber device 40a-1 and the optical signal having the wavelength $\lambda_2$ input from the subscriber device 40a-2 to the WDM device 80b from different ports 11-2. The subscriber device 40a-2 transmits a wavelength change request to the wavelength controller 25 by using a control signal during communication or after the end of communication. Upon receiving the wavelength change request from the subscriber device 40a-2, the wavelength controller 25 performs a wavelength change process of instructing the subscriber device 40a-2 to change to the wavelength $\lambda_{10}$. The optical SW controller 26, the monitoring unit, or the blocking unit does not output the optical signal having the wavelength $\lambda_{10}$ received from the subscriber device 40a-2 until the wavelength change is completed as necessary, and the optical SW controller 26 controls the optical SW 10e to output the optical signal from the port 11-2 corresponding to the wavelength $\lambda_{10}$ to the WDM device 80b after the switching is completed. The wavelength controller 25 may further change the wavelength used for reception by the subscriber device 40a-2.

After the wavelength change process, the optical SW controller 26 may control the optical SW 10e to output the optical signal having the changed wavelength transmitted from the subscriber device 40 that is a transmission source to the WDM device 80 different from that before the wavelength change. FIG. 8 is a diagram illustrating an example of routing after wavelength change in the optical SW 10e in a case where the WDM device 80 that is an output destination is changed. Before the wavelength change, as illustrated in FIG. 7, the subscriber device 40a-1 performs communication using the wavelength $\lambda_1$, and the subscriber device 40a-2-performs communication using the wavelength $\lambda_2$ or the wavelength $\lambda_{10}$. The subscriber device 40a-2 transmits a wavelength change request to the wavelength controller 25 by using a control signal during communication or after the end of communication. Upon receiving a wavelength change request from the subscriber device 40a-2, the wavelength controller 25 performs a wavelength change process of instructing the subscriber device 40a-2 to change a wavelength to the wavelength $\lambda_{11}$ in order to communicate with the subscriber device 40 at the ground C. The optical SW controller 26, the monitoring unit, or the blocking unit does not output the optical signal having the wavelength $\lambda_{10}$ input from the subscriber device 40a-2 until the wavelength change is completed as necessary, and after the switching is completed, the optical SW controller 26 controls the optical SW 10e to output the optical signal having the wavelength $\lambda_{11}$ received from the subscriber device 40a-2 to the WDM device 80c from the port 11-2 corresponding to the wavelength $\lambda_{11}$. The wavelength controller 25 may further change the wavelength used for reception by the subscriber device 40a-2.

In a case where the subscriber device 40a-2 does not change the wavelength used for reception, the wavelength controller 25 may operate as follows. In a case where the wavelength is not used as at least a part of the destination information, the following may not be applied.

(1) The wavelength controller 25 releases the transmission wavelength used by the subscriber device 40 at the ground B that is a communication destination before the wavelength switching. Due to the release of the transmission wavelength, the path from the subscriber device 40a-2 to the subscriber device 40 at the ground B is reset. Thereafter, the wavelength controller 25 reallocates the wavelength that has become a free wavelength due to the release for reception of a signal addressed to the subscriber device 40a-2 from the subscriber device 40 at the ground C that is a new communication destination. This is performed in a case where a wavelength to be used for each subscriber device 40 is unique, and no wavelength other than the free wavelength is allocated.

(2) In a case where the subscriber device 40 connected via the different multiplex communication transmission line 90 before and after the wavelength change of the subscriber device 40a-2 is a communication destination, the wavelength used before the wavelength change can be reused without any change. However, although the wavelength is used as the destination information, for example, in a case where a signal passes through a different transmission line or in a case where the input port or the output port of the optical switch is different, paths are handled to be different even for the same wavelength. In order to enable reuse as described above, in this case, for example, an "input transmission line", an "output transmission line", or a "combination of all transmission lines configuring a path" is added to an argument serving as a condition for determining an output destination of an optical signal. For example, the output destination is determined by a combination of a transmission line or a port that has received the optical signal and a wavelength of the optical signal, or a combination of a transmission line or a port that has received the optical signal, the subscriber device 40 that has transmitted the optical signal, and a wavelength of the optical signal.

Although the wavelength change process performed by the subscriber device 40 requesting wavelength change has been described above, the same applies to a wavelength change process performed on the basis of the monitoring information.

Figure 9:
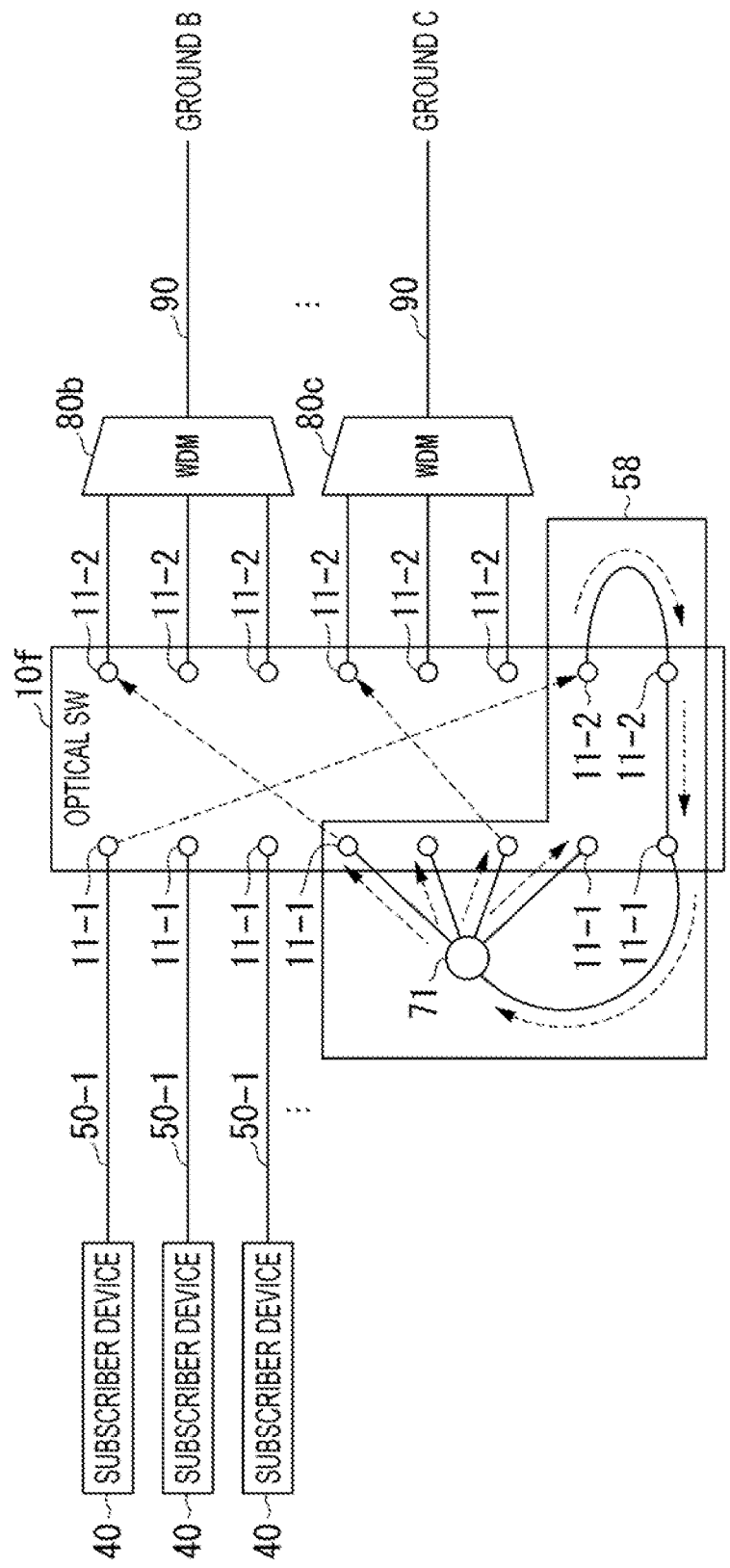
FIG. 9 is a diagram illustrating an example of an optical SW according to a basic configuration.

An optical SW that performs WDM transmission and multicast will be described with reference to FIGS. 9 to 11. FIG. 9 is a diagram illustrating a configuration example of an optical SW 10*f* that performs WDM transmission and uplink multicast. In FIG. 9, the optical SW 10*f* performs uplink multicast with a single wavelength. As illustrated in FIG. 9, the optical SW 10*f* includes a distribution unit 58 similar to that in FIG. 4. In FIG. 9, multicast is performed on the ground B and the ground C. The optical SW 10*f* outputs an optical signal input from the port 11-1 connected to the subscriber device 40 from the port 11-2 connected to the return transmission line, and receives the optical signal transmitted through the return transmission line from another port 11-2. The optical SW 10*f* outputs the received optical signal from the port 11-1 to which the 1×N power splitter 71 is connected. The optical SW 10*f* receives the optical signals distributed by the 1×N power splitter 71 from the plurality of ports 11-1, and outputs one of the received optical signals to the port 11-2 connected to the ground B and another optical signal to the port 11-2 connected to the ground C.

The subscriber device 40 may output a WDM signal. For example, the subscriber device 40 outputs a WDM signal in which the optical signal having the wavelength $\lambda_1$ and the optical signal having the wavelength $\lambda_2$ are multiplexed. A plurality of transmission lines between the WDM device 80*b* and the optical SW 10*f* transmit and receive optical signals having wavelengths $\lambda_1, \lambda_2, \ldots$ in order from the top. Similarly, in a plurality of transmission lines between the WDM device 80*c* and the optical SW 10*f*, optical signals having wavelengths $\lambda_1, \lambda_2, \ldots$ are transmitted and received in order from the top.

In the optical SW 10*f*, the WDM signal having the wavelength $\lambda_1$ and the wavelength $\lambda_2$ input from the ports 11-1 connected to the subscriber device 40 is distributed by the distribution unit 58. The optical SW 10*f* outputs the distributed WDM signal to the port 11-2 corresponding to the wavelength $\lambda_1$ among the ports 11-2 connected to the WDM device 80*b*. The optical SW 10*f* outputs another distributed WDM signal to the port 11-2 corresponding to the wavelength $\lambda_2$ among the ports 11-2 connected to the WDM device 80*c*. The WDM device 80*b* filters the WDM signal input from the port corresponding to the wavelength $\lambda 1$ to block the wavelength $\lambda_2$, passes the optical signal having the wavelength $\lambda_1$, and outputs the optical signal to the multiplex communication transmission line 90. The WDM device 80*c* filters the WDM signal input from the port corresponding to the wavelength 22 to block the wavelength $\lambda_1$, causes the optical signal having the wavelength $\lambda_2$ to pass therethrough, and outputs the optical signal to the multiplex communication transmission line 90.

Figure 10:
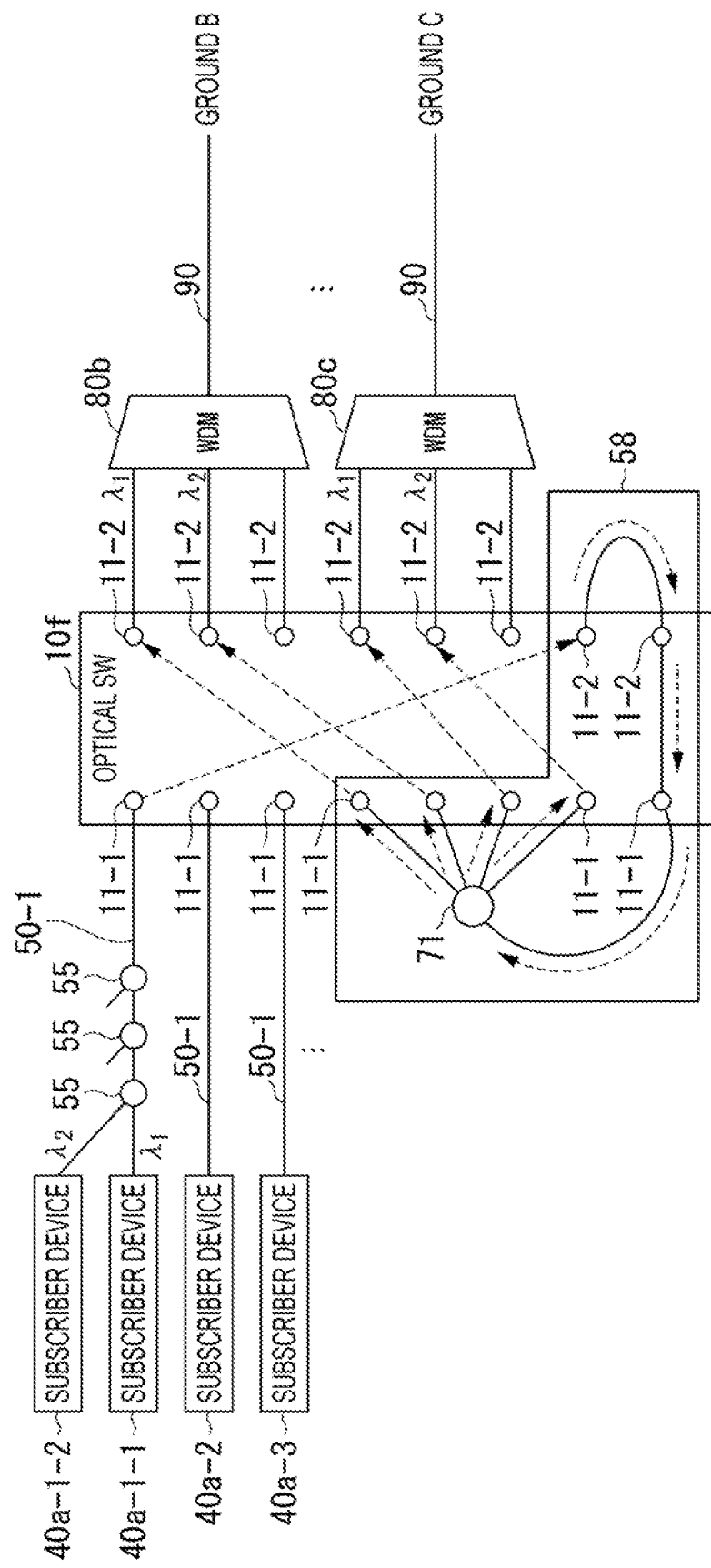
FIG. 10 is a diagram illustrating an example of an optical SW according to a basic configuration.

FIG. 10 is a diagram illustrating a case where the optical SW 10*f* performs uplink multicast to a plurality of grounds by using a plurality of wavelengths. By providing one or more 1×M power splitters 55 in the transmission line 50-1, a plurality of subscriber devices 40 can be connected to the transmission line 50-1 connected to one port 11-1. In FIG. 10, as a plurality of subscriber devices 40*a*-1, the subscriber devices 40*a*-1-1, 40*a*-1-2, . . . are connected to one transmission line 50-1. The subscriber devices 40*a*-1-1, 40*a*-1-2, . . . use different wavelengths. Here, the subscriber device 40*a*-1-1 transmits an optical signal having the wavelength $\lambda_1$, and the subscriber device 40*a*-1-2 transmits an optical signal having the wavelength $\lambda_2$. The optical SW 10*f* receives, from the port 11-1, an optical signal obtained by multiplexing the optical signal having the wavelength $\lambda_1$ transmitted by the subscriber device 40*a*-1-1 and the optical signal having the wavelength $\lambda_2$ transmitted by the subscriber device 40*a*-1-2. The optical SW 10*f* outputs the received optical signal from the port 11-2 to which the return transmission line is connected, and receives the optical signal transmitted through the return transmission line from another port 11-2. The optical SW 10*f* outputs the received optical signal from the port 11-1 to which the 1×N power splitter 71 is connected. The optical signals distributed by the 1×N power splitter 71 are input to the optical SW 10*f* from the plurality of ports 11-1.

The optical SW 10*f* outputs the optical signals distributed by the power splitter 71 to the port 11-2 corresponding to the wavelength $\lambda_1$ and the port 11-2 corresponding to the wavelength $\lambda_2$ among the ports 11-2 connected to the WDM device 80*b*. The optical SW 10*f* outputs the optical signals distributed by the power splitter 71 to the port 11-2 corresponding to the wavelength $\lambda_1$ and the port 11-2 corresponding to the wavelength $\lambda_2$ among the ports 11-2 connected to the WDM device 80*c*. The WDM device 80*b* filters the optical signal input from the port corresponding to the wavelength $\lambda_1$, causes the optical signal having the wavelength $\lambda_1$ to pass therethrough, and outputs the optical signal to the multiplex communication transmission line 90, and filters the optical signal input from the port corresponding to the wavelength $\lambda_2$, causes the optical signal having the wavelength $\lambda_2$ to pass therethrough, and outputs the optical signal to the multiplex communication transmission line 90. Similarly, the WDM device 80*c* filters the optical signal input from the port corresponding to the wavelength 1, causes the optical signal having the wavelength $\lambda_1$ to pass therethrough, and outputs the optical signal to the multiplex communication transmission line 90, and filters the optical signal input from the port corresponding to the wavelength $\lambda_2$, causes the optical signal having the wavelength $\lambda_2$ to pass therethrough, and outputs the optical signal to the multiplex communication transmission line 90.

Figure 11:
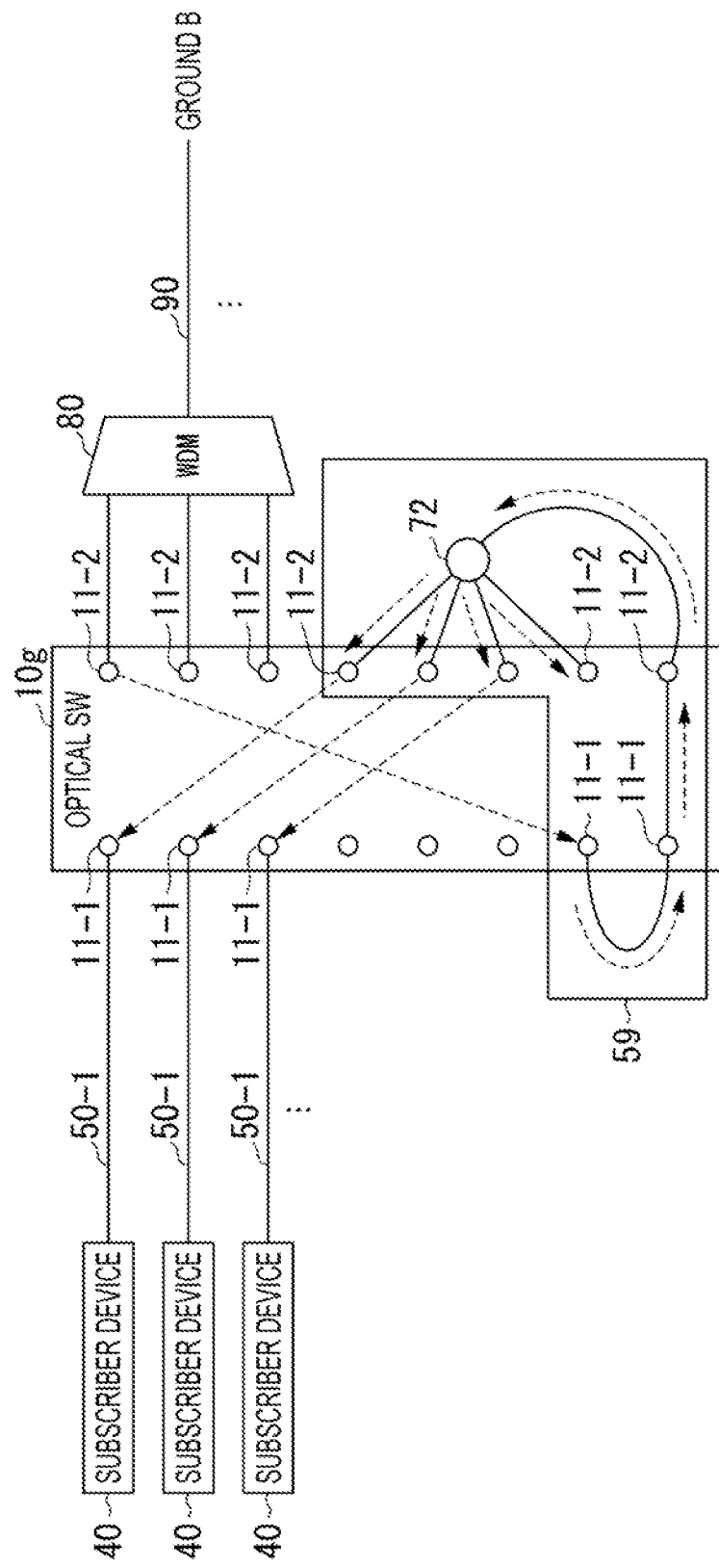
FIG. 11 is a diagram illustrating an example of an optical SW according to a basic configuration.

FIG. 11 is a diagram illustrating a configuration example of an optical SW 10*g* that performs WDM transmission and downlink multicast. The optical SW 10*g* has a distribution unit 59 similar to that in FIG. 5. The optical SW 10*f* illustrated in FIGS. 9 and 10 and the optical SW 10*g* illustrated in FIG. 11 may have a monitoring unit 65 similar to that in FIG. 6. The wavelength controller 25 may perform a wavelength change process in the same manner as described above on the subscriber device 40 in which the monitoring unit 65 has detected the abnormality in a communication status.

Figure 12:
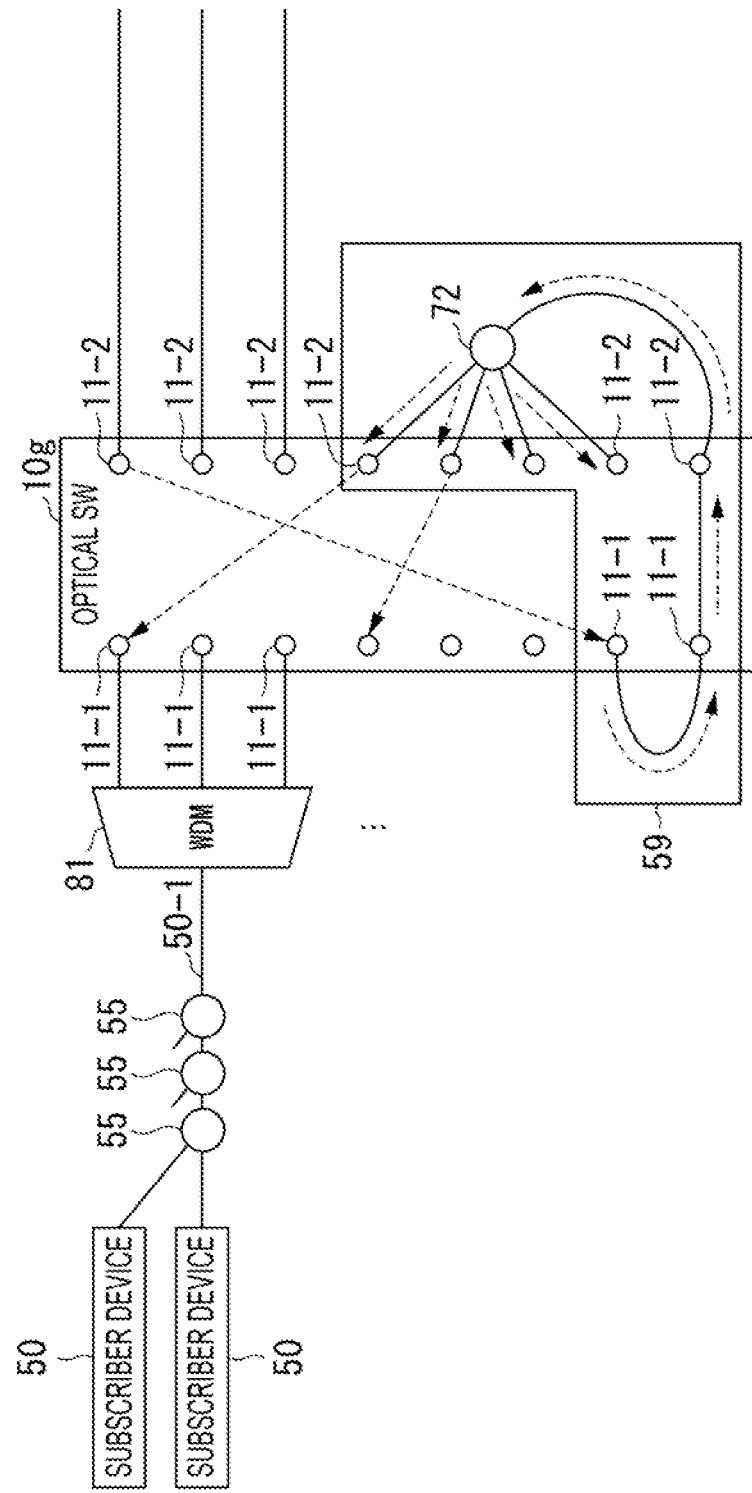
FIG. 12 is a diagram illustrating an example of an optical SW according to a basic configuration.

FIG. 12 is a diagram illustrating a case where the optical SW 10*g* performs WDM transmission and downlink multicast. The connection configuration illustrated in FIG. 12 is different from the connection configuration illustrated in FIG. 11 in that the WDM device 80 connected to the plurality of ports 11-2 of the optical SW 10*g* is replaced with a WDM device 81 connected to the plurality of ports 11-1 and disposed. One or more subscriber devices 40 are connected to the WDM device 81 on the side opposite to the port 11-1. The optical SW 10*g* receives an optical signal having a plurality of wavelengths from another ground from the port 11-2 and outputs the optical signal to the port 11-1 to which the return transmission line of the distribution unit 59 is connected. The optical signal having the plurality of wavelengths is branched by the power splitter 72 without any change. The optical SW 10*d* receives the branched optical signals having the plurality of wavelengths from the plurality of ports 11-2, and outputs the received optical signals to any one of the ports 11-1 connected to the WDM device 81. The WDM device 81 filters an optical signal having a wavelength corresponding to the port 11-1 to which the optical signal is input from the input optical signals having the plurality of wavelengths, causes the optical signal to pass therethrough, and outputs the optical signal having passed to the transmission line connected to the subscriber device 40.

Figure 13:
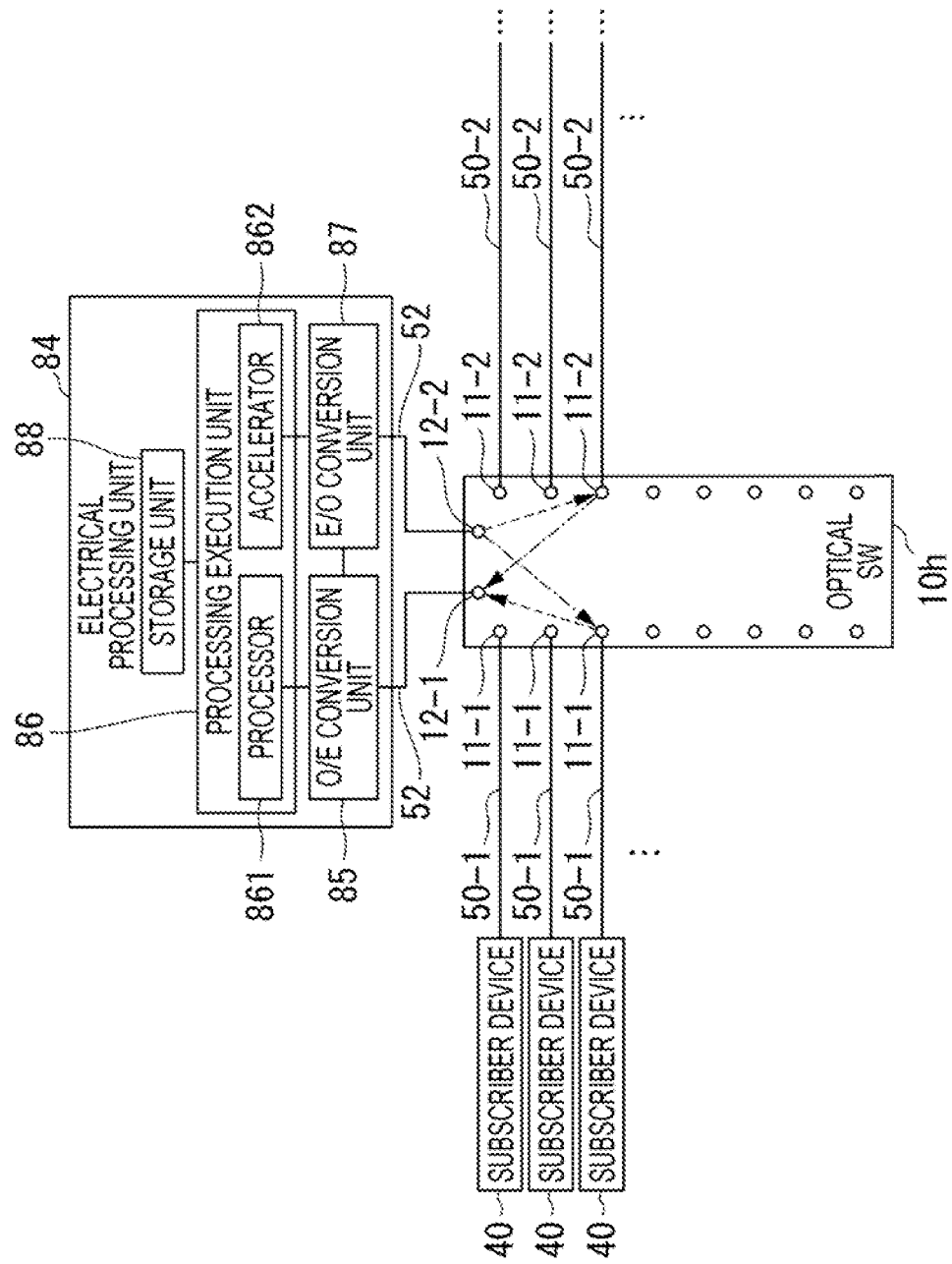
FIG. 13 is a diagram illustrating an example of an optical SW according to a basic configuration.

FIG. 13 is a diagram illustrating a configuration example of an optical SW 10h that performs electrical processing on an optical signal. In FIG. 13, the same constituents as those of the optical SW 10b illustrated in FIG. 3 are denoted by the same reference numerals, and description thereof will be omitted. The optical SW 10h is different from the optical SWs 10a to 10g described above in that a port 12-1 and a port 12-2 are further provided. The port 12-1 and the port 12-2 are connected to an electrical processing unit 84 via transmission lines 52. The port 11-1 and the port 11-2 may be used as ports connected to the electrical processing unit 84 via the transmission lines 52.

Under the control of the optical SW controller 26, the optical SW 10h outputs the optical signal input from the subscriber device 40 from the port 11-2 or the port 12-1 according to a combination of the subscriber device 40 that is a transmission source of the optical signal or the port 11-1 to which the optical signal is input and the wavelength. Under the control of the optical SW controller 26, the optical SW 10h outputs the output destination of the optical signal input from the port 11-2 from the port 11-1 or the port 12-1 according to a combination of the port 11-2 to which the optical signal is input and the wavelength.

The optical SW 10h outputs the optical signal from the port 12-1, and thus drops the optical signal on the electrical processing unit 84. The electrical processing unit 84 electrically terminates the dropped optical signal, performs various types of electrical processing such as error correction and line concentration, converts the signal into an optical signal, and inputs the optical signal to the port 12-2 of the optical SW 10h. The optical SW 10h outputs the optical signal input from the electrical processing unit 84 from the port 11-1 or the port 11-2 according to a transfer destination on a path to a communication destination specified by the combination of the port 12-2 and the wavelength. As described above, the electrical processing unit 84 performs O-E (electrical processing addition)-O conversion (O represents optical, and E represents electrical). The electrical processing unit 84 may simply perform O-E-O conversion without performing electrical processing for adding a function. The electrical processing unit 84 can also reduce optical waveform deterioration associated with transmission by performing 3R reproduction (re-amplification: amplification, re-timing: timing reproduction, and re-shaping: waveform shaping) or performing 0/1 inversion to use a threshold effect in O-E-O conversion or the like.

A wavelength of an optical signal before being converted into an electrical signal and a wavelength of an optical signal after being converted from an electrical signal may be the same or different. The electrical processing unit 84 may multiplex optical signals transmitted from the plurality of subscriber devices 40 at an electrical stage, convert the multiplexed signal into a plurality of optical signals, and branch the plurality of optical signals into separate ports, multiplexers/demultiplexers, or power splitters. The branched optical signal may be further branched and output to the multiplexer/demultiplexer at a plurality of wavelengths, or may be further branched and multicasted by a power splitter. The electrical processing unit 84 may perform only multiplexing or only multicast at the electrical stage. The processing at the electrical stage is suitable for a case where signals of transceivers of the subscriber device 40 having a band smaller than that of the transmission line are bundled and handled, for example.

Specifically, the optical SW 10h is connected to the electrical processing unit 84 that converts optical signals transmitted from the plurality of respective subscriber devices 40 into electrical signals, multiplexes the electrical signals, processes the multiplexed electrical signal, converts the electrical signal into an optical signal having a plurality of wavelengths, and inputs the optical signal to the optical switch 10h. The optical switch controller 26 controls the optical switch 10h to output a plurality of optical signals input from the transmission lines 50-1 to the electrical processing unit 84 according to a combination of the plurality of subscriber devices 40 that have transmitted the plurality of input optical signals and wavelengths of the input optical signals, and to output a signal input from the electrical processing unit 84 to the transmission line 50-2 corresponding to a transfer destination on a path to a communication destination specified by the wavelength.

In a case where a port to be an output destination of the optical SW is defined by a combination of a subscriber device that transmits an optical signal and a wavelength, a destination may be different between a direction from the port 11-1 to the port 11-2 and a direction from the port 11-2 to the port 11-1 in order to cause the optical signal to pass through the electrical processing unit 84.

The electrical processing unit 84 includes an optical/electrical (O/E) conversion unit 85, a processing execution unit 86, an electrical/optical (E/O) conversion unit 87, and a storage unit 88. The O/E conversion unit 85 converts an optical signal input from the optical SW 10h into an electrical signal. The processing execution unit 86 includes a processor 861 and an accelerator 862. The processor 861 is, for example, a general-purpose processor such as a central processing unit (CPU). The accelerator 862 is a processor such as a graphics processing unit (GPU). The processor 861 and the accelerator 862 read a program from the storage unit 88 and execute the program, and thus perform electrical signal processing on the electrical signal converted by the O/E conversion unit 85. The processing execution unit 86 may perform electrical signal processing corresponding to a plurality of functions. Examples of the electrical signal processing are digital signal processing (DSP) for long distance/high speed access, mobile fronthaul processing, and error correction. The E/O conversion unit 87 converts the electrical signal into an optical signal having a wavelength designated by the optical SW controller 26, and outputs the optical signal to the optical SW 10h. The storage unit 88 stores a program for the processor 861 and the accelerator 862 to execute a function of electrical signal processing.

Since the processing execution unit 86 has a device architecture based on a general-purpose processor, it is possible to add and change electrical signal processing and to replace various functions other than the transmission function. Since the processing execution unit 86 performs DSP for long distance/high speed access, a dedicated large scale integration (LSI) for long distance/high speed access is not required, and flexible function deployment according to needs can be realized.

The optical SW 10h may be connected to a plurality of electrical processing units 84. In this case, the optical SW 10h has ports 12-1 and 12-2 connected to the respective electrical processing units 84. Each of the electrical processing units 84 may perform different electrical signal processing, or some or all of the electrical processing units may perform the same electrical processing.

The processing execution unit 86 and the storage unit 88 may be realized by using hardware such as an application specific integrated circuit (ASIC), a programmable logic device (PLD), or a field programmable gate array (FPGA).

Figure 14:
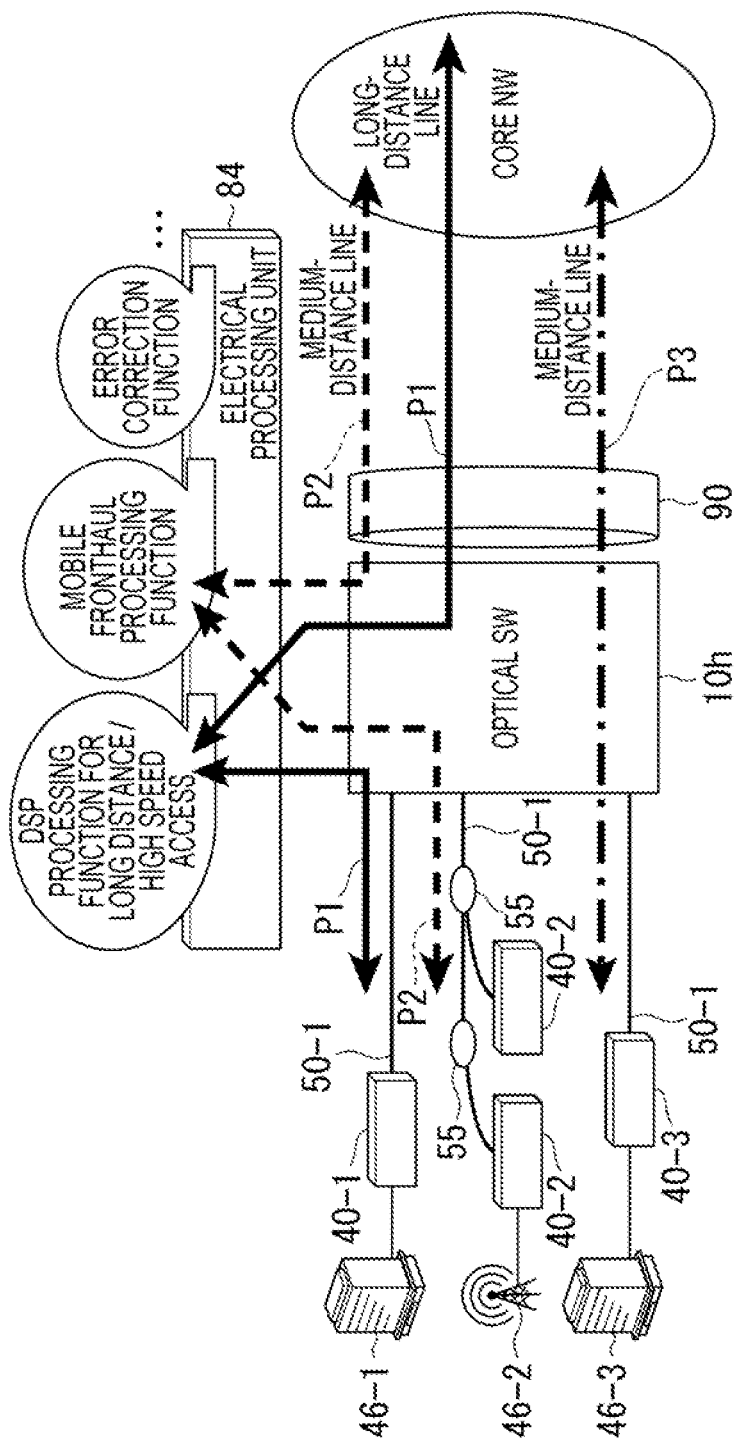
FIG. 14 is a diagram illustrating an example of an optical SW according to a basic configuration.

FIG. 14 is a diagram illustrating an example of connection using the optical SW 10h. The subscriber devices 40-1, 40-2, and 40-3 connected to the optical SW 10h are, for example, ONUs. A user 46-1 who uses the subscriber device 40-1 is a user who performs long-distance or high-speed communication. One or more communication devices of the user 46-1 are connected to the subscriber device 40-1. The subscriber device 40-1 communicates with a communication destination device via a long-distance line P1. A mobile base station 46-2 is connected to the subscriber device 40-2. In FIG. 14, a plurality of subscriber devices 40-2 are connected to one transmission line 50-1 by a power splitter 55. The subscriber device 40-2 communicates with a communication destination device via a medium-distance line P2. A user 46-3 who uses the subscriber device 40-3 is a user who performs medium-distance or medium-speed communication. One or more communication devices of the user 46-3 communicate with a communication destination device through a medium-distance line P3 via the subscriber device 40-3. Optical signals of the long-distance line P1, the medium-distance line P2, and the medium-distance line P3 are wavelength-multiplexed and transmitted through the multiplex communication transmission line 90 connected to a core network (NW). The electrical processing unit 84 has a DSP function for long-distance/high-speed access, a mobile fronthaul processing function, an error correction function, and the like.

An operation of the optical SW 10h will be described with reference to FIGS. 13 and 14. The optical SW 10h outputs an uplink optical signal transmitted by the subscriber device 40-1 to the electrical processing unit 84. The O/E conversion unit 85 of the electrical processing unit 84 converts the input optical signal into an electrical signal. The processing execution unit 86 performs DSP processing for long-distance/high-speed access on the converted electrical signal. The E/O conversion unit 87 converts the electrical signal subjected to the DSP processing into an optical signal and outputs the optical signal to the optical SW 10h. The wavelength after conversion may be the same as or different from the wavelength when input to the electrical processing unit 84. The optical SW 10h outputs the optical signal input from the electrical processing unit 84 to the multiplex communication transmission line 90 from the port 11-2.

The optical SW 10h receives a downlink optical signal addressed to the subscriber device 40-1 transmitted through the multiplex communication transmission line 90. The optical SW 10h outputs the received downlink optical signal from the port 12-1 to the electrical processing unit 84 according to a combination of the input port 51-2 and the wavelength. The O/E conversion unit 85 of the electrical processing unit 84 converts the input optical signal into an electrical signal, and the processing execution unit 86 performs DSP processing for long-distance/high-speed access on the converted electrical signal. The E/O conversion unit 87 converts the electrical signal subjected to the DSP processing into an optical signal and outputs the optical signal to the optical SW 10h. The wavelength after conversion of the optical signal may be the same as or different from the wavelength when input to the electrical processing unit 84. The optical SW 10h outputs the optical signal input from the electrical processing unit 84 to the port 11-1 connected to the subscriber device 40-1.

In the above example, the configuration has been described in which the electrical processing unit 84 modulates a multiplexed electrical signal with the same signal and converts the modulated electrical signal into an optical signal having a plurality of wavelengths. The electrical processing unit 84 may be configured to convert a multiplexed or demultiplexed electrical signals into one or more optical signals (optical signals modulated with the same signal or different signals) having one or more wavelengths.

An optical signal transmitted and received by the subscriber device 40-2 is also processed in the same manner as an optical signal transmitted and received by the subscriber device 40-1 described above. However, the processing execution unit 86 performs mobile fronthaul processing on the optical signal transmitted and received by the subscriber device 40-2. The processing execution unit 86 determines signal processing to be performed on the electrical signal on the basis of any information included in the electrical signal.

On the other hand, the optical SW 10h outputs an uplink optical signal input from the subscriber device 40-3 to the multiplex communication transmission line 90 from the port 11-2. The optical SW 10h receives a downlink optical signal addressed to the subscriber device 40-3 transmitted through the multiplex communication transmission line 90, and outputs the downlink optical signal to the port 11-1 connected to the subscriber device 40-3 according to a combination of the port 11-2 to which the optical signal is input and the wavelength.

Figure 15:
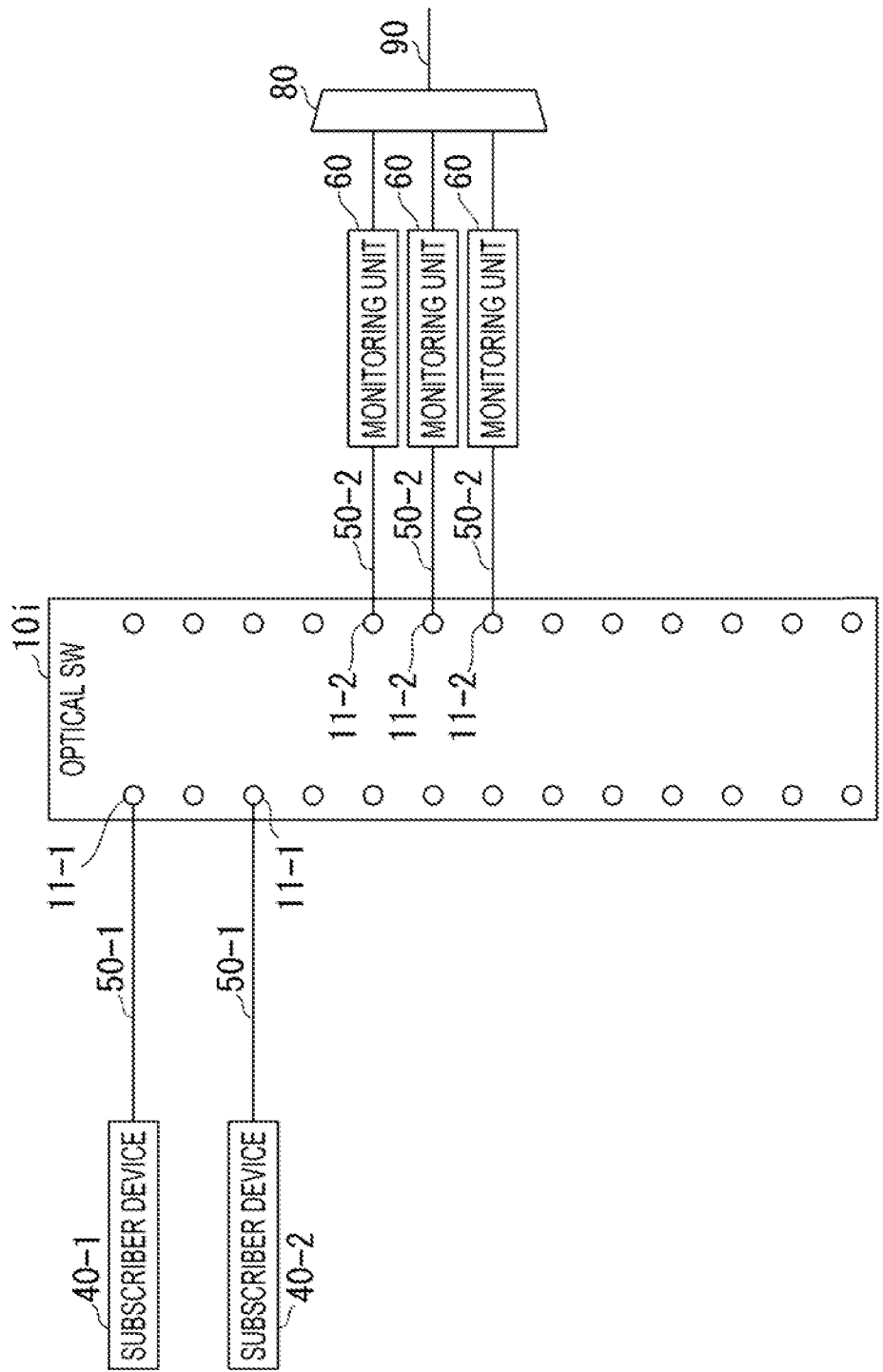
FIG. 15 is a diagram illustrating an example of an optical SW according to a basic configuration.

FIG. 15 is a diagram illustrating a configuration example of an optical SW 10i that monitors an optical signal before performing WDM transmission. In the same figure, the same constituents as those of the optical SW 10e illustrated in FIG. 6 are denoted by the same reference numerals, and description thereof will be omitted. The difference from FIG. 6 is that a monitoring unit 60 is provided between the port 11-2 and the WDM device 80. The transmission line 50-2 connected to the port 11-2 includes the monitoring unit 60. In the same figure, only three monitoring units 60 are illustrated. A specific configuration of the monitoring unit 60 is as illustrated in FIG. 2. The optical signals output from the ports 11-2 are multiplexed and output by the WDM device 80 via the monitoring unit 60. The WDM device 80 demultiplexes the optical signal received via the multiplex communication transmission line 90 according to wavelengths, and inputs the demultiplexed optical signals to the monitoring units 60, respectively. The monitoring unit 60 generates monitoring information based on a monitoring result and outputs the generated monitoring information. An example of an output destination of the monitoring information is the control unit 20.

Next, an access topology to the optical SW will be described with reference to FIGS. 16 to 25.

Figure 16:
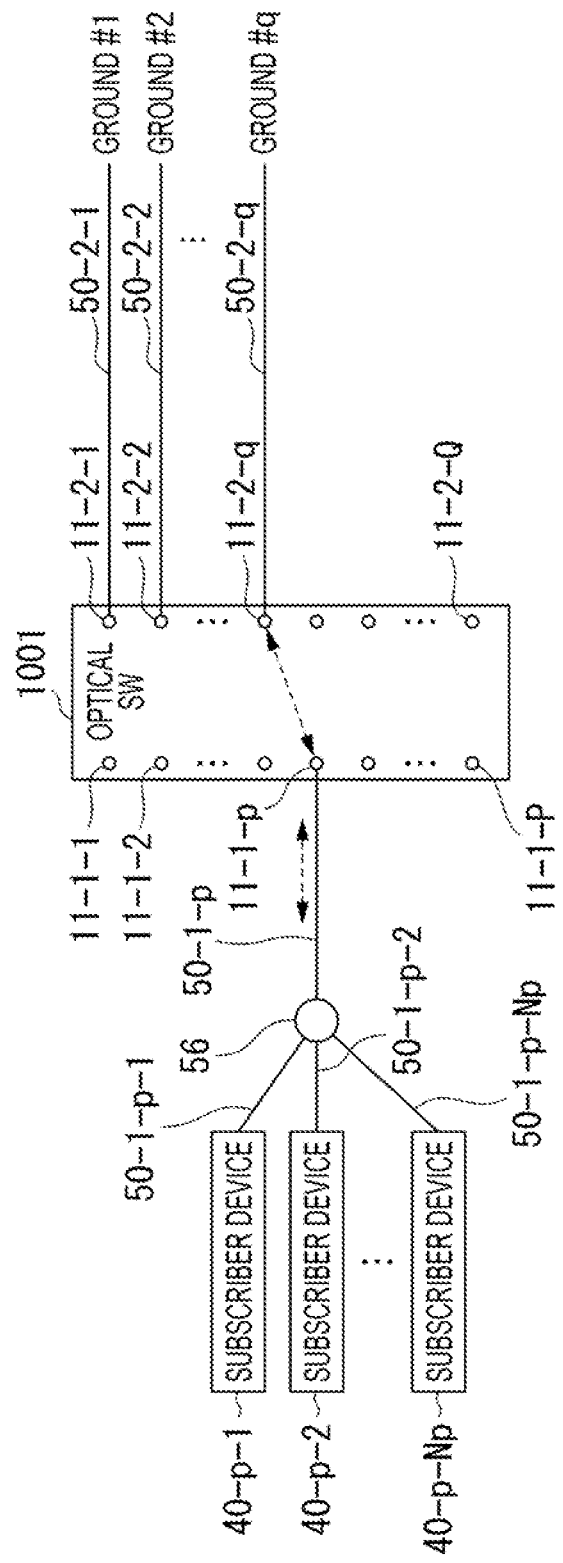
FIG. 16 is a diagram illustrating an example of an access topology according to a basic configuration.

FIG. 16 is a diagram illustrating a passive double star (PDS) type access topology using time division multiplexing. As an optical SW 1001, the above-described optical SWs 10a to 10i may be used. The optical SW 1001 includes ports 11-1-1 to 11-1-P and ports 11-2-1 to 11-2-Q. The transmission line 50-1 connected to the port 11-1-$p$ (where p is an integer of 1 or more and P or less) will also be referred to as a transmission line 50-1-$p$, and the transmission line 50-2 connected to the port 11-2-$q$ (where q is an integer of 1 or more and Q or less) will also be referred to as a transmission line 50-2-$q$. In FIG. 16, the port 11-2-$q$ is connected to a ground #q via the transmission line 50-2-$q$.

A power splitter 56 is provided in the transmission line 50-1-$p$. Np (where Np is an integer of 2 or more) subscriber devices 40-$p$ are connected to the power splitter 56 in a star form. The Np subscriber devices 40-$p$ will be referred to as subscriber devices 40-$p$-1 to 40-$p$-Np, and the transmission line 50-1-$p$ between the subscriber device 40-$p$-$np$ (where np is an integer of 1 or more and Np or less) and the power splitter 56 will be referred to as 50-1-$p$-$np$. The subscriber devices 40-$p$-1 to 40-$p$-Np use the same wavelength on the basis of time division multiplexing. A wavelength used for an uplink optical signal is different from a wavelength used for a downlink optical signal.

The optical SW 1001 receives a downlink optical signal subjected to time division multiplexing and having the wavelength $\lambda_1$ addressed to the subscriber devices 40-$p$-1 to 40-$p$-Np from the port 11-2-$q$. The optical SW 1001 outputs the received downlink optical signal from the port 11-1-$p$ that is an output destination according to the combination of the port 11-2-$q$ and the wavelength $\lambda_1$. The power splitter 56 receives the time-division-multiplexed downlink optical signal from the transmission line 50-1-$p$, branches the received optical signal, and outputs the branched optical signals to the transmission lines 50-1-$p$-1 to 50-1-$p$-Np. The subscriber devices 40-$p$-1 to 40-$p$-Np receive the time-division-multiplexed optical signals and select downlink optical signals addressed to the own devices from the received optical signals.

The subscriber devices 40-$p$-1 to 40-$p$-Np transmit time-division-multiplexed uplink optical signals having the same wavelength $\lambda_2$ according to time division multiple access (TDMA). The power splitter 56 receives the uplink optical signal having the wavelength $\lambda_2$ from each of the transmission lines 50-1-$p$-1 to 50-1-$p$-Np, time-divisionally multiplexes the input optical signals, and outputs the time-division-multiplexed optical signal to the transmission line 50-1-$p$. The optical SW 1001 outputs the time-division-multiplexed uplink optical signal from the port 11-2-$q$ according to the combination of the port 11-1-$p$ and the wavelength $\lambda_2$.

A PDS type access topology may be applied to any one or more of the transmission lines 50-1-1 to 50-1-$p$.

Figure 17:
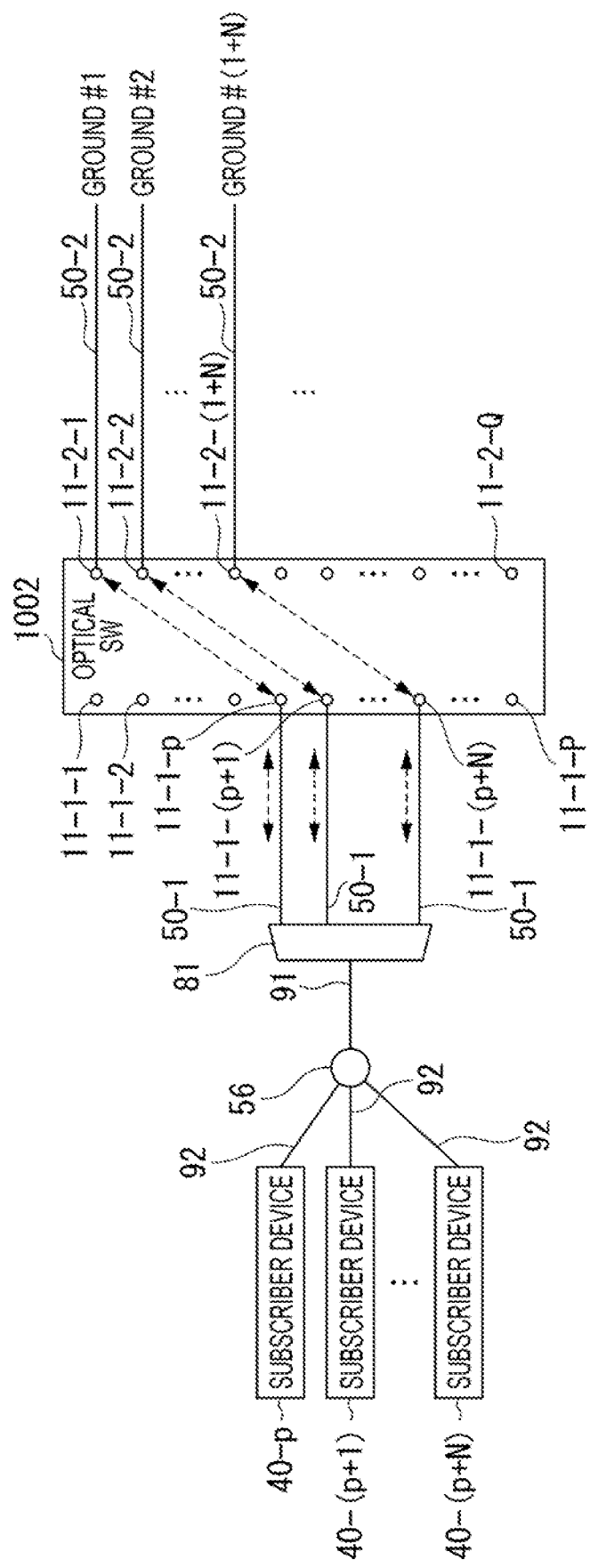
FIG. 17 is a diagram illustrating an example of an access topology according to a basic configuration.

FIG. 17 is a diagram illustrating a PDS type access topology using wavelength multiplexing. As an optical SW 1002, the above-described optical SWs 10$a$ to 10$i$ may be used. The optical SW 1002 is connected to one or more WDM devices 81. The WDM device 81 multiplexes downlink optical signals having different wavelengths output from the plurality of ports 11-1 and outputs the multiplexed optical signal to the multiplex communication transmission line 91. The WDM device 81 demultiplexes an uplink wavelength-multiplexed optical signal received via the multiplex communication transmission line 91, and inputs the demultiplexed optical signals to different ports 11-1. The power splitter 56 is provided in the multiplex communication transmission line 91. N (where N is an integer of 2 or more) subscriber devices 40 are connected to the power splitter 56 in a star form. The subscriber device 40 and the power splitter 56 are connected via a transmission line 92. The plurality of subscriber devices 40 connected to the power splitter 56 transmit and receive optical signals having different wavelengths.

In FIG. 17, the ports 11-1-$p$ to 11-1-($p$+N) of the optical SW 1002 are connected to the WDM device 81 via the transmission lines 50-1 (where p and N are integers of 1 or more, and p+N is an integer of P or less). Subscriber devices 40-$p$ to 40-($p$+N) are connected to the power splitter 56.

The optical SW 1002 receives a downlink optical signal addressed to the subscriber device 40-($p$+n) having the wavelength $\lambda_{1(q+n)}$ from the port 11-2-($q$+n) (where q is an integer of 1 or more, and n is an integer of 0 or more and N or less). FIG. 17 illustrates an example in a case where q=1. The optical SW 1002 routes the downlink optical signal having the wavelength $\lambda_{1(1+n)}$ input from the port 11-2-($q$+n) to the port 11-1-($p$+n) that is an output destination corresponding to a combination of the port 11-2-($q$+n) and the wavelength $\lambda_{1(1+n)}$. Consequently, the optical SW 1002 routes the downlink optical signal having the wavelength $\lambda_{11}$ input from the port 11-2-1 to the port 11-1-$p$, and routes the downlink optical signal having the wavelength $\lambda_{12}$ input from the port 11-2-2 to the port 11-1-($p$+1).

The WDM device 81 multiplexes the downlink optical signals having the wavelengths $\lambda_{11}$ to $\lambda_{1N}$ respectively output from the ports 11-1-$p$ to 11-1-($p$+N) and outputs the multiplexed optical signal to the multiplex communication transmission line 91. The power splitter 56 receives the wavelength-multiplexed downlink optical signal from the multiplex communication transmission line 91, branches the received downlink optical signal without any change, and outputs the branched optical signals to the transmission lines 92 connected to the respective subscriber devices 40-$p$ to 40-($p$+N). The subscriber devices 40-$p$ to 40-($p$+N) receive the wavelength-multiplexed downlink optical signals, and select downlink optical signals having wavelengths used by the own devices from the received optical signals.

Figure 18:
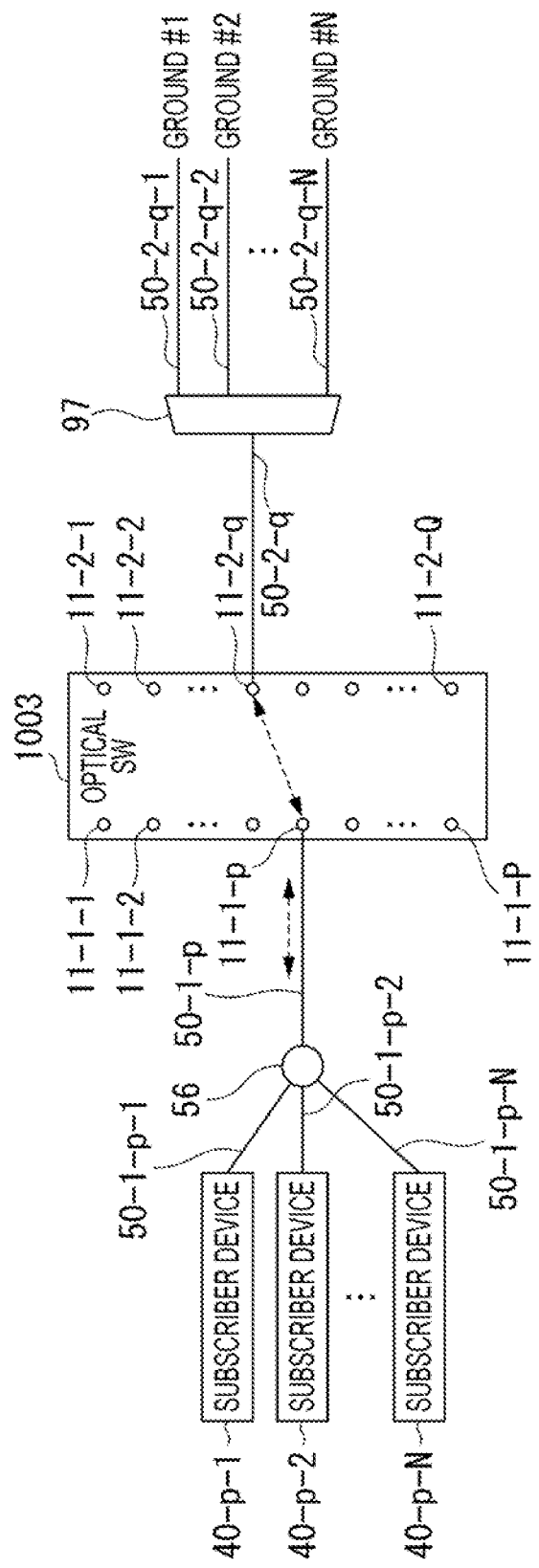
FIG. 18 is a diagram illustrating an example of an access topology according to a basic configuration.

The subscriber device 40-($p$+n) transmits an uplink optical signal having a wavelength $\lambda_{2(1+n)}$. The power splitter 56 receives an uplink optical signal from each of the subscriber devices 40-$p$ to 40-($p$+N) via the transmission line 92, performs wavelength multiplexing on the received uplink optical signal having each of the wavelengths $\lambda_{21}$ to $\lambda_{2(1+N)}$, and outputs the multiplexed optical signal to the multiplex communication transmission line 91. The WDM device 81 receives the wavelength-multiplexed uplink optical signal from the multiplex communication transmission line 91 and performs wavelength separation. The WDM device 81 inputs uplink optical signals having the wavelength $\lambda_{2(1+n)}$ to the port 11-1-($p$+n). The optical SW 1002 outputs the uplink optical signal having the wavelength $\lambda_{2(1+n)}$ from the port 11-2-($q$+n) that is an output destination corresponding to a combination of the input port 11-1-($p$+n) and the wavelength $\lambda_{2(1+n)}$. Consequently, the uplink optical signal having the wavelength $\lambda_{21}$ transmitted by the subscriber device 40-$p$ is input from the port 11-1-$p$ and output from the port 11-2-1. The uplink optical signal having the wavelength $\lambda_{22}$ transmitted by the subscriber device 40-($p$+1) is input from the port 11-1-($p$+1) and output from the port 11-2-2. As illustrated in FIG. 18, a WDM device may be provided at a subsequent stage with respect to the optical SW.

FIG. 18 is a diagram illustrating a PDS type access topology in which wavelength multiplexing is used and a WDM device is provided at a subsequent stage with respect to an optical SW. As an optical SW 1003, the above-described optical SWs 10$a$ to 10$i$ may be used. A port 11-2-$q$ (where q is an integer between 1 and Q) of the optical SW 1003 is connected to a WDM device 97 via a transmission line 50-2-$q$. The WDM device 97 is connected to a ground #n (where n is an integer of 1 or more and N or less) via a transmission line 50-2-$q$-$n$. A power splitter 56 is provided in the transmission line 50-1-$p$ connected to the port 11-1-$p$ of the optical SW 1003. N subscriber devices 40-$p$-1 to 40-$p$-N are connected to the power splitter 56 in a star form.

The WDM device 97 receives a downlink optical signal having a wavelength $\lambda_{1n}$ addressed to the subscriber device 40-$p$-$n$ transmitted from the ground #n from the transmission line 50-2-$q$-$n$. The WDM device 97 inputs, to the optical SW 1003, a wavelength-multiplexed signal obtained by multiplexing the downlink optical signals having $\lambda_{11}$ to $\lambda_{1N}$ respectively input from the ground #1 to the ground #N. The optical SW 1003 outputs the wavelength-multiplexed downlink signal input from the port 11-2-$q$ from the port 11-1-$p$ that is an output destination. The power splitter 56 branches the wavelength-multiplexed signal input from the transmission line 50-1-$p$ and outputs the branched signals to the transmission lines 50-1-$p$-1 to 50-1-$p$-N. The subscriber devices 40-$p$-1 to 40-$p$-N receive the wavelength-multiplexed signals and select downlink optical signals addressed to the own devices from the received optical signals. Consequently, the subscriber device 40-$p$-$n$ receives the optical signal having the wavelength $\lambda_{1n}$ from the ground #n.

The subscriber device 40-$p$-$n$ transmits an uplink optical signal having a wavelength $\lambda_{2n}$. The power splitter 56 receives uplink optical signals having wavelengths $\lambda_{21}$ to $\lambda_{2N}$ from the respective subscriber devices 40-$p$-1 to 40-$p$-N via the transmission lines 50-1-$p$-1 to 50-1-$p$-N. The power splitter 56 outputs a wavelength-multiplexed signal obtained by wavelength-multiplexing the uplink optical signals having the wavelengths $\lambda_{21}$ to $\lambda_{2N}$ to the transmission line 50-1-$p$. The optical SW 1003 receives, from the port 11-1-$p$, the wavelength-multiplexed signal obtained by wavelength-multiplexing the uplink optical signals having the wavelengths $\lambda_{21}$ to $\lambda_{2N}$. The optical SW 1003 outputs the wavelength-multiplexed uplink signal from the output destination port 11-2-$q$ to the transmission line 50-2-$q$. The WDM device 97 receives the wavelength-multiplexed uplink optical signal from the transmission line 50-2-$q$ and performs wavelength separation. The WDM device 97 outputs the uplink optical signal having a wavelength $\lambda_{2n}$ to the transmission line 50-2-$n$ connected to the ground #n. Consequently, the optical signal having the wavelength $\lambda_{2n}$ transmitted by the subscriber device 40-$p$-$n$ is transmitted to the ground #n.

Figure 19:
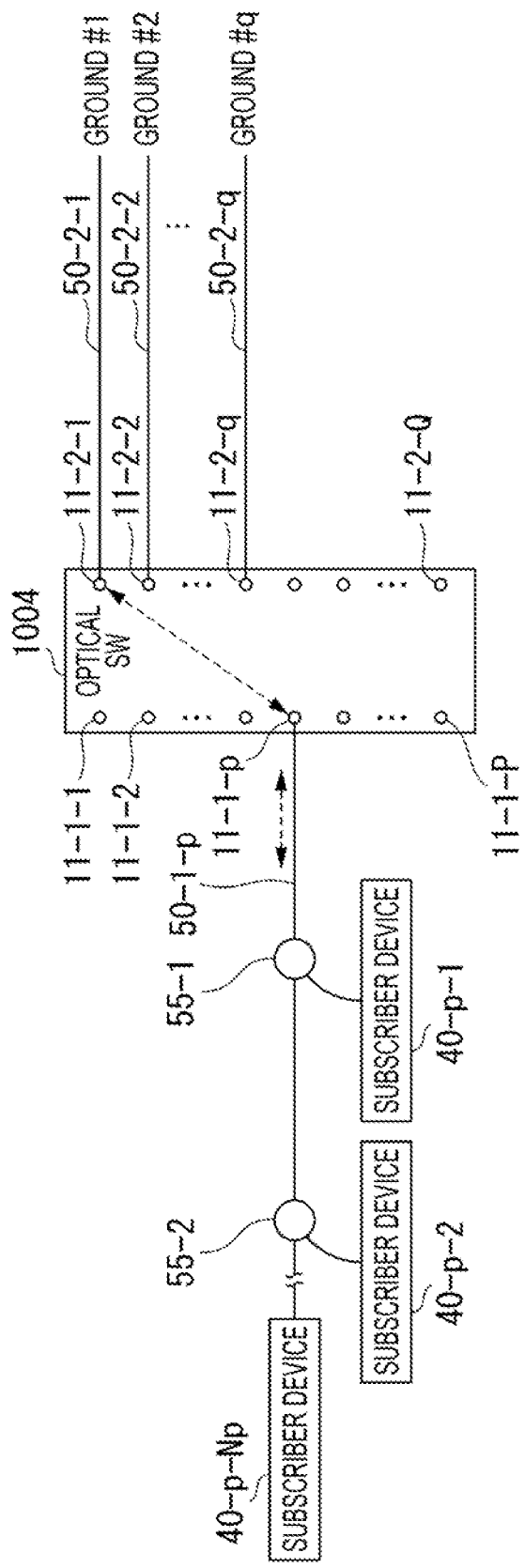
FIG. 19 is a diagram illustrating an example of an access topology according to a basic configuration.

FIG. 19 is a diagram illustrating a bus type access topology using time division multiplexing. As an optical SW 1004, the above-described optical SWs 10$a$ to 10$i$ may be used. The access topology illustrated in FIG. 19 is different from the access topology illustrated in FIG. 16 in that a plurality of bus type subscriber devices 40-$p$-1 to 40-$p$-Np are connected to the transmission line 50-1-$p$. One or more power splitters 55 are provided in the transmission line 50-1-$p$. The power splitter 55 to which the subscriber device 40-$p$-$n$ (where n is an integer of 1 or more and Np−1 or less) is connected will be referred to as a power splitter 55-$n$.

The subscriber devices 40-$p$-1 to 40-$p$-Np use the same wavelength on the basis of time division multiplexing. A wavelength used for an uplink optical signal is different from a wavelength used for a downlink optical signal. The transmission line 50-2-1 connected to the ground #1 transmits a time-division-multiplexed downlink optical signals having the wavelength $\lambda 1$ addressed to the respective subscriber devices 40-$p$-1 to 40-$p$-Np. The optical SW 1004 receives, from the port 11-2-1, the time-division-multiplexed downlink optical signal having the wavelength $\lambda_1$ transmitted through the transmission line 50-2-1. The optical SW 1004 routes the received downlink optical signal to the port 11-1-$p$ that is an output destination corresponding to a combination of the port 11-2-1 (or the ground #1) and the wavelength $\lambda_1$. The optical SW 1004 outputs the time-division-multiplexed downlink optical signal having the wavelength $\lambda_1$ from the port 11-1-$p$ to the transmission line 50-1-$p$. The power splitter 55-$n$ branches the time-division-multiplexed downlink optical signal from the transmission line 50-1-$p$ and outputs the branched downlink optical signal to the subscriber device 40-$p$-$n$. The subscriber devices 40-$p$-1 to 40-$p$-Np receive time-division-multiplexed downlink optical signals and select downlink optical signals addressed to the own devices from the received downlink optical signals.

The subscriber devices 40-$p$-1 to 40-$p$-Np transmit time-division-multiplexed uplink optical signals having the same wavelength $\lambda_2$ according to TDMA. Each power splitter 55-$n$ time-divisionally multiplexes the uplink optical signal having the wavelength $\lambda_2$ input from the subscriber device 40-$p$-$n$ with the uplink optical signal transmitted through the transmission line 50-1-$p$. The optical SW 1004 receives the time-division-multiplexed uplink optical signal from the port 11-1-$p$, routes the signal to the port 11-2-1 that is an output destination corresponding to a combination of the port 11-1-$p$ and the wavelength $\lambda_2$, and outputs the signal to the transmission line 50-2-1 connected to the ground #1.

The bus type access topology may be applied to any one or more of the transmission lines 50-1-1 to 50-1-$p$.

Figure 20:
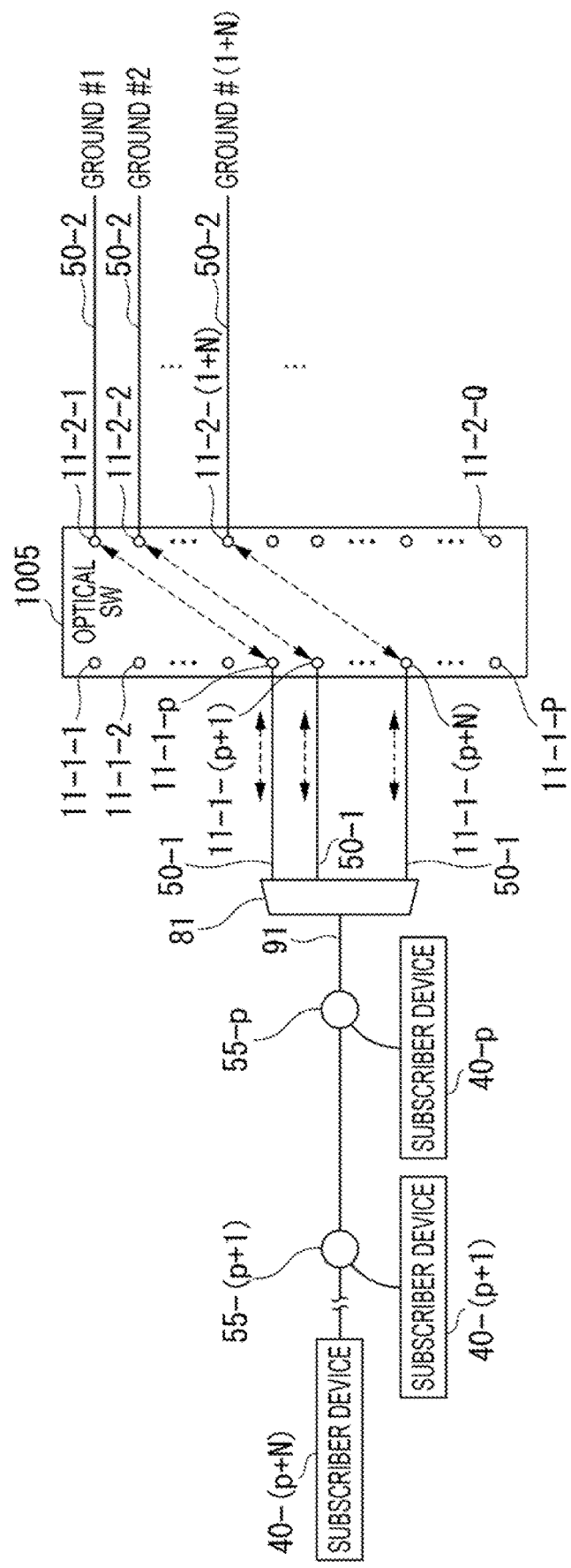
FIG. 20 is a diagram illustrating an example of an access topology according to a basic configuration.

FIG. 20 is a diagram illustrating a bus type access topology using wavelength multiplexing. As an optical SW 1005, the above-described optical SWs 10$a$ to 10$i$ may be used. The access topology illustrated in FIG. 19 is different from the access topology illustrated in FIG. 17 in that a plurality of bus type subscriber devices 40-$p$ to 40-($p$+N) are connected to the multiplex communication transmission line 91. The subscriber devices 40-$p$ to 40-($p$+N) transmit and receive optical signals having different wavelengths. One or more power splitters 55 are provided in the multiplex communication transmission line 91. The power splitter 55 to which the subscriber device 40-($p$+n) (where n is an integer of 0 or more and N−1 or less, and N is an integer of 1 or more) is connected will be referred to as a power splitter 55-($p$+n).

Similarly to the optical SW 1002 illustrated in FIG. 17, the optical SW 1005 receives a downlink optical signal addressed to the subscriber device 40-($p$+n) having the wavelength $\lambda_{1(1+n)}$ from the port 11-2-($q$+n) (where q is an integer of 1 or more, and n is an integer of 0 or more and N or less). FIG. 20 illustrates an example in a case where q=1. The optical SW 1005 routes the downlink optical signal having the wavelength $\lambda_{1(1+n)}$ input from the port 11-2-($q$+n) to the port 11-1-($p$+n) that is an output destination corresponding to a combination of the port 11-2-($q$+n) and the wavelength $\lambda_{1(1+n)}$.

The WDM device 81 multiplexes the downlink optical signals having the wavelengths $\lambda_{11}$ to $\lambda_{1N}$ respectively output from the ports 11-1-$p$ to 11-1-($p$+N) and outputs the multiplexed optical signal to the multiplex communication transmission line 91. The power splitter 55-($p$+n) branches the wavelength-multiplexed downlink optical signal from the multiplex communication transmission line 91 and outputs the branched downlink optical signal to the subscriber device 40-($p$+n). The subscriber devices 40-$p$ to 40-($p$+N) receive the wavelength-multiplexed downlink optical signals and select downlink optical signals addressed to the own devices from the received downlink optical signals.

Figure 21:
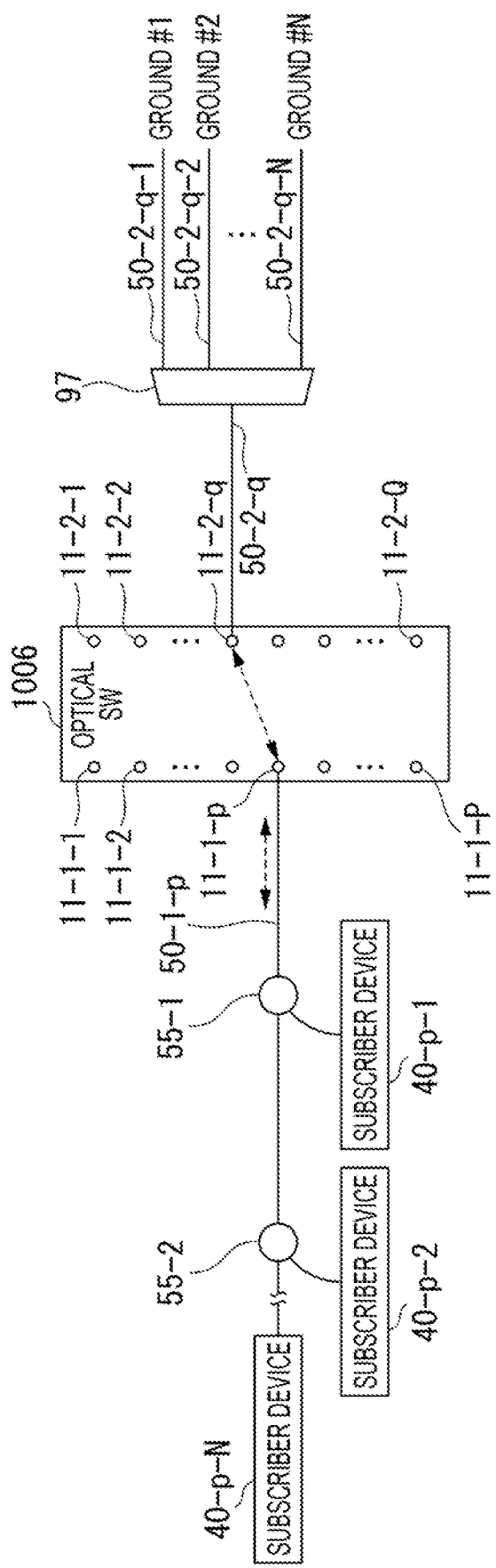
FIG. 21 is a diagram illustrating an example of an access topology according to a basic configuration.

The subscriber device 40-($p$+n) transmits an uplink optical signal having a wavelength $\lambda_{2(1+n)}$. Each power splitter 55-($p$+n) multiplexes the uplink optical signal having the wavelength $\lambda_{2(1+n)}$ input from the subscriber device 40-($p$+n) with the uplink optical signal having the wavelengths $\lambda_{2(2+n)}$ to $\lambda_{2N}$ transmitted through the multiplex communication transmission line 91. The WDM device 81 receives the wavelength-multiplexed uplink optical signal from the multiplex communication transmission line 91 and separates the optical signal into uplink optical signals having wavelengths $\lambda_{21}$ to $\lambda_{2N}$. The WDM device 81 inputs an uplink optical signal having the wavelength $\lambda_{2(1+n)}$ to the port 11-1-(p+n). Similarly to the optical SW 1002 illustrated in FIG. 16, the optical SW 1005 outputs the uplink optical signal having the wavelength $\lambda_{2(1+n)}$ from the port 11-2-(q+n) that is an output destination corresponding to a combination of the input port 11-1-(p+n) and the wavelength $\lambda_{2(1+n)}$. Consequently, the uplink optical signal having the wavelength $\lambda_{21}$ transmitted by the subscriber device 40-p is input from the port 11-1-p and output from the port 11-2-1. The uplink optical signal having the wavelength $\lambda_{22}$ transmitted by the subscriber device 40-(p+1) is input from the port 11-1-(p+1) and output from the port 11-2-2. As illustrated in FIG. 21, a WDM device may be provided at a subsequent stage with respect to the optical SW.

FIG. 21 is a diagram illustrating a bus type access topology in which wavelength multiplexing is used and a WDM device is provided at a subsequent stage with respect to an optical SW. As an optical SW 1006, the above-described optical SWs 10a to 10i may be used. In FIG. 21, the same constituents as those in FIG. 18 are denoted by the same reference numerals. A port 11-2-q (where q is an integer 1 or more and Q or less) of the optical SW 1006 is connected to a WDM device 97 via a transmission line 50-2-q. The WDM device 97 is connected to a ground #n (where n is an integer of 1 or more and N or less, and N is an integer of 2 or more) via a transmission line 50-2-q-n. One or more power splitters 55 are provided in the transmission line 50-1-p connected to the port 11-1-p (where p is an integer of 1 or more and P or less) of the optical SW 1006. The power splitter 55 to which the subscriber device 40-p-n is connected will be referred to as a power splitter 55-n.

The WDM device 97 receives a downlink optical signal having a wavelength $\lambda_{1n}$ addressed to the subscriber device 40-p-n transmitted from the ground #n from the transmission line 50-2-q-n. The WDM device 97 inputs, to the optical SW 1006, a wavelength-multiplexed signal obtained by multiplexing downlink optical signals having wavelengths $\lambda_{11}$ to $\lambda_{1N}$ respectively input from the ground #1 to the ground #N. The optical SW 1006 outputs the wavelength-multiplexed downlink signal input from the port 11-2-q from the port 11-1-p that is an output destination. The power splitter 55-n branches the wavelength-multiplexed downlink signal from the transmission line 50-1-p and outputs the branched wavelength-multiplexed downlink signal to the subscriber device 40-p-n. The subscriber devices 40-p-1 to 40-p-N select downlink optical signals addressed to the own devices from the received wavelength-multiplexed downlink signals. Consequently, the subscriber device 40-p-n receives the optical signal having the wavelength $\lambda_{1n}$ from the ground #n.

The subscriber device 40-p-n transmits an uplink optical signal having a wavelength $\lambda_{2n}$. Each power splitter 55-n wavelength-multiplexes the uplink optical signal having the wavelength $\lambda_{2n}$ input from the subscriber device 40-p-n with the uplink optical signal transmitted through the transmission line 50-1-p. The optical SW 1006 receives, from the port 11-1-p, a wavelength-multiplexed signal obtained by wavelength-multiplexing the uplink optical signals having the wavelengths $N_{21}$ to $\lambda_2 N$. The optical SW 1006 outputs the wavelength-multiplexed uplink signal from the port 11-2-q that is an output destination to the transmission line 50-2-q. The WDM device 97 receives a wavelength-multiplexed signal from the transmission line 50-2-q and performs wavelength separation. The WDM device 97 outputs an uplink optical signal having the wavelength $\lambda_{2n}$ to the transmission line 50-2-q-n connected to the ground #n. Consequently, the optical signal having the wavelength 2n transmitted by the subscriber device 40-p-n is transmitted to the ground #n.

Figure 22:
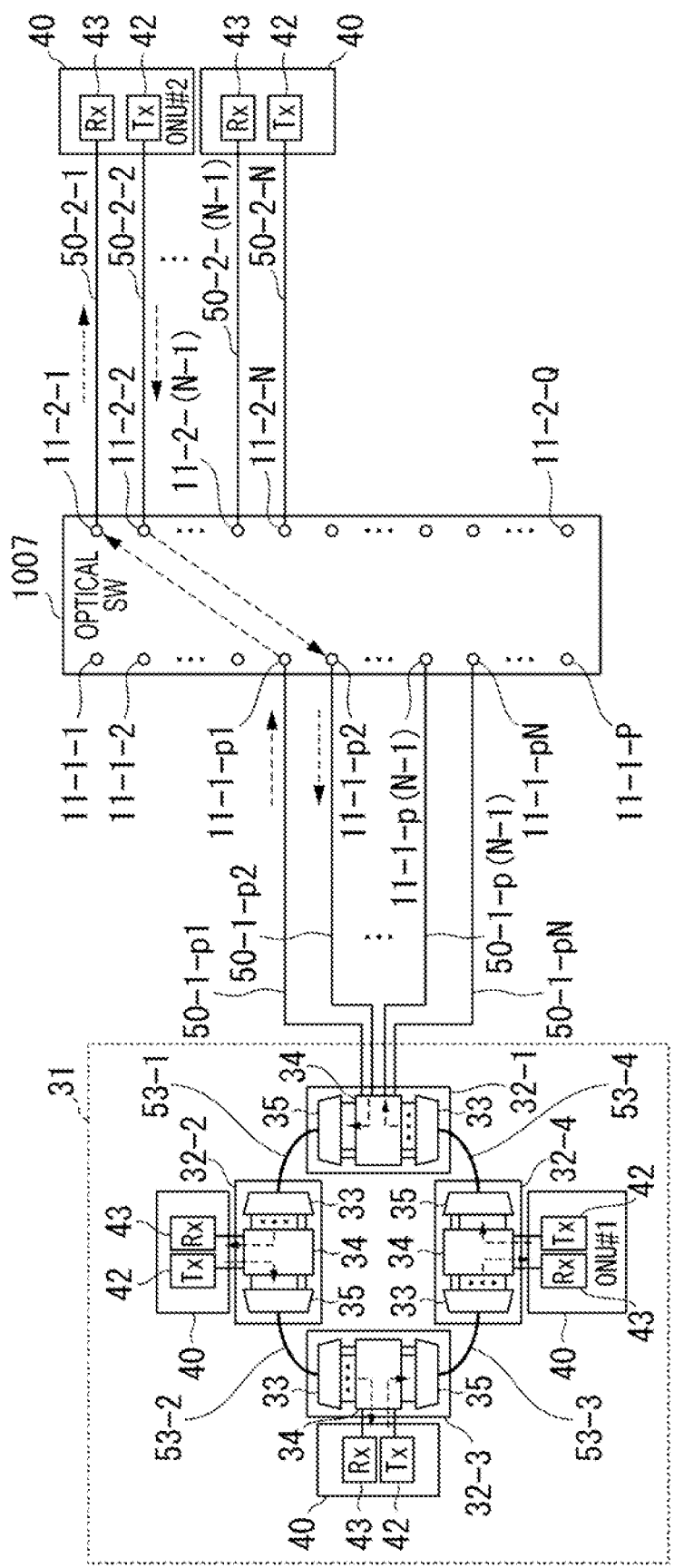
FIG. 22 is a diagram illustrating an example of an access topology according to a basic configuration.

FIG. 22 is a diagram illustrating a loop type access topology. As an optical SW 1007, the above-described optical SWs 10a to 10i may be used. Some ports 11-1-p1 to 11-1-pN (where p1<pN, p1 is an integer of 1 or more, and pN is an integer of P or less) of the optical SW 1007 are connected to a WDM access ring network 31 that transmits optical signals having a plurality of wavelengths. Optical signals having several wavelengths used in the WDM access ring network 31 are transmitted to the subscriber device 40 that is a communication destination or a higher NW via the optical SW 1007. In the topology illustrated in FIG. 22, a WDM multiplexer/demultiplexer is not used, and opposing subscriber devices 40 are connected via two transmission lines to perform communication.

The WDM access ring network 31 is a network in which R add/drop nodes 32 are connected via a transmission line 53. FIG. 21 illustrates an example of R=4. The R add/drop nodes 32 will be referred to as add/drop nodes 32-1 to 32-R, and the transmission line 53 between the add/drop node 32-r (where r is an integer of 1 or more and R or less) and the add/drop node 32-(r+1) will be referred to as a transmission line 53-r. However, the add/drop node 32-(R+1) is regarded as an add/drop node 32-1. The add/drop node 32-1 is connected to the port 11-1-pn (where pn is an integer of p1 or more and pN or less) of the optical SW 1007 via the transmission line 50-1-pn.

The add/drop node 32 includes a demultiplexing unit 33, an optical SW 34, and a multiplexing unit 35. The demultiplexing unit 33 of the add/drop node 32-r (where r is an integer of 2 or more and R or less) demultiplexes the wavelength-multiplexed optical signal input from the transmission line 53-(r-1), and outputs an optical signal obtained by the demultiplexing to the optical SW 34. The optical SW 34 is connected to one or more subscriber devices 40. In the drawing, only one subscriber device 40 connected to the optical SW 34 is illustrated. The optical SW 34 drops an optical signal having a wavelength corresponding to the own node among optical signals input from the demultiplexing unit 33. The optical receiver 43 of the subscriber device 40 receives the optical signal dropped by the optical SW 34. The optical SW 34 receives an optical signal transmitted from the optical transmitter 42 of the subscriber device 40, and outputs the received optical signal and the optical signal that has not been dropped to the multiplexing unit 35. The multiplexing unit 35 of the add/drop node 32-r multiplexes the optical signals input from the optical SW 34 and outputs the multiplexed optical signal to the transmission line 53-r. The optical SW 34 of the add/drop node 32-1 drops an optical signal having a wavelength corresponding to the own node among the optical signals demultiplexed by the demultiplexing unit 33, and inputs the optical signal having each wavelength to the transmission line 50-1-pn1 (where pn1=1, 3, 5, . . . , and p(N−1)). The port 11-1-pn1 of the optical SW 1007 receives the optical signal dropped by the add/drop node 32-1 from the transmission line 50-1-pn1. The optical SW 34 of the add/drop node 32-1 receives the optical signal output from the port 11-1-pn2 (where pn2=2, 4, 6, . . . , and pN) by the optical SW 1007 from the transmission line 50-1-pn2, and outputs the received optical signal and the optical signal that has not been dropped to the multiplexing unit 35.

Consequently, an ONU #1 that is the subscriber device 40 connected to the add/drop node 32-4 of the WDM access ring network 31 and an ONU #2 that is the subscriber device 40 connected to the port 11-2-1 and the port 11-2-2 of the optical SW 1007 perform communication as follows.

The ONU #1 transmits an optical signal having the wavelength $\lambda_1$ to the add/drop node 32-4. The multiplexing unit 35 of the add/drop node 32-4 multiplexes the optical signal having the wavelength $\lambda_1$ input by the optical SW 34 and the optical signal not dropped by the optical SW 34, and outputs the multiplexed signal to the add/drop node 32-1. The optical SW 34 of the add/drop node 32-1 drops the optical signal having the wavelength $\lambda_1$ demultiplexed by the demultiplexing unit 33 and outputs the optical signal that has not been dropped to the multiplexing unit 35. The port 11-1-$p1$ of the optical SW 1007 receives the optical signal having the wavelength $\lambda_1$ dropped by the add/drop node 32-1 from the transmission line 50-1-$p1$. The optical SW 1007 outputs the optical signal having the wavelength $\lambda_1$ input from the port 11-1-$p1$ from the port 11-2-1. The optical receiver 43 of the ONU #2 receives the optical signal having the wavelength $\lambda_1$ transmitted through the transmission line 50-2-1.

The optical transmitter 42 of the ONU #2 transmits a downlink optical signal having the wavelength $\lambda_2$. The port 11-2-2 of the optical SW 1007 receives the optical signal transmitted by the ONU #2 from the transmission line 50-2-2. The optical SW 1007 outputs the downlink optical signal having the wavelength $\lambda_2$ input from the port 11-2-2 from the port 11-1-$p2$. The optical SW 34 of the add/drop node 32-1 receives the optical signal having the wavelength $\lambda_2$ output from the optical SW 1007 from the transmission line 50-1-$p2$, and outputs the received optical signal and the optical signal that has not been dropped to the multiplexing unit 35. The optical signal having the wavelength $\lambda_2$ is input to the add/drop node 32-4 via the add/drop nodes 32-2 and 32-3. The optical SW 34 of the add/drop node 32-4 drops the optical signal having the wavelength $\lambda_2$. The optical receiver 43 of the ONU #1 receives the optical signal having the wavelength $\lambda_2$ dropped by the add/drop node 32-4.

Figure 23:
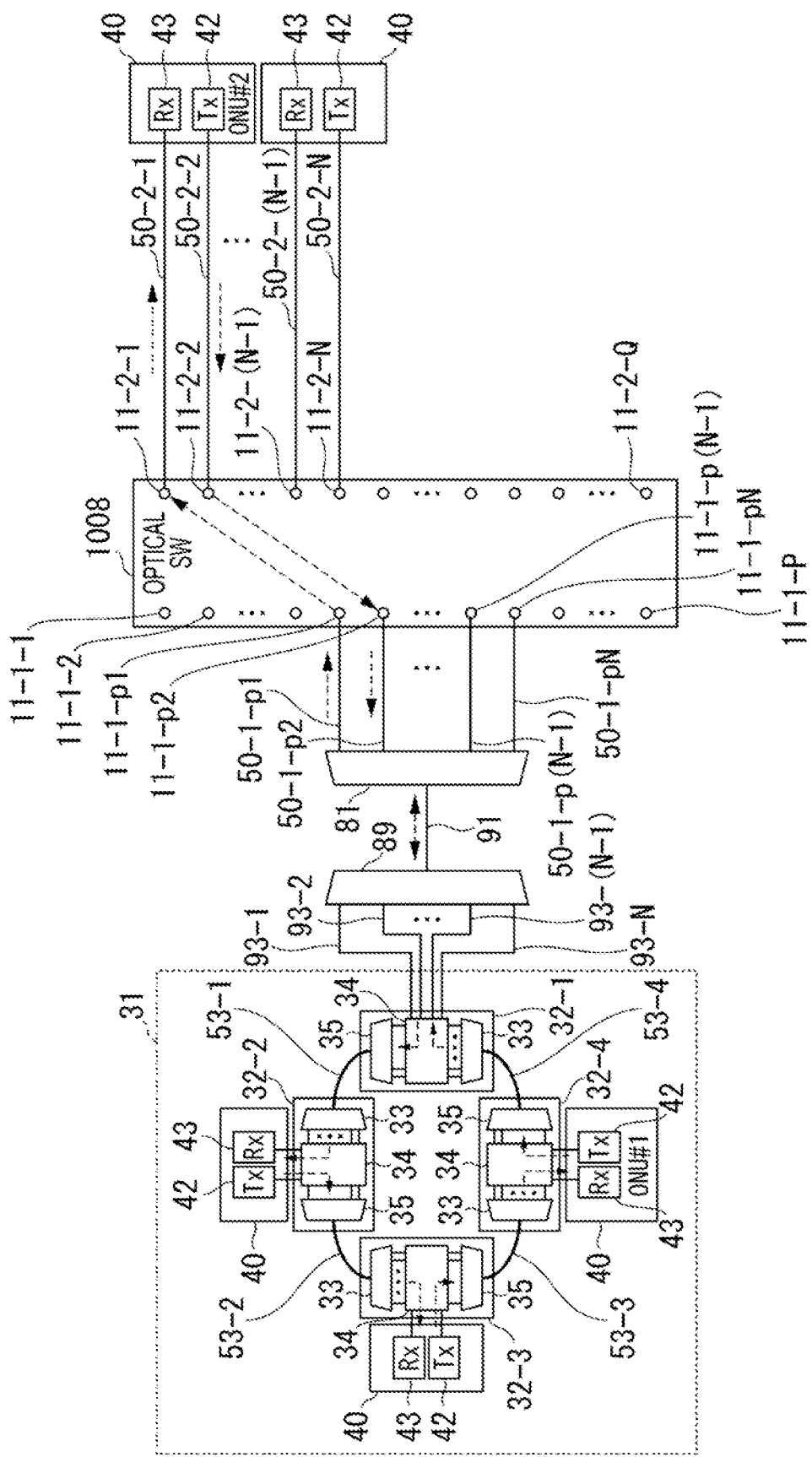
FIG. 23 is a diagram illustrating an example of an access topology according to a basic configuration.

FIG. 23 is a diagram illustrating a loop type access topology using a WDM multiplexer/demultiplexer. As an optical SW 1008, the above-described optical SWs 10$a$ to 10$i$ may be used. The access topology illustrated in FIG. 23 is different from the access topology illustrated in FIG. 22 in that the optical SW 1008 and the WDM access ring network 31 are connected via a WDM device 81 and a WDM device 89.

The add/drop node 32-1 of the WDM access ring network 31 and the WDM device 89 are connected via transmission lines 93-1 to 93-N (where N is an integer of 2 or more). The WDM device 89 receives an uplink optical signal having the wavelength $\lambda_{n1}$ from the transmission line 93-$n_1$ (where $n_1$=1, 3, 5, . . . , and N−1), and outputs a multiplexed signal obtained by multiplexing the received uplink optical signals to the multiplex communication transmission line 91. The WDM device 89 demultiplexes the downlink wavelength-multiplexed optical signal received via the multiplex communication transmission line 91, and inputs the demultiplexed downlink optical signal having the wavelength $\lambda_{n2}$ to the transmission line 93-$n_2$ (where $n_2$=2, 4, 6, . . . , and N).

The WDM device 81 demultiplexes the uplink wavelength-multiplexed optical signal received via the multiplex communication transmission line 91, and inputs the demultiplexed uplink optical signal having the wavelength $\lambda_1$ to the port 11-1-$n_1$. The WDM device 81 receives the downlink optical signal having the wavelength $\lambda_{n2}$ output from each of the ports 11-1-$pn2$, multiplexes the received downlink signals, and outputs the multiplexed signal to the multiplex communication transmission line 91.

Consequently, the ONU #1 that is the subscriber device 40 connected to the add/drop node 32-4 of the WDM access ring network 31 and the ONU #2 that is the subscriber device 40 connected to the port 11-2-1 and the port 11-2-2 of the optical SW 1008 perform communication as follows. A case of N=18 will be described as an example.

The ONU #1 transmits the uplink optical signal having the wavelength $\lambda_1$ to the add/drop node 32-4. Another ONU transmits uplink optical signals having wavelengths $\lambda_3$ and $\lambda_5$ to the add/drop node 32-4. The optical SW 34 of the add/drop node 32-4 receives the optical signals having wavelengths $\lambda_1$, $\lambda_3$, and $\lambda_5$. The multiplexing unit 35 of the add/drop node 32-4 multiplexes the optical signals having the wavelengths $\lambda_1$, $\lambda_3$, and $\lambda_5$ input by the optical SW 34 and the optical signal not dropped by the optical SW 34, and outputs the multiplexed signal to the add/drop node 32-1. The optical SW 34 of the add/drop node 32-1 drops the optical signals having the wavelengths $\lambda_1$, $\lambda_3$, $\lambda_5$, . . . , and $\lambda_{17}$ demultiplexed by the demultiplexing unit 33, and outputs an optical signal that has not been dropped to the multiplexing unit 35. The WDM device 89 outputs, to the multiplex communication transmission line 91, a multiplexed signal obtained by multiplexing the uplink optical signals having the wavelengths $\lambda_1$, $\lambda_3$, $\lambda_5$, . . . , and $\lambda_{17}$ respectively input from the transmission lines 93-1, 93-3, 93-5, . . . , and 93-17.

The WDM device 81 receives the wavelength-multiplexed uplink optical signal from the multiplex communication transmission line 91 and performs wavelength separation. The WDM device 81 inputs the uplink optical signals having the wavelengths $\lambda_1$, $\lambda_3$, $\lambda_5$, . . . , and $\lambda_{17}$ to the ports 11-1-$p1$, 11-1-$p3$, 11-1-$p5$, . . . , and 11-1-$p$ 17 of the optical SW 1008, respectively. The optical SW 1008 outputs the uplink optical signal having the wavelength $\lambda_1$ from the port 11-2-1 that is an output destination. The optical receiver 43 of the ONU #2 receives the optical signal having the wavelength $\lambda_1$ transmitted through the transmission line 50-2-1.

The optical transmitter 42 of the ONU #2 transmits a downlink optical signal having the wavelength $\lambda_2$. The port 11-2-2 of the optical SW 1008 receives the optical signal transmitted by the ONU #2 from the transmission line 50-2-2. The optical SW 1008 outputs the downlink optical signal having the wavelength $\lambda_2$ input from the port 11-2-2 from the port 11-1-$p2$. the optical SW 1008 outputs downlink optical signals having wavelengths $\lambda_4$, $\lambda_6$, . . . , and $\lambda_{18}$ respectively input from the ports 11-2-4, 11-2-6, . . . , and 11-2-18 from the ports 11-1-$p4$, 11-2-$p6$, . . . , and 11-2-$p18$.

The WDM device 81 outputs, to the multiplex communication transmission line 91, a wavelength-multiplexed signal obtained by multiplexing the downlink optical signals having the wavelengths $\lambda_2$, $\lambda_4$, $\lambda_6$, . . . , and his respectively output from the ports 11-1-$p2$, 11-1-$p4$, 11-1-$p6$, . . . , and 11-1-$p18$. The WDM device 89 separates the wavelength-multiplexed signal transmitted through the multiplex communication transmission line 91, and outputs the downlink optical signals having the wavelengths $\lambda_2$, $\lambda_4$, $\lambda_6$, . . . , and $\lambda_{18}$ obtained through the separation to the transmission lines 93-2, 93-4, 93-6, . . . , and 93-18, respectively. The optical SW 34 of the add/drop node 32-1 receives the optical signals having the wavelengths $N_2$, $N_4$, $\lambda_6$, . . . , and $\lambda_{1s}$ output from the WDM device 89 from the transmission lines 93-2, 93-4, 93-6, . . . , and 93-18, respectively, and outputs the received optical signals and the optical signal that has not been dropped to the multiplexing unit 35. The multiplexing unit 35 multiplexes the optical signals input from the optical SW 34 and outputs the multiplexed optical signal to the transmission line 53-1.

The demultiplexing unit 33 of the add/drop node 32-2 demultiplexes the optical signal input from the transmission line 53-1 and outputs the demultiplexed signals to the optical SW 34. The optical SW 34 drops the optical signals having wavelengths $\lambda_{14}$, $\lambda_{16}$, and $\lambda_{18}$ corresponding to the own node. The optical signals having the wavelengths $\lambda_{14}$, $\lambda_{16}$, and $\lambda_{18}$ are transmitted to the optical receivers 43 of the subscriber devices 40 respectively corresponding to the wavelengths. The optical SW 34 of the add/drop node 32-2 receives the optical signals having the wavelengths $\lambda_{13}$, $\lambda_{15}$, and $\lambda_{17}$ respectively transmitted by the optical transmitters 42 of the subscriber devices 40, and outputs the received optical signals and the optical signal that has not been dropped to the multiplexing unit 35. The multiplexing unit 35 multiplexes the optical signals input from the optical SW 34 and outputs the multiplexed optical signals to the transmission line 53-2.

The add/drop node 32-3 operates similarly to the add/drop node 32-2. However, the optical SW 34 of the add/drop node 32-3 drops the optical signals having the wavelengths $\lambda_8$, $\lambda_{10}$, and $\lambda_{12}$ corresponding to the own node, and inputs the optical signals having the wavelengths $\lambda_7$, $\lambda_9$, and $\lambda_{11}$. The demultiplexing unit 33 of the add/drop node 32-4 demultiplexes the wavelength-multiplexed optical signal input from the transmission line 53-3 and outputs the demultiplexed signals to the optical SW 34. The optical SW 34 of the add/drop node 32-4 drops the optical signals having wavelengths $\lambda_2$, $\lambda_4$, and $\lambda_6$ corresponding to the own node. The optical receiver 43 of the ONU #1 receives the optical signal having the wavelength $\lambda_2$ dropped by the optical SW 34 of the add/drop node 32-4.

Figure 24:
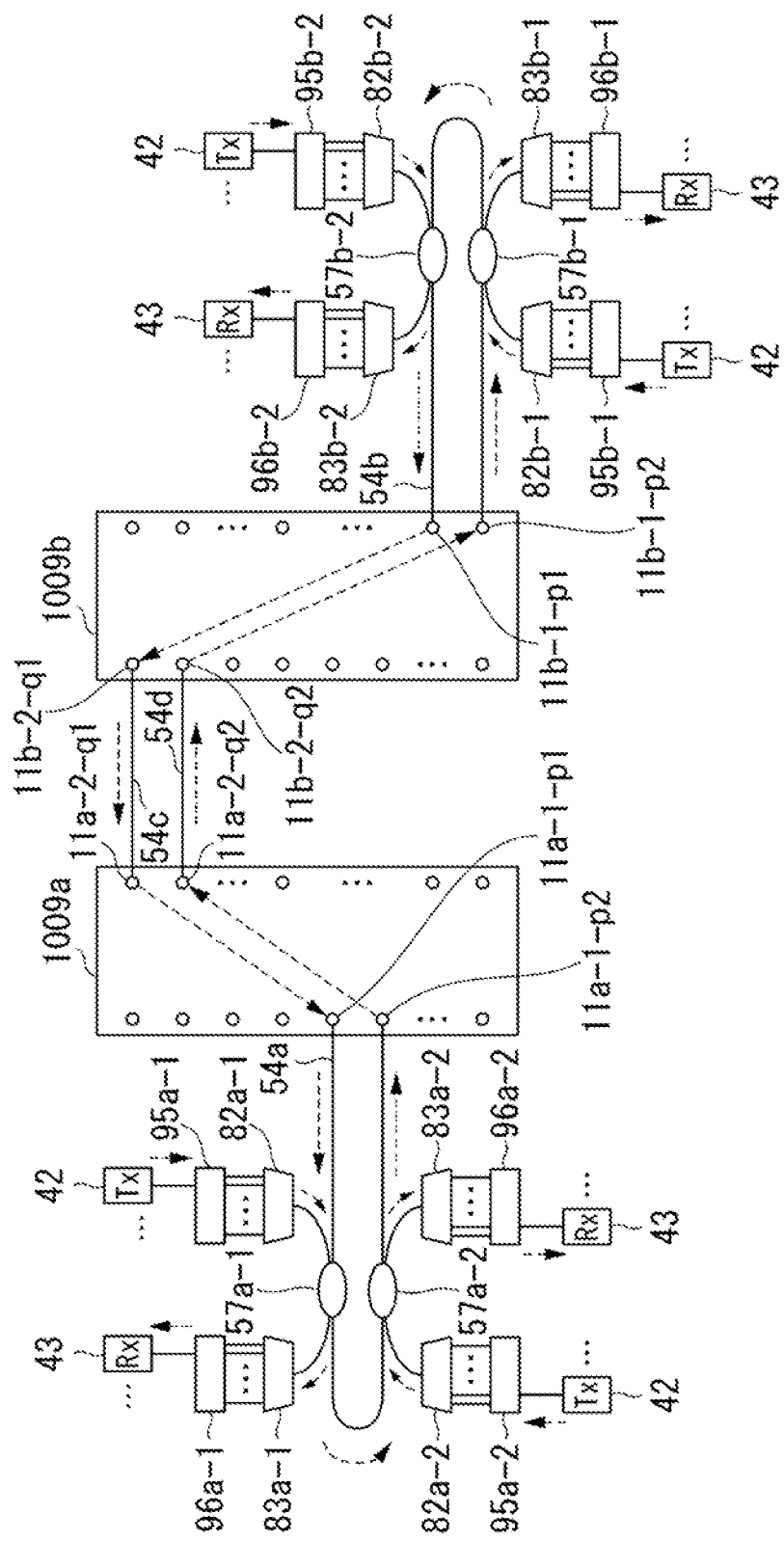
FIG. 24 is a diagram illustrating an example of an access topology according to a basic configuration.

FIG. 24 is a diagram illustrating an access topology in which two access surfaces form one loop. As an optical SW 1009a and an optical SW 1009b, the above-described optical SWs 10a to 10i may be used. The optical SW 1009a and the optical SW 1009b are collectively referred to as an optical SW 1009. Two ports 11-1 of the optical SW 1009 are connected to both ends of one transmission line 54. One or more power splitters 57 are connected to the transmission line 54. The power splitter 57 is connected to the optical transmitters 42 of the one or more subscriber devices 40 via the multiplexer 82 and the optical SW 95, and is connected to the optical receivers 43 of the one or more subscriber devices 40 via the demultiplexer 83 and the optical SW 96. Each of the subscriber devices 40 transmits and receives optical signals having different wavelengths.

The transmission line 54 connected to the optical SW 1009a will be referred to as a transmission line 54a, the two ports 11-1 connected to the transmission line 54a will be referred to as ports 11a-1-p1 and 11a-1-p2, the transmission line 54 connected to the optical SW 1009b will be referred to as a transmission line 54b, and the two ports 11-1 connected to the transmission line 54b will be referred to as ports 11b-1-p1 and 11b-1-p2. The N (where N is an integer of 1 or more) power splitters 57 connected to the transmission line 54a will be referred to as power splitters 57a-1 to 57a-N, and the M (M is an integer of 1 or more) power splitters 57 connected to the transmission line 54b will be referred to as power splitters 57b-1 to 57b-M. The multiplexer 82 and the demultiplexer 83 connected to the power splitters 57a-n (where n is an integer of 1 or more and N or less) will be respectively referred to as a multiplexer 82a-n and a demultiplexer 83a-n, and the multiplexer 82 and the demultiplexer 83 connected to the power splitters 57b-m (where m is an integer of 1 or more and M or less) will be respectively referred to as a multiplexer 82b-m and a demultiplexer 83b-m. The optical SW 95 connected to the multiplexer 82a-n will be referred to as an optical SW 95a-n, and the optical SW 96 connected to the demultiplexer 83a-n will be referred to as an optical SW 96a-n. The optical SW 95 connected to the multiplexer 82b-m will be referred to as an optical SW 95b-m, and the optical SW 96 connected to the demultiplexer 83b-m will be referred to as an optical SW 96b-m.

The optical SW 1009a and the optical SW 1009b are connected via a transmission line 54c and a transmission line 54d. The port 11-2 of the optical SW 1009a connected to the transmission line 54c will be referred to as a port 11a-2-q1, and the port 11-2 of the optical SW 1009a connected to the transmission line 54d will be referred to as a port 11a-2-q2. The port 11-2 of the optical SW 1009b connected to the transmission line 54c will be referred to as a port 11b-2-q1, and the port 11-2 of the optical SW 1009b connected to the transmission line 54d will be referred to as a port 11b-2-q2.

In the above configuration, the optical SW 95b-m outputs optical signals having different wavelengths respectively transmitted by the optical transmitters 42 of the subscriber devices 40 to the ports respectively corresponding to wavelengths of the multiplexer 82b-m. The multiplexer 82b-m receives optical signals having different wavelengths transmitted by the optical transmitters 42 of the respective subscriber devices 40 via the optical SW 95b-m, and outputs a wavelength-multiplexed optical signal obtained by multiplexing the received optical signals. The power splitter 57b-m multiplexes the wavelength-multiplexed optical signal output from the multiplexer 82b-m with a wavelength-multiplexed optical signal transmitted through the transmission line 54b in a direction from the port 11b-1-p2 to the port 11b-1-p1, and outputs the multiplexed optical signal.

The port 11b-1-p1 of the optical SW 1009b receives the wavelength-multiplexed optical signal from the transmission line 54b and outputs the wavelength-multiplexed optical signal from the port 11b-2-q1. The port 11a-2-q1 of the optical SW 1009a receives the wavelength-multiplexed optical signal output from the port 11b-2-q1 of the optical SW 1009b from the transmission line 54c. The optical SW 1009a outputs the wavelength-multiplexed optical signal input from the port 11a-2-q1 to the transmission line 54a from the port 11a-1-p1.

The power splitter 57a-n branches the wavelength-multiplexed optical signal transmitted through the transmission line 54a in the direction from the port 11a-1-p1 to the port 11a-1-p2, and outputs the branched wavelength-multiplexed optical signal to the demultiplexer 83a-n. The demultiplexer 83a-n demultiplexes the wavelength-multiplexed optical signal received from the power splitter 57a-n, and outputs the demultiplexed optical signal to the optical SW 96a-n from a port corresponding to a wavelength. The optical SW 96a-n outputs the optical signal having each wavelength input from the demultiplexer 83a-n to the optical receiver 43 of the subscriber device 40 that receives the optical signal having the wavelength.

On the other hand, the optical SW 95a-n outputs optical signals having different wavelengths transmitted by the optical transmitters 42 of the respective subscriber devices 40 to ports corresponding to the respective wavelengths of the multiplexer 82a-n. The multiplexer 82a-n receives the optical signals having different wavelengths transmitted by the optical transmitters 42 of the respective subscriber devices 40 via the optical SW 95a-n, and outputs a wavelength-multiplexed optical signal obtained by multiplexing the input optical signals. The power splitter 57a-n multiplexes the wavelength-multiplexed optical signal output from the multiplexer 82a-n with the wavelength-multiplexed optical signal transmitted through the transmission line 54a in the direction from the port 11a-1-p1 to the port 11a-1-p2, and outputs the wavelength-multiplexed optical signal.

The port 11a-1-p2 of the optical SW 1009a receives the wavelength-multiplexed optical signal from the transmission line 54a and outputs the wavelength-multiplexed optical signal from the port 11a-2-q2. The port 11b-2-q2 of the optical SW 1009b receives the wavelength-multiplexed optical signal output from the port 11a-2-q2 of the optical SW 1009a from the transmission line 54d. The optical SW 1009b outputs the wavelength-multiplexed optical signal input from the port 11b-2-q2 to the transmission line 54b from the port 11b-1-p2.

The power splitter 57b-m branches the wavelength-multiplexed optical signal transmitted through the transmission line 54b in the direction from the port 11b-1-p2 to the port 11b-1-p1, and outputs the branched wavelength-multiplexed optical signal to the demultiplexer 83b-m. The demultiplexer 83b-m demultiplexes the wavelength-multiplexed optical signal received from the power splitter 57b-m, and outputs the demultiplexed optical signals to the optical SW 96b-m from ports corresponding to the wavelengths. The optical SW 96b-m outputs the optical signal having each wavelength input from the demultiplexer 83b-m to the optical receiver 43 of the subscriber device 40 that receives the optical signal having the wavelength.

Although FIG. 24 illustrates a case where the optical signal is transmitted counterclockwise, the optical signal may be transmitted clockwise, and a pair of left and right two cores may be used for redundancy.

Figure 25:
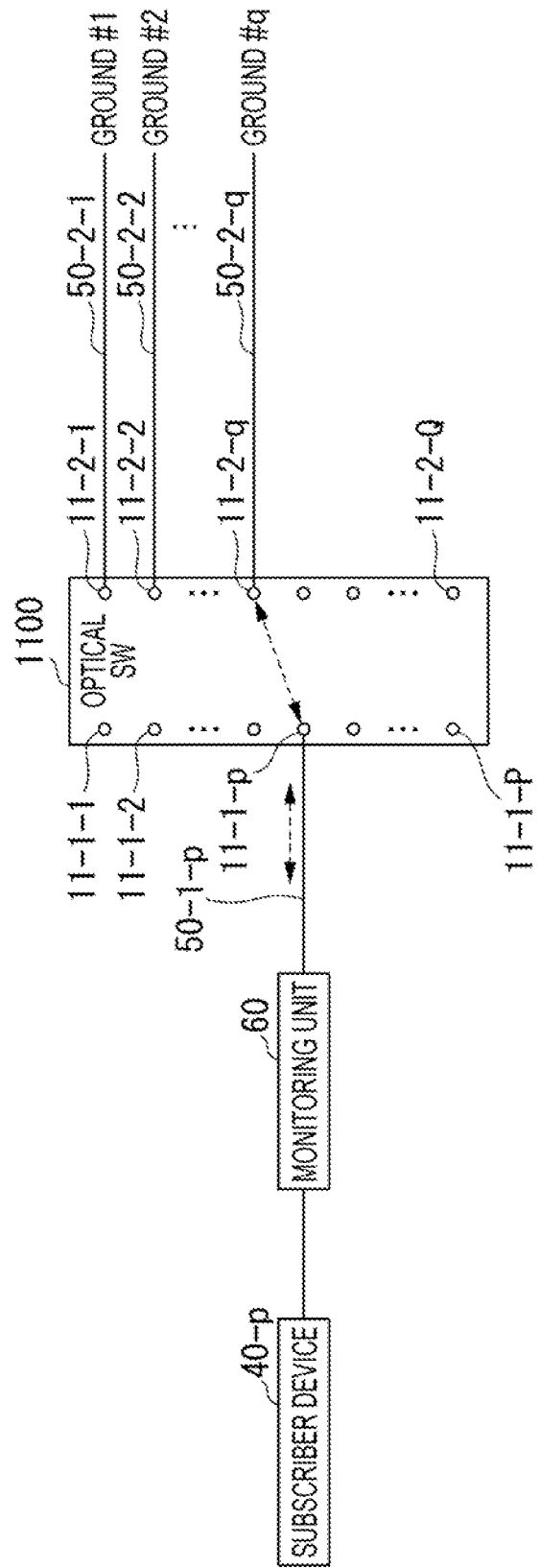
FIG. 25 is a diagram illustrating an example of an access topology according to a basic configuration.

FIG. 25 is a diagram illustrating a line type access topology. As an optical SW 1100, the above-described optical SWs 10a to 10i may be used. The access topology illustrated in FIG. 25 is different from the access topology illustrated in FIG. 16 in that the monitoring unit 60 is connected between a subscriber device 40-p and the optical SW 1100. The monitoring unit 60 monitors an optical signal output from the subscriber device 40-p or an optical signal output from the port 11-1-p.

Figure 26:
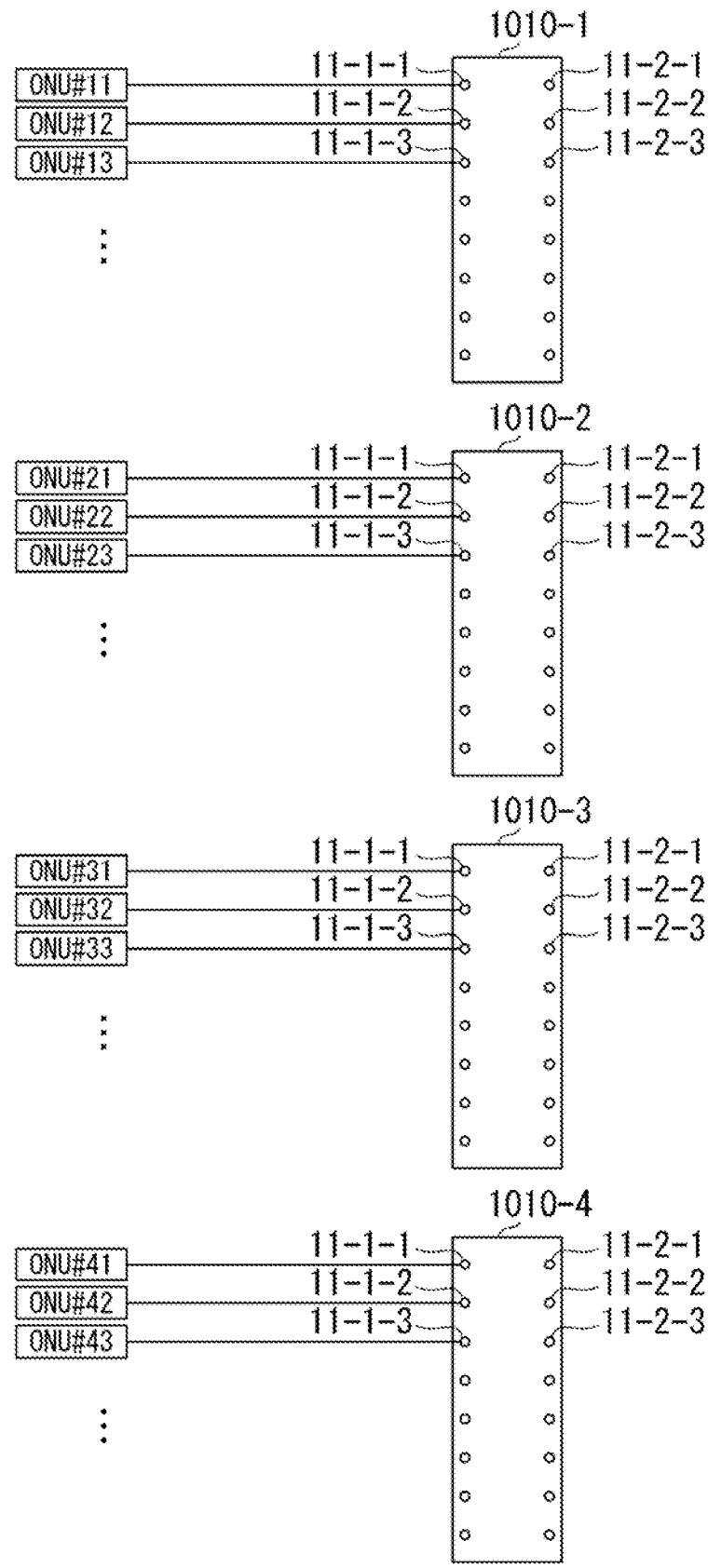
FIG. 26 is a diagram illustrating an example in which scalability of an optical SW according to a basic configuration is required.

Next, a connection configuration in a case where the number of user connections increases will be described. FIG. 26 is a diagram illustrating an example in which scalability of the optical SW is required. FIG. 26 illustrates N (where N is an integer of 1 or more) optical SWs 1010-1 to 1010-N. As the optical SWs 1010-1 to 1010-N, the above-described optical SWs 10a to 10i may be used. FIG. 26 illustrates an example of N=4. In the same figure, an ONU #np as the subscriber device 40 is connected to the port 11-1-p of the optical SW 1010-n (where n is an integer 1 or more and N or less). The port 11-2-q of the optical SW 1010-n is connected to an uplink. The uplink is a transmission line 50-2 connected to a higher network.

When the number of users becomes enormous and the number of ONUs increases, the optical SW 1010 may exceed an accommodatable size. In the present embodiment, even in such a case, a function similar to that in a case where the number of users is small, for example, connection in which any uplink is selected or light return to any subscriber device is realized by a connection configuration illustrated in FIG. 27 or 28.

Figure 27:
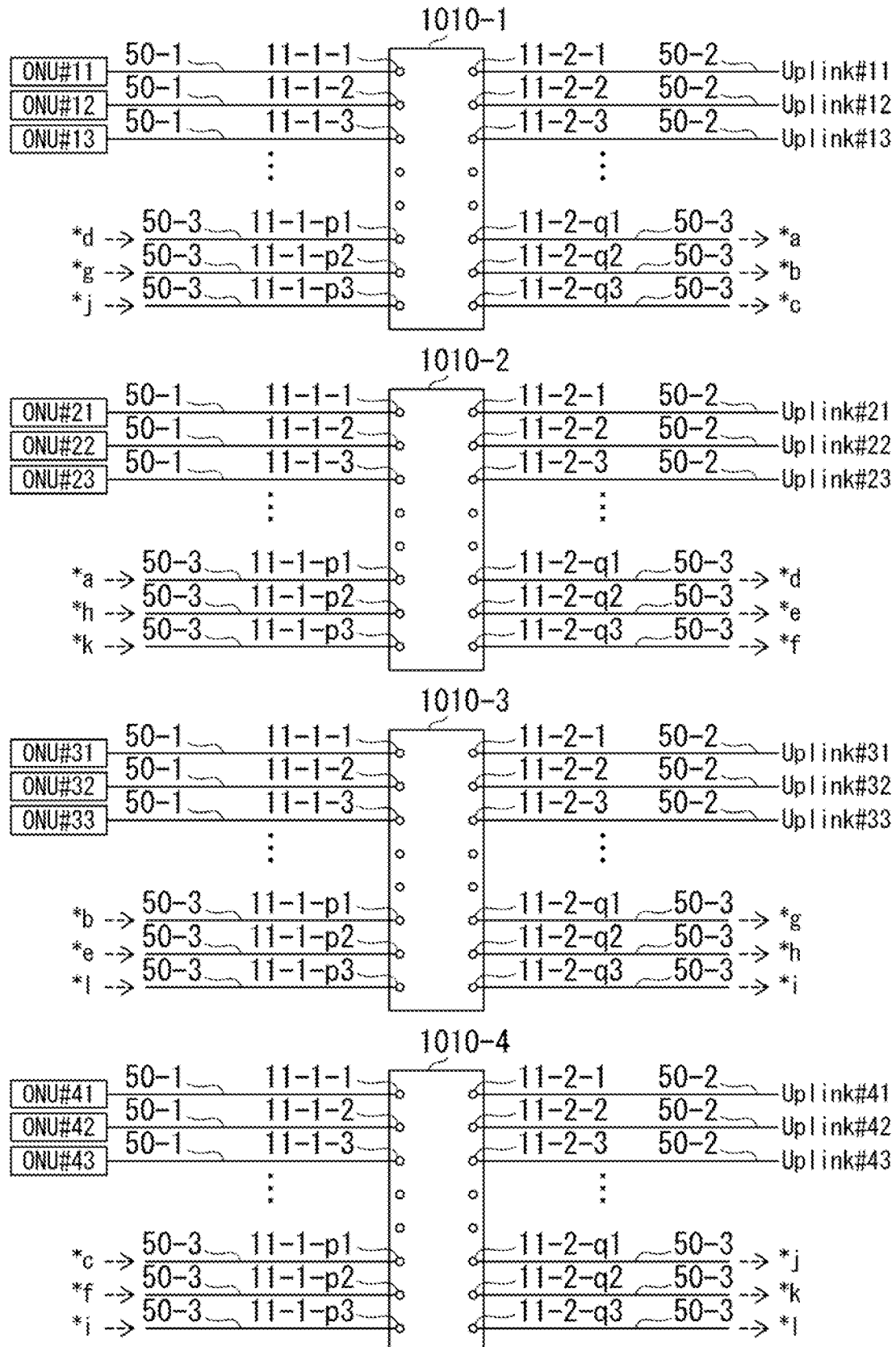
FIG. 27 is a diagram illustrating an example in which scalability of an optical SW according to a basic configuration is required.

FIG. 27 is a diagram illustrating an example of optical SW scalability by a mesh configuration. Some ports 11-1 of the optical SW 1010 are connected to the ONU via the transmission line 50-1, and some ports 11-2 are connected to an uplink transmission line 50-2. Some ports 11-1 of the optical SW 1010 and some ports 11-2 of another optical SW 1010 are connected via transmission lines 50-3. In the same figure, one optical SW 1010 is connected to all the other optical SWs 1010.

The plurality of ports 11-1 of the optical SW 1010 will be referred to as ports 11-1-1, 11-1-2, 11-1-3, . . . , 11-1-p1, 11-1-p2, and 11-1-p3, and the plurality of ports 11-2 of the optical SW 1010 will be referred to as ports 11-2-1, 11-2-2, 11-2-3, . . . , 11-2-q1, 11-2-q2, and 11-2-q3.

In FIG. 27, the ports 11-1-1, 11-1-2, 11-1-3, . . . of the optical SW 1010-n (where n is an integer of 1 or more and N or less) are connected to the ONUs #n1, #n2, #n3, . . . , and the ports 11-2-1, 11-2-2, 11-2-3, . . . are connected to the transmission lines 50-2 of the uplink #n1, the uplink #n2, the uplink #n3, . . . . All the other optical SWs 1010-n are connected to the ports 11-1 of the optical SW 1010-j (where j #n, and j is an integer of 1 or more and N or less) via some of the ports 11-2. For example, the port 11-2-q1 of the optical SW 1010-1 is connected to the port 11-1-p1 of the optical SW 1010-2, the port 11-2-q2 of the optical SW 1010-1 is connected to the port 11-1-p1 of the optical SW 1010-3, and the port 11-2-q3 of the optical SW 1010-1 is connected to the port 11-1-p1 of the optical SW 1010-4. The port 11-2-q1 of the optical SW 1010-2 is connected to the port 11-1-p1 of the optical SW 1010-1, the port 11-2-q2 of the optical SW 1010-2 is connected to the port 11-1-p2 of the optical SW 1010-3, and the port 11-2-q3 of the optical SW 1010-2 is connected to the port 11-1-p2 of the optical SW 1010-4. The optical SW 1010-n may be connected to the ports 11-1 of some optical SWs 1010-j among all the other optical SWs 1010-j (where j #n, and j is an integer 1 or more and N or less) via some of the ports 11-2.

For example, in a case where the ONU #11 transmits an uplink optical signal having the wavelength $\lambda_1$ addressed to the uplink #41, the optical SW 1010-1 outputs the optical signal input from the port 11-1-1 from the port 11-2-q3. The port 11-1-p1 of the optical SW 1010-4 receives the optical signal having the wavelength $\lambda_1$ output from the port 11-2-q3 of the optical SW 1010-1, and outputs the optical signal from the port 11-2-1.

In a case where the ONU #12 transmits an uplink optical signal having the wavelength $\lambda_2$ addressed to the ONU #31, the optical SW 1010-1 outputs the optical signal input from the port 11-1-2 from the port 11-2-q2. The port 11-1-p1 of the optical SW 1010-3 receives the optical signal output from the port 11-2-q2 of the optical SW 1010-1. The optical SW 1010-3 performs return communication similar to the optical SW 10b illustrated in FIG. 3 on the optical signal having the wavelength $\lambda_2$ input from the port 11-1-p1, and outputs the optical signal from the port 11-1-1.

In FIG. 27, only the uplink optical signal is illustrated. In a case of performing vertical bidirectional communication, a WDM filter (separation unit) that separates and transmits an uplink optical signal and a downlink optical signal is provided in the transmission lines 50-1, 50-2, and 50-3. For the downlink optical signal, connection is performed in a direction opposite to that of the above-described uplink optical signal.

Figure 28:
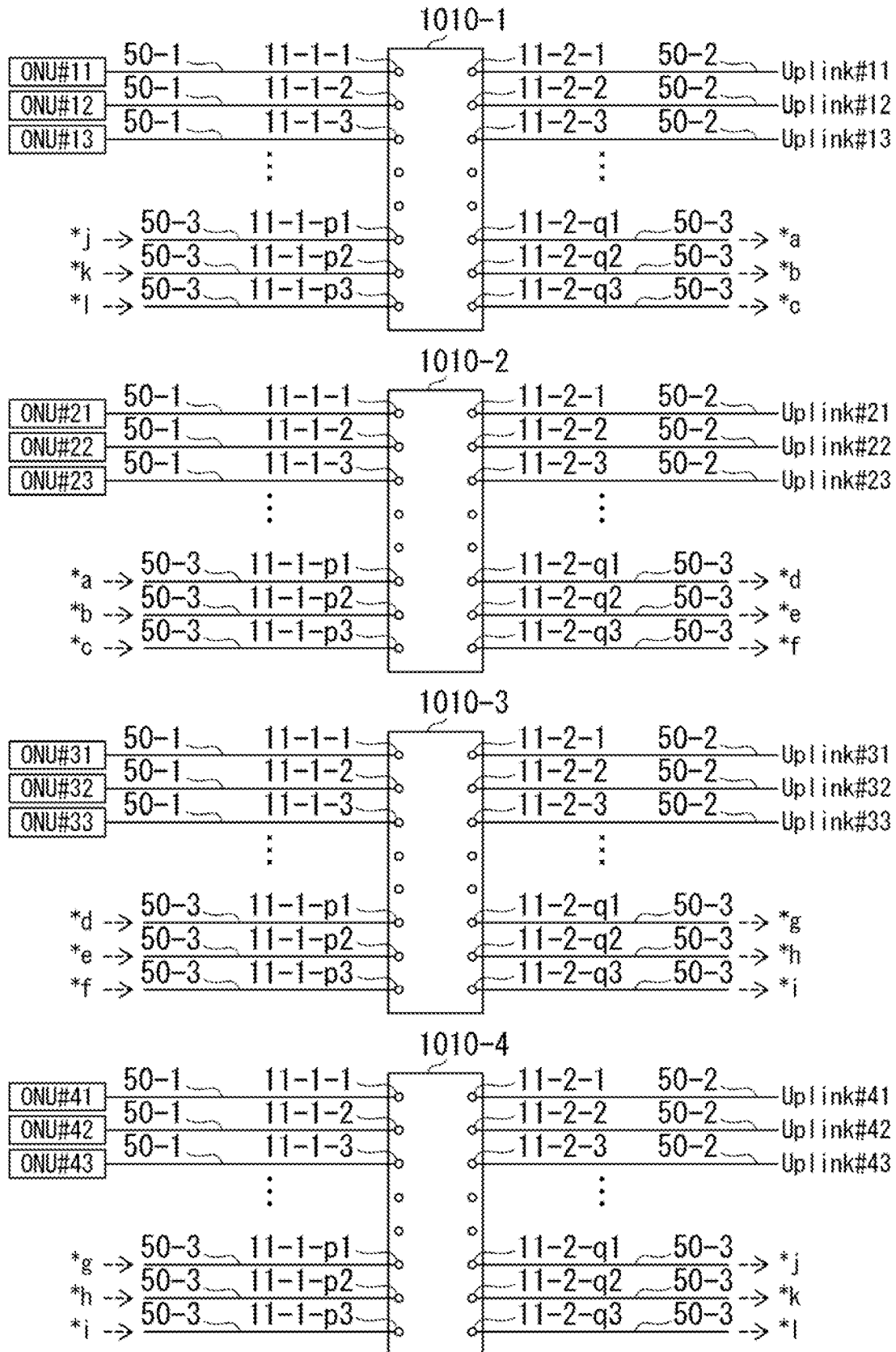
FIG. 28 is a diagram illustrating an example in which scalability of an optical SW according to a basic configuration is required.

FIG. 28 is a diagram illustrating another example of the optical SW scalability according to a cascade configuration. The configuration illustrated in FIG. 28 is different from the configuration illustrated in FIG. 27 in that the optical SW 1010-n (where n is an integer of 1 or more and N or less) is connected to the ports 11-1 of any other optical SW 1010-(n+1) via some ports 11-2. The optical SW 1010-(N+1) is assumed to be the optical SW 1010-1. Consequently, the plurality of optical SWs 1010 are connected in series.

In FIG. 28, the ports 11-1-1, 11-1-2, 11-1-3, . . . of the optical SW 1010-*n* (where n is an integer 1 or more and N or less) are connected to the ONUs #n1, #n2, #n3, . . . , and the ports 11-2-1, 11-2-2, 11-2-3, . . . are connected to the transmission lines 50-2 of the uplink #n1, the uplink #n2, the uplink #n3, . . . . The port 11-2-*q*1 of the optical SW 1010-*n* is connected to the port 11-1-*p*1 of the optical SW 1010-(*n*+1), the port 11-2-*q*2 of the optical SW 1010-*n* is connected to the port 11-1-*p*2 of the optical SW 1010-(*n*+1), and the port 11-2-*q*3 of the optical SW 1010-*n* is connected to the port 11-1-*p*3 of the optical SW 1010-(*n*+1).

For example, in a case where the ONU #11 transmits an uplink optical signal having the wavelength $\lambda_1$ addressed to the uplink #41, the optical SW 1010-1 outputs the optical signal input from the port 11-1-1 from the port 11-2-*q*1. The port 11-1-*p*1 of the optical SW 1010-2 receives the optical signal output from the port 11-2-*q*1 of the optical SW 1010-1, and outputs the optical signal from the port 11-2-*q*1 according to the wavelength $\lambda_1$. The port 11-1-*p*1 of the optical SW 1010-3 receives the optical signal output from the port 11-2-*q*1 of the optical SW 1010-2, and outputs the optical signal from the port 11-2-*q*1 according to the wavelength $\lambda_1$. The port 11-1-*p*1 of the optical SW 1010-4 receives the optical signal output from the port 11-2-*q*1 of the optical SW 1010-3, and outputs the optical signal from the port 11-2-1 according to the wavelength $\lambda_1$.

In a case where the ONU #12 transmits an uplink optical signal having the wavelength $\lambda_2$ addressed to the ONU #31, the optical SW 1010-1 outputs the optical signal input from the port 11-1-2 from the port 11-2-*q*2. The port 11-1-*p*2 of the optical SW 1010-2 receives the optical signal output from the port 11-2-*q*2 of the optical SW 1010-1. The optical SW 1010-2 outputs the optical signal input from the port 11-1-*p*2 from the port 11-2-*q*2 according to the wavelength $\lambda_2$. The port 11-1-*p*2 of the optical SW 1010-3 receives the optical signal output from the port 11-2-*q*2 of the optical SW 1010-2. The optical SW 1010-3 performs return communication similar to the optical SW 10*b* illustrated in FIG. 3 on the optical signal input from the port 11-1-*p*2 according to the wavelength $\lambda_2$, and outputs the optical signal from the port 11-1-1.

In FIG. 28, only the uplink optical signal is illustrated. In a case of performing vertical bidirectional communication, a WDM filter that separates and transmits an uplink optical signal and a downlink optical signal is provided in the transmission lines 50-1, 50-2, and 50-3. For the downlink optical signal, connection is performed in a direction opposite to that of the above-described uplink optical signal.

Figure 29:
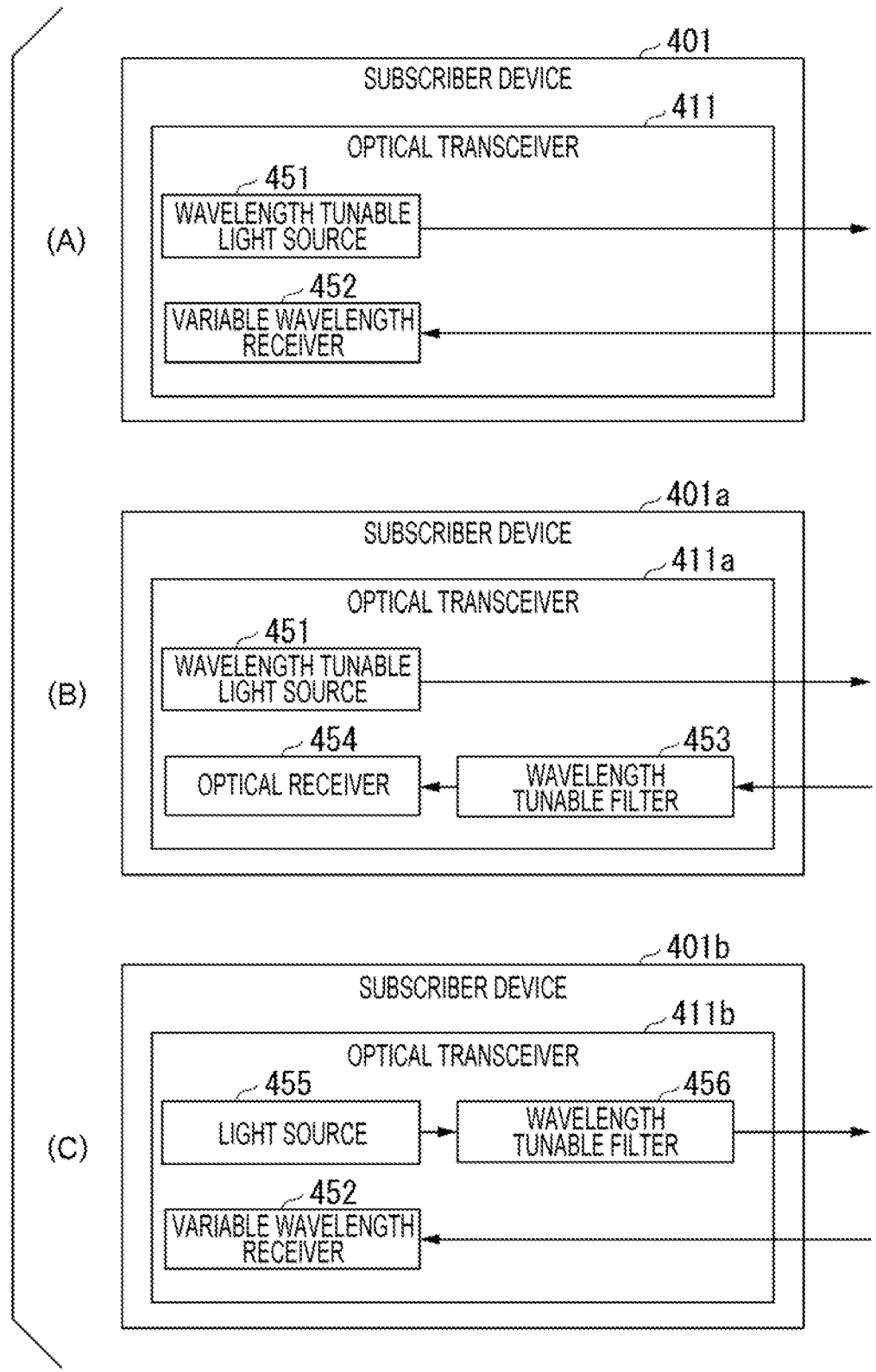
FIG. 29 is a diagram illustrating a configuration example of a twin-core subscriber device according to a basic configuration.
Figure 30:
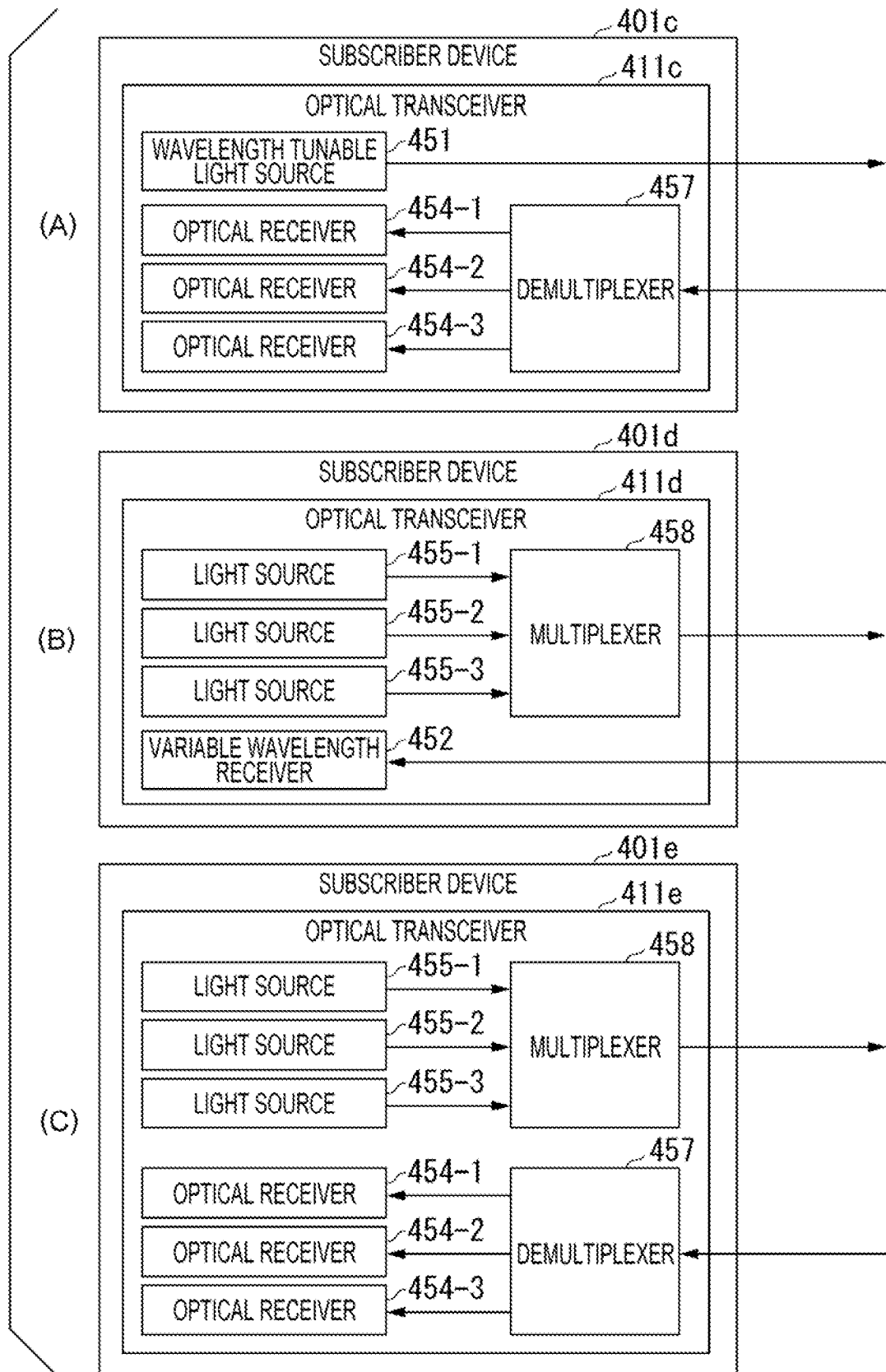
FIG. 30 is a diagram illustrating a configuration example of a twin-core subscriber device according to a basic configuration.

Next, a configuration of an optical transceiver will be described with reference to FIGS. 29 to 32. Although a part of a configuration example of the subscriber device 40 connected to the optical SW will be described, the configuration example may be used in a control unit, a monitoring unit, or the like, and will be described as a set of transmission and reception, but only transmission or only reception may be used depending on a use form thereof. FIGS. 29 and 30 are configuration diagrams of the double-core subscriber device 401. In FIGS. 29 to 32, in order to describe a plurality of configurations, the same constituents are denoted by the same reference numerals, and description thereof may be omitted.

A subscriber device 401 illustrated in FIG. 29(A) includes an optical transceiver 411. The optical transceiver 411 includes a wavelength tunable light source 451 and a variable wavelength receiver 452. The wavelength tunable light source 451 is an example of an optical transmission unit, and the variable wavelength receiver 452 is an example of an optical reception unit.

The wavelength tunable light source 451 outputs light having a set wavelength. A wavelength set to the wavelength tunable light source 451 is variable. The wavelength tunable light source 451 includes, for example, a variable wavelength laser diode (LD). The wavelength tunable light source 451 includes, for example, any one of a combination of a gain medium and a resonator with a variable resonator length, for example, a combination of a gain medium and a wavelength-selective medium, for example, a combination of a gain medium, a resonator with a variable resonator length, and a wavelength-selective medium. For example, the wavelength tunable light source 451 includes a multiplexer/demultiplexer or a power splitter and an optical transmitter (Tx) for each wavelength, and transmits an optical signal from the optical transmitter having a set wavelength. The multiplexer/demultiplexer is, for example, an AWG. The multiplexer/demultiplexer or the power splitter multiplexes input light and outputs an optical signal having the wavelength. For example, the multiplexer/demultiplexer or the power splitter has a multi-wavelength light source or a broadband light source, and a variable wavelength filter (tf) that selects and outputs a set wavelength. The variable wavelength filter causes an optical signal having a set wavelength (variable) to pass therethrough among input optical signals. The wavelength tunable light source 451 may output a main signal (or a signal obtained by superimposing a control signal on the main signal) according to, for example, a direct modulation method. Alternatively, the wavelength tunable light source 451 further includes an external modulator, and may output a main signal (or a signal obtained by superimposing a control signal on the main signal) by using the external modulator. As the external modulator, a Mach-Zender (MZ), an electro-absorption (EA), a semiconductor optical amplifier (SOA), or the like may be used. The external modulator may have a structure integrated with a light source. A main signal and a control signal may be modulated by the same modulator. A main signal and a control signal may be separately modulated by different modulators.

The variable wavelength receiver 452 includes a variable wavelength filter and an optical receiver. The variable wavelength filter causes light having a set wavelength (variable) to pass therethrough among input optical signals. The optical receiver receives the optical signal that has passed through the variable wavelength filter. Variable wavelength filtering, that is, selection of a signal having a predetermined wavelength may be performed after light reception. For example, a beat signal centered on a frequency corresponding to a wavelength difference from local light having a predetermined wavelength may be selected with a frequency width corresponding to the band of the signal. Depending on a configuration of the optical SW, a multiplexing method, or the like, a configuration using a transmitter that does not have a variable wavelength or a configuration not using a variable wavelength filter or a multiplexer/demultiplexer may be employed.

A subscriber device 401*a* illustrated in FIG. 29(B) includes an optical transceiver 411*a*. The optical transceiver 411*a* includes a wavelength tunable light source 451, a wavelength tunable filter 453, and an optical receiver 454. The wavelength tunable light source 451 is an example of an optical transmission unit, and the wavelength tunable filter 453 and the optical receiver 454 are an example of an optical reception unit. The wavelength tunable filter 453 receives an optical signal from a transmission line and causes light having a set wavelength to pass to the optical receiver 454. A wavelength set to the wavelength tunable filter 453 is variable. The optical receiver 454 receives the optical signal that has passed through the wavelength tunable filter 453. The subscriber device 40 on the reception side may have a configuration not using the wavelength tunable filter 453 depending on a configuration of the optical SW, a multiplexing method, or the like.

A subscriber device 401b illustrated in FIG. 29(C) includes an optical transceiver 411b. The optical transceiver 411b includes a light source 455, a wavelength tunable filter 456, and a variable wavelength receiver 452. The light source 455 and the wavelength tunable filter 456 are an example of an optical transmission unit, and the variable wavelength receiver 452 is an example of an optical reception unit. The light source 455 outputs light having a single wavelength (for example, the wavelength $\lambda_1$). That is, the light source 455 does not output light having a variable wavelength. The wavelength tunable filter 456 receives an optical signal output from light source 455, and outputs an optical signal having a set wavelength to a transmission line. A wavelength set to the wavelength tunable filter 456 is the wavelength of the optical signal output from the light source 455.

A subscriber device 401c illustrated in FIG. 30(A) includes an optical transceiver 411c. The optical transceiver 411c includes a wavelength tunable light source 451, a plurality of optical receivers 454-1 to 454-3, and a demultiplexer 457. The wavelength tunable light source 451 is an example of an optical transmission unit, and the optical receivers 454-1 to 454-3 and the demultiplexer 457 are an example of an optical reception unit. FIG. 30(A) illustrates a case where there are three optical receivers 454-1 to 454-3, but the number of optical receivers 454-1 to 454-3 is not limited. Also in the following description, the number of the optical receivers 454-1 to 454-3 is not particularly limited. The demultiplexer 457 demultiplexes an optical signal input from the transmission line according to wavelengths. The optical signals demultiplexed by the demultiplexer 457 are input to the optical receivers 454-1 to 454-3. The optical receivers 454-1 to 454-3 receive the optical signals demultiplexed by the demultiplexer 457.

A subscriber device 401d illustrated in FIG. 30(B) includes an optical transceiver 411d. The optical transceiver 411d includes a plurality of light sources 455-1 to 455-3, a multiplexer 458, and a variable wavelength receiver 452. The light sources 455-1 to 455-3 and the multiplexer 458 are an example of an optical transmission unit, and the variable wavelength receiver 452 is an example of an optical reception unit. FIG. 30(B) illustrates a case where there are three light sources 455-1 to 455-3, but the number of light sources 455-1 to 455-3 is not limited. Also in the following description, the number of light sources 455 is not particularly limited. The light sources 455-1 to 455-3 respectively transmit optical signals having different wavelengths. The multiplexer 458 multiplexes the plurality of optical signals output from the light sources 455-1 to 455-3 and outputs the multiplexed optical signal to a transmission line.

A subscriber device 401e illustrated in FIG. 30(C) includes an optical transceiver 411e. The optical transceiver 411e includes a plurality of light sources 455-1 to 455-3, a multiplexer 458, a plurality of optical receivers 454-1 to 454-3, and a demultiplexer 457. The light sources 455-1 to 455-3 and the multiplexer 458 are an example of an optical transmission unit, and the optical receivers 454-1 to 454-3 and the demultiplexer 457 are an example of an optical reception unit. In the subscriber device 401e, optical signals output from the light sources 455-1 to 455-3 are multiplexed by the multiplexer 458 and output to a transmission line. In the subscriber device 401e, an optical signal input from the transmission line is demultiplexed according to wavelengths in the demultiplexer 457, and the demultiplexed optical signals are received by the optical receivers 454-1 to 454-3.

It is desirable to combine a plurality of multiplexers/demultiplexers or combining/branching devices if wavelengths to be multiplexed/demultiplexed after combination are equal. That is, the demultiplexer 457 and the multiplexer 458 may be combined.

Figure 31:
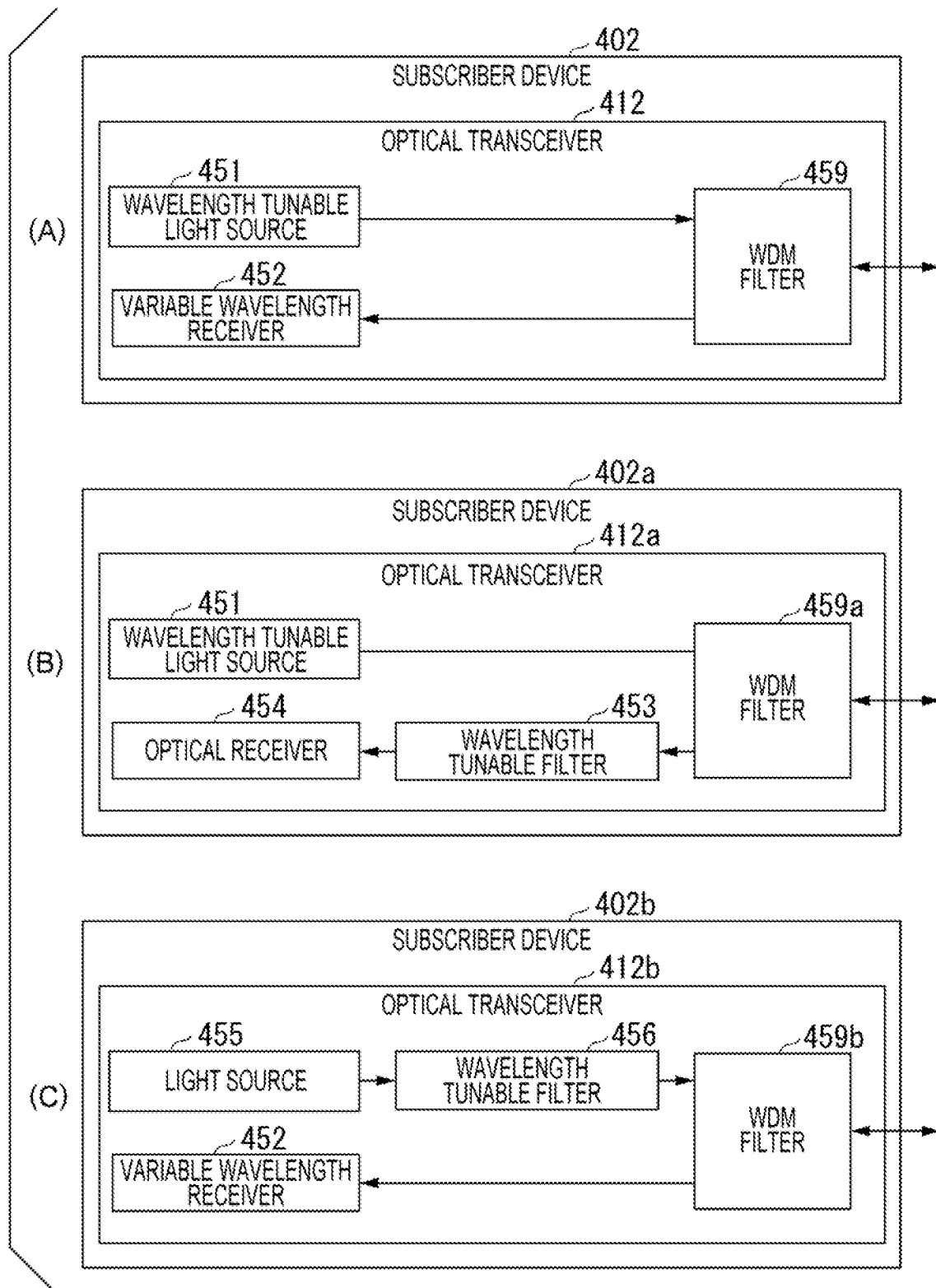
FIG. 31 is a diagram illustrating a configuration example of a single-core subscriber device according to a basic configuration.
Figure 32:
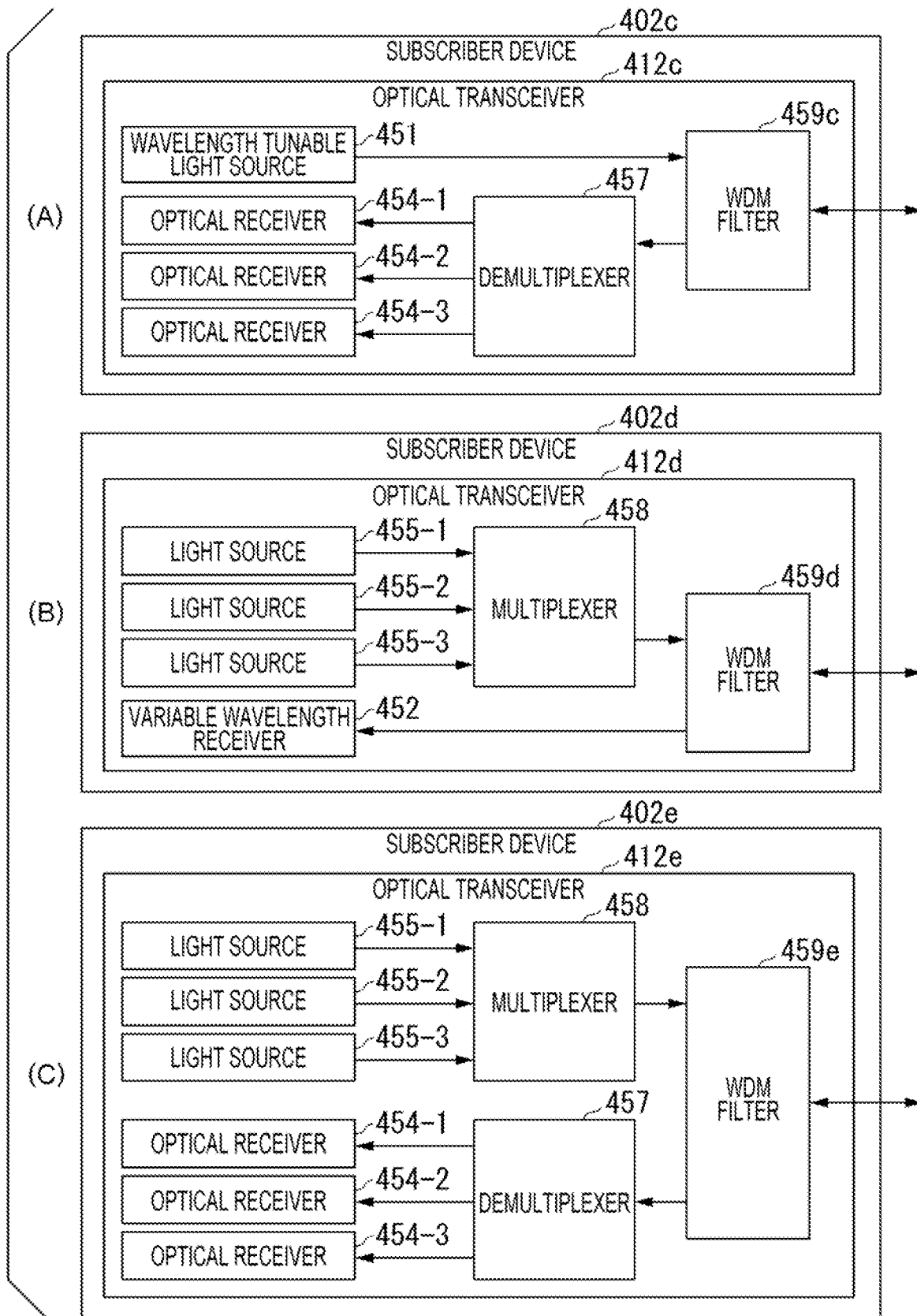
FIG. 32 is a diagram illustrating a configuration example of a single-core subscriber device according to a basic configuration.

FIGS. 31 and 32 are configuration diagrams of a single-core subscriber device 402. The subscriber device 402 illustrated in FIG. 31(A) includes an optical transceiver 412. The optical transceiver 412 includes a wavelength tunable light source 451, a variable wavelength receiver 452, and a WDM filter 459. The optical transceiver 412 illustrated in FIG. 31(A) is different from the optical transceiver 411 illustrated in FIG. 29(A) in that the WDM filter 459 is further provided. The WDM filter 459 separates an uplink signal and a downlink signal according to wavelengths. The WDM filter 459 outputs an optical signal generated by the wavelength tunable light source 451 to the transmission line, and outputs an optical signal input from the transmission line to the variable wavelength receiver 452. In the same manner as the subscriber device 401, the subscriber device 402 further includes an external modulator, and may output a main signal (or a signal obtained by superimposing a control signal on the main signal) by using the external modulator.

Here, the WDM filter 459 illustrated in FIGS. 31 and 32 may be a power splitter. The WDM filter 459 is suitable in a case where the insertion loss is sufficiently low with respect to the power splitter and wavelengths used on the transmission side and the reception side do not overlap. In a case where wavelengths used on the transmission side and the reception side overlap each other, the WDM filter 459 is suitable, for example, in a case of return communication or the like between the same type of subscriber devices.

In FIGS. 31 and 32, the WDM filter 459 is incorporated in the optical transceiver 412, but may be provided outside the optical transceiver 412 or outside the subscriber device 40.

A subscriber device 402a illustrated in FIG. 31(B) includes an optical transceiver 412a. The optical transceiver 412a includes a wavelength tunable light source 451, a wavelength tunable filter 453, an optical receiver 454, and a WDM filter 459a. The optical transceiver 412a illustrated in FIG. 31(B) is different from the optical transceiver 411a illustrated in FIG. 29(B) in that the WDM filter 459a is further provided. The WDM filter 459a separates an uplink signal and a downlink signal according to wavelengths. The WDM filter 459a outputs an optical signal generated by the wavelength tunable light source 451 to the transmission line, and outputs an optical signal input from the transmission line to the wavelength tunable filter 453. The subscriber device 402 on the reception side may have a configuration not using the wavelength tunable filter 453 depending on a configuration of the optical SW, a multiplexing method, or the like.

A subscriber device 402b illustrated in FIG. 31(C) includes an optical transceiver 412b. The optical transceiver 412b includes a light source 455, a wavelength tunable filter 456, a variable wavelength receiver 452, and a WDM filter 459b. The optical transceiver 412b illustrated in FIG. 31(C) is different from the optical transceiver 411b illustrated in FIG. 29(C) in that the WDM filter 459*b* is further provided. The WDM filter 459*b* separates an uplink signal and a downlink signal according to wavelengths. The WDM filter 459*b* outputs an optical signal that has passed through the wavelength tunable filter 456 to the transmission line, and outputs an optical signal input from the transmission line to the variable wavelength receiver 452.

A subscriber device 402*c* illustrated in FIG. 32(A) includes an optical transceiver 412*c*. The optical transceiver 412*c* includes a wavelength tunable light source 451, a plurality of optical receivers 454-1 to 454-3, a demultiplexer 457, and a WDM filter 459*c*. The optical transceiver 412*c* illustrated in FIG. 32(A) is different from the optical transceiver 411*c* illustrated in FIG. 30 (A) in that the WDM filter 459*c* is further provided. The WDM filter 459*c* separates an uplink signal and a downlink signal according to wavelengths. The WDM filter 459*c* outputs an optical signal generated by the wavelength tunable light source 451 to the transmission line, and outputs an optical signal input from the transmission line to the demultiplexer 457.

A subscriber device 402*d* illustrated in FIG. 32(B) includes an optical transceiver 412*d*. The optical transceiver 412*d* includes a plurality of light sources 455-1 to 455-3, a multiplexer 458, a variable wavelength receiver 452, and a WDM filter 459*d*. The optical transceiver 412*d* illustrated in FIG. 32(B) is different from the optical transceiver 411*d* illustrated in FIG. 30(B) in that the WDM filter 459*d* is further provided. The WDM filter 459*d* separates an uplink signal and a downlink signal according to wavelengths. The WDM filter 459*d* outputs an optical signal multiplexed by the multiplexer 458 to the transmission line, and outputs an optical signal input from the transmission line to the variable wavelength receiver 452.

A subscriber device 402*e* illustrated in FIG. 32(C) includes an optical transceiver 412*e*. The optical transceiver 412*e* includes a plurality of light sources 455-1 to 455-3, a multiplexer 458, a plurality of optical receivers 454-1 to 454-3, a demultiplexer 457, and a WDM filter 459*e*. The optical transceiver 412*e* illustrated in FIG. 32(C) is different from the optical transceiver 411*e* illustrated in FIG. 30(C) in that the WDM filter 459*e* is further provided. The WDM filter 459*e* separates an uplink signal and a downlink signal according to wavelengths. The WDM filter 459*e* outputs an optical signal multiplexed by the multiplexer 458 to the transmission line, and outputs an optical signal input from the transmission line to the demultiplexer 457.

It is desirable to combine a plurality of multiplexers/demultiplexers or combining/branching devices if wavelengths to be multiplexed/demultiplexed after combination are equal. That is, the demultiplexer 457 and the multiplexer 458, the multiplexer 458 and the WDM filter 459*e*, the demultiplexer 457 and the WDM filter 459*e*, and the demultiplexer 457, the multiplexer 458, and the WDM filter 459*e* may be combined.

The configurations of the single-core subscriber device 401 and the double-core subscriber device 402 have been described above. In the present invention, any of the configurations illustrated in FIGS. 29 to 32 may be used as the subscriber device 40.

Next, configuration examples of the monitoring unit 60 and the monitoring unit 65 will be described. First, in the above description, a signal is branched and monitored by using a power splitter, but a medium in which a gain, an applied voltage, a current, or a resistance changes due to conduction of the signal at a frequency of at least a carrier wave of an AMCC, for example, a semiconductor amplifier may be incorporated in a transmission line without branching. A wavelength-multiplexed signal may also be monitored without branching by using a medium having high wavelength dependency on changes in gain, voltage, current, resistance, and the like by using a superlattice structure such as multiple quantum well (MQW) or a photonic crystal.

Hereinafter, configuration examples of the monitoring unit 60 and the monitoring unit 65 will be described with reference to FIGS. 33 to 37 in the case of branching. In FIGS. 33 to 37, the monitoring unit 60 will be described as an example. Although FIGS. 33 to 37 illustrate an example of monitoring directions such as an uplink direction and a downlink direction, the monitoring unit 60 may monitor only one direction related to output from the subscriber device 40, for example, from the viewpoint of monitoring the subscriber device 40. In the case of an example of only one direction, both directions are obtained by replacing the transmitter and the receiver with a combination of a transmitter and a receiver connected to, for example, a transceiver, a power splitter, or a multiplexer/demultiplexer.

Although the receiver and the transmitter are described in proximity to the power splitter 61, the multiplexer/demultiplexer, and the like branching from a transmission line, the receiver and the transmitter may be disposed far away, for example, via one or a plurality of optical SWs, and the receiver and the transmitter of the control unit may be connected to the receiver and the transmitter of the monitoring unit 60 by assuming that the receiver and the transmitter of the control unit also serve as the receiver and the transmitter thereof.

The monitoring unit 60 monitors an optical signal. At the time of monitoring, the optical receiver or the optical transceiver is disposed in the vicinity of a combining/branching device or a multiplexer/demultiplexer or at a location where an optical signal can be connected. The monitoring unit 60 branches an optical signal with a combining/branching device or a multiplexer/demultiplexer, performs monitoring by using the received optical signal, and further receives a control signal superimposed on the received optical signal.

The monitoring unit 60 includes a combining/branching device or a multiplexer/demultiplexer provided at a port on an input side, a passing side, or an output side of an optical SW, a transmission line, or a connection point thereof, and a blocking unit that blocks a main signal in some cases. For example, a multiplexer/demultiplexer may be disposed at the port 11-2 at the ground side, the transmission line 2, or a connection point thereof, and separate an input optical signal, according to wavelengths, into an uplink optical signal from the optical SW and a downlink optical signal input from another ground or a higher network and output the optical signals to the optical SW. The blocking unit in the case of including the blocking unit is preferably disposed at a location in a multiplexed or merged state, for example, in a case where the disposition is set or changed in both uplink and downlink directions, and is preferably disposed at a location in a demultiplexed or branched state, for example, in a case where the disposition is separately set or changed in uplink and downlink directions.

The monitoring unit 60 may be connected via an optical SW different from the optical SW connected to the subscriber device 40 that is a control target. For example, an optical signal separated from a transmission line through which the combining/branching device transmits the optical signal of the subscriber device 40 that is a control target is input to the optical SW connected to the monitoring unit 60 separately from the connection of the subscriber device 40, multiplexed as necessary, transmitted to the optical SW connected to the monitoring unit 60, and input to the monitoring unit 60. Alternatively, the optical signal is not input to the optical SW, but is directly input to an optical SW connected to the control unit or the monitoring unit 60.

The ports configuring the optical SW may be divided into a plurality of groups, and the combining/branching device or the multiplexer/demultiplexer may be provided in the port 11-2 belonging to one group in a case where the ports are not connected in the group, the transmission line 2 connected thereto, or the transmission line 2 connected to the port 2. The branching may be performed before or after wavelength separation. The combining/branching device or the multiplexer/demultiplexer may be provided closer to the optical SW side than a multiplexer/demultiplexer for uplink and downlink multiplexing, or may be provided closer to the transmission line side. In a case where the combining/branching device or the multiplexer/demultiplexer is provided closer to the transmission line side, uplink and downlink optical signals transmitted through the transmission line can be branched by one device. In this case, the branched uplink optical signal and downlink optical signal are respectively input to ports of the optical SW. The optical SW outputs the input optical signals from ports connected to the monitoring unit 60. Consequently, the monitoring unit 60 receives the branched optical signals.

A monitoring unit 60a illustrated in FIG. 33(A) shows a specific configuration of the monitoring unit 60. The monitoring unit 60a includes a power splitter 61 and a plurality of receivers 62-1 and 62-2. The receivers 62-1 and 62-2 receive optical signals branched by the power splitter 61. The number of receivers 62-1 and 62-2 corresponding to the number of branches of the power splitter 61 may be provided. FIG. 33(A) illustrates an example in which a 2×2 power splitters 61 is used, and a total of one power splitter is provided, that is, the number of power splitters is obtained by subtracting one that is the number of paths of a main signal from two that is the number of branches branched in each direction or other than the path of the main signal on the input side and the output side. In a case of a 3×3 power splitter 61, two power splitters may be provided. From the viewpoint of reducing the influence of reflection and the like, the power splitter 61 of 1×2, 1×3, or the like that does not include ports not to be monitored may be used. In this case, the receiver 62-1 or 62-2 may set the following: the number of branches (2)–the number of main signal path (1)=1 and the number of branches (1)–the number of main signal path (1)=0; the number of branches (3)–the number of main signal path (1)=2, and the number of branches (1)–the number of main signal path (1)=0.

A path other than the main signal branched by the power splitter 61 may be branched as in the WDM device 63b of FIG. 33(B) and the main signal may be received, or a plurality of power splitters 61 may be provided in the main signal path and may be branched and the main signal may be received.

A monitoring unit 60a illustrated in FIG. 33(A) shows a specific configuration of the monitoring unit 60. The monitoring unit 60a includes a power splitter 61 and a plurality of receivers 62-1 and 62-2. The receivers 62-1 and 62-2 receive optical signals branched by the power splitter 61. The number of the receivers 62 is not particularly limited.

A monitoring unit 60b illustrated in FIG. 33(B) shows a specific configuration of the monitoring unit 65. The monitoring unit 60b includes a power splitter 61, a plurality of receivers 62-1 to 62-6, and a plurality of WDM devices 63b-1 and 63b-2. The receivers 62-1 to 62-3 are connected to the WDM device 63b-1. The receivers 62-4 to 62-6 are connected to the WDM device 63b-2. The WDM device 63b-1 demultiplexes an optical signal branched by the power splitter 61 and outputs the demultiplexed optical signals to the receivers 62-1 to 62-3. The WDM device 63b-2 demultiplexes an optical signal branched by the power splitter 61 and outputs the demultiplexed optical signals to the receivers 62-4 to 62-6. The number of the WDM devices 63b is not particularly limited.

The monitoring unit 60c illustrated in FIG. 33(C) includes a power splitter 61, a plurality of receivers 62-1 and 62-2, and a WDM device 63c. The WDM device 63c multiplexes a plurality of input optical signals and outputs the multiplexed optical signal to a transmission line 601. The WDM device 63c demultiplexes an optical signal input from the transmission line 601 and outputs the demultiplexed optical signals to transmission lines 602-1 and 602-2.

A monitoring unit 60d illustrated in FIG. 34(A) includes a plurality of power splitters 61-1 to 61-3, a plurality of receivers 62-1 to 62-6, and a WDM device 63d. The power splitter 61-1 is provided in a transmission line 602-1, the power splitter 61-2 is provided in a transmission line 602-2, and the power splitter 61-3 is provided in a transmission line 602-3. The receivers 62-1 and 62-2 are connected to the power splitter 61-1, the receivers 62-3 and 62-4 are connected to the power splitter 61-2, and the receivers 62-5 and 62-6 are connected to the power splitter 61-3. The WDM device 63d demultiplexes an optical signal input from the transmission line 601 and outputs the demultiplexed optical signals to the transmission lines 602-1 to 602-3. The WDM device 63d multiplexes optical signals input from the transmission lines 602-1 to 602-3 and outputs the multiplexed optical signal to the transmission line 601.

In FIG. 34(A), the receivers 62-1 to 62-6 are provided in the respective transmission lines 602-1 to 602-3 after demultiplexing by the WDM device 63d when viewed from the transmission line 601 or before multiplexing by the WDM device 63d when viewed from the transmission line 602, but the receiver 62 does not have to be provided in a transmission line for which reception is not required.

A monitoring unit 60e illustrated in FIG. 34(B) includes a plurality of power splitters 61-1 and 61-2, a plurality of receivers 62-1 and 62-2, and a plurality of WDM devices 63e-1 and 63e-2. Transmission lines 602-1 and 602-2 are provided between the WDM device 63e-1 and the WDM device 63e-2. The power splitter 61-1 is provided in the transmission line 602-1, and the power splitter 61-2 is provided in the transmission line 602-2. The receiver 62-1 is connected to the power splitter 61-1, and the receiver 62-2 is connected to the power splitter 61-2. The WDM device 63e-1 demultiplexes an optical signal input from the transmission line 601 and outputs the demultiplexed optical signals to the transmission lines 602-1 and 602-2. The WDM device 63e-1 multiplexes optical signals input from the transmission lines 602-1 and 602-2 and outputs the multiplexed optical signal to the transmission line 601. The WDM device 63e-2 demultiplexes an optical signal input from the transmission line 603 and outputs the demultiplexed optical signals to the transmission lines 602-1 and 602-2. The WDM device 63e-2 multiplexes optical signals input from the transmission lines 602-1 to 602-2 and outputs the multiplexed optical signal to the transmission line 603.

In FIG. 34(B), the receivers 62-1 and 62-2 are provided in the transmission lines 602-1 and 602-2 after demultiplexing and before multiplexing, but the receiver 62 does not have to be provided in a transmission line for which reception is not required.

The monitoring unit may control the subscriber device 40. In a case where a control signal is exchanged with the subscriber device 40, the monitoring unit may set or change a wavelength of the subscriber device 40 similarly to the control unit 20. However, in a case where the setting, particularly the wavelength is changed, an optical signal other than the wavelength set at the time of the change does not reach an unintended destination. Therefore, it is desirable to set a wavelength such that an output from a target device does not reach a destination until the change is completed.

A configuration in which the monitoring unit performs control will be described with reference to FIG. 35.

A monitoring unit 60*f* illustrated in FIG. 35(A) includes a power splitter 61, a plurality of receivers 62-1 and 62-2, and a modulator 64. The power splitter 61 and the modulator 64 are provided in a transmission line 601. As described above, in the monitoring unit 60*f*, the modulator is provided in the middle of the path of the main signal, and the main signal is modulated by the modulator 64. As the modulator, modulation may be performed by an amplifier that modulates an amplification factor according to an external modulator or a control signal, or due to gain saturation according to an optical signal from the monitoring unit 60*f*, intermodulation, or non-linear effects such as four-wave mixing and the Raman effect.

As long as an extinction ratio of the modulator is high enough not to affect other optical signals, the modulator may also serve as a blocking unit.

Although FIG. 35(A) illustrates the configuration in which the monitoring unit 60*f* includes the power splitter 61, the receivers 62-1 to 62-2, and the modulator 64, the modulator 64 may be replaced with a device capable of modulating an input intensity monitor and an output at a frequency of about a carrier wave of the AMCC, for example, a multi-electrode optical semiconductor amplifier.

In a case of modulation with external light, the power splitter 61 also serves as a modulator without separately providing the modulator 64. The power splitter 61 includes a semiconductor optical amplifier, a highly non-linear fiber (HNLF), a non-linear optical crystal, a periodically poled optical element (for example, periodically poled potassium titanyl phosphate (PPKTP), periodically poled lithium niobate (PPLN), and periodically poled lithium tantalate (PPLT)) that facilitates quasi-phase matching for non-linearity, and the like, which have large gain saturation and a large non-linear effect, and causes a signal and external light to act.

In a case where a signal that has already been modulated with the AMCC is re-modulated, the influence of the pre-modulation is assumed. In such a case, a frequency band of the control signal is desirably different from a frequency band at the pre-modulation. For example, in a case where a modulation band of a signal is B to such an extent that the modulation sidebands of pre-modulation and of new modulation do not overlap each other, a difference between the frequency bands may be set to 2 B or more, or may be set to 2 B or more from the viewpoint of preventing interference, or may be conversely set to about 0.5 times to 0.8 times thereof on the assumption that the signal is cut out by a filter. The modulation may be performed by another modulator 64 after the inverse modulation illustrated in FIG. 35(B). In this case, since the influence of the pre-modulation is reduced, the frequency bands may be allowed to overlap. Modulation may be performed with a signal corresponding to a product of inverse modulation of pre-modulation and new modulation, and modulation in a plurality of modulators 64 may be performed by modulation of one modulator 64. The monitoring unit 60*f* may perform a process described with reference to FIG. 35(B) in order to reduce the influence of the AMCC on the main signal.

As illustrated in FIG. 35(B), the monitoring unit 60*f* may modulate the main signal modulated with an AMCC according to the same modulation method as that of the AMCC received by the receiver 62-2 and a reverse signal (in a case of I/O intensity modulation, 0 is superimposed on a signal modulated with 1, 1 is superimposed on a signal modulated with 0, and the modulation gives an opposite phase and an intensity that exactly cancels the signal). Consequently, the influence on a main signal of the AMCC can be reduced.

Figure 36:
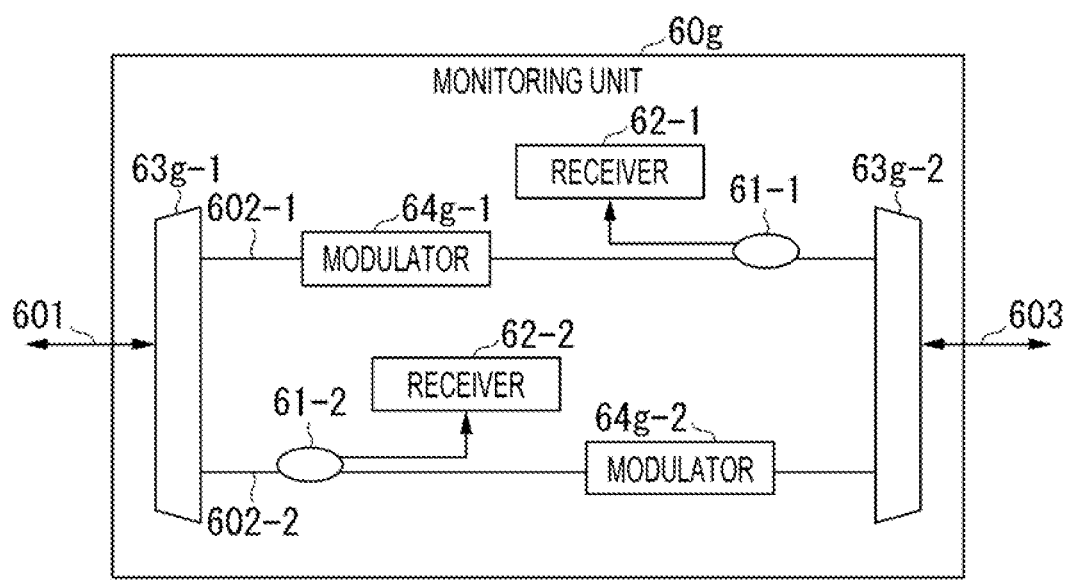
FIG. 36 is a diagram illustrating a configuration example of a monitoring unit according to a basic configuration.

A monitoring unit 60*g* illustrated in FIG. 36 includes a plurality of power splitters 61-1 and 61-2, a plurality of receivers 62-1 and 62-2, a plurality of WDM devices 63*g*-1 to 63*g*-2, and a plurality of modulators 64*g*-1 to 64*g*-2. Transmission lines 602-1 and 602-2 are provided between the WDM device 63*g*-1 and the WDM device 63*g*-2. The modulator 64*g*-1 and the power splitter 61-1 are provided in the transmission line 602-1, and 64*g*-2 and the power splitter 61-2 are provided in the transmission line 602-2. The receiver 62-1 is connected to the power splitter 61-1, and the receiver 62-2 is connected to the power splitter 61-2. The WDM device 63*g*-1 demultiplexes an optical signal input from the transmission line 601 and outputs the demultiplexed optical signals to the transmission lines 602-1 and 602-2. The WDM device 63*g*-1 multiplexes optical signals input from the transmission lines 602-1 to 602-2 and outputs the multiplexed optical signal to the transmission line 601. The WDM device 63*e*-2 demultiplexes an optical signal input from the transmission line 603 and outputs the demultiplexed optical signals to the transmission lines 602-1 and 602-2. The WDM device 63*e*-2 multiplexes optical signals input from the transmission lines 602-1 to 602-2 and outputs the multiplexed optical signal to the transmission line 603. Optical signals input from the transmission lines 602-1 and 602-2 to the WDM device 63*e*-1 and the WDM device 63*e*-2 are modulated by the modulators 64*g*-1 and 64*g*-2.

In FIG. 36, branched optical signals are modulated after being received by the receivers 62-1 and 62-2. However, in a case where it is not necessary to consider quality of a received optical signal due to modulation, for example, deterioration in a signal-to-noise ratio (SN) of a received control signal or the like, a modulated optical signal may be branched by the power splitters 61-1 and 61-2 and received by the receivers 62-1 and 62-2.

A configuration in which the monitoring unit uses a transmitter will be described. Similarly to the subscriber device 40 or the control unit 20, the monitoring unit includes an optical transceiver and a variable wavelength or non-variable wavelength optical transceiver, and is connected to a port of an optical SW. If the transmitter is a variable wavelength transmitter, an optical signal having any wavelength can be transmitted. The monitoring unit transmits a control signal to the subscriber device 40 by using an optical signal. A power splitter of a transmission line for transmitting an optical signal of the subscriber device 40 that is a control target merges a control signal with the optical signal transmitted through the transmission line. With this configuration, even in a state in which the subscriber device 40 is performing normal communication, the monitoring unit can receive a connection destination change request or the like from the subscriber device 40, transmit a control signal, and perform wavelength switching or the like for the subscriber device 40. A specific configuration in which the monitoring unit includes a transmitter will be described later.

In a case where the subscriber device 40 is performing normal communication, communication with the control unit 20 in a case where the control unit 20 controls the subscriber device 40 by using an optical signal directly or via an optical SW or the like cannot be performed. Since the monitoring unit includes the transmitter, it is possible to give instructions for various settings or the like of the subscriber device 40. That is, the monitoring unit receives an optical signal inserted and separated into a transmission line through which the optical signal is transmitted to the subscriber device 40 that is a control target with the power splitter.

An example will be described using an AMCC. Typically, in the AMCC, a main signal and an AMCC signal are modulated with a signal obtained by superimposing the main signal and the AMCC signal at an electrical stage, or the main signal is further modulated at an optical stage. In contrast, the transmitter of the monitoring unit inputs and multiplexes an optical signal corresponding to the control signal separately from the main signal. A wavelength of the optical signal corresponding to the control signal is a wavelength that passes through the same path as that of the main signal from the transmitter to a location where at least a control signal corresponding to the AMCC is received. The monitoring unit does not modulate the main signal but performs intensity modulation or the like on the separately input optical signal intensity at a frequency of a carrier wave of the AMCC, and thus an optical signal obtained by combining the main signal and the control signal corresponding to the AMCC is equivalent to that modulated at the frequency of the carrier wave of the AMCC.

Here, the example in which the control signal is received after intensity modulation thereof together with the main signal has been described, but in a case of phase modulation or the like, the control signal may be received by using delay detection or local light emission.

Here, if a wavelength difference between the main signal and the control signal corresponding to the AMCC is separated to such an extent that beat noise can be ignored, for example, by a sum of line widths of both pieces of light, and if the line widths are equal, the wavelength difference is separated by twice or more the line width, demodulation can be performed in the same manner as in the case of modulation with the AMCC similarly to an average value of the light intensities of both pieces of light in the time of one bit or one baud of the AMCC. In a case where a modulated sideband at the frequency of the carrier wave in the AMCC and a modulated sideband at a bit rate or a baud rate of the main signal are superimposed, it is difficult to perform demodulation according to direct detection with the same modulation as usual. However, for example, coherent reception or the like may be performed, and reception may be performed after removal at an electrical stage by maximum likelihood determination or the like, or a phase of light of the optical signal of the control signal corresponding to the AMCC may be synchronized with a phase of light of the optical signal of the main signal. In a case where phase synchronization is performed, even modulation using a phase can be performed with the AMCC. In this case, modulation is performed such that a phase after multiplexing becomes a phase after modulation.

For example, an intensity or a wavelength of signal light and control light may be measured by different measurement means, or may be measured by the same measurement means such that the optical signal of the main signal and a part of an optical signal input from the transmitter of the monitoring unit to the power splitter can be received by the receiver of the monitoring unit. The latter has an effect of reducing the number of measurement means. For example, the influence of beat noise between pieces of light on the main signal may be observed and adjusted after multiplexing. For example, the main signal is measured before the control light is multiplexed, and then a signal after the control light is multiplexed is equivalent to a signal to which the desired AMCC is applied, or the influence or the like of the beat noise between pieces of light on the main signal is measured after the multiplexing. The intensity or the wavelength of the optical signal of the control signal is adjusted. In the case of phase synchronization, feedback may be performed in measurement after multiplexing.

Figure 37:
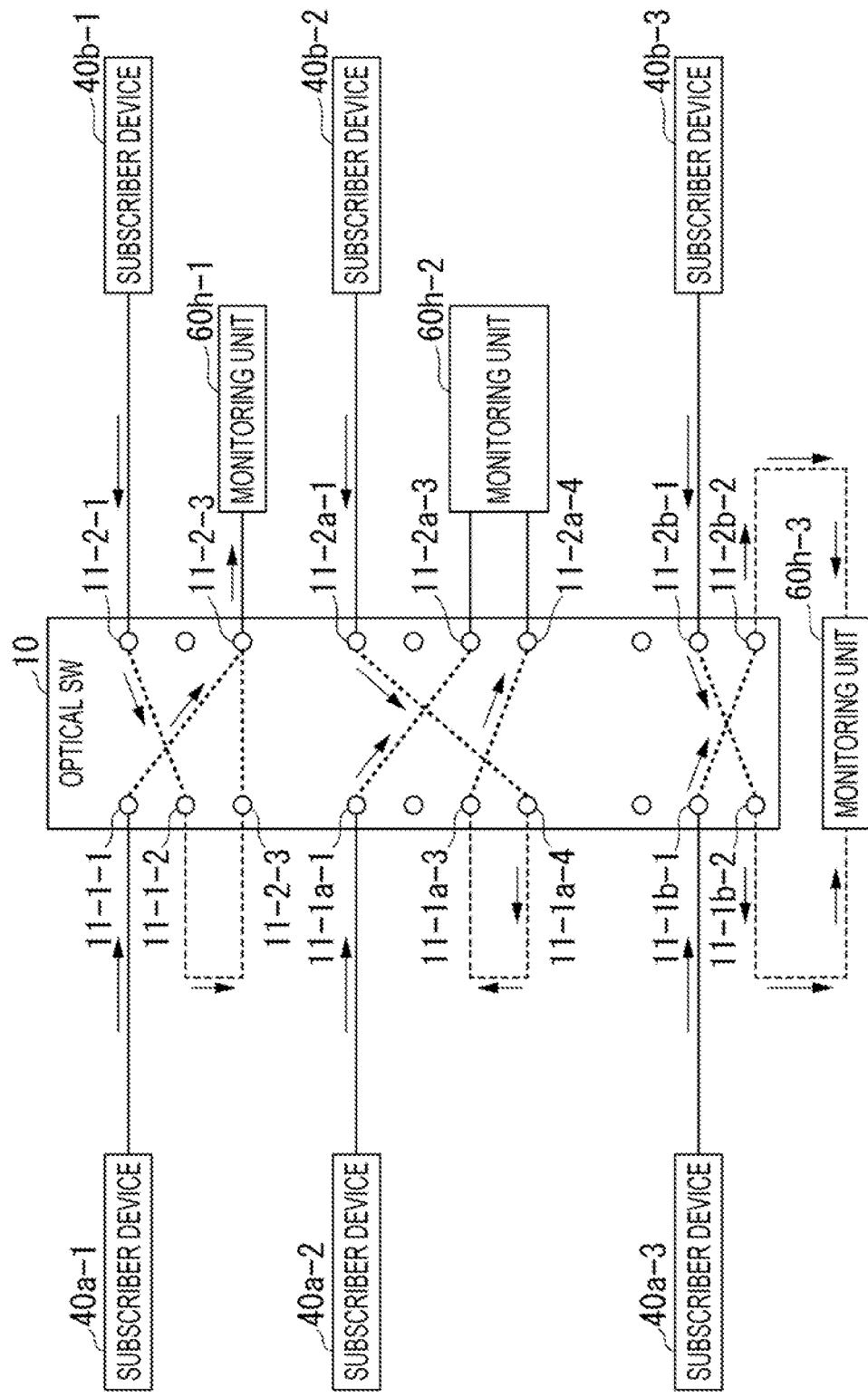
FIG. 37 is a diagram illustrating a configuration example of a monitoring unit according to a basic configuration.

Next, an example of another configuration using a transmitter in the monitoring unit will be described with reference to FIG. 37. Instead of being installed at a port of the optical SW 10, a transmission line, or a connection point thereof, as illustrated in FIG. 37, the control unit 20 may loop using a return transmission line (upper side in the figure), or may cross the optical SW 10 (lower side in the figure) similarly to an electrical processing unit that will be described later.

For example, a monitoring unit 60h terminates the main signal, and the transmitter transmits an optical signal obtained by superimposing the AMCC on the main signal subjected to photoelectric conversion, or further modulating an optical signal modulated with the main signal, with the AMCC. Unlike the monitoring unit 60h described above, the monitoring unit 60h does not include a power splitter that combines and branches the main signal, but may be similarly provided at a port on an input side, a passing side, or an output side of an optical SW, a transmission line, or a connection point thereof. In this configuration, since the signal is temporarily terminated, a wavelength to the monitoring unit 60h and a wavelength from the monitoring unit may be different as long as they are wavelengths transmitted through a desired path.

The monitoring unit 60h does not have to include an optical receiver or an optical transceiver, and may transmit and output a branched optical signal to the control unit 20 via the optical SW 10, for example. In the case of outputting to the control unit 20, the control unit 20 includes an optical receiver or an optical transceiver, and the monitoring unit 60h has a function of setting a path between a power splitter or a multiplexer/demultiplexer provided at a port on an input side, a passing side, or an output side of an optical SW, a transmission line, or a connection point thereof, and the control unit 20, and setting the power splitter, the multiplexer/demultiplexer, or the path as necessary. The path may be realized by the optical SW, and may also be set by the control unit.

The monitoring unit 60h may include an optical receiver or an optical transceiver, and may further include a blocking unit. At the time of initial setting, setting change, and abnormality detection, a path from the monitoring unit to an output destination may be blocked or blocked by the blocking unit to set, change, and block a subscriber device.

As described above, the monitoring units 60 to 60h monitor an optical signal. The monitoring units 60 to 60h performs monitoring by using an optical signal branched by a power splitter or a WDM device, and further receives a control signal superimposed on the received optical signal. Although FIGS. 33 to 37 illustrate the configuration in which the monitoring units 60 to 60h include the receiver 62, the monitoring units 60 to 60h may include a transmitter.

The monitoring units 60 to 60h may be connected via an optical SW different from an optical SW connected to the subscriber device 40 that is a control target. In this case, an optical signal separated by the power splitter 61 in the transmission line for transmitting an optical signal of the subscriber device 40 that is a control target is input to an optical SW that is different from the optical SW connected to the subscriber device 40 and is connected to the monitoring units 60 to 60h. In this case, signals are multiplexed as necessary, transmitted to the optical SW connected to the monitoring units 60 to 60h, and connected to the monitoring units 60 to 60h.

In the following description, the monitoring units 60 to 60h will be described as the monitoring unit 60 unless otherwise distinguished.

Hereinafter, an example of an optical access system using the optical SW having the above-described functions will be described.

(Configuration Example of Optical Access System 100)

Figure 38:
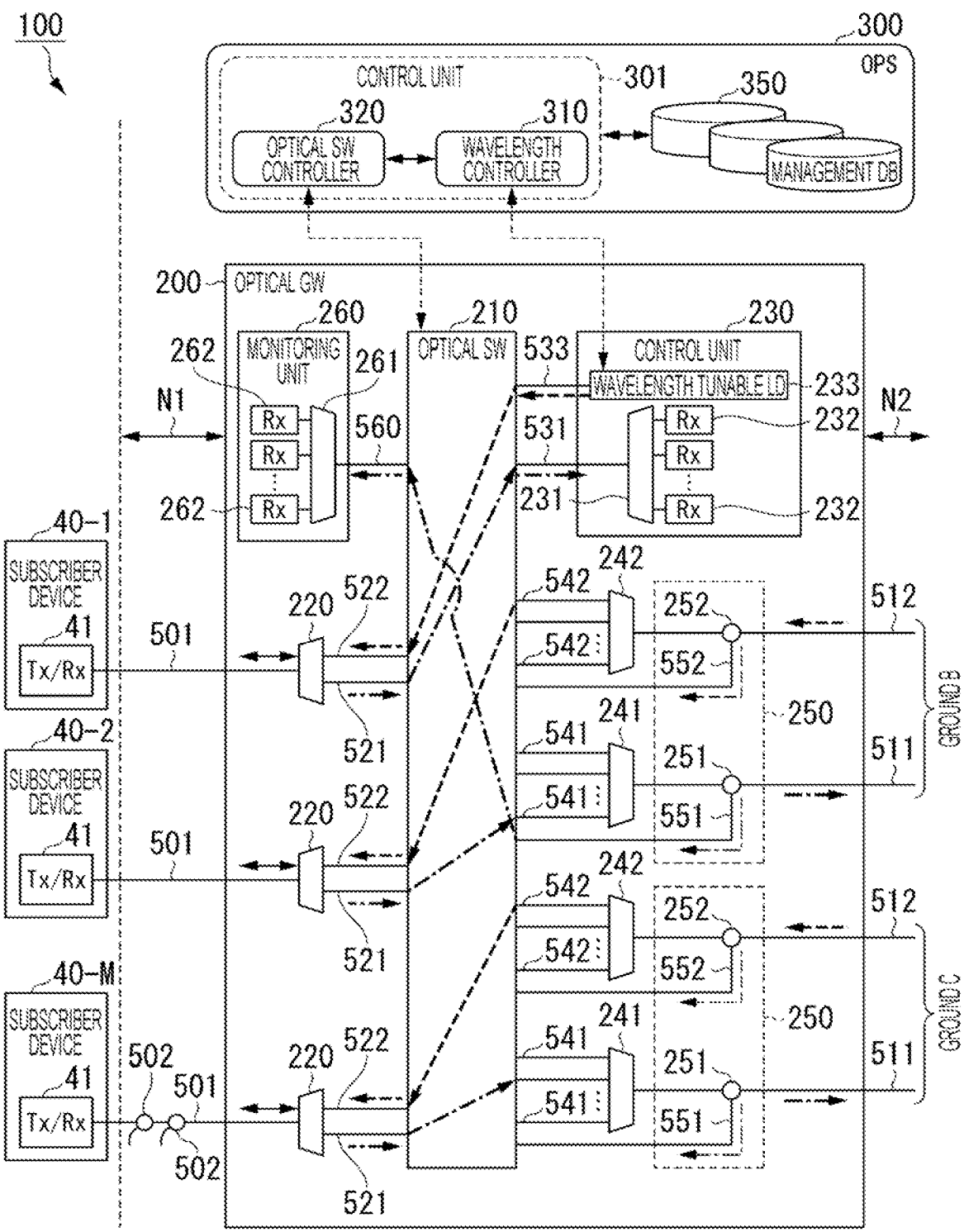
FIG. 38 is a diagram illustrating a configuration example of an optical access system according to a configuration example.

FIG. 38 is a diagram illustrating a configuration example of an optical access system 100. The optical access system 100 includes an optical gateway (GW) 200 and an operation system (OPS) 300. The OPS 300 may be integrated with the control unit 20, and both may be referred to as a control unit or an OPS as a representative. The subscriber device 40 is communicatively connected to a higher network such as the optical communication network 30 illustrated in FIG. 1 via the optical access system 100.

The subscriber device 40 is a device on an optical subscriber side. The subscriber device 40 is connected to the optical GW 200 via a transmission line 501. The transmission line 501 is, for example, an optical fiber. The optical GW 200 is a device in a communication station. The subscriber device 40 and the optical GW 200 in a portion denoted by the reference sign N1 are connected via, for example, the transmission line 501 or a power splitter 502. A configuration of a network connected from the subscriber device 40 to the optical GW 200 may be various network topologies such as a point-to-point (P-to-P) configuration, a PON configuration, a bus type, a mesh type, a ring type, and a multi-ring type. For example, a power splitter 502 or the like may be provided in the transmission line 501, and a plurality of subscriber devices 40 may be connected to one transmission line 501. The optical GW 200 is connected to another station, a core network, or the like via a transmission line 511 and a transmission line 512. The transmission line 511 and the transmission line 512 are, for example, optical fibers. The transmission line 511 transmits an uplink signal, and the transmission line 512 transmits a downlink signal. The transmission line 511 and the transmission line 512 are an example of a multiplex communication transmission line for transmitting a wavelength-multiplexed optical signal. The optical GW 200 to another station or a core network in a portion denoted by the reference sign N2 are connected via, for example, the transmission line 511 or a transmission line 512 of an optical fiber, and are connected such that connection between the grounds is a full mesh. In this configuration, a case where the optical GW 200 is installed in a station at the ground A and is connected to an optical communication device set in a station at the ground B and an optical communication device installed in a station at the ground C via the optical communication network 30 or the like will be described as an example. The optical communication devices at the ground B and the ground C to which the optical GW 200 is connected may be the optical GW 200.

The subscriber device 40 is connected to the optical GW 200 via a transmission line 501. The subscriber device 40 includes the optical transceiver 41. The optical transceiver 41 is a wavelength tunable optical transceiver. The optical transceiver 41 is, for example, an optical transceiver that mutually converts an optical signal and an electrical signal. The subscriber device 40 can select and set a unique wavelength in the optical transceiver 41 according to a transmission/reception destination. The subscriber device 40 sets a wavelength to be used in the optical transceiver 41 according to an instruction received from the optical GW 200. M (where M is an integer of 1 or more) subscriber devices 40 connected to the optical GW 200 will be referred to as subscriber devices 40-1 to 40-M.

The optical GW 200 includes an optical SW 210, a wavelength multiplexer/demultiplexer 220, a control unit 230, a multiplexer 241, a demultiplexer 242, a branching unit 250, and a monitoring unit 260. The monitoring unit 260 may be replaced with any one of the monitoring units 60 to 60h described above.

The optical SW 210 has a plurality of input/output ports (hereinafter, referred to as "ports"), and connects two or more ports. The optical SW 210 can freely switch an optical path between ports. A port through which an uplink signal is input and output will be referred to as an uplink port, and a port through which a downlink signal is input and output will be referred to as a downlink port. Each port of the optical SW 210 is connected to a transmission line.

The wavelength multiplexer/demultiplexer 220 performs vertical demultiplexing in which an uplink signal and a downlink signal are separated according to wavelengths. The wavelength multiplexer/demultiplexer 220 receives an uplink optical signal transmitted by the subscriber device 40 from the transmission line 501 and outputs the uplink optical signal to the optical SW 210 via the transmission line 521. The wavelength multiplexer/demultiplexer 220 receives a downlink optical signal output from the optical SW 210 from the transmission line 522 and outputs the downlink optical signal to the subscriber device 40 via the transmission line 501.

The control unit 230 is connected to an uplink port and a downlink port to which the subscriber device 40 is not connected among the ports of the optical SW 210. The uplink port of the optical SW 210 is connected to a port on the transmission side of the control unit 230 via a transmission line 531. The downlink port of the optical SW 210 is connected to a port on the transmission side of the control unit 230 via a transmission line 533. The control unit 230 includes a wavelength demultiplexer 231, an optical receiver (Rx) 232 for each wavelength channel, and a wavelength tunable transmitter 233. The wavelength demultiplexer 231 is, for example, an AWG. The wavelength demultiplexer 231 demultiplexes light input to the port on the reception side via a transmission line 540 for each wavelength. The wavelength demultiplexer 231 outputs the demultiplexed light to the optical receiver 232 that receives an optical signal having a wavelength of the light. The wavelength tunable transmitter 233 includes a wavelength tunable laser diode (LD) that generates light having a variable wavelength. The wavelength tunable transmitter 233 transmits an optical signal having a variable wavelength by using light generated by the wavelength tunable laser diode. The wavelength tunable transmitter 233 outputs an optical signal using the generated light from the port on the transmission side to the transmission line 533.

The multiplexer 241 multiplexes the uplink optical signals having different wavelengths output from the plurality of transmission lines 541 by the optical SW 210, and outputs the multiplexed signal to the transmission line 511 connected to another ground. The demultiplexer 242 receives an optical signal transmitted from any other ground from the transmission line 512 and demultiplexes the received downlink optical signal according to wavelengths. The demultiplexer 242 inputs each of the demultiplexed downlink optical signals to the optical SW 210 via a plurality of transmission lines 542 connected to the uplink port corresponding to the wavelength of the optical signal.

The branching unit 250 is provided in the transmission line 511 and the transmission line 512. The branching unit 250 includes power splitters 251 and 252. The power splitter 251 branches an uplink optical signal transmitted through the transmission line 511, and inputs the signal to the optical SW 210 via the transmission line 551. The power splitter 252 branches a downlink optical signal transmitted through the transmission line 512, and inputs the signal to the optical SW 210 via the transmission line 552.

The monitoring unit 260 includes a wavelength demultiplexer 261 and an optical receiver (Rx) 262 for each wavelength. The wavelength demultiplexer 261 is connected to the optical SW 210 via a transmission line 560. The optical SW 210 outputs an optical signal input from a port connected to the transmission line 541 or the transmission line 542 to a port connected to the transmission line 560. Consequently, the wavelength demultiplexer 261 receives the optical signal branched by the branching unit 250. The wavelength demultiplexer 261 demultiplexes the input optical signal for each wavelength. The wavelength demultiplexer 261 outputs the demultiplexed light to the optical receiver 262 that receives an optical signal having the wavelength of the light. The monitoring unit 260 monitors a state of communication performed by the subscriber device 40 by using the optical signal received by the optical receiver 262. The monitoring unit 260 may output a monitoring result to the control unit 230 or a control unit 301 included in the OPS 300. Here, the control unit 230 and the control unit 301 are used, but they may be the same. The monitoring unit 260 may output a monitoring result to the control unit 230, and the control unit 230 may output the output monitoring result to the control unit 301. The control unit 230 and the control unit 301 may be the same. In that case, the output from the control unit 230 to the control unit 301 does not have to be output to the outside of the control unit.

The OPS 300 includes the control unit 301 and a management DB 350. The control unit 301 is connected to the optical GW 200. The control unit 301 includes a wavelength controller 310 and an optical SW controller 320. The wavelength controller 310 stores information indicating a wavelength of light used by each user (or each service). The wavelength controller 310 refers to this information and dynamically allocates a wavelength to be used by each user. The wavelength controller 310 may be installed in a building different from that of the optical GW 200 and connected to the optical SW 210 or the optical SW controller 320 via a network. The wavelength controller 310 manages and controls information regarding which user is connected to which port of the optical SW 210 and which wavelength is used in real time by sharing each piece of connection information. The control unit 301 may be installed for each optical SW 210 or may be installed for plurality of optical SWs. As described above, the wavelength controller 310 executes processing similar to that of the wavelength controller 25 in FIG. 2.

The control unit 301 is connected to the management database (DB) 350. The control unit 301 exchanges information regarding a user and a use wavelength with the management DB 350. The management DB 350 stores a use wavelength of each user and destination information. The destination is represented by, for example, the ground A or the ground B. The management DB 350 manages information regarding all users connected to the optical access system 100.

FIG. 39 is a diagram illustrating an example of a SW connection table. The SW connection table indicates a connection destination of each port of the optical SW 210. That is, a port through which an optical signal is input and output may be used as information for identifying the subscriber device 40, the control unit 230, the branching unit 250, the monitoring unit 260, the ground, and the like of a transmission source or a transmission destination of the optical signal.

The wavelength table includes a user wavelength table and an inter-station wavelength table.

FIG. 40 is a diagram illustrating an example of the user wavelength table. The user wavelength table indicates a wavelength used for transmission by each user, a wavelength used for reception, a free wavelength not used for transmission and reception, and a wavelength that cannot be used due to a failure. The management DB 350 may manage the wavelength table for each transmission line connected to the optical SW 210.

FIG. 41 is a diagram illustrating an example of the inter-station wavelength table. The inter-station wavelength table indicates a wavelength used for a certain ground to perform communication with each of other grounds, a free wavelength not used for a certain ground to perform communication with each of other grounds, and a wavelength that cannot be used for a certain ground to perform communication with each of other grounds due to a failure.

Figure 42:
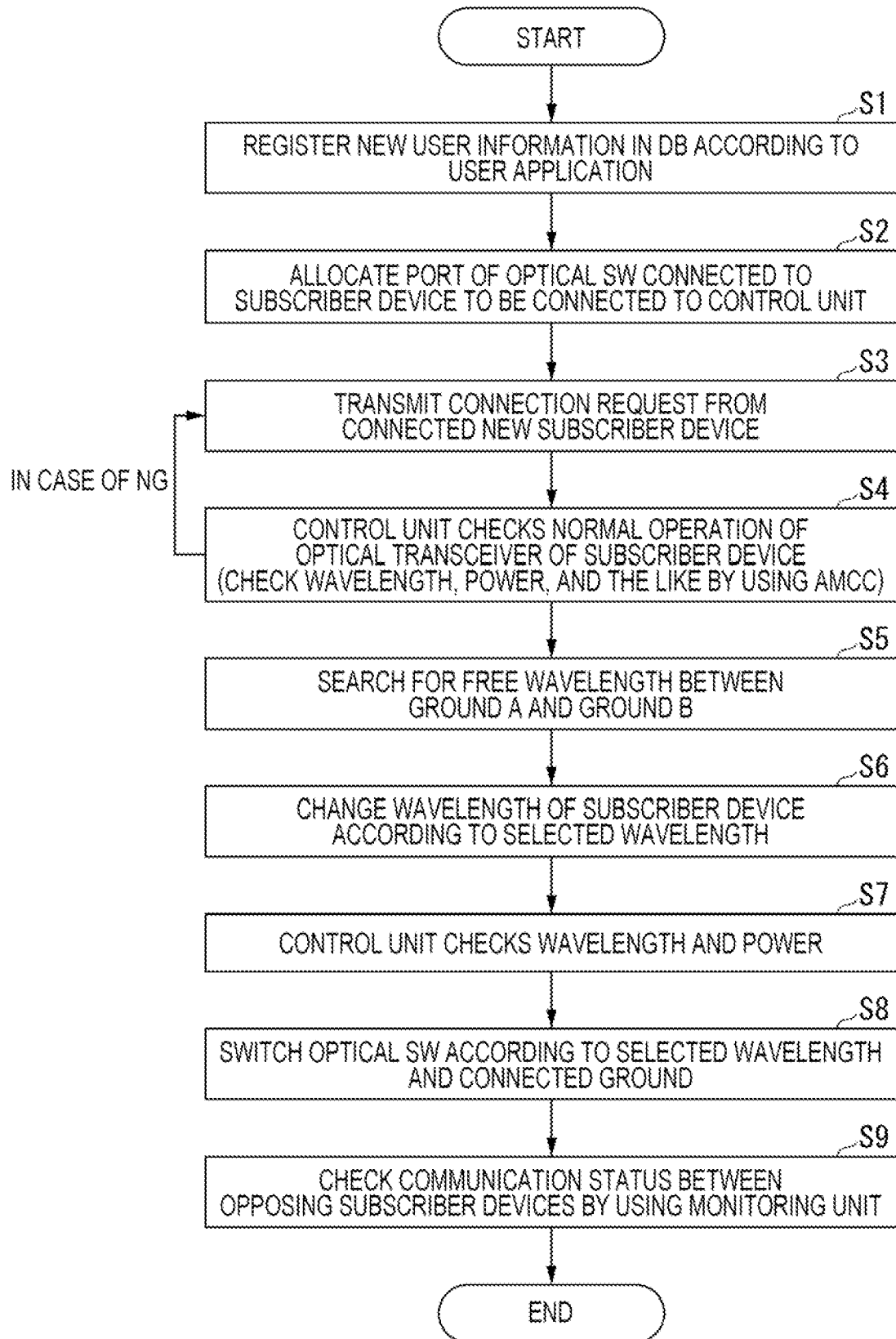
FIG. 42 is a flowchart illustrating an initial setting process of the optical access system according to the configuration example.

Here, an operation when the new subscriber device 40 is connected will be described. FIG. 42 is a flowchart illustrating initial setting process of the optical access system 100 when a new subscriber device is connected. An operation of the optical access system 100 when the new subscriber device 40-1 is connected to the optical GW 200 will be described with reference to FIGS. 38 and 42. It is assumed that which port of the optical SW 210 is connected to each port of the wavelength demultiplexer 261 (AWG) of the control unit 230 is confirmed in advance by the control unit 230.

First, user application is performed before connecting the new subscriber device 40-1. For example, communication between the ground A and the ground B can be performed by the user application. A business operator registers user information, initial destination information, and the like in the management DB 350 of the OPS 300 on the basis of the user application (step S1). The user information is, for example, information for obtaining a wavelength or the like that can be used by the optical transceiver 41. The OPS 300 refers to the SW connection table and allocates a port of the optical SW 210 to which the subscriber device 40-1 is to be connected from among free ports of the optical SW 210 (step S2). Here, at least two ports such as an uplink port and a downlink port are allocated in the case of double cores, and at least one port is allocated in the case of the single-core bidirectional type. The OPS 300 registers information indicating that the allocated port is connected to the subscriber device 40-1 in the SW connection table. In a case where the control unit 20 controls the subscriber device 400 with an optical signal, the optical SW controller 320 of the OPS 300 controls the optical SW 210 such that an optical signal is transmitted and received between the port allocated to the target subscriber device 40-1 and the port to which the control unit 230 is connected. In a case where the subscriber device 40 is controlled with an optical signal via the optical SW 210 and the monitoring unit 260, the optical SW 210 is connected via the monitoring unit 260, and in a case where the subscriber device 40 is not controlled with an optical signal via the optical SW 210 and via the monitoring unit 260 or the communication unit, or in a case where the subscriber device 40 is not controlled with an optical signal, if the port to be connected is not connected by the optical SW 210, the state may be maintained, or if the port to be connected is blocked, the state may be maintained.

When the new subscriber device 40-1 is connected, the subscriber device 40-1-performs an initialization process and transmits a connection request (register request) by using an optical signal (step S3).

In a case where a propagation delay or a transmission distance is measured on the basis of a register request, in a case where a functional unit that has received the request, for example, the control unit 230, the monitoring unit 260, or the communication unit, and a functional unit that uses a measured value, for example, a control unit, a monitoring unit, or a communication unit that is different from the functional unit that has received the request, a band allocating unit that gives a transmission permission notification, an opposing device, or the like use the value, the measurement is performed again by the functional unit that uses the value, or the propagation delay or the transmission distance between the functional unit that has performed the measurement and the functional unit that uses the value is adjusted and used in consideration of wavelength dispersion, polarization dispersion, or mode dispersion.

The subscriber device 40-1 automatically performs the initialization process before connection or immediately after connection. The wavelength multiplexer/demultiplexer 220 receives a connection request from the transmission line 501 and outputs the connection request to the optical SW 210 via the transmission line 521. The optical SW 210 outputs a connection request input from a port connected to the subscriber device 40-1 to an output port to which the control unit 230 is connected in a case where the control unit 20 controls the subscriber device 400 by an optical signal. The input to the reception port of the control unit may be performed via the monitoring unit 260. The control unit 230 receives the connection request from the reception port via the transmission line 531. The control unit 230 analyzes the input optical signal, and checks whether there is a problem in an initial set wavelength or optical power (step S4).

In a case where there is a problem in a wavelength or optical power, the control unit 230 transmits a restart or initialization instruction to the subscriber device 40-1. After the restart or the initial setting, the process returns to step S3, and the subscriber device 40-1 transmits the connection request again.

The control unit 230 analyzes the optical signal received from the subscriber device 40-1, and outputs a connection request to the control unit 301 in a case where it is checked that there is no problem. The control unit 301 registers information regarding the subscriber device 40-1 in the management DB 350. The connection request includes connection source information, connection destination information, the type of a signal to be transmitted, and the like. For example, address information such as a Medium Access Control (MAC) address is used as the connection source information. For example, destination address information is used as the connection destination information. As the type of a signal to be transmitted, for example, a service, a modulation method, or the like is used. The wavelength controller 310 registers the connection source information in the management DB 350 on the basis of these pieces of information. Consequently, identification of a user who uses the subscriber device 40-1 and the fact that a wavelength that can be used by the subscriber device 40-1 is free are set in the user wavelength table. The wavelength controller 310 calculates an optimum path between the subscriber device 40-1 and the communication destination such as between the ground A and the ground B in comparison with the connection information stored in the management DB 350. The wavelength controller 310 searches for a free wavelength indicated by the inter-station wavelength table according to the calculated path. The wavelength controller 310 selects a wavelength to be used by the subscriber device 40-1 from among the free wavelengths and transmits information regarding the selected wavelength to the control unit 230 (step S5).

Another subscriber device 40 that is a communication destination of the subscriber device 40-1 will be referred to as a communication destination subscriber device 40. In this case, the wavelength controller 310 selects a transmission wavelength that is a wavelength used by the subscriber device 40-1 to transmit an optical signal to the communication destination subscriber device 40 and a reception wavelength that is a wavelength used by the subscriber device 40-1 to receive an optical signal from the communication destination subscriber device 40. The wavelength controller 310 transmits the selected transmission wavelength and reception wavelength to the control unit 230 as wavelengths to be used by the subscriber device 40-1. In a case where the subscriber device 40-1-performs only transmission to the communication destination subscriber device 40, the wavelength controller 310 does not have to select the reception wavelength. In a case where the subscriber device 40-1-performs only reception from the communication destination subscriber device 40, the wavelength controller 310 does not have to select the transmission wavelength.

The control unit 230 transmits wavelength information as follows. The wavelength tunable transmitter 233 of the control unit 230 transmits a wavelength instruction in which the information regarding the wavelength selected by the wavelength controller 310 is set, by using an optical signal having a wavelength indicating an address to the subscriber device 40-1. In a case where the wavelength instruction is transmitted by using an optical signal, the optical SW 210 outputs the optical signal input from a port connected to the wavelength tunable transmitter 233 of the control unit 20 or via the monitoring unit, or from a port connected to the communication unit in a case where the communication unit is used, to the transmission line 522 connected to the subscriber device 40-1. The wavelength multiplexer/demultiplexer 220 enters the optical signal input from the optical SW 210 via the transmission line 522 into the transmission line 501. The subscriber device 40-1 receives the optical signal transmitted through the transmission line 501. The wavelength may be branched in the middle of the path, or may be different from the setting as long as the wavelength reaches the subscriber device 40. If there is no multiplexer/demultiplexer or the like that demultiplexes according to the wavelength between the control unit 20 and the subscriber device 40, the wavelength of the signal to be transmitted does not have to be changed. In a case where the transmission wavelength is set in the instruction using the received optical signal, the subscriber device 40-1 sets a wavelength of the optical transceiver 41 according to the wavelength instruction (step S6). That is, the subscriber device 40-1 sets the wavelength of the optical transceiver 41 (wavelength tunable light source 451) such that an optical signal is transmitted by using the transmission wavelength set in the wavelength instruction. In a case where the reception wavelength is set in the wavelength instruction, the subscriber device 40-1 sets the optical transceiver 41 (the wavelength tunable filter 453) to receive a wavelength signal having the reception wavelength.

In a case where an optical signal is transmitted, the optical transceiver 41 of the subscriber device 40-1 transmits a notification signal for notifying that the wavelength has been set by an optical signal having the designated wavelength. Similarly to a request signal, the notification signal is transmitted to the control unit 230 via the optical SW 210, the monitoring unit 260, or the communication unit. On the basis of the received notification signal, the control unit 230 checks whether the designated wavelength is set correctly, whether the output power is sufficient, and the like (step S7). The control unit 230 checks whether or not a value of the notification signal is a value as designated. In a case where an optical signal is received, the control unit 230 may perform checking with a measurement value of the optical signal. In a case of determining that there is no problem as a result of the checking, the control unit 230 transmits a permission notification indicating permission to start communication to the subscriber device 40-1 by using an optical signal. The permission notification is transmitted to the subscriber device 40-1, similar to the wavelength instruction.

The optical SW controller 320 transmits connection information of the optimum port in the optical SW 210 to the optical SW 210 according to a transmission destination of the subscriber device 40-1. The optical SW 210 sets an uplink port and a downlink port of the subscriber device 40-1 according to an instruction from the optical SW controller 320 on the basis of the connection information (step S8).

The optical access system 100 controls a timing such that path switching in the optical SW 210 is performed after the permission to start communication is transmitted from the control unit 230 to the subscriber device 40-1. For example, it is assumed that the time required for path switching of the optical SW 210 is known in advance. In this case, the control unit 230 waits for the time required for the optical SW 210 to actually switch paths after receiving the path switching instruction until the subscriber device 40-1 actually starts communication after receiving the permission to start communication, and then gives an instruction for starting communication. After the communication is started, the monitoring unit 260 of the GW 200 checks a communication status between the opposing subscriber devices (step S9). The monitoring unit 260 notifies the OPS 300 of the check result. In a case where the check is NG, the control unit 230 or the OPS 300 performs a cause isolation procedure.

The connection request transmitted by the subscriber device 40-1 and the control signal transmitted by the control unit 230 to the subscriber device 40-1 are optical signals lower in speed than the main signal. As the control signal, for example, a protocol-free control signal (control method) represented by an AMCC may be used.

The control unit or the OPS 300 instructs the communication destination subscriber device 40 to use the transmission wavelength of the subscriber device 40-1 as a reception wavelength of the communication destination subscriber device 40 and use the reception wavelength of the subscriber device 40-1 as a transmission wavelength of the communication destination subscriber device 40. For example, in the control unit 301 that controls the optical GW 200 in which the communication destination subscriber device 40 is accommodated, the wavelength controller 310 instructs the control unit 230 to transmit a wavelength instruction in which the reception wavelength and the transmission wavelength of the communication destination subscriber device 40 are set. The communication destination subscriber device 40 receives the wavelength instruction from the control unit 230 by using a control signal, and sets the reception wavelength and the transmission wavelength in the optical transceiver 41 according to the received wavelength instruction. That is, in a case where the transmission wavelength is set in the wavelength instruction, the communication destination subscriber device 40 sets ae wavelength of the optical transceiver 41 (wavelength tunable light source 451) such that an optical signal is transmitted by using the transmission wavelength. In a case where the reception wavelength is set in the wavelength instruction, the communication destination subscriber device 40 sets the optical transceiver 41 (wavelength tunable filter 453) to receive a wavelength signal having the reception wavelength.

The optical access system 100 may transmit and receive information to be registered in the management DB 350 through the user application between the new subscriber device 40-1 and the control unit 301 without performing the user application in step S1. Consequently, the subscriber device 40-1 can communicate with another subscriber device 40 without performing user application. Transmission and reception of information between the subscriber device 40-1 and the control unit 301 are performed via the control unit 230 by using, for example, an AMCC.

The operation when the new subscriber device is connected has been described above. Next, a normal communication operation after a new subscriber device is connected will be described by exemplifying a case where the subscriber device 40-2 in FIG. 38 performs communication.

First, an uplink optical signal output from the subscriber device 40-2 described for the uplink communication is transmitted to the optical GW 200 via the transmission line 501. The wavelength multiplexer/demultiplexer 220 of the optical GW 200 separates the input optical signal into an uplink optical signal and a downlink optical signal according to wavelengths. The uplink optical signal demultiplexed by the wavelength multiplexer/demultiplexer 220 is input to the optical SW 210 via the transmission line 521. The optical SW 210 connects the port to which the uplink optical signal has been input from the wavelength multiplexer/demultiplexer 220 to another port corresponding to a path to a transfer destination on the path to a communication destination of the subscriber device 40-2, and outputs the optical signal. In a case where a wavelength is used as the destination information, the optical SW 210 is connected to another port corresponding to the transfer destination on the path to the communication destination specified by the wavelength allocated to the subscriber device 40-2 and outputs the optical signal. The uplink signal output from the optical SW 210 is multiplexed with an optical signal having a different wavelength transmitted by another subscriber device 40 in the multiplexer 241 and transmitted to another station (for example, the ground B) via one transmission line 511. Each multiplexer 241 multiplexes wavelength channels for each station such as the ground B and the ground C. It is also possible to use the same wavelength between the ground B and the ground C by separating the transmission line 511 to the ground B and the transmission line 511 to the ground C.

Next, the downlink communication will be described. The downlink communication is communication from the ground B or C toward the subscriber device 40. A downlink optical signal is sent to the optical GW 200 via one transmission line 512. The demultiplexer 242 of the optical GW 200 demultiplexes the downlink optical signal transmitted through the transmission line 512 according to wavelengths. The demultiplexer 242 inputs the demultiplexed light to a downlink port corresponding to the wavelength of the demultiplexed light via the transmission line 542. The optical SW 210 connects the port to which the downlink optical signal is input from the demultiplexer 242 to another port corresponding to the wavelength, and outputs the optical signal. The wavelength multiplexer/demultiplexer 220 separates the optical signal input from the optical SW 210 via the transmission line 522 into an uplink optical signal and a downlink optical signal according to wavelengths. The downlink optical signal demultiplexed by the wavelength multiplexer/demultiplexer 220 is input to the subscriber device 40-2 via the transmission line 501. The wavelength channels transmitted from the optical GW 200 to the respective stations (for example, the grounds B, and C) are assumed to be the same wavelength band, but different wavelength bands may be used for each station.

The monitoring unit 260 of the optical GW 200 receives light branched by the branching unit 250. The light branched by the branching unit 250 is an optical signal transmitted and received by each subscriber device 40. The monitoring unit 260 monitors the received optical signal to monitor a signal transmitted and received by each subscriber device 40. In a case where an abnormality such as a wavelength shift, a decrease in output, or a communication abnormality is detected through the monitoring, the monitoring unit 260 transmits an abnormality detection signal to the control unit 301. The optical SW controller 320 of the control unit 301 controls the optical SW 210 such that the target subscriber device 40 is connected to the control unit 230 again. The control unit 301 performs an allocation process of a new wavelength different from the wavelength used when the abnormality is detected, similarly to when the new subscriber device 40 is connected. Consequently, in a case where an optical signal having a changed wavelength is input from the subscriber device 40, the optical SW 210 inputs the input optical signal to the port specified by the wavelength before the change by the subscriber device 40.

(First Configuration Example of Optical Access System 100)

Figure 43:
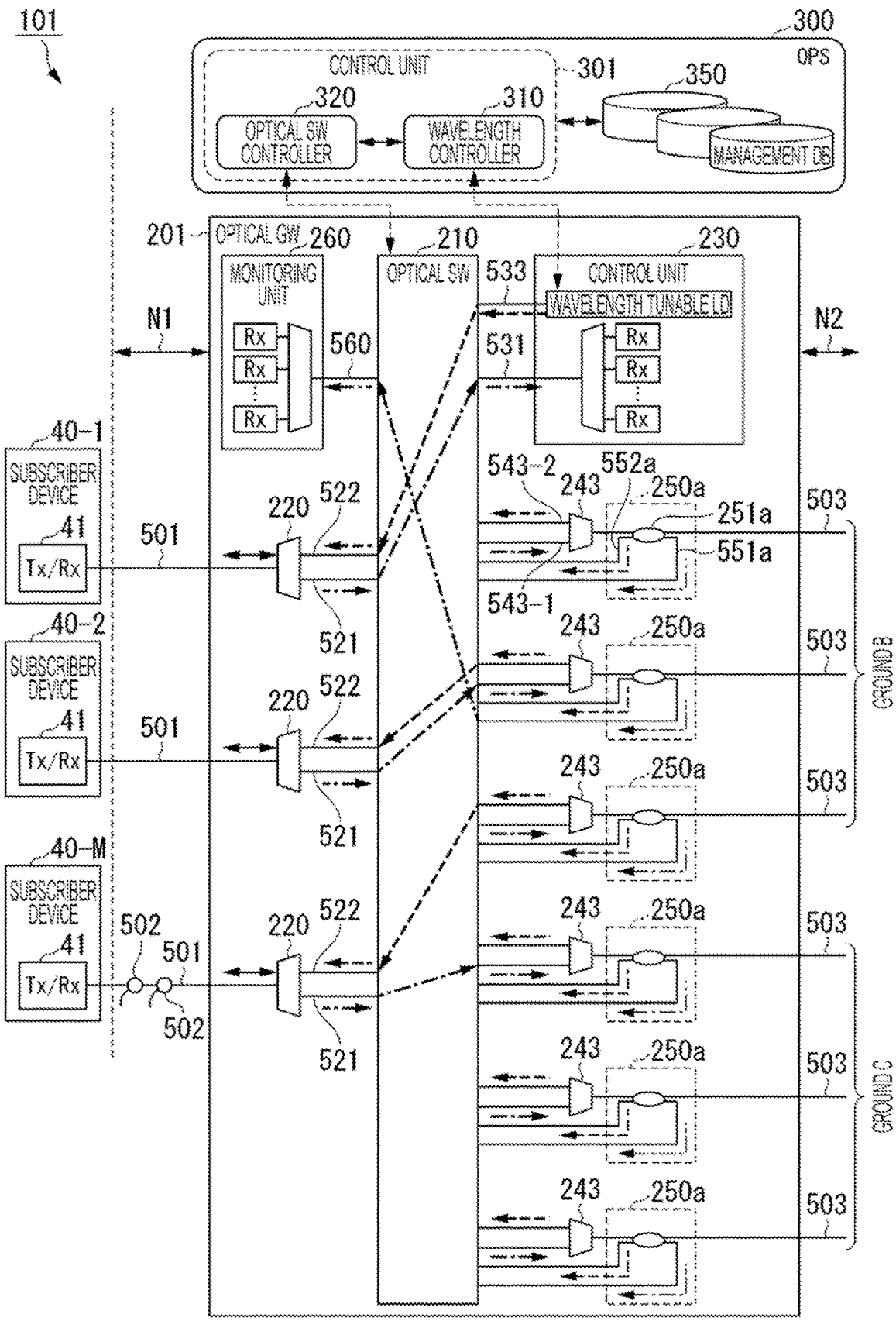
FIG. 43 is a diagram illustrating a configuration example of an optical access system according to a first configuration example.
Figure 44:
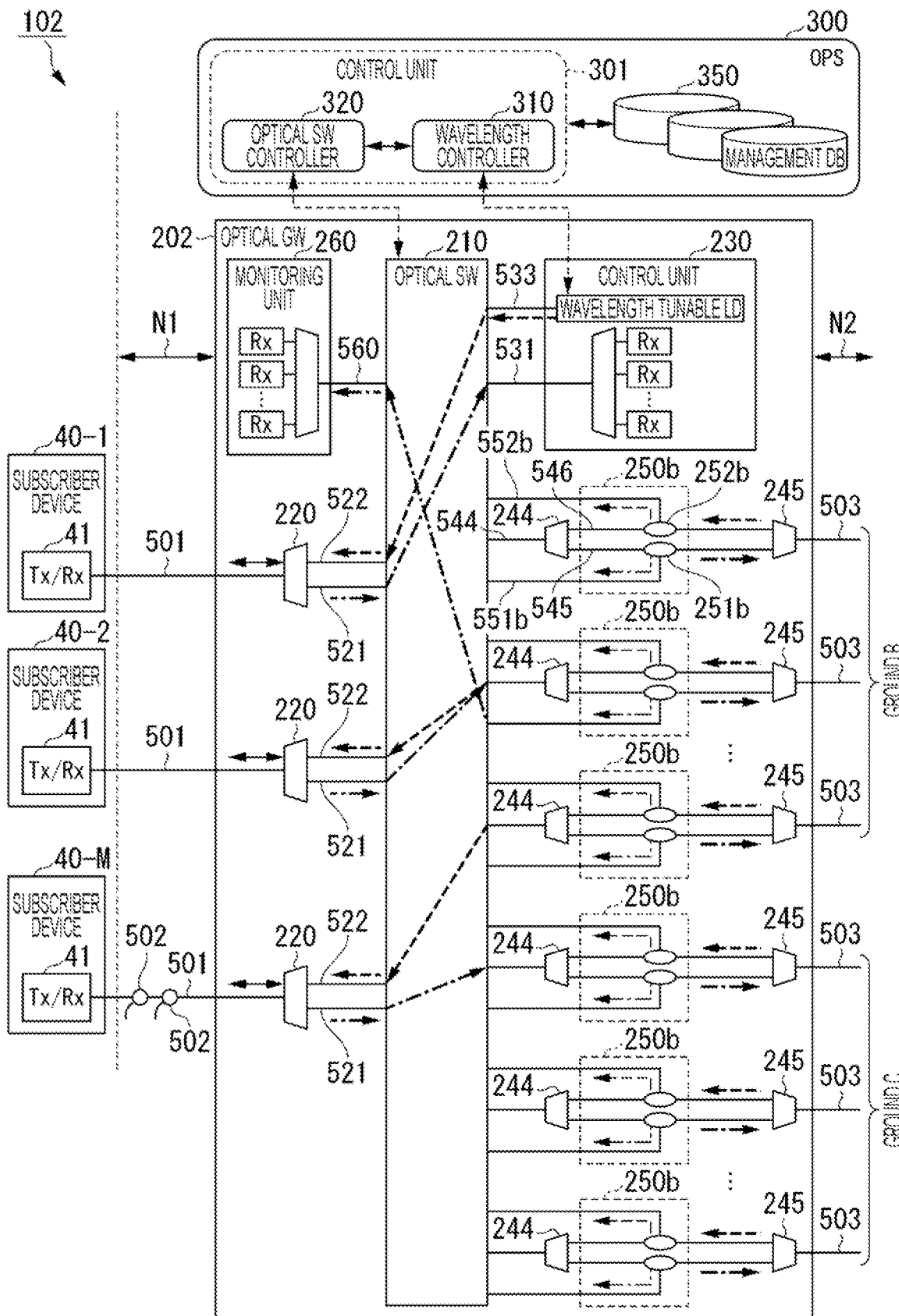
FIG. 44 is a diagram illustrating a configuration example of an optical access system according to a second configuration example.

Although the optical GW 200 illustrated in FIG. 38 performs wavelength multiplexing, it is not necessary to perform wavelength multiplexing as illustrated in FIGS. 43 and 44. FIG. 43 is a diagram illustrating a configuration example of an optical access system 101. The optical access system 101 illustrated in FIG. 43 is different from the optical access system 100 illustrated in FIG. 38 in that a GW 201 is provided instead of the GW 200. The GW 201 is different from the GW 200 in that it includes a wavelength multiplexer/demultiplexer 243 and a branching unit 250a instead of the multiplexer 241, the demultiplexer 242, and the branching unit 250. The GW 201 is connected to a communication device of a station at another ground via a transmission line 503. One transmission line 503 transmits an uplink signal and a downlink signal to and from any ground.

The wavelength multiplexer/demultiplexer 243 separates an input optical signal into an uplink optical signal and a downlink optical signal according to wavelengths. The wavelength multiplexer/demultiplexer 243 separates an uplink optical signal input from the optical SW 210 via a transmission line 543-1, and transmits the signal to another ground or a higher network via the transmission line 503. The wavelength multiplexer/demultiplexer 243 separates a downlink optical signal input from another ground via the transmission line 503, and outputs the signal to the optical SW 210 via a transmission line 543-2.

The branching unit 250a is provided in the transmission line 503. The branching unit 250a includes a power splitter 251a. The power splitter 251a branches uplink and downlink optical signals transmitted through the transmission line 503. The power splitter 251a inputs the branched uplink optical signal to the port of the optical SW 210 via the transmission line 551a, and inputs the branched downlink optical signal to the port of the optical SW 210 via the transmission line 551b. The optical SW 210 outputs the optical signal input from the port connected to the transmission line 551a and the optical signal input from the port connected to the transmission line 551b from the port connected to the transmission line 560. Consequently, the wavelength demultiplexer 261 of the monitoring unit 260 receives the optical signal branched by the branching unit 250a.

(Second Configuration Example of Optical Access System 100)

FIG. 44 is a diagram illustrating a configuration example of an optical access system 102. An optical access system 102 illustrated in FIG. 44 is different from the optical access system 101 illustrated in FIG. 43 in that an optical GW 202 is provided instead of the optical GW 201. The optical GW 202 is different from the optical GW 201 in that it includes a wavelength multiplexer/demultiplexer 244, a wavelength multiplexer/demultiplexer 245, and a branching unit 250b instead of the wavelength multiplexer/demultiplexer 243 and the branching unit 250a.

The wavelength multiplexer/demultiplexer 244 separates an uplink optical signal and a downlink optical signal according to wavelengths. The wavelength multiplexer/demultiplexer 244 inputs the uplink optical signal input from the optical SW 210 via the transmission line 544 to the wavelength multiplexer/demultiplexer 245 via the transmission line 545. The wavelength multiplexer/demultiplexer 244 inputs the downlink optical signal input from the wavelength multiplexer/demultiplexer 245 via the transmission line 546 to the optical SW 210 via the transmission line 544.

The wavelength multiplexer/demultiplexer 245 separates an uplink optical signal and a downlink optical signal according to wavelengths. The wavelength multiplexer/demultiplexer 245 transmits the uplink optical signal input from the wavelength multiplexer/demultiplexer 245 via the transmission line 545 to another ground or a higher network via the transmission line 503. The wavelength multiplexer/demultiplexer 245 inputs the downlink optical signal received via the transmission line 503 to the wavelength multiplexer/demultiplexer 244 via the transmission line 546.

The branching unit 250b includes a power splitter 251b and a power splitter 252b. The power splitter 251b branches an uplink optical signal transmitted through the transmission line 545. The power splitter 251b inputs the branched uplink optical signal to the port of the optical SW 210 via the transmission line 551b. The power splitter 252b branches a downlink optical signal transmitted through the transmission line 546. The power splitter 252b inputs the branched downlink optical signal to the port of the optical SW 210 via the transmission line 552b. The optical SW 210 outputs the optical signal input from a port connected to the transmission line 551b and the optical signal input from the port connected to the transmission line 552b from the port connected to the transmission line 560. Consequently, the optical signal branched by the branching unit 250*b* is input to the wavelength demultiplexer 261 of the monitoring unit 260.

The monitoring unit 260 described above has a receiver configuration including the wavelength demultiplexer 261 and the optical receiver 262 for each wavelength. The monitoring unit 260 may include a wavelength tunable optical receiver instead of the receiver configuration. The transceiver of the control unit may have a transmitter that does not transmit a signal having a variable wavelength, or may have a receiver configuration not including a wavelength demultiplexer. An example of such a configuration will be described with reference to FIG. 45.

(Third Configuration Example of Optical Access System 100)

Figure 45:
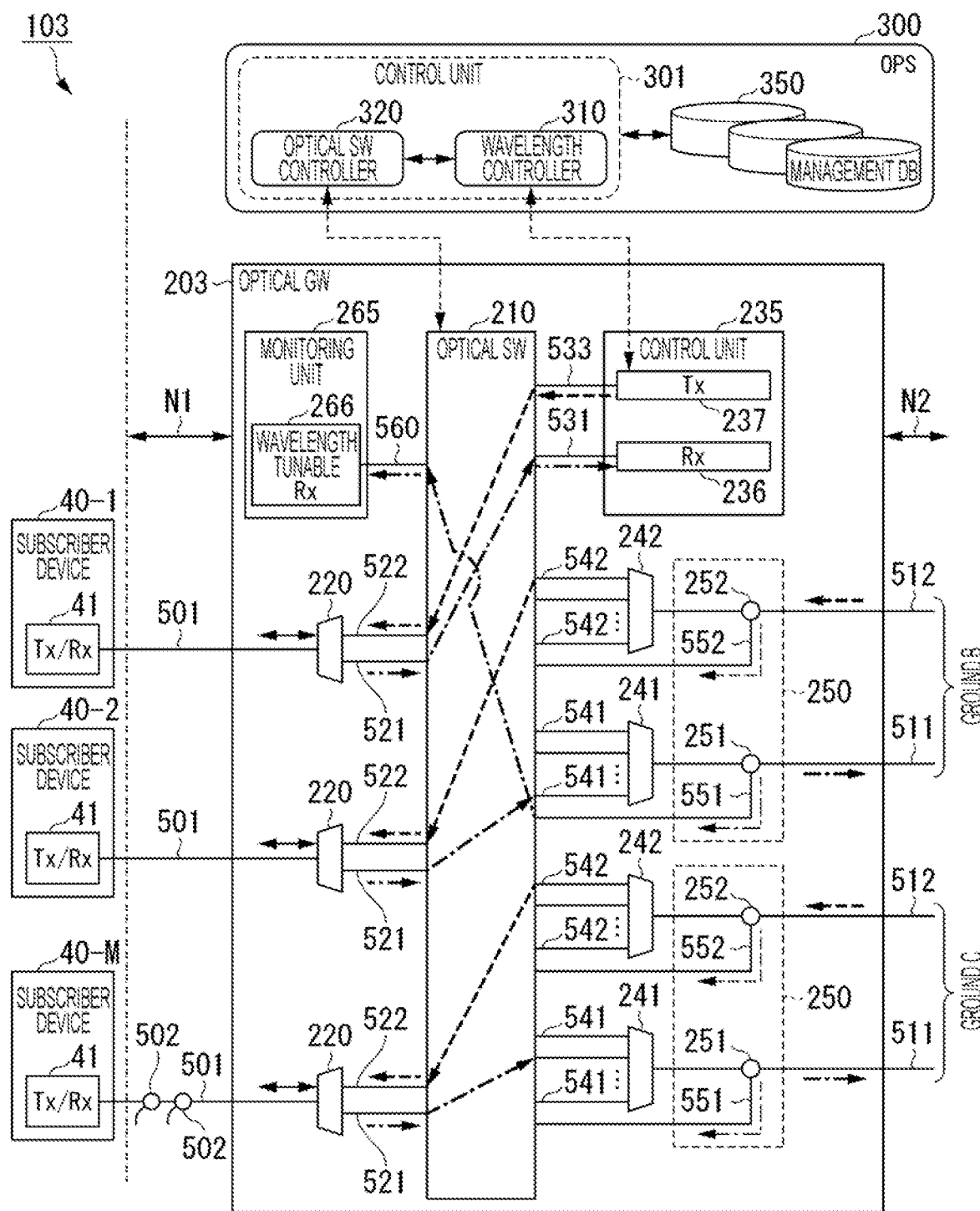
FIG. 45 is a diagram illustrating a configuration example of an optical access system according to a third configuration example.

FIG. 45 is a diagram illustrating a configuration example of an optical access system 103. The optical access system 103 illustrated in FIG. 45 is different from the optical access system 100 illustrated in FIG. 38 in that an optical GW 203 is provided instead of the optical GW 200. The optical GW 203 is different from the optical GW 200 in that a control unit 235 and a monitoring unit 265 are provided instead of the control unit 230 and the monitoring unit 260. The control unit 235 includes an optical receiver 236 and an optical transmitter 237 that does not transmit a signal having a variable wavelength. The monitoring unit 265 includes a wavelength tunable optical receiver 266. The monitoring unit 265 may be replaced with any one of the monitoring units 60 to 60*h* described above.

(Fourth Configuration Example of Optical Access System 100)

Figure 46:
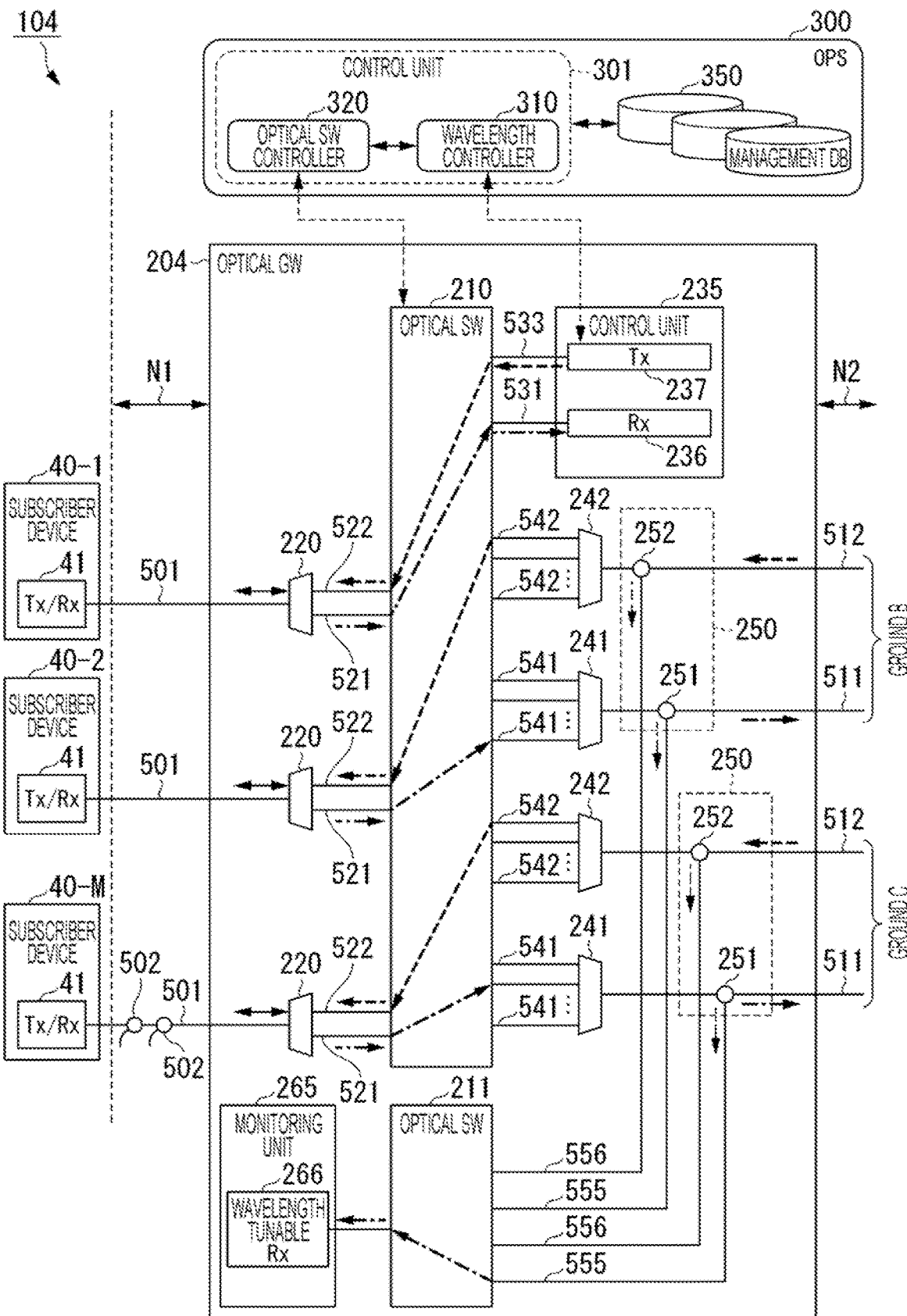
FIG. 46 is a diagram illustrating a configuration example of an optical access system according to a fourth configuration example.

The monitoring unit may be connected via an optical SW different from the above-described optical SW. An example of such a configuration will be described with reference to FIG. 46. FIG. 46 is a diagram illustrating a configuration example of an optical access system 104. The optical access system 104 illustrated in FIG. 46 is different from the optical access system 103 illustrated in FIG. 45 in that an optical GW 204 is provided instead of the optical GW 203. The optical GW 204 is different from the optical GW 203 in that an optical SW 211 is further provided and that the monitoring unit 265 is connected to the optical SW 211.

An uplink optical signal separated from the transmission line 511 by the power splitter 251 of the branching unit 250 is input to the optical SW 211 via the transmission line 555, and a downlink optical signal separated from the transmission line 512 by the power splitter 252 is input to the optical SW 211 via the transmission line 555. The optical SW 211 is, for example, a small optical SW. The number of ports of the optical SW 211 is one on the monitoring unit 260 side and 2M on the side to which a monitoring target optical signal is input. 2M is twice the number M of the subscriber devices 40 connected to the optical GW 204. Monitoring units may be prepared by the number of connected grounds without using the small optical SW, and signals transmitted to and received from all the grounds may be monitored for each ground.

In the present configuration example, communication is performed between a plurality of subscriber devices connected to the same optical GW by using a return transmission line. In the following description, a description will focus on differences from the above configuration examples.

(Fifth Configuration Example of Optical Access System 100)

Figure 47:
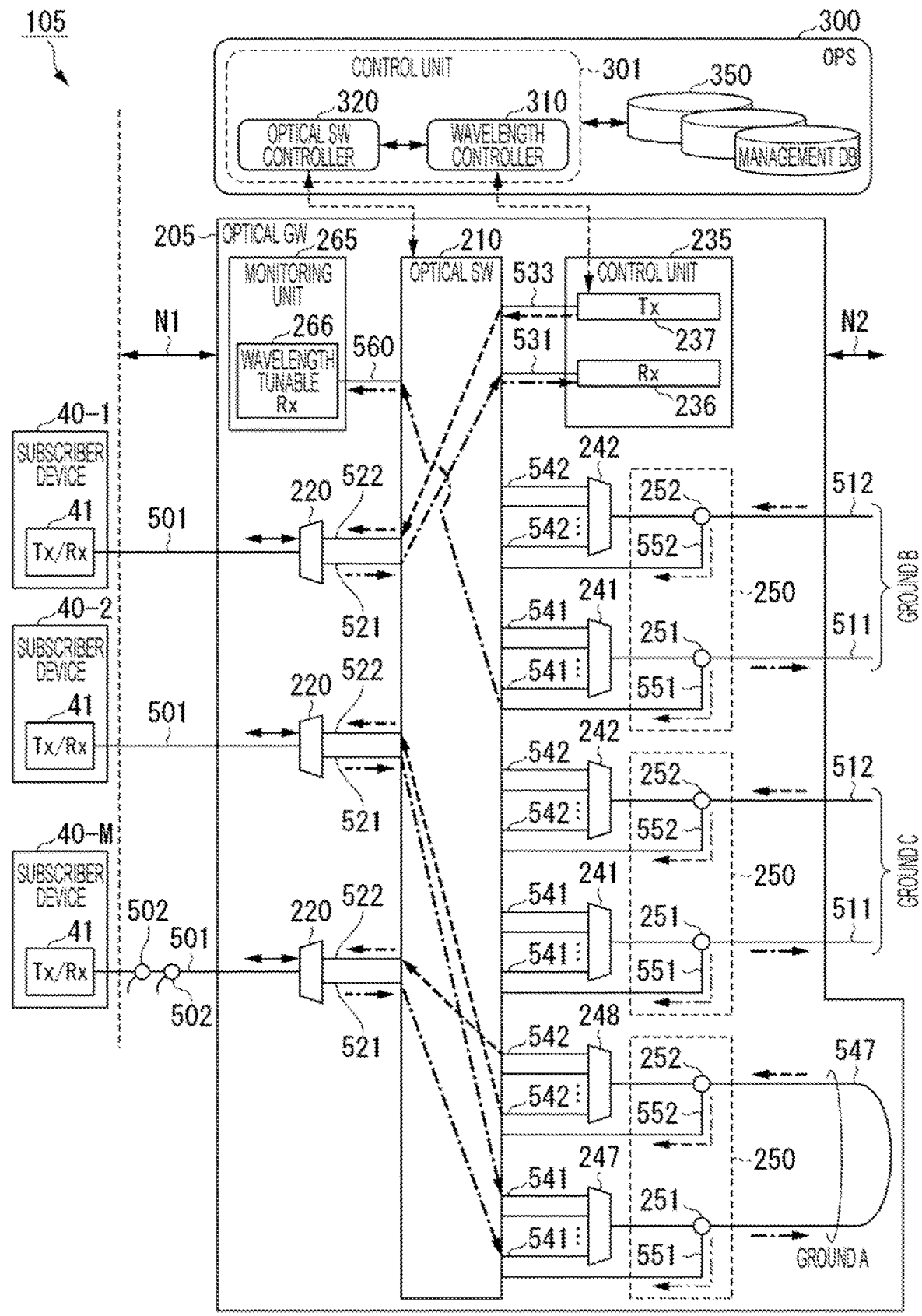
FIG. 47 is a diagram illustrating a configuration example of an optical access system according to a fifth configuration example.

FIG. 47 is a diagram illustrating a configuration example of an optical access system 105. The optical access system 105 illustrated in FIG. 47 is different from the optical access system 103 illustrated in FIG. 45 in that an optical GW 205 is provided instead of the optical GW 203. The optical GW 205 is different from the optical GW 203 in that a multiplexer 247 and a demultiplexer 248 corresponding to the ground A where the optical GW 205 is installed are further provided. The multiplexer 247 and the demultiplexer 248 are connected via a transmission line 547. The transmission line 547 is a return transmission line.

Similarly to the multiplexer 241, the multiplexer 247 multiplexes uplink optical signals having different wavelengths respectively output from the plurality of transmission lines 541 by the optical SW 210, and outputs the multiplexed signal to the transmission line 547. Similarly to the demultiplexer 242, the demultiplexer 248 demultiplexes a downlink optical signal input from the transmission line 547 according to wavelengths. The demultiplexer 248 inputs the respective demultiplexed downlink optical signals to the optical SW 210 via a plurality of transmission lines 542 connected to downlink ports corresponding to wavelengths of the optical signals. The branching unit 250 is provided in the transmission line 547.

In the above configuration example, the subscriber device connected to the ground A is connected to a port for connection to the ground B or the ground C via the optical SW. In the present configuration example, another set that is the same as the combination of the multiplexer 241 and the demultiplexer 242 connected to the ground B or the ground C is added. The added set includes the multiplexer 247 and the demultiplexer 248. An output port of the added multiplexer 247 and an input port of the added demultiplexer 248 are connected via the transmission line 547. With this configuration, a signal output from the subscriber device 40 can be input to the optical SW 210 again. Consequently, the optical GW 205 returns an optical signal output from a certain subscriber device 40 and enters the optical signal the optical SW 210 again as a downlink signal. By inputting this return signal to another subscriber device 40 in the optical SW 210, return communication, that is, communication between the subscriber devices 40 connected to the same optical GW 205 can be performed.

For example, a state in which the subscriber device 40-2 and the subscriber device 40-M communicate with each other will be described. It is assumed that each of K (where K is an integer of 2 or more) uplink ports of the optical SW 210 corresponding to the ground A is connected to the multiplexer 247 via the transmission line 541, and each of K downlink ports of the optical SW 210 corresponding to the ground A is connected to the demultiplexer 248 via the transmission line 542. It is assumed that the k-th (where k is an integer of 1 or more and K or less) uplink port and downlink port among the K downlink ports and uplink ports corresponding to the ground A correspond to a wavelength λk. The uplink optical signal having the wavelength λ1 output from the subscriber device 40-2 is input to the first uplink port corresponding to the ground A. The input optical signal is returned by the transmission line 547 and is input to the optical SW 210 again as a downlink optical signal from the first downlink port corresponding to the ground A. The optical SW controller 320 sets a path in the optical SW 210 such that the optical signal is transmitted to the subscriber device 40-M according to the wavelength. Similarly, the uplink optical signal having the wavelength λk output from the subscriber device 40-M is input to the k-th uplink port corresponding to the ground A. The input optical signal is returned by the transmission line 547 and is input to the optical SW 210 again as a downlink optical signal from the k-th downlink port corresponding to the ground A. The optical SW controller 320 sets a path in the optical SW 210 such that the optical signal is transmitted to the subscriber device 40-2 according to the wavelength. Consequently, communication is performed between the subscriber device 40-2 and the subscriber device 40-M.

(Sixth Configuration Example of Optical Access System 100)

Figure 48:
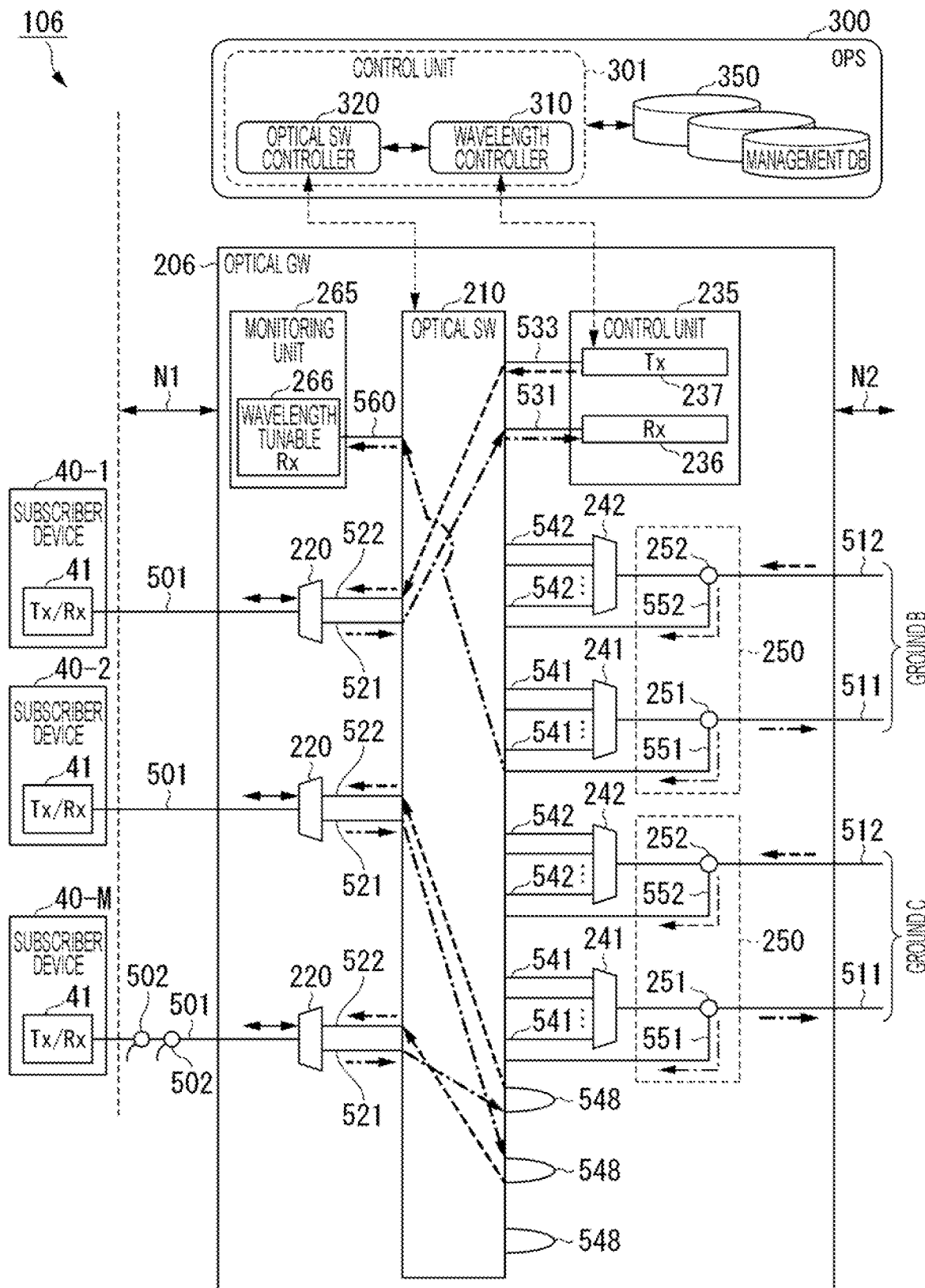
FIG. 48 is a diagram illustrating a configuration example of an optical access system according to a sixth configuration example.

Another configuration of the present configuration example will be described with reference to FIGS. 48 and 49. FIG. 48 is a diagram illustrating a configuration example of an optical access system 106. The optical access system 106 illustrated in FIG. 48 is different from the optical access system 105 illustrated in FIG. 47 in that an optical GW 206 is provided instead of the optical GW 205. The optical GW 206 is different from the optical GW 205 in that the multiplexer 247 and the demultiplexer 248 are not provided, and the uplink port and the downlink port for the ground A of the optical SW 210 are directly connected via the transmission line 548 without wavelength multiplexing, so that a signal is returned.

(Seventh Configuration Example of Optical Access System 100)

Figure 49:
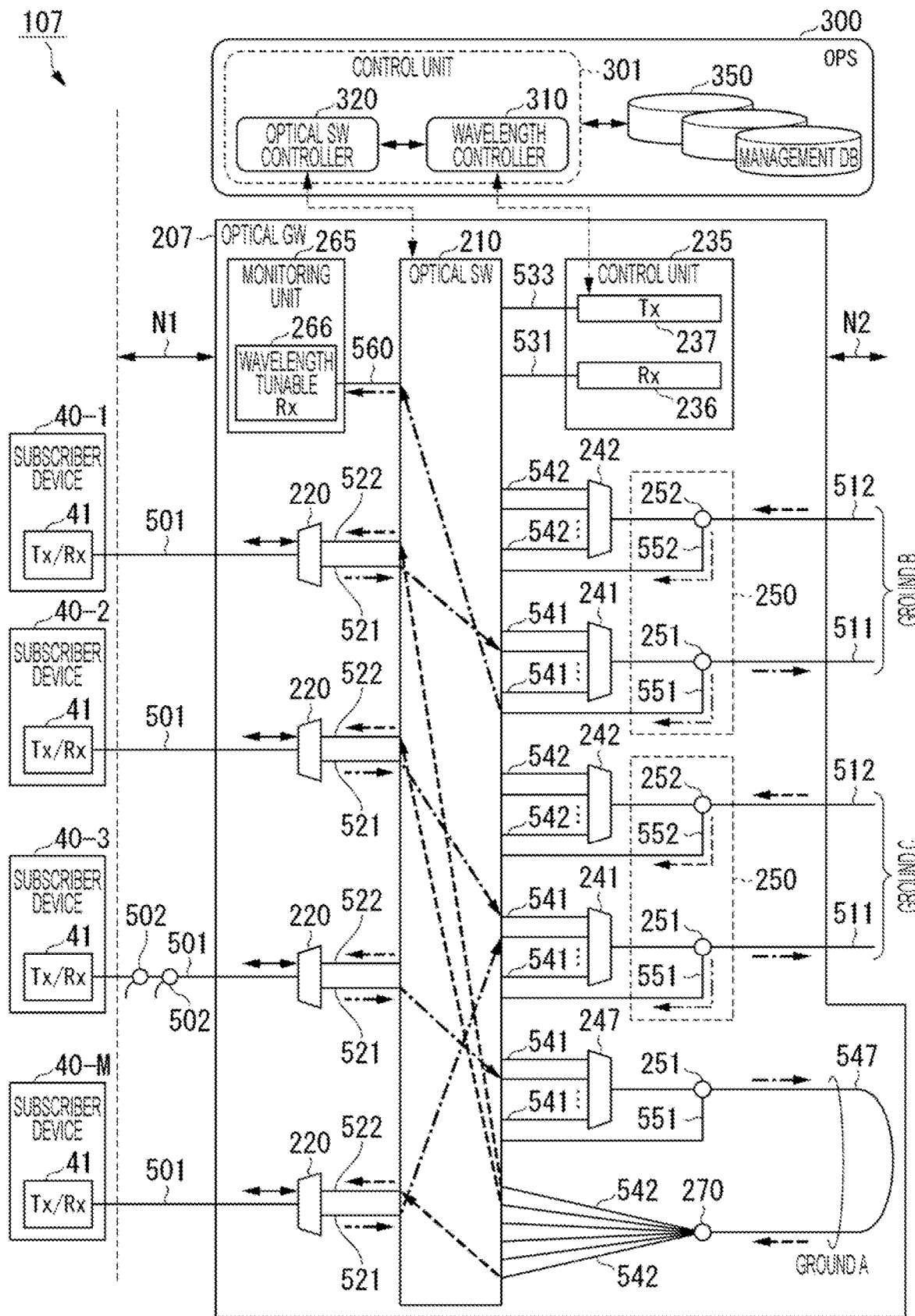
FIG. 49 is a diagram illustrating a configuration example of an optical access system according to a seventh configuration example.

FIG. 49 is a diagram illustrating a configuration example of an optical access system 107. The optical access system 107 illustrated in FIG. 49 is different from the optical access system 105 illustrated in FIG. 47 in that an optical GW 207 is provided instead of the optical GW 205. The optical GW 207 is different from the optical GW 205 in that a power splitter 270 is provided instead of the demultiplexer 248. The power splitter 270 branches a downlink optical signal input from the multiplexer 247 via the transmission line 547 into a plurality of signals, and inputs the plurality of signals to the optical SW 210 via the plurality of transmission lines 542.

A power splitter may be provided at a subsequent stage with respect to the demultiplexer 248 of the optical GW 205 in FIG. 47. The power splitter branches the optical signal demultiplexed by the demultiplexer 248 into a plurality of signals, and inputs the plurality of signals to different ports of the optical SW 210. As described above, multicast communication of return communication can be performed.

Although the difference from the optical access system 103 has been described above, the difference may also be applied to the optical access systems 100, 101, and 102.

(Eighth Configuration Example of Optical Access System 100)

An optical access system of the present configuration example performs multicast communication. In the present configuration example, a description will focus on differences.

Figure 50:
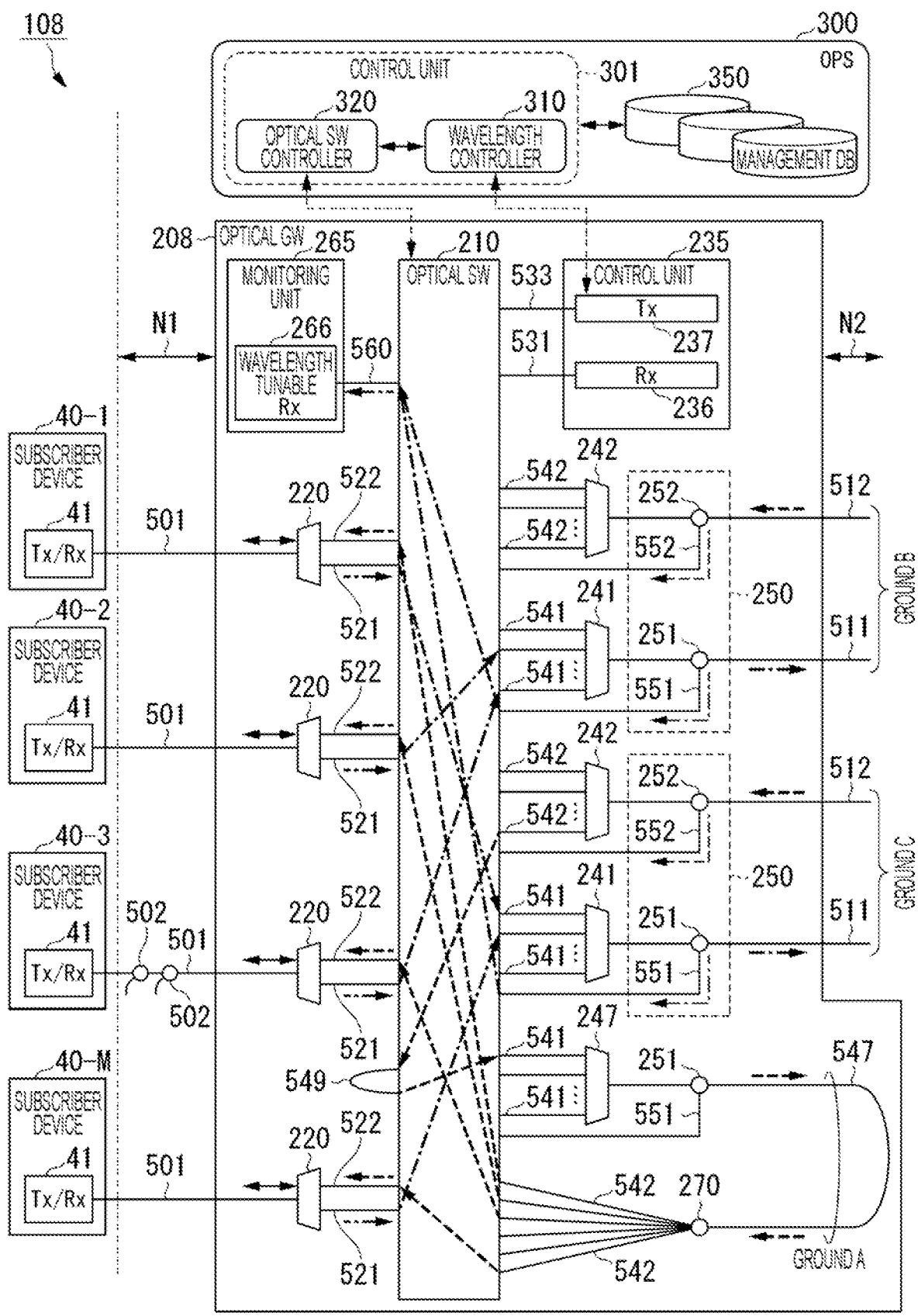
FIG. 50 is a diagram illustrating a configuration example of an optical access system according to an eighth configuration example.

First, multicast in downlink communication will be described with reference to FIG. 50. FIG. 50 is a diagram illustrating a configuration example of an optical access system 108. The optical access system 108 illustrated in FIG. 50 is different from the optical access system 107 illustrated in FIG. 49 in that an optical GW 208 is provided instead of the optical GW 207. The optical GW 208 is different from the optical GW 207 in that a transmission line 549 that connects a return port of the optical SW 210 is further provided.

A case where a downlink optical signal transmitted from the ground C is multicasted will be described. The optical SW controller 320 performs control such that a port to which the downlink optical signal from the ground C is input is connected to a return port to which the transmission line 549 is connected according to a wavelength. Consequently, the downlink optical signal from the ground C is transmitted through the transmission line 549 and is input again to the optical SW 210 as an uplink signal of the ground A. The optical SW controller 320 performs control such that the downlink optical signal input from the return port is input to the uplink signal port for the ground A. Consequently, the optical signal returned through the transmission line 549 and input to the optical SW 210 is output to the port connected to the multiplexer 247. The multiplexer 247 multiplexes the optical signals output from the optical SW 210 via the plurality of respective transmission lines 541 and outputs the multiplexed optical signal to the transmission line 547. The optical signal output to the transmission line 547 is branched into a plurality of optical signals by the power splitter 270. The power splitter 270 inputs the plurality of branched optical signals to the optical SW 210 as downlink signals of the ground A via the plurality of transmission lines 542. The optical SW 210 outputs the optical signal input from each transmission line 542 to a port connected to the subscriber device 40 according to the wavelength. This enables multicast of downlink signals.

(Ninth Configuration Example of Optical Access System 100)

Figure 51:
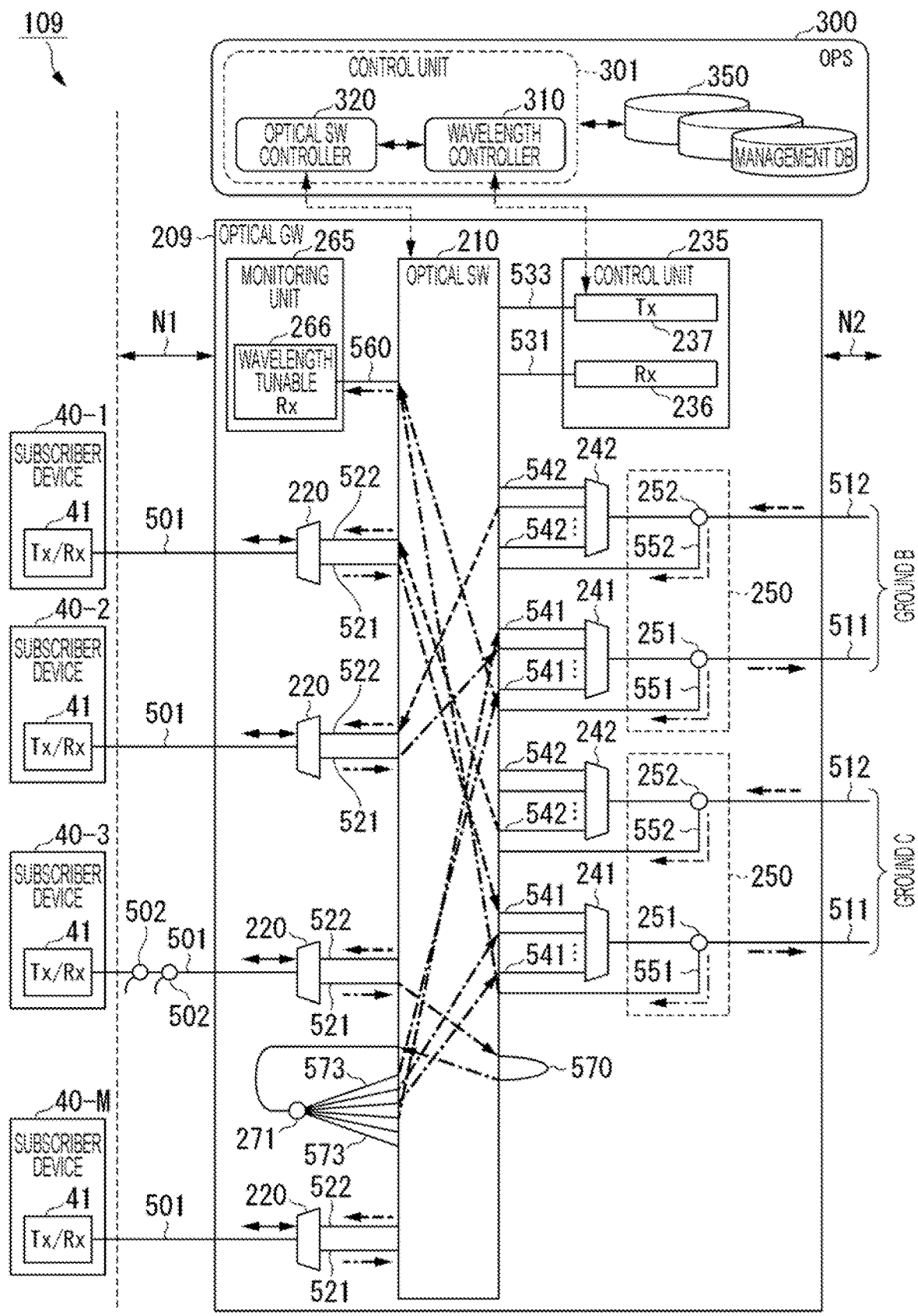
FIG. 51 is a diagram illustrating a configuration example of an optical access system according to a ninth configuration example.

Next, multicast of uplink communication will be described with reference to FIG. 51. FIG. 51 is a diagram illustrating a configuration example of an optical access system 109. The optical access system 109 illustrated in FIG. 51 is different from the optical access system 103 illustrated in FIG. 45 in that an optical GW 209 is provided instead of the optical GW 203. The optical GW 209 is different from the optical GW 203 in that a transmission line 570 that connects a return port to the optical SW 210 and a power splitter 271 for multicast are provided. The power splitter 271 is connected to the optical SW 210 via the transmission line 572 and the plurality of transmission lines 573.

A case where an uplink optical signal transmitted from the ground A is multicasted will be described. The optical SW controller 320 performs control such that a port to which the uplink optical signal from the ground A is input is connected to a return port to which the transmission line 570 is connected according to a wavelength. Consequently, the uplink optical signal from the ground A is transmitted through the transmission line 570 and is input to the optical SW 210 again. The optical SW controller 320 performs control such that the optical signal input from the return port is output to the port connected to the power splitter 271. Consequently, the optical signal that is returned through the transmission line 570 and is input to the optical SW 210 is output to the transmission line 572. The optical signal output to the transmission line 572 is branched into a plurality of optical signals by the power splitter 271. The power splitter 271 inputs the plurality of branched optical signals to the optical SW 210 as uplink signals via the plurality of transmission lines 573. The optical SW 210 outputs the optical signal input from each transmission line 573 to the port connected to the ground B or the ground C according to the wavelength. This enables multicast of the uplink signal.

(Tenth Configuration Example of Optical Access System 100)

Figure 52:
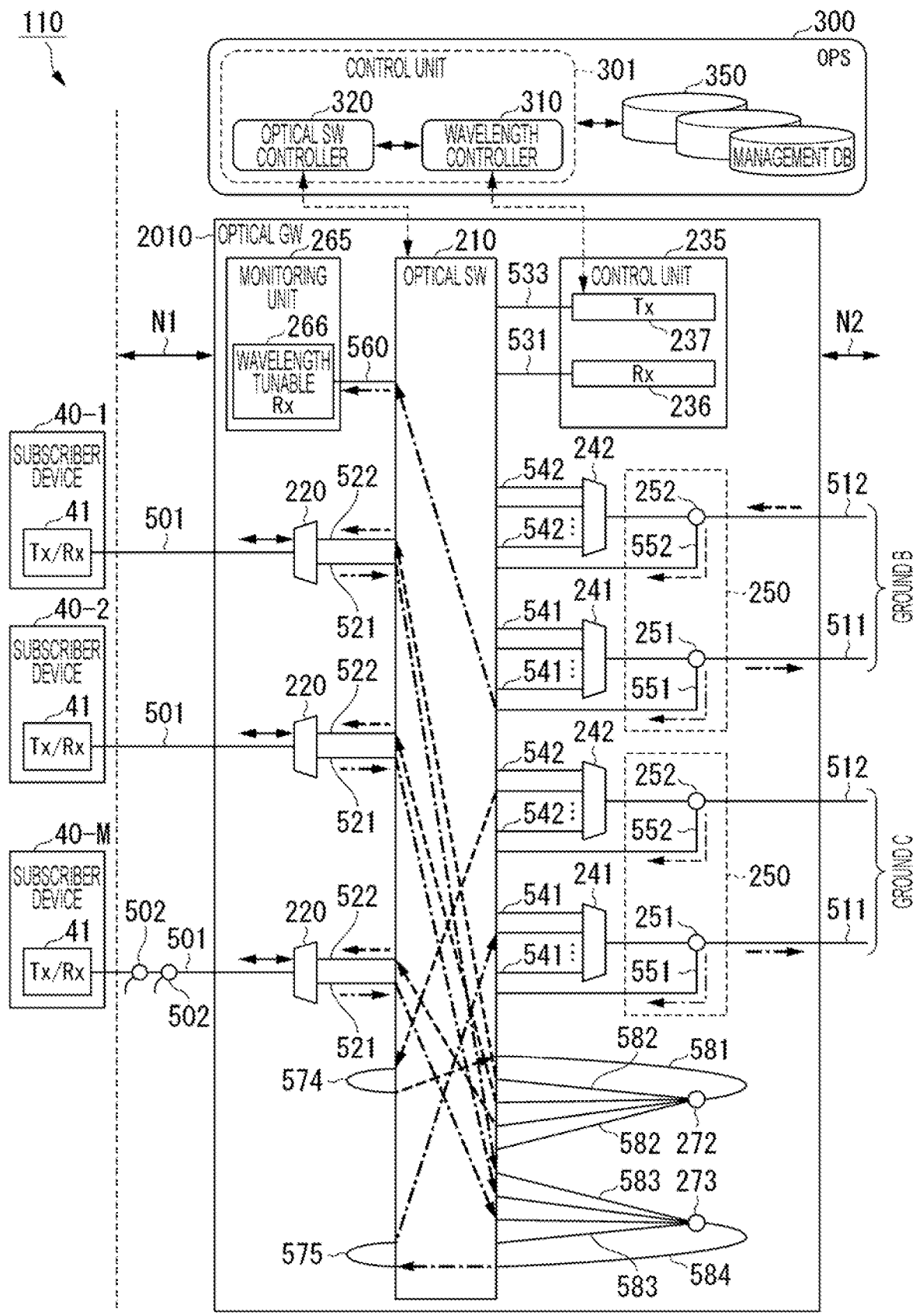
FIG. 52 is a diagram illustrating a configuration example of an optical access system according to a tenth configuration example.

Next, a configuration in which point to multipoint communication including uplink communication is performed while multicasting downlink communication will be described with reference to FIG. 52. FIG. 52 is a diagram illustrating a configuration example of an optical access system 110. The optical access system 110 illustrated in FIG. 52 is different from the optical access system 103 illustrated in FIG. 45 in that an optical GW 2010 is provided instead of the optical GW 203. The optical GW 2010 is different from the optical GW 203 in that transmission lines 574 and 575 connecting a return port to the optical SW 210 and power splitters 272 and 273 are further provided. The power splitter 272 is connected to the optical SW 210 via the transmission line 581 and the plurality of transmission lines 582. The power splitter 273 is connected to the optical SW 210 via the plurality of transmission lines 583 and the transmission line 584.

A case where a downlink optical signal transmitted from the ground C is multicasted will be described. The optical SW controller 320 performs control such that a port to which the downlink optical signal from the ground C is input is connected to a return port to which the transmission line 574 is connected according to a wavelength. Consequently, the downlink optical signal from the ground C is transmitted through the transmission line 574 and is input again to the optical SW 210 as an uplink signal of the ground A. The optical SW controller 320 performs control such that the downlink optical signal input from the return port is output to the port to which the power splitter 272 is connected. Consequently, the optical signal that is returned through the transmission line 574 and is input to the optical SW 210 is output to the transmission line 581. The optical signal output to the transmission line 581 is branched into a plurality of optical signals by the power splitter 272. The power splitter 272 inputs the plurality of branched optical signals to the optical SW 210 as downlink signals via the plurality of transmission lines 582. The optical SW 210 outputs the optical signal input from each transmission line 582 to a port connected to the subscriber device 40 according to the wavelength. This enables multicast of downlink signals.

A case where an uplink optical signal transmitted from the ground A is transmitted to the ground C will be described. The optical SW controller 320 performs control such that a port to which the uplink optical signal from the ground A is input is connected to a port to which the power splitter 273 is connected according to a wavelength. Consequently, the uplink optical signal from the ground A is output to the transmission line 583. The optical signals respectively output to the plurality of transmission lines 583 are multiplexed by the power splitter 273. The power splitter 273 inputs the multiplexed optical signal to the optical SW 210 via the transmission line 584. The optical SW 210 performs control such that the optical signal input from the transmission line 584 is input to the return port to which the transmission line 575 is connected. Consequently, the optical signal is transmitted through the transmission line 575 and is input to the optical SW 210 again. The optical SW 210 outputs the optical signal input from the transmission line 575 to the multiplexer 241 connected to the ground C according to the wavelength.

As described above, by providing two sets of configurations using a power splitter for multicast, not only downlink multicast communication but also point to multipoint communication including uplink communication can be performed.

(Eleventh Configuration Example of Optical Access System 100)

In the present configuration example, communication is performed without separating an uplink signal and a downlink signal. Hereinafter, a description will focus on differences from each of the above configuration examples.

Figure 53:
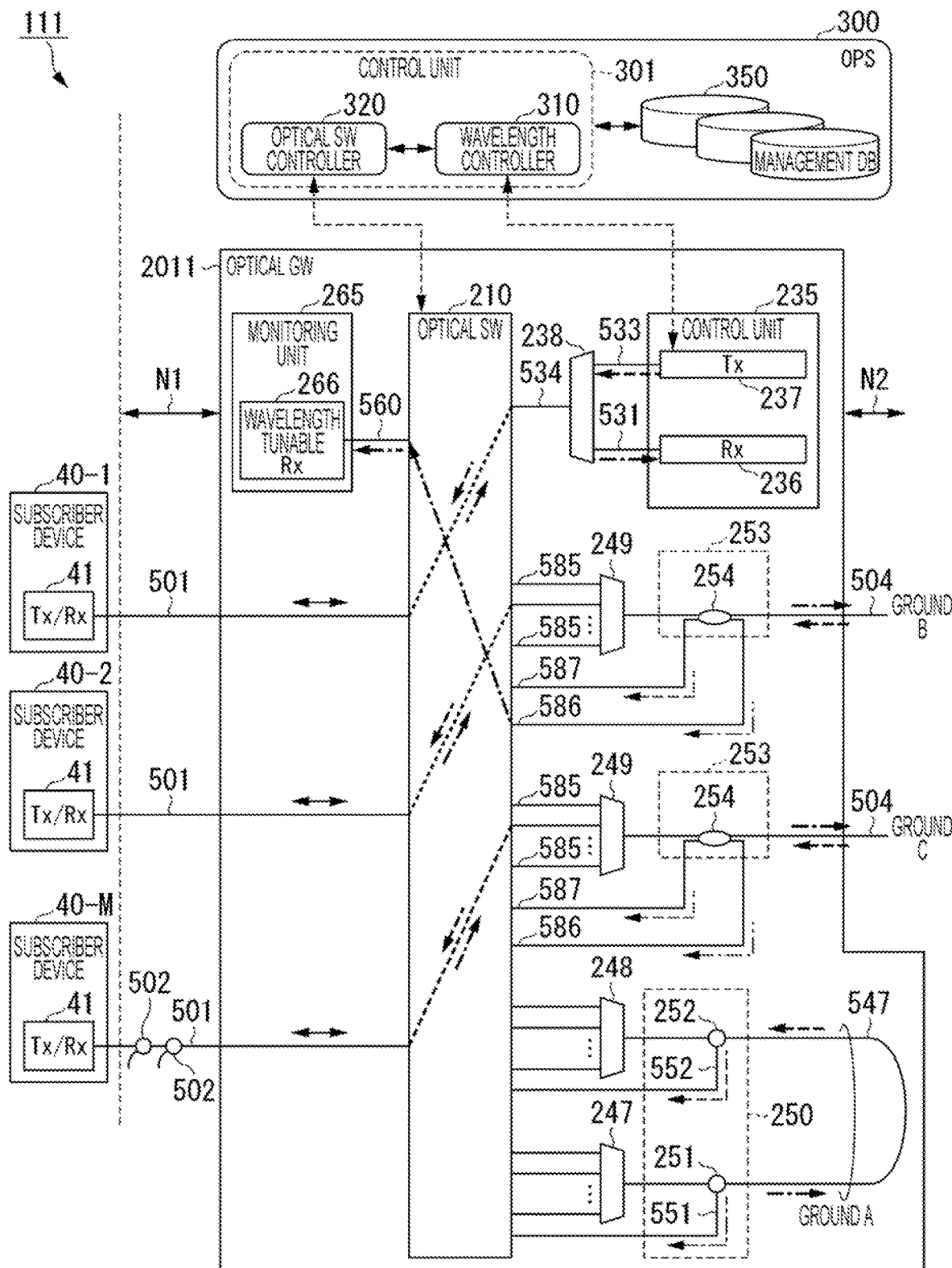
FIG. 53 is a diagram illustrating a configuration example of an optical access system according to an eleventh configuration example.

FIG. 53 is a diagram illustrating a configuration example of an optical access system 111. The optical access system 111 illustrated in FIG. 53 is different from the optical access system 105 illustrated in FIG. 47 in that an optical GW 2011 is provided instead of the optical GW 205. The optical GW 2011 is different from the optical GW 205 in that the wavelength multiplexer/demultiplexer 220 is not provided, a wavelength multiplexer/demultiplexer 249 and a branching unit 253 are provided instead of the multiplexer 241, the demultiplexer 242, and the branching unit 250, and a wavelength multiplexer/demultiplexer 238 is further provided.

The wavelength multiplexer/demultiplexer 249 is connected to the optical SW 210 via a plurality of transmission lines 585. The wavelength multiplexer/demultiplexer 249 multiplexes uplink optical signals having different wavelengths respectively output from the plurality of transmission lines 585 by the optical SW 210, and outputs the multiplexed signal to the transmission line 504 connected to any other ground. The wavelength multiplexer/demultiplexer 249 demultiplexes a downlink optical signal input from another ground via the transmission line 504 according to wavelengths. The wavelength multiplexer/demultiplexer 249 inputs the respective demultiplexed downlink optical signals to the optical SW 210 via a plurality of transmission lines 585 connected to the uplink ports corresponding to the wavelengths of the optical signals.

The branching unit 253 includes a power splitter 254. The power splitter 254 branches an uplink optical signal and a downlink optical signal transmitted through the transmission line 504. The power splitter 254 inputs the branched uplink optical signal to the port of the optical SW 210 via the transmission line 586, and inputs the branched downlink optical signal to the port of the optical SW 210 via the transmission line 587. The optical SW 210 outputs the optical signal input from a port connected to the transmission line 586 or the transmission line 587 to a port connected to the transmission line 560.

The wavelength multiplexer/demultiplexer 238 is connected to the optical SW 210 via the transmission line 534, and is connected to the control unit 235 via the transmission line 531 and the transmission line 533. The wavelength multiplexer/demultiplexer 238 separates the input optical signal into an uplink optical signal and a downlink optical signal according to wavelengths. The wavelength multiplexer/demultiplexer 238 outputs the uplink optical signal input from the optical SW 210 via the transmission line 534 to the control unit 235 via the transmission line 531. The wavelength multiplexer/demultiplexer 238 outputs the downlink optical signal input from the control unit 235 via the transmission line 533 to the optical SW 210 via the transmission line 534.

Figure 54:
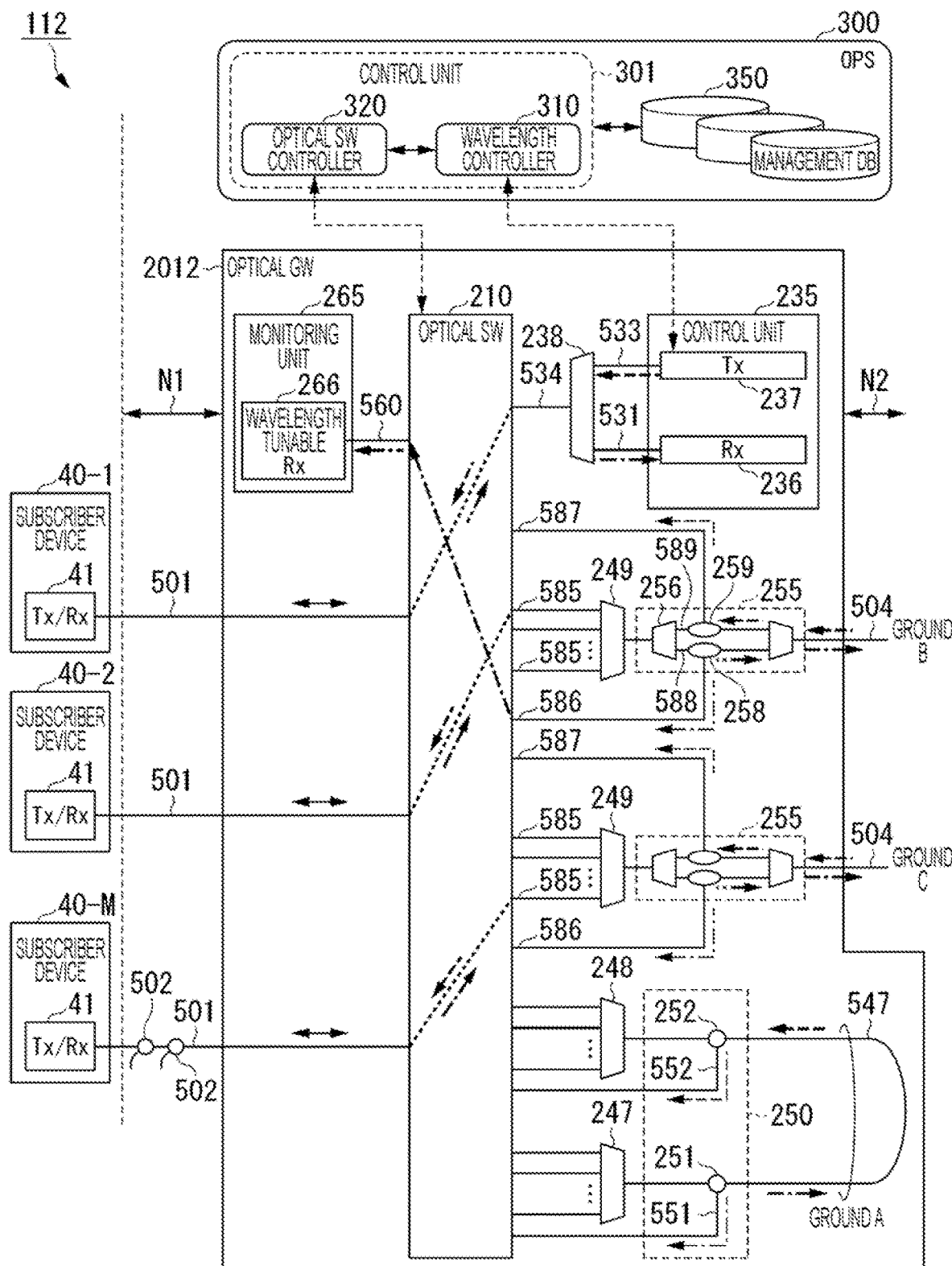
FIG. 54 is a diagram illustrating a configuration example of an optical access system according to a twelfth configuration example.

As described above, the optical GW 2011 has a configuration in which there is no wavelength multiplexer/demultiplexer between the optical SW 210 and the subscriber device 40 and an uplink signal and a downlink signal are not separated. Consequently, the number of ports used for the optical SW 210 can be greatly reduced, and an amount of information to be managed can be greatly reduced. As illustrated in FIG. 54, a portion that separates an optical signal to the monitoring unit 265 may have a configuration illustrated in FIG. 44.

(Twelfth Configuration Example of Optical Access System 100)

FIG. 54 is a diagram illustrating a configuration example of an optical access system 112 according to the present embodiment. An optical GW 2012 of the optical access system 112 illustrated in FIG. 54 includes a branching unit 255 instead of the branching unit 253 included in the optical GW 2011 illustrated in FIG. 53. The branching unit 255 includes a wavelength multiplexer/demultiplexer 256, a wavelength multiplexer/demultiplexer 257, a power splitter 258, and a power splitter 259.

The wavelength multiplexer/demultiplexer 256 separates an input optical signal into an uplink optical signal and a downlink optical signal according to wavelengths. The wavelength multiplexer/demultiplexer 256 outputs the uplink optical signal input from the wavelength multiplexer/demultiplexer 249 to the wavelength multiplexer/demultiplexer 257 via the transmission line 588. The wavelength multiplexer/demultiplexer 256 outputs the downlink optical signal input from the wavelength multiplexer/demultiplexer 257 via the transmission line 589 to the wavelength multiplexer/demultiplexer 249.

The wavelength multiplexer/demultiplexer 257 separates an optical signal into an uplink optical signal and a downlink optical signal according to wavelengths. The wavelength multiplexer/demultiplexer 257 outputs the uplink optical signal input from the wavelength multiplexer/demultiplexer 256 via the transmission line 588 to the transmission line 504. The wavelength multiplexer/demultiplexer 257 inputs a downlink optical signal received from another ground via the transmission line 504 to the wavelength multiplexer/demultiplexer 256 via the transmission line 589.

The power splitter 258 branches an uplink optical signal transmitted through the transmission line 588, and inputs the branched signal to the port of the optical SW 210 via the transmission line 586. The power splitter 259 branches a downlink optical signal transmitted through the transmission line 589, and inputs the branched signal to the port of the optical SW 210 via the transmission line 587. The optical SW 210 outputs the optical signal input from a port connected to the transmission line 586 or the transmission line 587 to a port connected to the transmission line 560.

The optical GW 2011 illustrated in FIG. 53 performs wavelength multiplexing. However, as illustrated in FIG. 55, a signal to be transmitted to each of the stations (the ground B and the ground C) may be transmitted through individual transmission lines without performing wavelength multiplexing.

(Thirteenth Configuration Example of Optical Access System 100)

Figure 55:
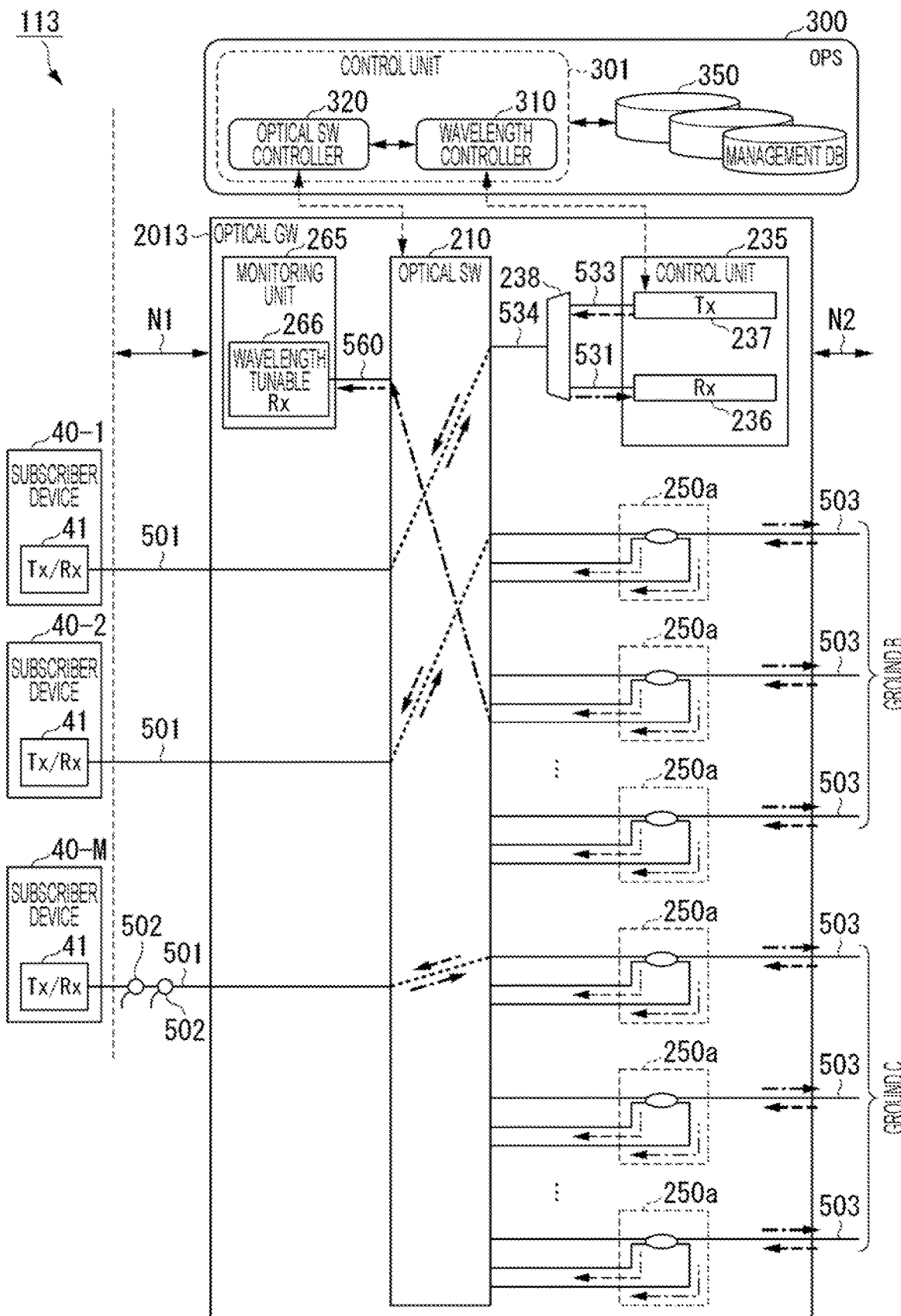
FIG. 55 is a diagram illustrating a configuration example of an optical access system according to a thirteenth configuration example.

FIG. 55 is a diagram illustrating a configuration example of an optical access system 113. The optical access system 113 illustrated in FIG. 55 is different from the optical access system 101 illustrated in FIG. 43 in that an optical GW 2013 is provided instead of the optical GW 201. The optical GW 2013 is different from the optical GW 201 in that the wavelength multiplexer/demultiplexer 220 and the wavelength multiplexer/demultiplexer 243 are not provided, and the control unit 235, the wavelength multiplexer/demultiplexer 238, and the monitoring unit 265 illustrated in FIG. 53 are provided instead of the control unit 230 and the monitoring unit 260. A port of the optical SW 210 connected to the transmission line 503 outputs an uplink optical signal and receives a downlink optical signal.

(Fourteenth Configuration Example of Optical Access System 100)

Figure 56:
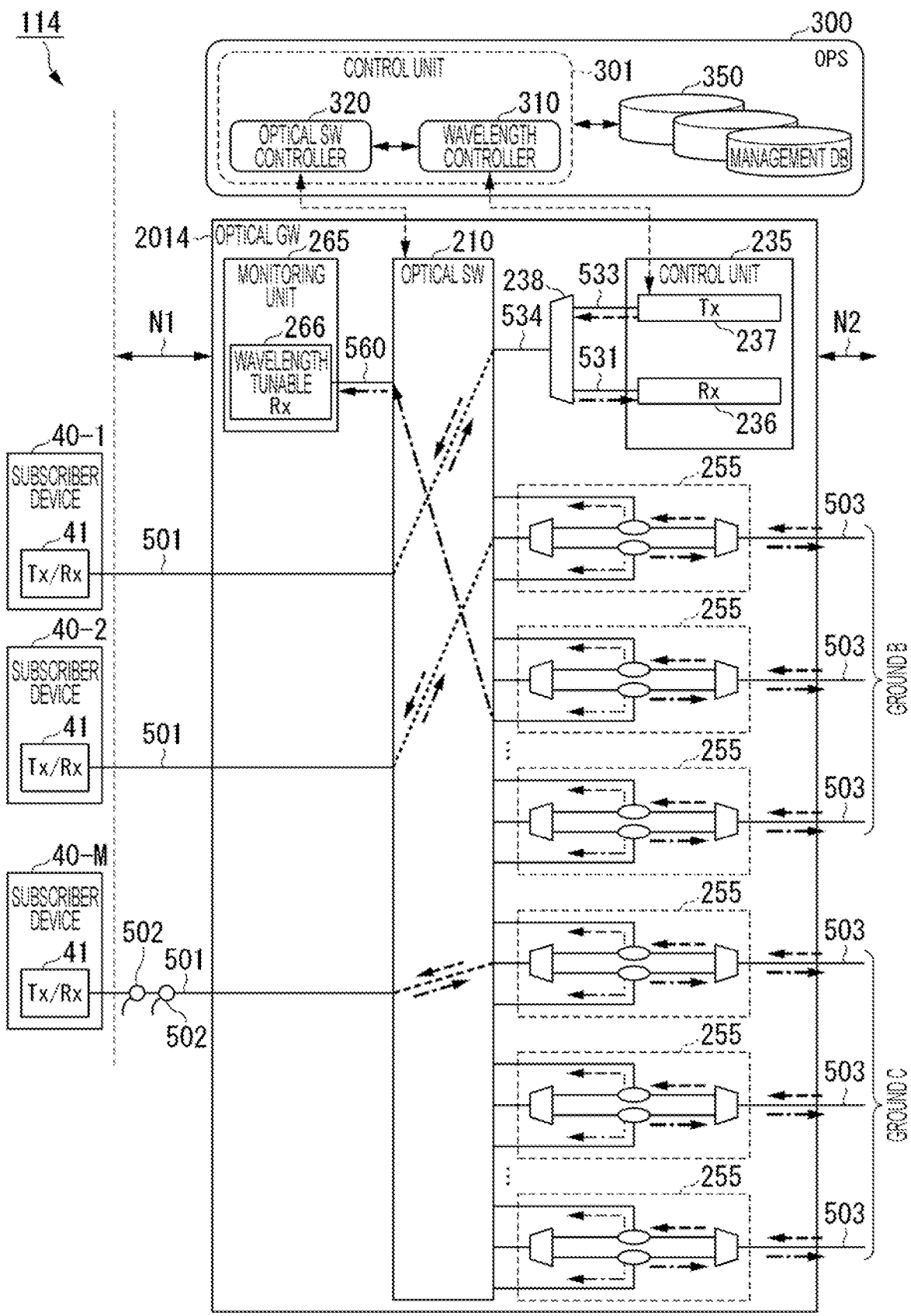
FIG. 56 is a diagram illustrating a configuration example of an optical access system according to a fourteenth configuration example.

The branching unit 250*a* of the optical GW 2013 may have a configuration illustrated in FIG. 56. FIG. 56 is a diagram illustrating a configuration example of an optical access system 114. An optical GW 2014 of the optical access system 114 illustrated in FIG. 56 has a configuration similar to that of the branching unit 255 illustrated in FIG. 54 instead of the branching unit 250*a* included in the optical GW 2013 illustrated in FIG. 55.

(Fifteenth Configuration Example of Optical Access System 100)

The present configuration example enables control of a subscriber device in communication. Hereinafter, a description will focus on differences from each of the above configuration examples.

Figure 57:
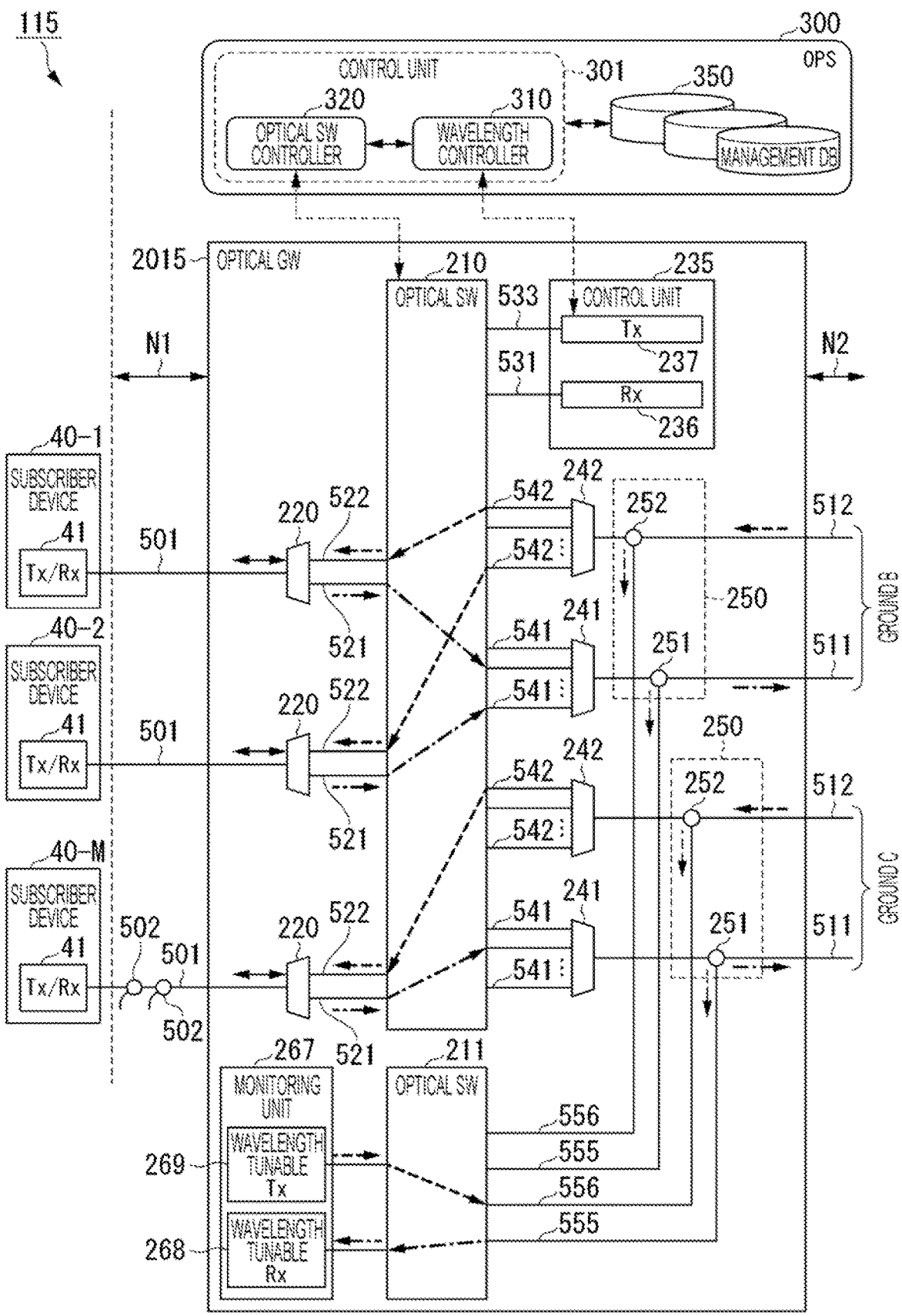
FIG. 57 is a diagram illustrating a configuration example of an optical access system according to a fifteenth configuration example.

FIG. 57 is a diagram illustrating a configuration example of an optical access system 115. The optical access system 115 illustrated in FIG. 57 is different from the optical access system 104 illustrated in FIG. 46 in that an optical GW 2015 is provided instead of the optical GW 204. The optical GW 2015 is different from the optical GW 204 in that a monitoring unit 267 is connected to the optical SW 211 instead of the monitoring unit 265.

The monitoring unit 267 includes a wavelength tunable receiver 268 and a wavelength tunable transmitter 269. The monitoring unit 267 can receive an optical signal having any wavelength with the wavelength tunable receiver 268 and can transmit an optical signal having any wavelength with the wavelength tunable transmitter 269. The optical GW 2015 includes a control unit 235. When the optical GW 2015 is connected to the subscriber device 40, the optical GW 2015 performs a connection process (registration, wavelength allocation, and the like) for the subscriber device 40 by using the control unit 235, and starts normal communication.

Here, a state in which the subscriber device 40-1 is connected to the ground B is considered. The subscriber device 40-1 cannot communicate with the control unit 235 because normal communication is being performed. Therefore, by providing the monitoring unit 267 connected to the optical SW 211 that is a small optical SW, it is possible not only to monitor a communication state of the subscriber device 40-1 but also to give instructions for various settings of the subscriber device 40-1. That is, an optical signal separated by the power splitter 251 is output to the optical SW 211 via the transmission line 555. The optical SW 211 outputs the input optical signal to the monitoring unit 267. The monitoring unit 267 performs monitoring by using the optical signal received from the optical SW 211 by the wavelength tunable receiver 268, and further receives a control signal superimposed on the received optical signal. The wavelength tunable transmitter 269 of the monitoring unit 267 transmits a control signal to the subscriber device 40 by using an optical signal. The optical SW 211 outputs the optical signal input from the wavelength tunable transmitter 269 to a port corresponding to a wavelength. The power splitter 251 multiplexes the control signal input from the optical SW 211 via the transmission line 556 with the optical signal transmitted through the transmission line 512. With this configuration, even in a state in which the subscriber device 40-1 is performing normal communication, it is possible to receive a connection destination change request or the like from the subscriber device 40-1, transmit a control signal, and perform wavelength switching or the like on the subscriber device 40-1.

In communication of a control signal between the monitoring unit 267 and each of the subscriber devices 40, a control signal that is slower than an optical main signal between the subscriber devices and can be superimposed on the main signal is used. For example, a technique such as AMCC may be used.

(Sixteenth Configuration Example of Optical Access System 100)

In the present configuration example, electrical processing is performed on an optical signal extracted from the optical SW. Hereinafter, a description will focus on differences from each of the above configuration examples.

Figure 58:
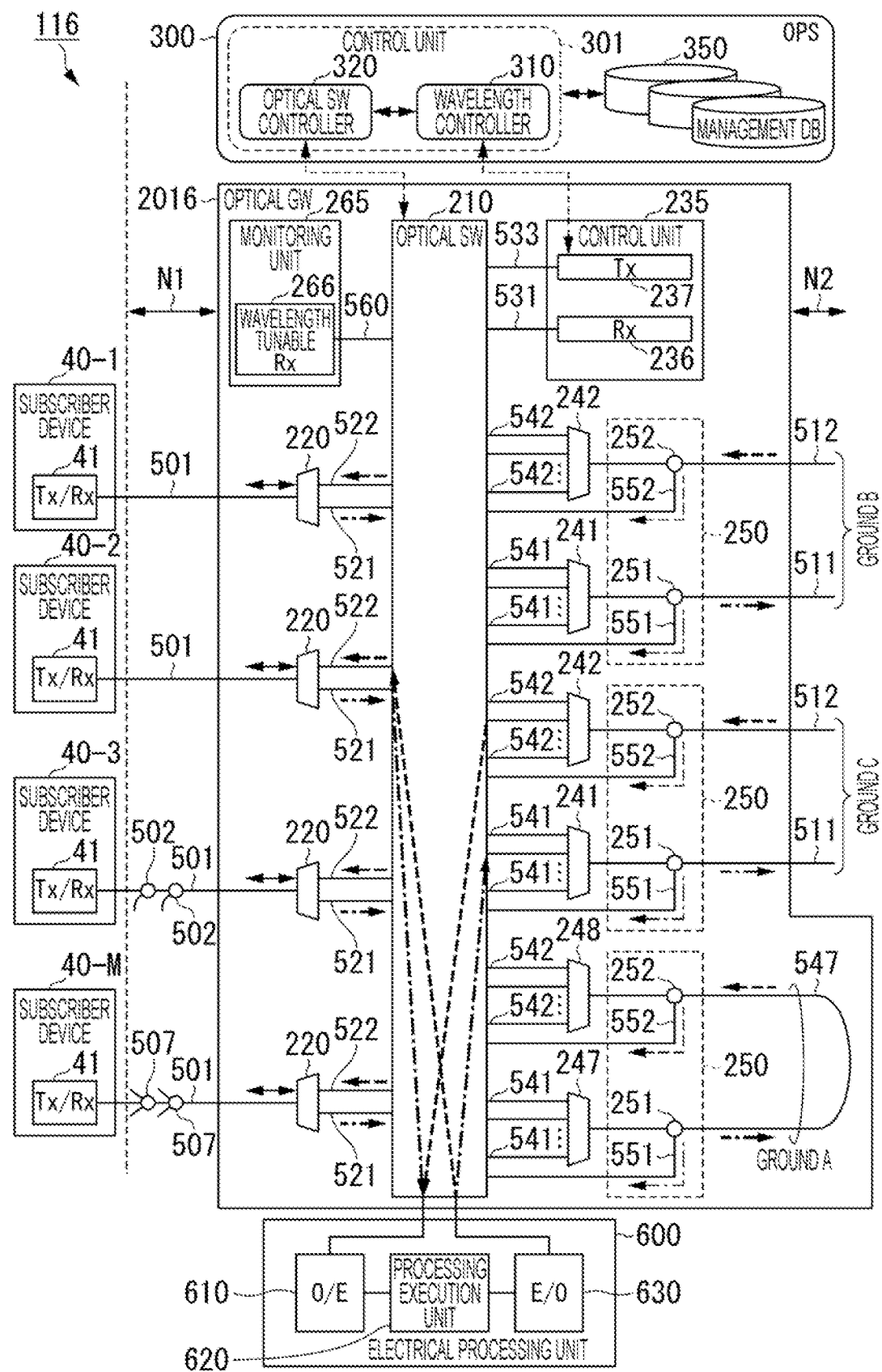
FIG. 58 is a diagram illustrating a configuration example of an optical access system according to a sixteenth configuration example.

FIG. 58 is a diagram illustrating a configuration example of an optical access system 116. The optical access system 116 illustrated in FIG. 58 is different from the optical access system 105 illustrated in FIG. 47 in that an optical GW 2016 is provided instead of the optical GW 202. The optical GW 2016 is different from the optical GW 202 in that an electrical processing unit 600 is connected.

The electrical processing unit 600 converts an optical signal into an electrical signal, performs electrical processing on the electrical signal, converts the electrical signal into an optical signal again, and outputs the optical signal. The electrical processing unit 600 includes an O/E conversion unit 610, a processing execution unit 620, and an E/O conversion unit 630. The O/E conversion unit 610 corresponds to the O/E conversion unit 85 in FIG. 13. The O/E conversion unit 610 converts an optical signal input from the optical SW 210 into an electrical signal and outputs the electrical signal to the processing execution unit 620. The processing execution unit 620 corresponds to the processing execution unit 86 and the storage unit 88 in FIG. 13. The processing execution unit 620 performs electrical processing on the electrical signal converted by the O/E conversion unit 610 by a processor such as a CPU or an accelerator reading a program from a storage unit (not illustrated) and executing the program. In this electrical processing, a function of electrically processing a signal, a function such as an OLT, and the like are realized. The signal processing function is, for example, code error correction such as FEC. The E/O conversion unit 630 corresponds to the E/O conversion unit 87 in FIG. 13. The E/O conversion unit 87 converts the electrical signal into an optical signal and outputs the optical signal to the optical SW 210. The O/E conversion unit 610 and the E/O conversion unit 630 are, for example, wavelength tunable transceivers.

In FIG. 58, the subscriber device 40-M is an ONU of a PON. The subscriber device 40-M is connected to the optical GW 2016 via the transmission line 501 such as an optical fiber and the power splitter 507. The processing execution unit 620 of the electrical processing unit 600 has an error correction function, an OLT function, and the like.

The wavelength controller 310 notifies the processing execution unit 620 of determination conditions for determining a signal that is a target subjected to electrical processing and the type of electrical processing to be performed on the signal. The processing execution unit 620 stores information regarding the determination conditions and the type of electrical processing reported from the wavelength controller 310.

For example, in step S5 in FIG. 42, the wavelength controller 310 determines whether or not to perform electrical processing on communication between the subscriber device 40 (hereinafter, referred to as a request source subscriber device 40) that is a transmission source of the connection request and the communication destination subscriber device 40. The wavelength controller 310 determines whether or not to perform the electrical processing and, in a case where the electrical processing is to be performed, what kind of electrical processing is to be performed according to a distance between the request source subscriber device 40 and the communication destination subscriber device 40 opposing each other, a service to be provided to the request source subscriber device 40 or the communication destination subscriber device 40, or the like. In a case where it is determined that electrical processing (hereinafter, transmission signal electrical processing) is to be performed on a signal addressed to the communication destination subscriber device 40 from the request source subscriber device 40, the wavelength controller 310 allocates a first transmission wavelength and a second transmission wavelength from among free wavelengths. In a case where it is determined that electrical processing (hereinafter, reception signal electrical processing) is to be performed on a signal addressed to the request source subscriber device 40 from the communication destination subscriber device 40, the wavelength controller 310 allocates a first reception wavelength and a second reception wavelength from among free wavelengths.

The first transmission wavelength is a wavelength for routing an optical transmission signal that is an optical signal addressed to the communication destination subscriber device 40 from the request source subscriber device 40, to the electrical processing unit 600. The second transmission wavelength is a wavelength for routing a transmission signal subjected to the transmission signal electrical processing by the electrical processing unit 600 to a port corresponding to the communication destination subscriber device 40. The first reception wavelength is a wavelength for routing a reception signal that is an optical signal addressed to the request source subscriber device 40 from the communication destination subscriber device 40, to the electrical processing unit 600. The second reception wavelength is a wavelength for routing the reception signal subjected to the reception signal electrical processing by the electrical processing unit 600 to a port corresponding to the request source subscriber device 40. The first transmission wavelength and the second transmission wavelength may be the same wavelength, or the first reception wavelength and the second reception wavelength may be the same wavelength.

In a case where it is determined that the transmission signal electrical processing is to be performed, the wavelength controller 310 sets information regarding the first transmission wavelength as a transmission wavelength in a wavelength instruction to be transmitted to the request source subscriber device 40. In a case where it is determined that the reception signal electrical processing is to be performed, the wavelength controller 310 sets information regarding the second reception wavelength as a reception wavelength in a wavelength instruction to be transmitted to the request source subscriber device 40.

In a case where it is determined that the transmission signal electrical processing is to be performed, the OPS 300 gives an instruction for using the second transmission wavelength as a reception wavelength of the communication destination subscriber device 40. In a case where it is determined that the reception signal electrical processing is to be performed, the OPS 300 gives an instruction for using the first transmission wavelength as a transmission wavelength of the communication destination subscriber device 40. For example, in the control unit 301 that controls the optical GW 200 in which the communication destination subscriber device 40 is accommodated, the wavelength controller 310 instructs the control unit 230 to transmit a wavelength instruction in which the reception wavelength and the transmission wavelength of the communication destination subscriber device 40 are set.

In a case where it is determined that the transmission signal electrical processing is to be performed, the wavelength controller 310 generates first instruction information in which determination conditions for determining that a signal is a transmission signal addressed to the communication destination subscriber device 40 from the request source subscriber device 40, the type of transmission signal electrical processing to be performed on the transmission signal, the first transmission wavelength, and the second transmission wavelength are associated with each other. In a case where it is determined that the reception signal electrical processing is to be performed, the wavelength controller 310 generates second instruction information in which determination conditions for determining that a signal is a reception signal addressed to the request source subscriber device 40 from the communication destination subscriber device 40, the type of reception signal electrical processing to be performed on the reception signal, the first reception wavelength, and the second reception wavelength are associated with each other. The wavelength controller 310 transmits an electrical processing execution instruction in which the generated first instruction information and second instruction information are set to the electrical processing unit 600.

In a case where the transmission signal electrical processing is performed, the optical SW controller 320 controls the optical SW 210 such that a transmission signal having the first transmission wavelength transmitted by the request source subscriber device 40 is output to the electrical processing unit 600, and a transmission signal having the second transmission wavelength input from the electrical processing unit 600 is output to the transmission line 541 corresponding to the communication destination subscriber device 40. In a case where the reception signal electrical processing is performed, the optical SW controller 320 controls the optical SW 210 such that a reception signal having the first transmission wavelength input from the transmission line 542 corresponding to the communication destination subscriber device 40 is output to the electrical processing unit 600, and a reception signal having the second transmission wavelength input from the electrical processing unit 600 is output to the transmission line 522 corresponding to the request source subscriber device 40.

For example, it is assumed that transmission signal electrical processing and reception signal electrical processing are performed on an optical signal between the subscriber device 40-2 and the communication destination subscriber device 40 at the ground C. The transmission signal having the first transmission wavelength transmitted by the subscriber device 40-2 is output to the electrical processing unit 600 via the optical SW 210. The O/E conversion unit 610 converts the transmission signal input from the optical SW 210 into an electrical signal. In a case where it is determined that the determination conditions included in the first instruction information are satisfied with reference to predetermined information included in the transmission signal converted into the electrical signal, the processing execution unit 620 performs transmission signal electrical processing corresponding to the determination conditions on the transmission signal. For example, the processing execution unit 620 performs error correction such as forward error correction (FEC). The E/O conversion unit 630 converts the transmission signal of the electrical signal subjected to the error correction by the processing execution unit 620 into an optical signal having the second transmission wavelength indicated by the first instruction information, and outputs the optical signal to the optical SW 210. The optical SW 210 outputs the transmission signal having the second transmission wavelength to the transmission line 541 corresponding to the ground C. By performing error correction, transmission characteristics are improved.

The optical SW 210 outputs the reception signal having the first reception wavelength input from the transmission line 542 corresponding to the communication destination subscriber device 40 at the ground C to the electrical processing unit 600. The O/E conversion unit 610 converts the reception signal input from the optical SW 210 into an electrical signal. In a case where it is determined that the determination conditions included in the second instruction information are satisfied with reference to predetermined information included in the transmission signal converted into the electrical signal, the processing execution unit 620 performs reception signal electrical processing corresponding to the determination conditions on the reception signal. The E/O conversion unit 630 converts the reception signal of the electrical signal subjected to the reception signal electrical processing by the processing execution unit 620 into an optical signal having the second reception wavelength indicated by the second instruction information, and outputs the optical signal to the optical SW 210. The optical SW 210 outputs the transmission signal having the second reception wavelength to the transmission line 522 corresponding to the subscriber device 40-2.

Figure 59:
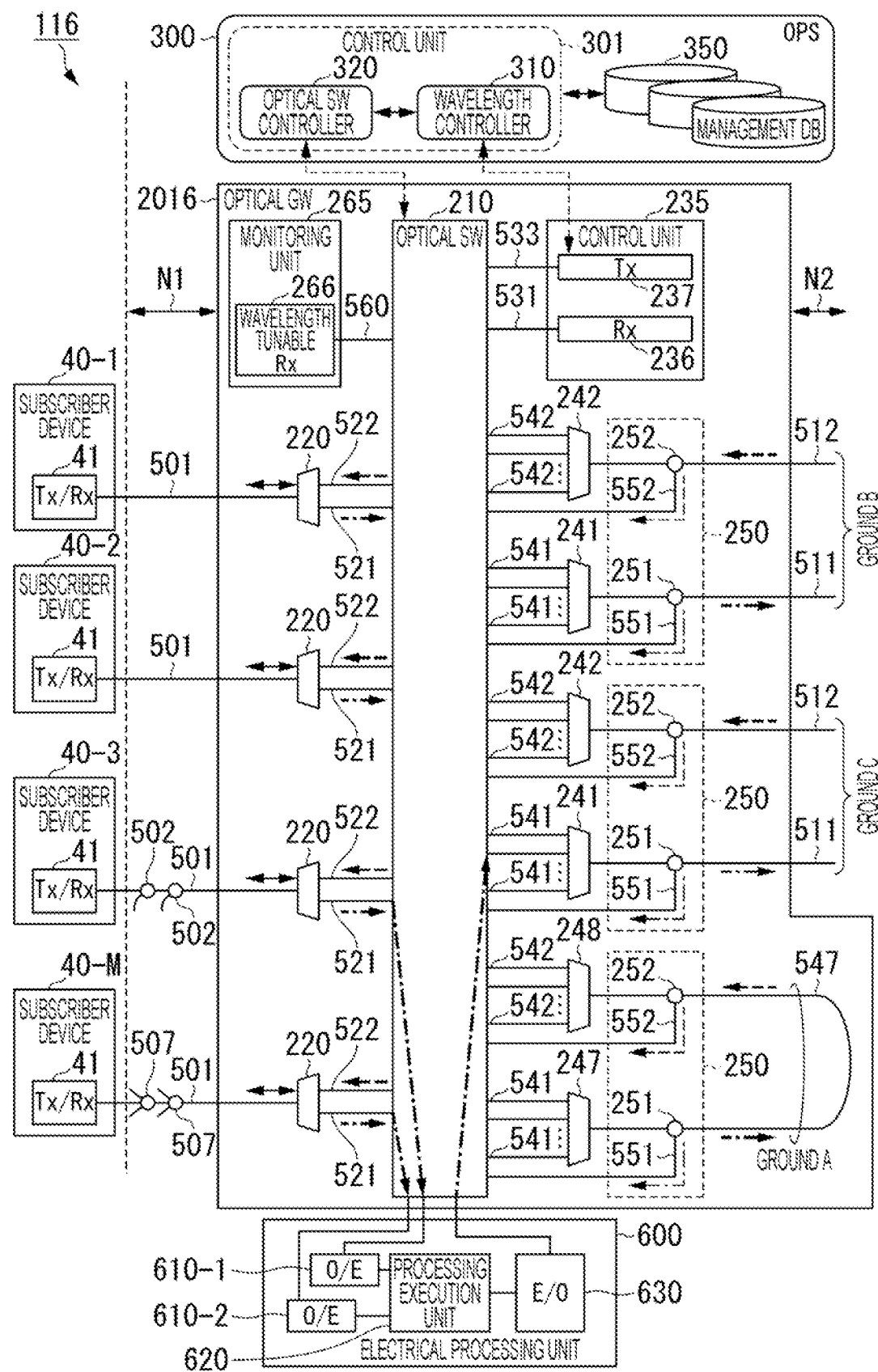
FIG. 59 is a diagram illustrating a configuration example of an optical access system according to the sixteenth configuration example in a case where an electrical processing unit multiplexes signals.

FIG. 59 is a diagram illustrating a configuration example of the optical access system 116 in a case where the electrical processing unit 600 multiplexes signals. The electrical processing unit 600 includes O/E conversion units 610-1 and 610-2 as a plurality of O/E conversion units 610.

An uplink optical signal of the subscriber device 40-3 and an uplink optical signal of the subscriber device 40-M are input to the electrical processing unit 600 via the optical SW 210. The electrical processing unit 600 has an OLT function. The processing execution unit 620 of the electrical processing unit 600 performs processing at an electrical stage of the OLT function. A plurality of subscriber devices 40 are connected to an OLT. The processing execution unit 620 having the OLT function collectively manages the subscriber devices 40.

The O/E conversion unit 610-1 converts the uplink optical signal of the subscriber device 40-3 input from the optical SW 210 into an electrical signal and outputs the electrical signal to the processing execution unit 620. The O/E conversion unit 610-2 converts the uplink optical signal of the subscriber device 40-M input from the optical SW 210 into an electrical signal and outputs the electrical signal to the processing execution unit 620. The processing execution unit 620 combines the uplink electrical signals transmitted from the subscriber device 40-3 and the subscriber device 40-M into one signal, and outputs the signal to the E/O conversion unit 630. The E/O conversion unit 630 converts the uplink electrical signal output from the processing execution unit 620 into an optical signal according to a wavelength designated from the control unit 230, and outputs the optical signal to the optical SW 210. The optical SW 210 outputs the uplink optical signal input from the electrical processing unit 600 to the transmission line 541 corresponding to the ground C. As described above, the electrical processing unit 600 receives each of a plurality of optical signals dropped by the optical GW 2016 and converts the optical signal into an electrical signal, multiplexes the signals related to the same target ground with the multiplexing circuit, converts the multiplexed signal into an optical signal again, and transmits the optical signal to the optical GW 2016. Consequently, a transmission rate can be maximized. FIGS. 58 and 59 illustrate an example in which one electrical processing unit is provided, but a plurality of electrical processing units may be provided.

The power splitter 507 between the subscriber device 40 and the optical GW 2016 may be a wavelength multiplexer/demultiplexer. For example, in a case where the optical access system 116 is a WDM-PON, a wavelength demultiplexer is used between the subscriber device 40 and the optical GW 2016.

(Seventeenth Configuration Example of Optical Access System 100)

The present configuration example is a mode in which optical SWs at different ground are connected in a ring form. Hereinafter, a description will focus on differences from each of the above configuration examples.

Figure 60:
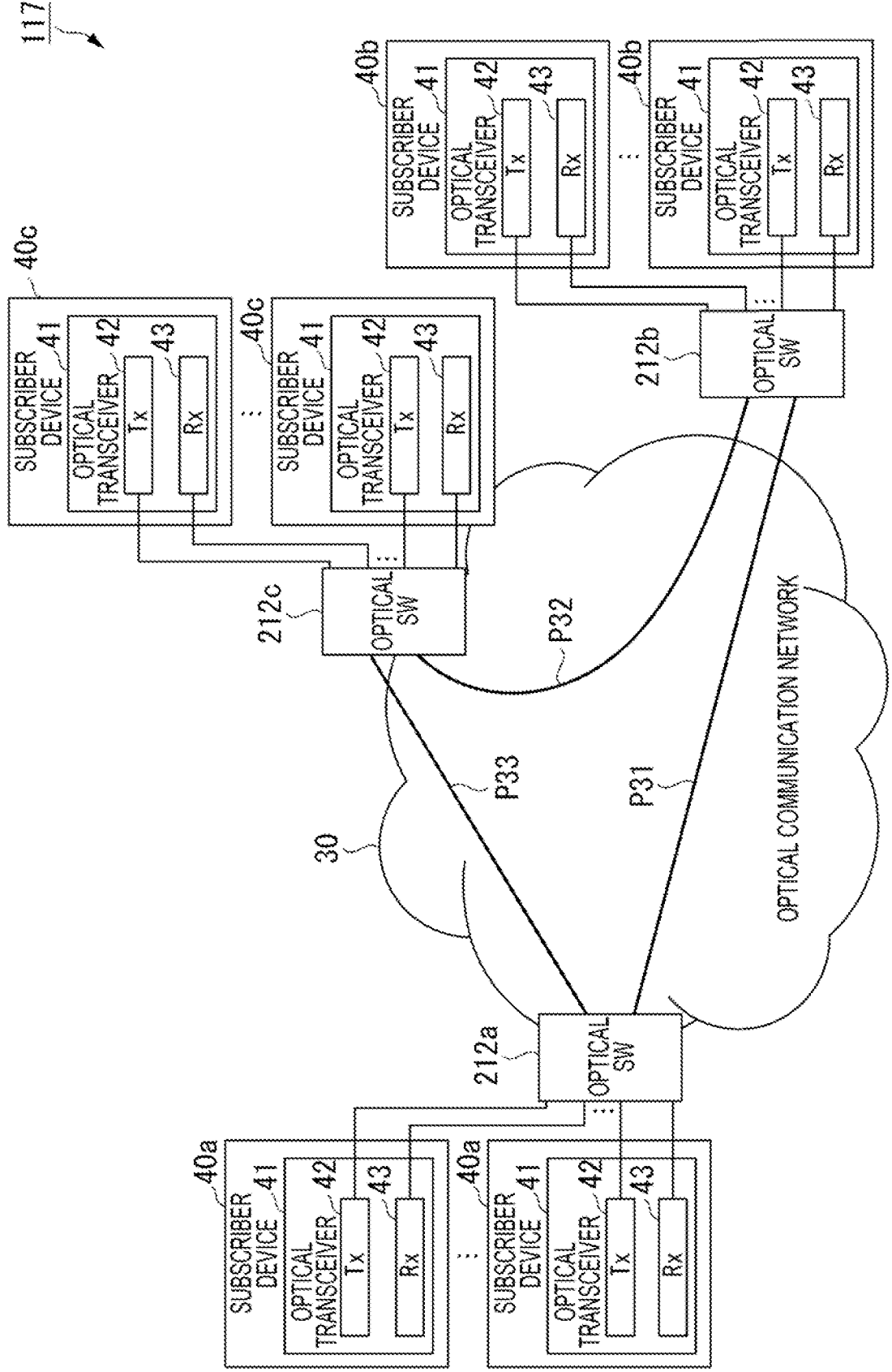
FIG. 60 is a diagram illustrating a configuration example of an optical access system according to a seventeenth configuration example.

FIG. 60 is a diagram illustrating a configuration example of an optical access system 117. The optical access system 117 has a configuration in which optical SWs 212 at three or more different grounds are connected in a ring form via the optical communication network 30. In the example illustrated in FIG. 60, the optical access system 117 has a configuration in which an optical SW 212a that is the optical SW 212 at the ground A, an optical SW 212b that is the optical SW 212 at the ground B, and an optical SW 212c that is the optical SW 212 at the ground C are connected in a ring form. A path between the optical SW 212a and the optical SW 212b in the optical communication network 30 will be referred to as a path P31, a path between the optical SW 212b and the optical SW 212c in the optical communication network 30 will be referred to as a path P32, and a path between the optical SW 212c and the optical SW 212a in the optical communication network 30 will be referred to as a path P33. One or more subscriber devices 40a are connected to the optical SW 212a, one or more subscriber devices 40b are connected to the optical SW 212b, and one or more subscriber devices 40c are connected to the optical SW 212c.

As the optical SW 212, the above-described optical SW or optical GW is used. For example, the ground B in FIGS. 6 to 10, 38, and 43 to 59 is defined as a counterclockwise ground in the ring illustrated in FIG. 60, and the ground C in FIGS. 6 to 10, 38, and 43 to 59 is defined as a clockwise ground in the ring illustrated in FIG. 60. In this case, the optical SW 212a at the ground A is connected to the optical SW 212b at the ground B via the path P31, and the optical SW 212b at the ground B is connected to the optical SW 212a at the ground A via the path P32, the optical SW 212-c at the ground C, and the path P33. The optical SW 212a at the ground A is connected to the optical SW 212c at the ground C via the path P33, and the optical SW 212c at the ground C is connected to the optical SW 212a at the ground A via the path P32, the optical SW 212b at the ground B, and the path P31.

Thus, with the counterclockwise connection from the optical SW 212a at the ground A to the optical SW 212b at the ground B as a backup system, connection based on the clockwise path connecting the optical SW 212a at the ground A to the optical SW 212b at the ground B via the optical SW 212c at the ground C is also possible, and counterclockwise connection is also possible. Similarly, with clockwise connection from the optical SW 212a at the ground A to the optical SW 212c at the ground C as a backup system, connection based on counterclockwise path connecting the optical SW 212-a at the ground A to the optical SW 212c at the ground C via the optical SW 212b at the ground B is also possible, and clockwise connection is also possible.

As a backup system of connection between the subscriber devices 40a connected to the optical SW 212a at the ground A, a counterclockwise path passing through the path P31, the optical SW 212b at the ground B, the path P32, the optical SW 212c at the ground C, and the path P33, or a counterclockwise path passing through the path P33, the optical SW 212c at the ground C, the path P32, the optical SW 212b at the ground B, and the path P31 may be used.

For example, in FIG. 14, the medium-distance line P2 may be a counterclockwise path of the ring, and the medium-distance line P3 may be a clockwise path of the ring. Any one of the grounds #1 to #q in FIGS. 16 and 19 may be a counterclockwise ground of the ring, and another may be a clockwise ground of the ring. In a case where FIGS. 27 and 28 illustrate the optical SW 1010 in one GW, any one of the uplink #11 to the uplink #43 may be set as a counterclockwise path of the ring, and another may be set as a clockwise path of the ring. Here, a path not selected as the path of the ring may be a path of the ring similarly to the path selected as the path of the ring, may be an oblique line other than the ring, may be connected to the subscriber device 40, or may be connected to another optical SW 1010 illustrated in FIGS. 27 and 28.

In the above description, as a basic configuration, when multicast is performed, uplink or downlink multicast is realized via the return transmission line as illustrated in FIG. 4 or 5. For example, in the example illustrated in FIG. 4, in order to realize uplink multicast, the optical signal output from the port 11-2 of the optical SW 10c is input to the other port 11-2 via the return transmission line, and the optical SW 10c outputs the input optical signal to the port 11-1 to which the 1×N power splitter 71 is connected. The optical signal output from the port 11-1 is divided by the power splitter 71 and input to a plurality of other ports 11-1, and thus uplink multicast is realized. However, in such a configuration, since it is necessary to use a port for return when multicast is performed, the number of ports in use may increase. Such a problem occurs not only in a case where multicast routing is performed but also in a case where broadcast routing is performed. Therefore, in the following embodiments, a configuration for reducing the number of ports when multicast or broadcast routing is performed will be described. In the following description of the embodiments, the control unit 20 and the OPS 300 are not illustrated in the drawings, but in the optical access system, wavelength setting and connection setting of the optical SW by the control unit 20 or the OPS 300 are performed.

First Embodiment

In the following embodiments including the present embodiment, uplink multicast from the subscriber device 40a connected to the port 11-1 to the subscriber device 40b or 40c connected to the port 11-2 or an uplink will be mainly described. However, if the port 11-1 and the port 11-2 are interchanged in line symmetry in the center optical SW 210, an uplink or multicast from the subscriber device 40b or 40c connected to the port 11-2 to the subscriber device 40a connected to the port 11-1 or the like is performed. Also in broadcast, a flow of processing is similar to that in multicast.

Figure 61:
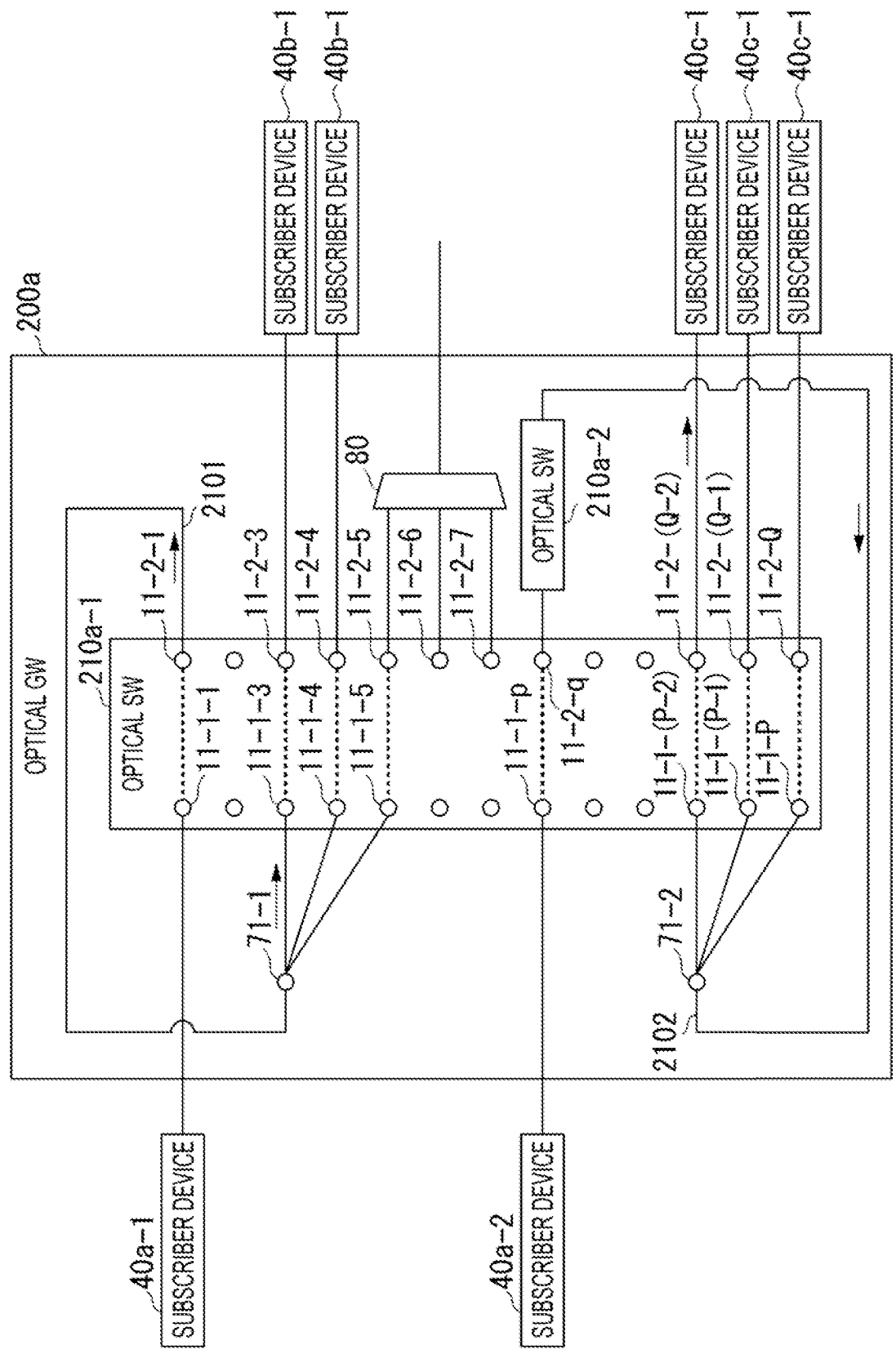
FIG. 61 is a diagram illustrating a configuration example of an optical GW in an optical access system according to a first embodiment.

FIG. 61 is a diagram illustrating a configuration example of an optical GW 200a in the optical access system of the first embodiment. In FIG. 61, a case of multicasting uplink optical signals transmitted from the subscriber devices 40a-1 and 40a-2 located at the ground A will be described. Here, in the description, as illustrated in FIG. 61, it is assumed that ports connected by a dotted line are connected inside the optical SW 210a. This connection between the ports is executed by the optical SW controller 320 (not illustrated).

The optical GW 200a returns an optical signal output from the port 11-2 without using the optical SW 210a-1, and inputs the optical signal to the power splitter 71 connected to the port 11-1. This enables multicast. FIG. 61 illustrates two configurations, that is, a configuration in which the optical signal passes through another optical switch and a configuration in which the optical signal does not pass through another optical switch when the optical signal is returned without passing through the optical SW 210*a*-1. Hereinafter, each configuration will be described.

(Configuration in which Signal does not Pass Through Another Optical Switch)

In the configuration in which a signal does not pass through another optical switch, the optical GW 200*a* includes an optical SW 210*a*-1, a transmission line 2101, and a power splitter 71-1. The transmission line 2101 connects a port (for example, the port 11-2-1) on the output side of the optical SW 210*a*-1 and the power splitter 71-1 via the outside of the optical SW 210*a*-1. The connection via the outside of the optical SW 210*a*-1 means that a signal does not pass through the inside (between ports) of the optical SW 210*a*-1. That is, the transmission line 2101 is a transmission line that is provided outside the optical SW 210*a*-1 and directly connects the port 11-2-1 and the power splitter 71-1. The transmission line 2101 is, for example, an optical fiber. The power splitter 71-1 divides the input optical signal into a plurality of optical signals, and inputs the plurality of divided optical signals to different ports 11-1. A new power splitter may be provided between the power splitter 71-1 and the port 11-1. In this case, the power splitter 71-1 divides the input optical signal into a plurality of optical signals, and inputs some or all of the plurality of divided optical signals to the port 11-1 via the power splitter.

A flow of processing in a case where the optical GW 200*a* has the configuration in which a signal does not pass through another optical switch will be described. In FIG. 61, the optical GW 200*a* outputs, from the port 11-2-1, an optical signal transmitted by the subscriber device 40*a*-1 and input to the port 11-1-1. The optical signal output from the port 11-2-1 is input to the power splitter 71-1 connected to the plurality of ports 11-1-*n* to 11-1-(*n*+2) via the transmission line 2101. For example, in FIG. 61, the power splitter 71-1 is connected to the ports 11-1-3 to 11-1-5.

The power splitter 71 divides the input optical signal and inputs the divided optical signals to the plurality of ports 11-1-3 to 11-1-5. The optical SW 210*a*-1 outputs the optical signals input from the plurality of ports 11-1-3 to 11-1-5 to different ports 11-2-3 to 11-2-5, respectively. Bidirectional communication may also be performed. The optical signal in the downlink direction is routed in a reverse direction to the uplink direction.

In this case, the uplink direction is related to one-to-many communication, and the downlink direction is related to many-to-one communication. In this case, the power splitter 71 is used as a combining/branching device. The power splitter 71 used here has H×I input/output ports. H and I are integers of 1 or more, and H≤I. In the case of H=1 and I=2, the power splitter 71, for example, branches an optical signal in the uplink direction and multiplexes optical signals in the downlink direction. In the example in FIG. 61, the power splitter 71 branches the input optical signal, inputs the branched optical signals to the plurality of ports 11-1-3 to 11-1-5, multiplexes optical signals respectively output from the plurality of ports 11-1-3 to 11-1-5, and outputs the multiplexed optical signal to the transmission line 2101.

In order to realize the above processing, in a case where a multicast transmission request is made from the subscriber device 40*a*-1, the optical SW controller 320 connects the port 11-1-1 to which the subscriber device 40*a*-1 is connected and the port 11-2-1 to which the power splitter 71-1 for performing multicast is connected. Consequently, the optical signal transmitted from the subscriber device 40*a*-1 is output from the port 11-2-1. The optical SW controller 320 connects the ports 11-1-3 to 11-1-5 to which the power splitter 71-1 is connected and the port 11-2 (in FIG. 61, 11-2-3 to 11-2-5) corresponding to the transfer destination on the path to the communication destination. Consequently, each optical signal branched by the power splitter 71-1 is output from the port 11-2 to which the destination subscriber device 40*b* is connected. With such a configuration, the optical signal is returned to enable multicast.

In the case of downlink multicast, the following applies.

The optical GW 200*a* includes an optical SW 210*a*-1, a transmission line, and a power splitter. The transmission line connects a port (for example, the port 11-1-1) on the output side of the optical SW 210*a*-1 and the power splitter via the outside of the optical SW 210*a*-1. The transmission line is a transmission line that directly connects the port 11-1-1 and the power splitter. The transmission line is, for example, an optical fiber. The power splitter divides an input optical signal into a plurality of optical signals, and inputs the plurality of divided optical signals to different ports 11-2. The optical SW 210*a*-1 outputs the optical signal input to the port 11-2-1 from the port 11-1-1. The optical signal output from the port 11-1-1 is input to the power splitter connected to the plurality of ports 11-2-*n* to 11-2-(*n*+2) via the transmission line. For example, the power splitter is connected to the ports 11-2-3 to 11-2-5.

The power splitter divides the input optical signal and inputs the divided optical signals to the plurality of ports 11-2-3 to 11-2-5. The optical SW 210*a*-1 outputs the optical signals input from the plurality of ports 11-2-3 to 11-2-5 to the different ports 11-1-3 to 11-1-5, respectively.

(Configuration in which Signal Passes Through Another Optical Switch)

In the configuration in which a signal passes through another optical switch, the optical GW 200*a* includes an optical SW 210*a*-1, an optical SW 210*a*-2, a transmission line 2102, and a power splitter 71-2. The optical SW 210*a*-2 is connected to a port (for example, the port 11-2-*q*) on the output side of the optical SW 210*a*-1. The transmission line 2102 connects the optical SW 210*a*-2 and the power splitter 71-2 via the outside of the optical SW 210*a*-1. The optical SW 210*a*-2 outputs an optical signal output from the port 11-2 on the output side of the optical SW 210*a*-1 to the power splitter 71-2 via the transmission line 2102. The power splitter 71-2 divides the input optical signal into a plurality of optical signals, and inputs the plurality of divided optical signals to different ports 11-1. A new power splitter may be provided between the power splitter 71-2 and the port 11-1. In this case, the power splitter 71-1 divides the input optical signal into a plurality of optical signals, and inputs some or all of the plurality of divided optical signals to the port 11-1 via the power splitter. The optical GW 200*a* may have only one or both of a configuration in which a signal does not pass through another optical switch and a configuration in which a signal passes through another optical switch.

A flow of processing in a case where the optical GW 200*a* has the configuration in which a signal passes through another optical switch will be described. In FIG. 61, the optical GW 200*a* outputs an optical signal transmitted by the subscriber device 40*a*-2 and input to the port 11-1-*p* from the port 11-2-*q*. The optical signal output from the port 11-2-1 is input to the optical SW 210*a*-2. The optical SW 210*a*-2 outputs the optical signal output from the port 11-2-*q* to the power splitter 71-2 connected to the plurality of ports 11-1-(P−2) to 11-1-P via the transmission line 2102.

The power splitter 72 divides the input optical signal and inputs the divided optical signals to the plurality of ports 11-1-(P−2) to 11-1-P. The optical SW 210a-1 outputs the optical signals input from the plurality of ports 11-1-(P−2) to 11-1-P to different ports 11-1-(Q−2) to 11-1-Q, respectively. Bidirectional communication may also be performed. The optical signal in the downlink direction is routed in a reverse direction to the uplink direction. In this case, the uplink direction is related to one-to-many communication, and the downlink direction is related to many-to-one communication. In this case, the power splitter 71 is used as a combining/branching device. The power splitter 71 used here has H×I input/output ports. In the case of H=1 and I=2, the power splitter 71, for example, branches an optical signal in the uplink direction and multiplexes optical signals in the downlink direction. In the example in FIG. 61, the power splitter 71 branches the input optical signal, inputs the branched optical signals to the plurality of ports 11-1-(Q−2) to 11-1-Q, multiplexes the optical signals output from the plurality of ports 11-1-(Q−2) to 11-1-Q, and outputs the multiplexed optical signal to the transmission line 2102.

In order to realize the above processing, in a case where a multicast transmission request is made from the subscriber device 40a-2, the optical SW controller 320 connects the port 11-1-p to which the subscriber device 40a-2 is connected and the port 11-2-q to which the power splitter 71-2 for performing multicast is connected. Consequently, the optical signal transmitted from the subscriber device 40a-2 is output from the port 11-2-q. The optical SW controller 320 connects the ports 11-1-(P−2) to 11-1-P to which the power splitter 71-2 is connected and the port 11-2 (in FIG. 61, 11-2-(Q−2) to 11-2-Q) corresponding to the transfer destination on the path to the communication destination. Consequently, each optical signal branched by the power splitter 71-2 is output from the port 11-2 to which the destination subscriber device 40c is connected. With such a configuration, the optical signal is returned to enable multicast to the destination.

In the case of downlink multicast, the following applies.

The optical GW 200a includes an optical SW 210a-1, an optical SW 210a-2, a transmission line, and a power splitter. The optical SW 210a-2 is connected to a port (for example, port 11-1-q) on the output side of the optical SW 210a-1. The transmission line connects the optical SW 210a-2 and the power splitter via the outside of the optical SW 210a-1. The optical SW 210a-2 outputs an optical signal output from the port on the output side of the optical SW 210a-1 to the power splitter via the transmission line. The power splitter divides an input optical signal into a plurality of optical signals, and inputs the plurality of divided optical signals to different ports 11-2. The optical GW 200a may have only one or both of a configuration in which a signal does not pass through another optical switch and a configuration in which a signal passes through another optical switch.

According to the optical GW 200a configured as described above, the port of the optical SW 210a-1 is not used as a return path when multicast or broadcast routing is performed. Therefore, even in a case where routing is performed, the number of paths inside the optical SW 210a-1 is reduced by one path, that is, one port for each of the ports 11-1-p and 11-2-q. Therefore, it is possible to transmit an optical signal according to a transfer destination on a path to a communication destination while reducing the number of use ports when multicast or broadcast routing is performed in the optical SW 210a-1.

In the first embodiment, a power splitter is mainly used, but a multiplexer/demultiplexer may be used in a case of performing multicast in which a signal is demultiplexed for each wavelength (effectively, unicast in which a signal is demultiplexed according to wavelengths).

Second Embodiment

In the first embodiment, the configuration in which an optical signal output from the port 11-2 once via the optical SW is returned via the outside of the optical SW has been described. In this case, in order to return the optical signal, it is necessary to transmit the optical signal between the ports of the optical SW once, and thus the corresponding number of ports cannot be used. Therefore, in the second embodiment, a configuration for reducing the number of ports when multicasting is performed compared with the first embodiment will be described. Also in broadcast, a flow of processing is similar to that in multicast.

Figure 62:
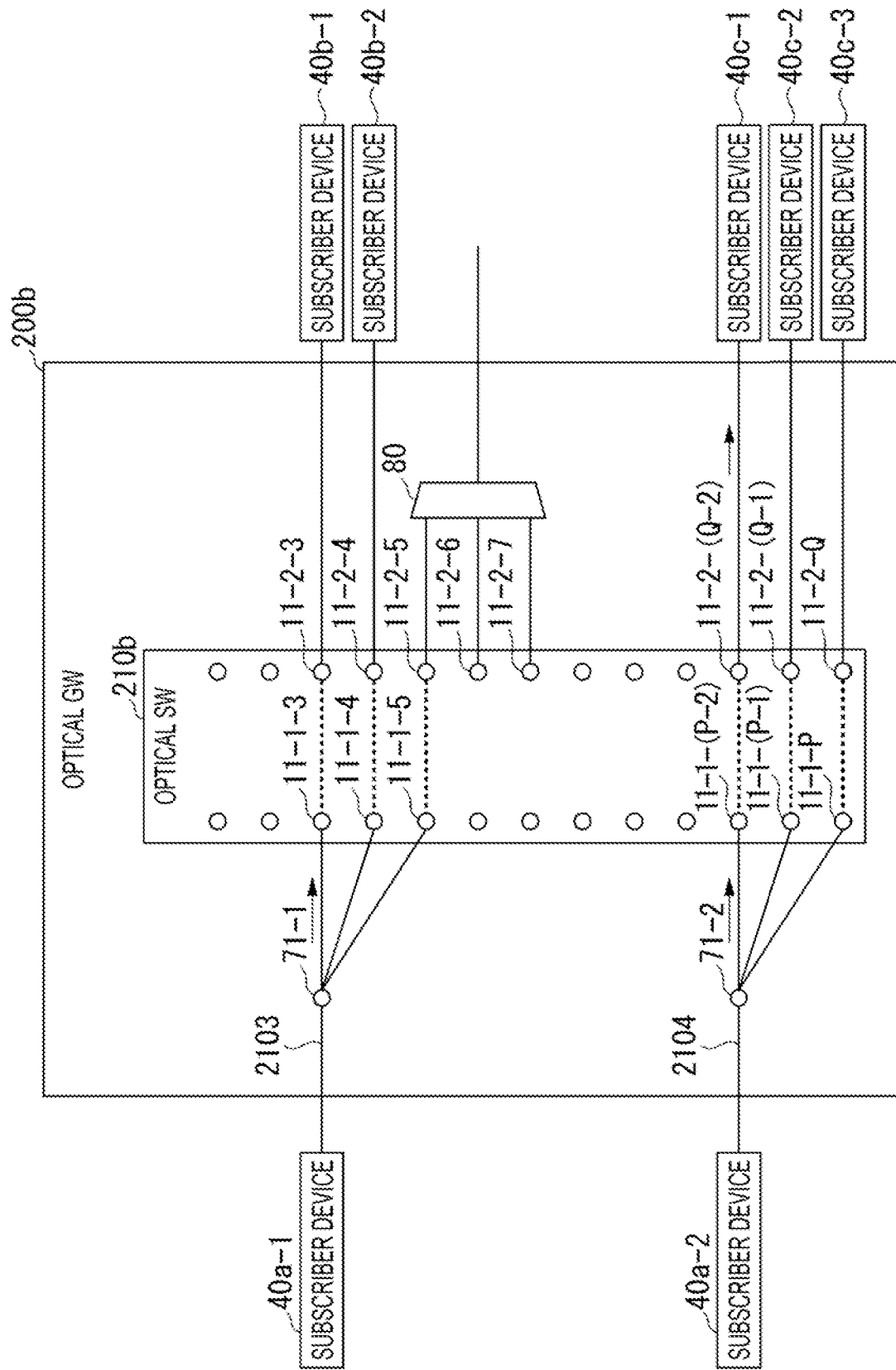
FIG. 62 is a diagram illustrating a configuration example of an optical GW in an optical access system according to a second embodiment.

FIG. 62 is a diagram illustrating a configuration example of an optical GW 200b in the optical access system of the second embodiment. In FIG. 62, a case of multicasting uplink optical signals transmitted from the subscriber devices 40a-1 and 40a-2 located at the ground A will be described. Here, in the description, as illustrated in FIG. 62, it is assumed that ports connected by a dotted line are connected inside the optical SW 210b. This connection between the ports is executed by the optical SW controller 320 (not illustrated).

The optical GW 200b divides an optical signal output from the subscriber device 40a-1 into a plurality of optical signals, and inputs the plurality of divided optical signals to different ports 11-1. Consequently, multicast can be performed by reducing one set of ports for returning an optical signal. The optical GW 200b includes power splitters 71-1 and 71-2. The optical GW 200b may include either the power splitter 71-1 or the power splitter 71-2, or may include both.

In FIG. 62, the power splitter 71-1 divides an optical signal output from the subscriber device 40a-1 into a plurality of optical signals, and inputs the plurality of divided optical signals to different ports 11-1 (in FIG. 62, the ports 11-1-3 to 11-1-5). The power splitter 71-1 is connected to the subscriber device 40a-1 via the transmission line 2103. The power splitter 71-2 divides the optical signal output from the subscriber device 40a-2 into a plurality of optical signals, and inputs the plurality of divided optical signals to different ports 11-1 (in FIG. 62, 11-1-(P−2) to 11-1-P). The power splitter 71-2 is connected to the subscriber device 40a-2 via the transmission line 2104. New power splitters may be provided between the power splitter 71-1 and the port 11-1 and between the power splitter 71-2 and the port 11-1. In this case, each of the power splitters 71-1 and 71-2 divides an input optical signal into a plurality of optical signals, and inputs some or all of the plurality of divided optical signals to the ports 11-1 via the power splitter.

As described above, in the second embodiment, the power splitter 71 or the power splitter 72 is provided at the preceding stage with respect to inputting the optical signal to the port 11-1, and the optical signal output from the subscriber device 40a is multicasted. The optical SW 210b outputs the optical signals input from the plurality of ports 11-1 to different ports 11-2, respectively. Bidirectional communication may also be performed. The optical signal in the downlink direction is routed in a reverse direction to the uplink direction. In this case, the power splitter 71 is used as a combining/branching device. The power splitter 71 used here has H×I input/output ports. In the case of H=1 and I=2, the power splitter 71, for example, branches an optical signal in the uplink direction and multiplexes optical signals in the downlink direction. In the example in FIG. 62, the power splitter 71 branches the input optical signal, inputs the branched optical signals to the plurality of ports 11-1-3 to 11-1-5, multiplexes the optical signals respectively output from the plurality of ports 11-1-3 to 11-1-5, and outputs the multiplexed optical signal to the subscriber device 40a-1.

In order to realize the above processing, in a case where a multicast transmission request is made from the subscriber device 40a, the optical SW controller 320 connects the port 11-1 to which the power splitter 71 to which the subscriber device 40a that is a transmission source of the transmission request is connected is connected and the port 11-2 corresponding to the transfer destination on the path to the communication destination. Consequently, the optical signal transmitted from the subscriber device 40a is branched into a plurality of optical signals by the power splitter 71, and each of the plurality of branched optical signals is output from port 11-2 that is a transfer destination on the path to the communication destination. Such a configuration enables multicast to a destination while reducing the number of ports.

According to the optical GW 200b configured as described above, the return path as described in the basic configuration or the first embodiment is not used to perform multicast. Therefore, the number of ports used for the return path can be reduced. For example, in the second embodiment, compared with the first embodiment, the number of paths inside the optical SW 210b is further reduced by one path, that is, by one port of each of the ports 11-1-$p$ and 11-2-$q$. Thus, it is possible to transmit an optical signal according to a transfer destination on a path to a communication destination while reducing the number of ports to be used in the optical SW 210b.

In the second embodiment, a power splitter is mainly used, but a multiplexer/demultiplexer may be used in a case of performing multicast in which a signal is demultiplexed for each wavelength (effectively, unicast in which a signal is demultiplexed according to wavelengths).

Third Embodiment

In the second embodiment, although the number of ports can be reduced, when the subscriber device 40a is connected, it is necessary to select whether to connect the subscriber device 40a to the power splitter or to connect the subscriber device 40a to a port not connected to the power splitter. As described above, in the second embodiment, in a case where a communication source starts or stops multicast, a port to be connected is changed. In the third embodiment, a configuration for suppressing a port change will be described. In such a configuration, the above-described optical SW is replaced with a set of cascade-connected optical SWs.

Figure 63:
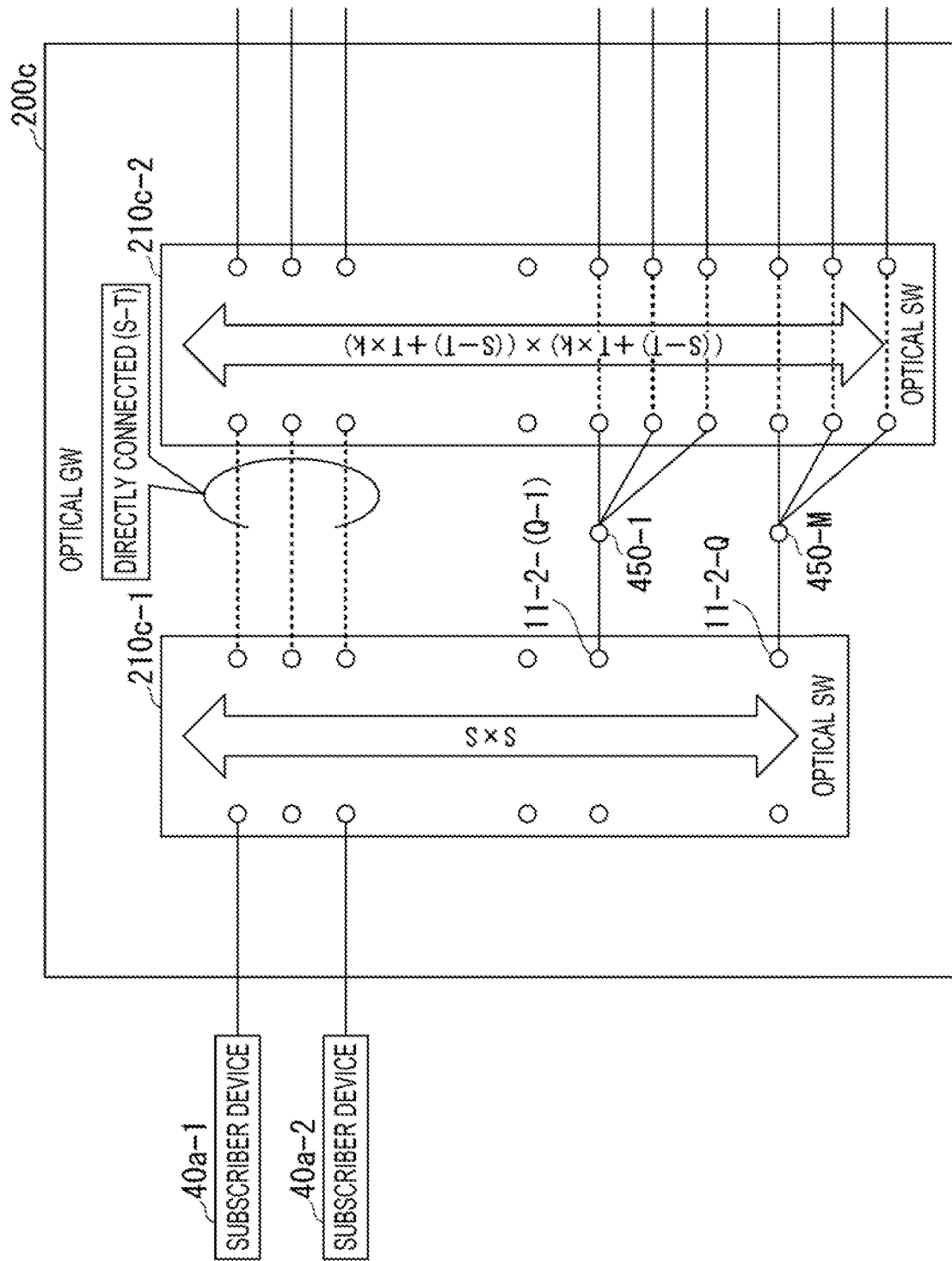
FIG. 63 is a diagram illustrating a configuration example of an optical GW in an optical access system according to a third embodiment.

FIG. 63 is a diagram illustrating a configuration example of an optical GW 200c in the optical access system of the third embodiment. In FIG. 63, for simplification of description, an optical SW having a (11-1-P)×(11-2-Q) configuration will be described as a symmetric SW of S×S or the like (where S is an integer of 1 or more), but the optical SW can be easily expanded even in a case of an asymmetric optical SW such as a SW having the (11-1-P)×(11-2-Q) configuration.

The optical GW 200c illustrated in FIG. 63 includes a first optical switch 210c-1, a second optical switch 210c-2, and power splitters 450-1 to 450-M. The first optical switch 210c-1 and the second optical switch 210c-2 are cascade-connected. In the cascade configuration of the optical GW 200c in the third embodiment, the first optical switch 210c-1 of S×S and the second optical switch 210c-2 of ((S−T)+T×k)×((S−T)+T×k) are used. Here, S is the number of subscriber devices 40a, T is the number of ports to be branched, and k is the number of branches for each port. The number of ports to be branched is the number of ports to which a power splitter is connected.

In a case where the number of branches k is different for each port, T×k is replaced with a sum of the number of branches of the port. Outputs corresponding to the branched T ports in the optical SW 210c-1 of S×S are connected to ports of the optical SW 210c-2 of ((S−T)+T×k)×((S−T)+T×k)) via the power splitters 450-1 to 450-M, and outputs corresponding to the remaining (S−T) ports are directly connected to ports thereof.

Effects achieved by the third embodiment will be described.

The SW sizes of the two optical SWs illustrated in FIG. 63 are $S^2$ for the first stage and $((S-T)+T\times k)^2 = (S+T\times(k-1))^2$ for the second stage. Therefore, the maximum size $(S+T\times k)^2$ decreases to $(S+T\times (k-1))^2$, and a total number of SW fabrics does not decrease at $(S+T\times k)^2 - \{(S)^2 + [(S+T\times (k-1))^2]\} = S(2S-2k+1) - S^2$.

Although all the ports are connected, there may be a free port or a port connected to an electrical processing unit or the like. Here, a configuration in a case where the electrical processing unit or the like is connected in the third embodiment will be described. In the optical GW 200c, the electrical processing unit is connected via an optical SW (for example, the optical switch 210c-1) near the subscriber device 40a before a signal is multicasted or in a case where a signal passes through the optical SW without being multicasted, and the electrical processing unit is connected via another optical SW (for example, the optical switch 210c-2) in a case where a signal passes through each optical SW after being multicasted. It is preferable to pass through before multicast in a case where forward error correction (FEC), encryption, or the like is collectively processed, and it is preferable to pass through after multicast in a case where FEC, encryption, or the like is changed for each destination.

In the third embodiment, bidirectional communication is also possible. The optical signal in the downlink direction is routed in a reverse direction to the uplink direction. In this case, the power splitter 450 is used as a combining/branching device. The power splitter 450 used here has H×I input/output ports. In the case of H=1 and I=2, the power splitter 450, for example, branches an uplink optical signal and multiplexes downlink optical signals. In the example in FIG. 63, the power splitter 450 branches an input optical signal, inputs the branched optical signals to a plurality of ports of the optical SW 210c-2, multiplexes optical signals respectively output from the plurality of ports of the optical SW 210c-2, and outputs the multiplexed optical signal to the port 11-2 (for example, the port 11-2-(Q−1)) of the optical SW 210c-1.

Fourth Embodiment

Figure 64:
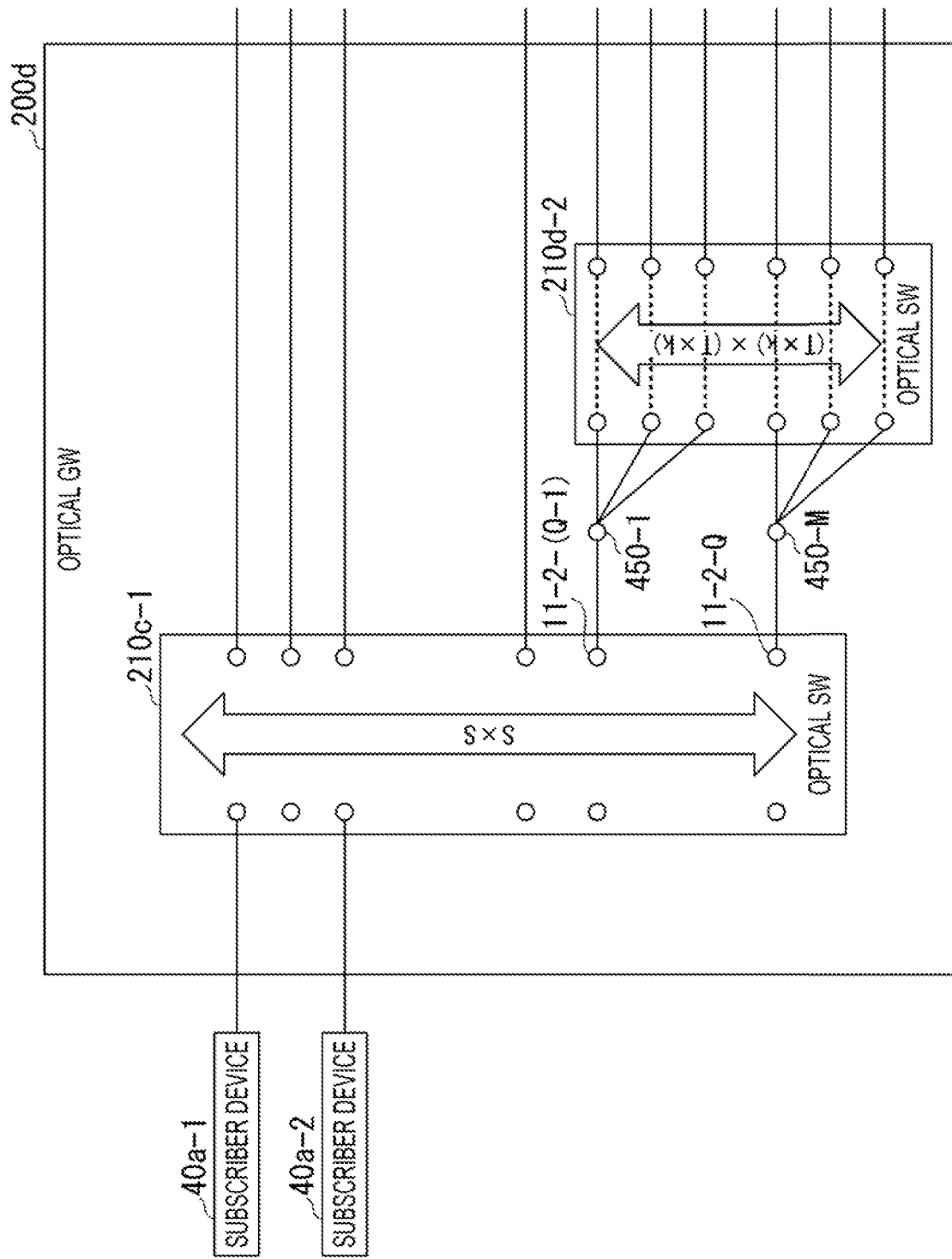
FIG. 64 is a diagram illustrating a configuration example of an optical GW in an optical access system according to a fourth embodiment.

FIG. 64 is a diagram illustrating a configuration example of an optical GW 200d in the optical access system of the third embodiment. In FIG. 64, for simplification of description, an optical SW having a (11-1-P)×(11-2-Q) configuration will be described as a symmetric SW of S×S or the like, but the optical SW can be easily expanded even in a case of an asymmetric optical SW such as a SW having the (11-1-P)×(11-2-Q) configuration.

The optical GW 200d illustrated in FIG. 64 includes a first optical switch 210c-1, a second optical switch 210d-2, and power splitters 450-1 to 450-M. The optical GW 200d is different from the optical GW 200c in that the second optical switch 210d-2 is provided instead of the second optical switch 210c-2. In the cascade configuration of the optical GW 200d in the fourth embodiment, an optical SW of S×S and an optical SW of (T×k)×(T×k) are used.

In a case where the number of branches k is different for each port, T×k is replaced with a sum of the number of branches of the port. Outputs corresponding to branched T ports in the optical SW 210c-1 of S×S are connected to the second optical switch 210d-2 via the power splitters 450-1 to 450-M. Outputs corresponding to the remaining (S−T) ports do not pass through the second optical switch 210d-2.

Effects achieved by the fourth embodiment will be described.

The SW sizes of the two optical SWs illustrated in FIG. 64 are $S^2$ for the first stage and $(T \times k)^2$ for the second stage. Therefore, the maximum size $(S+T \times k)^2$ decreases to MAX $(S^2, (T \times k)^2)$, and a total number of SW fabrics decreases by $(S+T \times k)^2 - \{(S)^2+(T \times k)^2\} = 2STk$.

Although all the ports are connected, there may be a free port or a port connected to an electrical processing unit or the like. Here, a configuration in a case where the electrical processing unit or the like is connected in the fourth embodiment will be described. In the optical GW 200d, the electrical processing unit is connected via an optical SW (for example, the optical switch 210c-1) near the subscriber device 40a before a signal is multicasted or in a case where a signal passes through the optical SW without being multicasted, and the electrical processing unit is connected via another optical SW (for example, the optical switch 210d-2) in a case where a signal passes through each optical SW after being multicasted. It is preferable to pass through before multicast in a case where forward error correction (FEC), encryption, or the like is collectively processed, and it is preferable to pass through after multicast in a case where FEC, encryption, or the like is changed for each destination.

In the fourth embodiment, bidirectional communication is also possible. The optical signal in the downlink direction is routed in a reverse direction to the uplink direction. In this case, the power splitter 450 is used as a combining/branching device. The power splitter 450 used here has H×I input/output ports. In the case of H=1 and I=2, the power splitter 450, for example, branches an uplink optical signal and multiplexes downlink optical signals. In the example in FIG. 64, the power splitter 450 branches an input optical signal, inputs the branched optical signals to a plurality of ports of the optical SW 210d-2, multiplexes optical signals respectively output from the plurality of ports of the optical SW 210d-2, and outputs the multiplexed optical signal to the port 11-2 (for example, the port 11-2-(Q−1)) of the optical SW 210c-1.

Fifth Embodiment

In the basic configuration, as illustrated in FIGS. 3 to 5, the configuration in which the power splitter or the WDM device is not provided in the return transmission line, and the ports are directly connected to each other to return an optical signal has been described. In the fifth embodiment, a variation of a configuration of returning an optical signal will be described. For example, a return transmission line may be configured by a network that is returned via a network of an optical SW or the like in an intermediate layer, such as a folded Clos network. The return transmission line may be configured such that some ports of some input/output SWs of the folded Clos network to an intermediate layer SW and some ports of the intermediate layer SW are disposed on 11-2-Q side, and some of the ports of some input/output SWs to the intermediate layer SW and some of the ports of the intermediate layer SW are disposed on 11-2-Q side. Consequently, the optical SW enables return communication.

Figure 65:
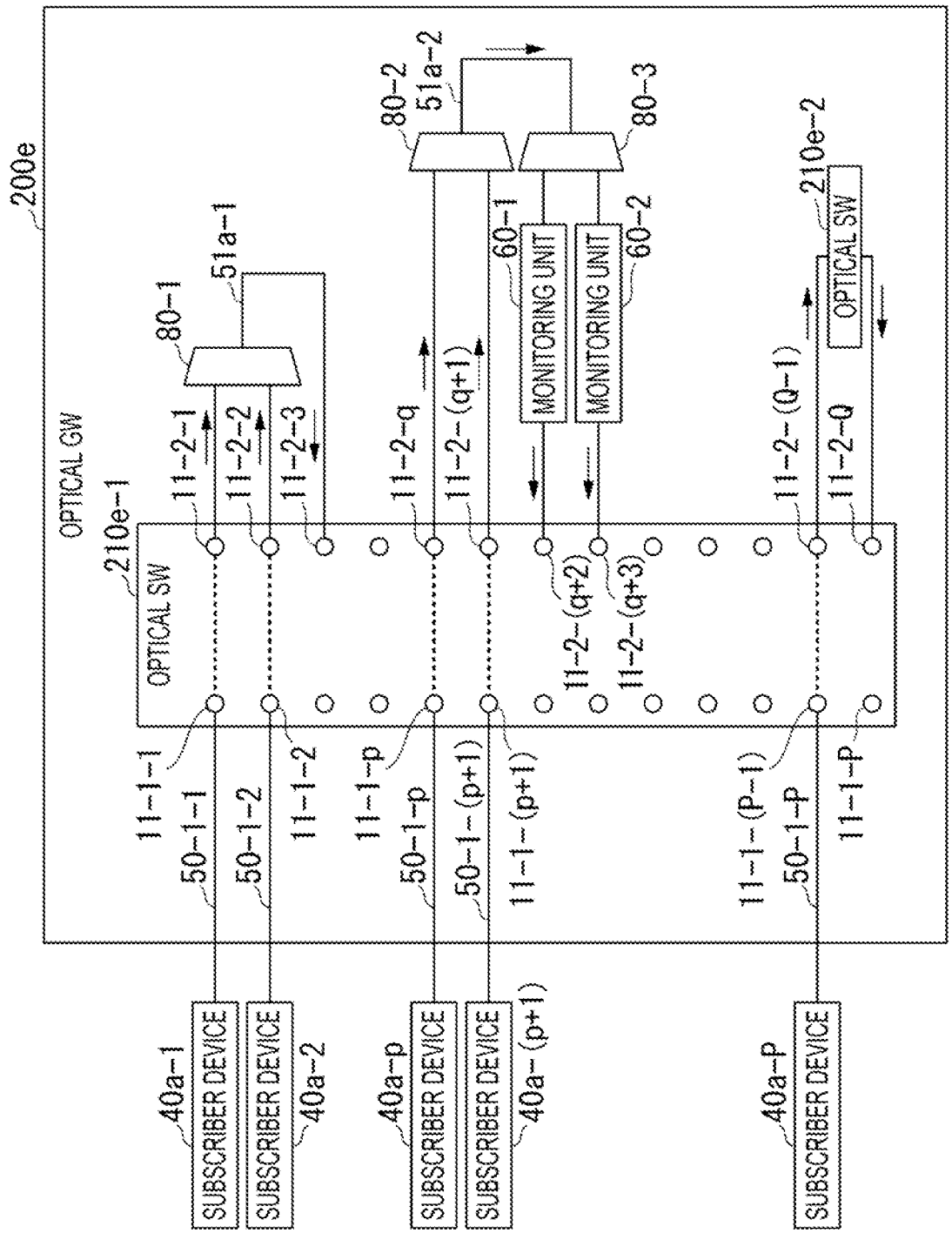
FIG. 65 is a diagram illustrating a configuration example of an optical GW in an optical access system according to a fifth embodiment.

FIG. 65 is a diagram illustrating a configuration example of an optical GW 200e in the optical access system of the fifth embodiment. In FIG. 65, three configurations (first to third configurations) will be described as variations of the configuration of returning an optical signal.
(First Configuration of Returning Optical Signal)

In the first configuration of returning an optical signal, the optical GW 200e includes an optical SW 210e-1 and a WDM device 80-1. The subscriber devices 40a-1 and 40a-2 are connected to the ports 11-1-1 and 11-1-2 of the optical GW 200e via transmission lines 50-1-1 and 50-1-2. The WDM device 80-1 is connected to the ports 11-2-1 and 11-2-2 of the optical GW 200e. The subscriber devices 40a-1 and 40a-2 transmit and receive optical signals having different wavelengths. The WDM device 80-1 multiplexes optical signals respectively output from the ports 11-2-1 and 11-2-2 and outputs the multiplexed optical signal to a return transmission line 51a-1. The return transmission line 51a-1 is connected to the port 11-2-3. With such a configuration, an optical signal can be returned.
(Second Configuration of Returning Optical Signal)

In the second configuration of returning an optical signal, the optical GW 200e includes an optical SW 210e-1, a plurality of WDM devices 80-2 and 80-3, and a plurality of monitoring units 60-1 and 60-2. The subscriber devices 40a-p and 40a-(p+1) are connected to the ports 11-1-p and 11-1-(p+1) of the optical GW 200e via transmission lines 50-1-p and 50-1-(p+1). The WDM device 80-2 is connected to the ports 11-2-q and 11-2-(q+1) of the optical GW 200e.

The subscriber devices 40a-p and 40a-(p+1) transmit and receive optical signals having different wavelengths. The WDM device 80-2 multiplexes optical signals respectively output from the ports 11-2-1 and 11-2-2 and outputs the multiplexed optical signal to a return transmission line 51a-2. The return transmission line 51a-2 is connected to the WDM device 80-3. The WDM device 80-3 demultiplexes the input optical signal and outputs the demultiplexed optical signals to the monitoring units 60-1 and 60-2, respectively. The monitoring units 60-1 and 60-2 monitor optical signals transmitted through the transmission lines. With such a configuration, an optical signal can be returned.
(Third Configuration of Returning Optical Signal)

In the third configuration of returning an optical signal, the optical GW 200e includes an optical SW 210e-1 and an optical SW 210e-2. The subscriber device 40a-P is connected to the port 11-1-(P−1) of the optical GW 200e via a transmission line 50-1-P. The optical SW 210e-2 is connected to the port 11-2-(Q−1) of the optical GW 200e. The subscriber devices 40a-P transmit and receive optical signals. The optical SW 210e-1 outputs an optical signal input from the port 11-1-(P−1) from the port 11-2-(Q−1). The optical signal output from the port 11-2-(Q−1) is output to the optical SW 210e-2. The optical SW 210e-2 outputs the input optical signal to the port 11-2-Q. With such a configuration, an optical signal can be returned.

According to the optical GW 200e configured as described above, a configuration for return communication other than the configuration illustrated in the basic configuration can be applied. Consequently, the degree of freedom of combination is improved, and convenience can be improved.

Next, a configuration for reducing the number of ports to be used of an optical SW accommodating the subscriber device 40 will be presented. Here, the optical SW 1010 illustrated in FIGS. 27 and 28 will be described as an example, but the optical SW can be similarly applied to other optical SWs (for example, the optical SW 10 and the optical SW 210) described above.

In the configuration illustrated in FIGS. 27 and 28, for example, when viewed from the subscriber device 40 (in FIGS. 27 and 28, the ONU) on the port 11-1 side as a transmission line, it clearly corresponds to an increase in the number of connections of output paths connected to the port 11-2. Therefore, in a case where the optical SW 1010 is connected to the subscriber device 40 on the port 11-1 side of another optical SW 1010 (for example, optical SW 1010-2 to 1010-4) as described above and the optical SW 1010 is connected in the full mesh type as illustrated in FIG. 27, six ports are occupied with the port 11-1 (for example, the port 11-1-1 (connected to the ONU #11)) and the port 11-2 (for example, the port 11-2-*q*1 (connected to *a)) of the optical SW 1010-1, the port 11-1 and the port 11-2 (for example, the port 11-1-*p*1 (connected to *a) and the port 11-2-*x* (connected to the return transmission line) of the optical SW 1010-2 to which the opposing subscriber device 40 is connected on the port 11-1 side, the port 11-2 and the port 11-2 (for example, the port 11-2-*y* and the port 11-2-*z*) connected to and the return transmission line, and the port 11-1 (for example, the port 11-1-1 (connected to the ONU #21)) to which the opposing ONU is connected. The same applies to a case where a return transmission line is provided in the optical SW 1001.

In the case of being connected in the ring form as illustrated in FIG. 28, eight ports are occupied with the port 11-1 and the port 11-2 (for example, the port 11-1-1 (connected to ONU #11) and port 11-2-*q*1 (connected to *a)) of the optical SW 1010-1, the port 11-1 and the port 11-2 (for example, the port 11-1-*p*1 (connected to *a) and the port 11-2-*q*1 (connected to *d)) of the intermediate optical SW 1010-2, the port 11-1 and the port 11-2 (for example, the port 11-1-*p*1 (connected to *d) and the port 11-2-*x* (connected to the return transmission line) of the optical SW 1010-3 to which the opposing subscriber device 40 is connected on the port 11-1 side, the port 11-2 and the port 11-2 (for example, port 11-2-*y*, port 11-2-*z*) connected to the return transmission line, and the port 11-1 (for example, the port 11-1-1 (connected to the ONU #21) to which the opposing ONU is connected. The same applies to a case where a return transmission line is provided in the optical SW 1010-1 or the optical SW 1010-2.

Figure 66:
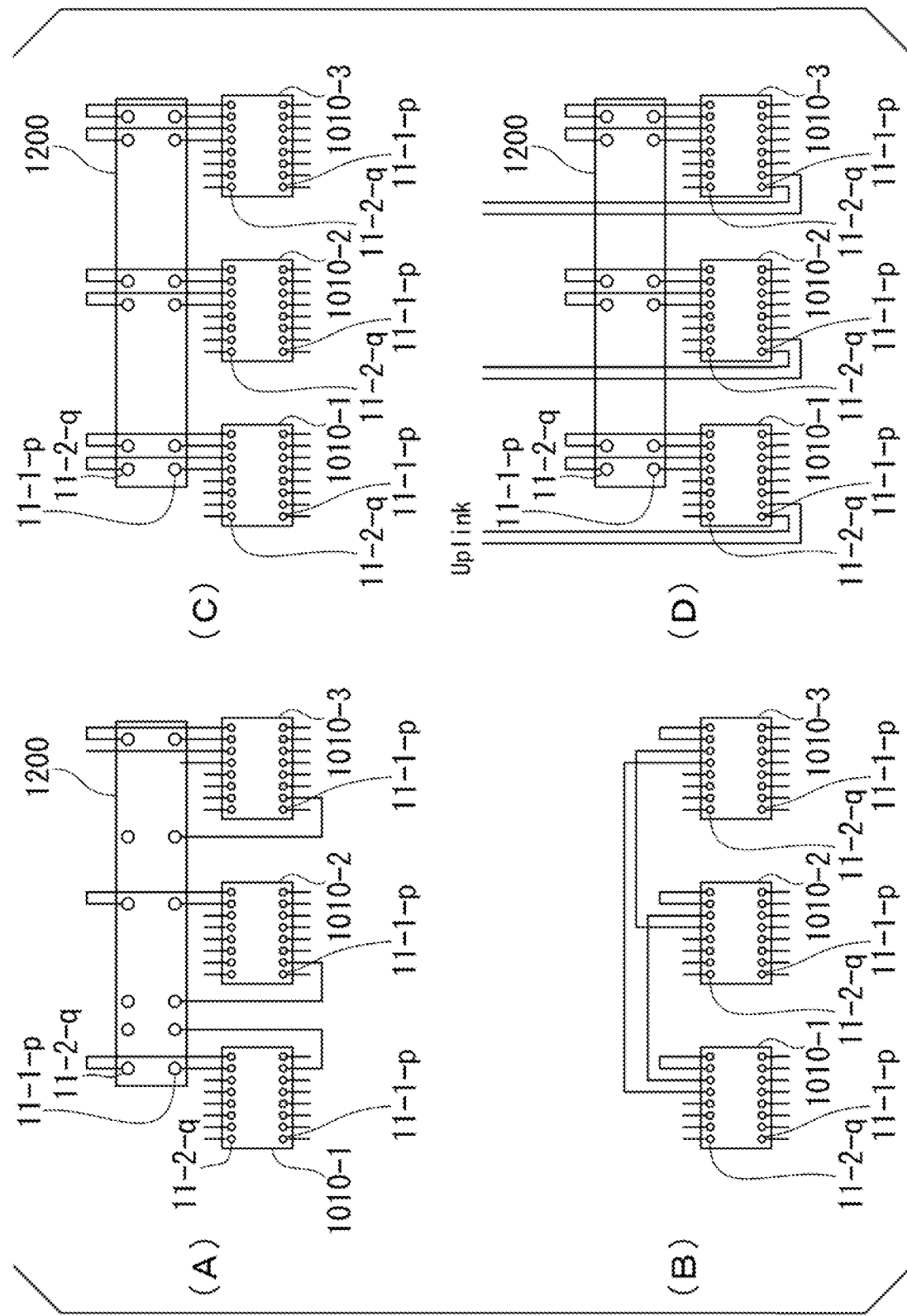
FIG. 66 is a diagram illustrating another aspect of scalability of the optical SW.

In view of the above, a configuration for reducing the number of ports to be used of an optical SW accommodating the subscriber device 40 will be described with reference to FIG. 66. In FIG. 66, four configurations are illustrated as configurations for reducing the number of ports to be used of the optical SW.

(First Configuration)

As illustrated in FIG. 66(A), in a first configuration, the optical SW 1010-1 to the optical SW 1010-3 and the optical SW 1200 are illustrated. In the first configuration, from the viewpoint of improving the degree of freedom of connection for changing a ratio of ports of an optical SW delivered to a transmission line crossing the optical SW, the transmission line crossing the optical SW is the optical SW 1200. A configuration of the optical SW 1200 is basically similar to that of the other optical SWs 1010. In a case where the transmission line crossing the optical SW is the optical SW, the number of ports to be used of the optical SW accommodating the subscriber device 40 can be reduced.

Means for reducing the number of ports to be used of the optical SW accommodating the subscriber device 40 will be described. In FIG. 27, crossing transmission lines connected to each of the optical SWs 1010-1 to 1010-4 are illustrated as one set, but the crossing transmission lines are occupied from a single optical SW 1010 and connected to an ONU of the same optical SW. For example, in the example in FIG. 27, in a case where the ONU #11, the ONU #12, and the ONU #13 are connected to the ONU #21, the ONU #22, and the ONU #23, 22 ports including, for example, 6 ports, 8 ports, and 8 ports are occupied via another optical SW. In contrast, as illustrated in FIG. 66 (A), in a case where the transmission line crossing the optical SW is the optical SW 1200, 18 ports are sufficient as ports of the optical SW 1010-1 and the optical SW 1010-2 that accommodate the subscriber device 40. The optical SWs 1010-1 to 1010-4 are an aspect of a plurality of optical switches. In this description, the optical SW 1010-1 will be described as an aspect of a first optical switch among the plurality of optical switches, and the optical SW 1010-2 will be described as an aspect of a second optical switch among the plurality of optical switches.

More specifically, the optical SW 1200 is connected to the port 11-1 and the port 11-2 of the optical SW 1010-1, and is further connected to the port 11-1 and the port 11-2 of the optical SW 1010-2 and the port 11-1 and the port 11-2 of the optical SW 1010-3. In the above-described way, the optical SW 1200 is connected to the first ports (for example, the ports 11-1) of the plurality of optical switches and the second ports (for example, the ports 11-2) on the side (for example, the side different from the side on which the port 11-1 is provided in the plurality of optical switches) different from the first ports. The first port and the second port illustrated here are examples, and the port 11-1 may be the second port and the port 11-2 may be the first port. The same applies to the following description. The optical SW 1200 connects the ports 11-2 on the output side of the plurality of optical SWs 1010 and the ports 11-1 on the input side of the plurality of optical SWs 1010. For example, the optical SW 1200 connects the port 11-2 on the output side of the optical SW 1010-1 and the port 11-1 on the input side of the optical SW 1010-2. The optical SW controller 320 controls the optical SW 1200 such that a path inside the optical SW 1200 becomes a path toward a transfer destination on a path to a communication destination. With such a configuration, as illustrated in FIG. 27, the number of ports via other optical SWs 1010-2 and 1010-3 can be reduced.

(Second Configuration)

As illustrated in FIG. 66(B), in a second configuration, the optical SW 1010-1 to the optical SW 1010-3 are illustrated. In the second configuration, the return transmission line is not connected to the same optical SW, but is connected between the optical SWs connected via the respective opposing subscribers. For example, the connection is made such as by using the port 11-1-1 that connects the optical SW 1010-1 and the ONU #11, the port 11-2-*x* of the optical SW 1010-1, the return transmission line, the port 11-2-*y* of the optical SW 1010-2, and the port 11-1-1 that connects the optical SW 1010-2 and the ONU #21. That is, in the second embodiment, the ports 11-2 on the same side of the different optical SWs 1010 are connected via the return transmission line. In the example illustrated in FIG. 66(B), the port 11-2 of the optical SW 1010-1 and the port 11-2 of the optical SW 1010-2 are connected via the return transmission line, the port 11-2 of the optical SW 1010-2 and the port 11-2 of the optical SW 1010-3 are connected via the return transmission line, and the port 11-2 of the optical SW 1010-1 and the port 11-2 of the optical SW 1010-3 are connected via the return transmission line. In this case, since four ports are used, it can be seen that the number of ports to be used can be reduced by two ports compared with use of six ports.

(Third Configuration)

As illustrated in FIG. 66(C), in a third configuration, the optical SW 1010-1 to the optical SW 1010-3 and the optical SW 1200 are illustrated. In the third configuration, the optical SW 1200 is used as a return transmission line. In a case where the optical SW 1200 is a SW having the (11-1-P)×(11-2-Q) configuration, a single optical SW (for example, the optical SW 1010-1) accommodating the subscriber device 40 is connected to each of the port 11-1 and the port 11-2 of the optical SW 1200 that is a transmission line crossing the optical SW, and is connected from the port 11-1 to the port 11-2 and from the port 11-2 to the port 11-1. In a case where different optical SWs accommodating the subscriber device 40 are connected to each other, a transmission line crossing the optical SW is formed, and in a case where connection is made through the same optical SW, a return transmission line in the same SW is formed. That is, in the third configuration, some of the ports 11-2 on the output side of the optical SW 1010-1 to the optical SW 1010-3 are connected to the port 11-1 of the optical SW 1200, and the other of the ports 11-2 on the output side of the optical SW 1010-1 to the optical SW 1010-3 are connected to the port 11-2 of the optical SW 1200. Consequently, the optical SW 1200 connects the ports 11-2 on the output side of the optical SW 1010-1 to the optical SW 1010-3. The optical SW controller 320 controls the optical SW 1200 such that the path inside the optical SW 1200 connects the ports 11-2 on the output side of the optical SW 1010-1 to the optical SW 1010-3.

The second or third configuration may be combined with the transmission line crossing the mesh type optical SW in FIG. 27 or the ring type optical SW in FIG. 28 or the first configuration.

(Fourth Configuration)

As illustrated in FIG. 66(D), in a fourth configuration, the optical SW 1010-1 to the optical SW 1010-3 and the optical SW 1200 are illustrated. The fourth configuration is an extension of the third configuration. In the third configuration, at least some uplinks are installed on the port 11-1 side rather than on the port 11-2 side, and, when ports are connected to the uplinks, the ports are connected via a return transmission line. That is, in the fourth configuration, the ports 11-1 of the optical switches 1010-1 to 1010-3 that are not connected to the optical SW 1200 are connected to the uplinks. This configuration is suitable in a case where return is mainly performed. For example, in a case where the subscriber devices 40 are connected to each other in a full mesh or a form close to a full mesh, the number of the ports 11-1 is smaller than the number of the ports 11-2. In such a case, in a case where the optical SW is a symmetric SW of P×P, since the port 11-1 side to which the subscriber is connected is left, the optical SW is diverted to the uplink side and the port is effectively utilized.

Figure 67:
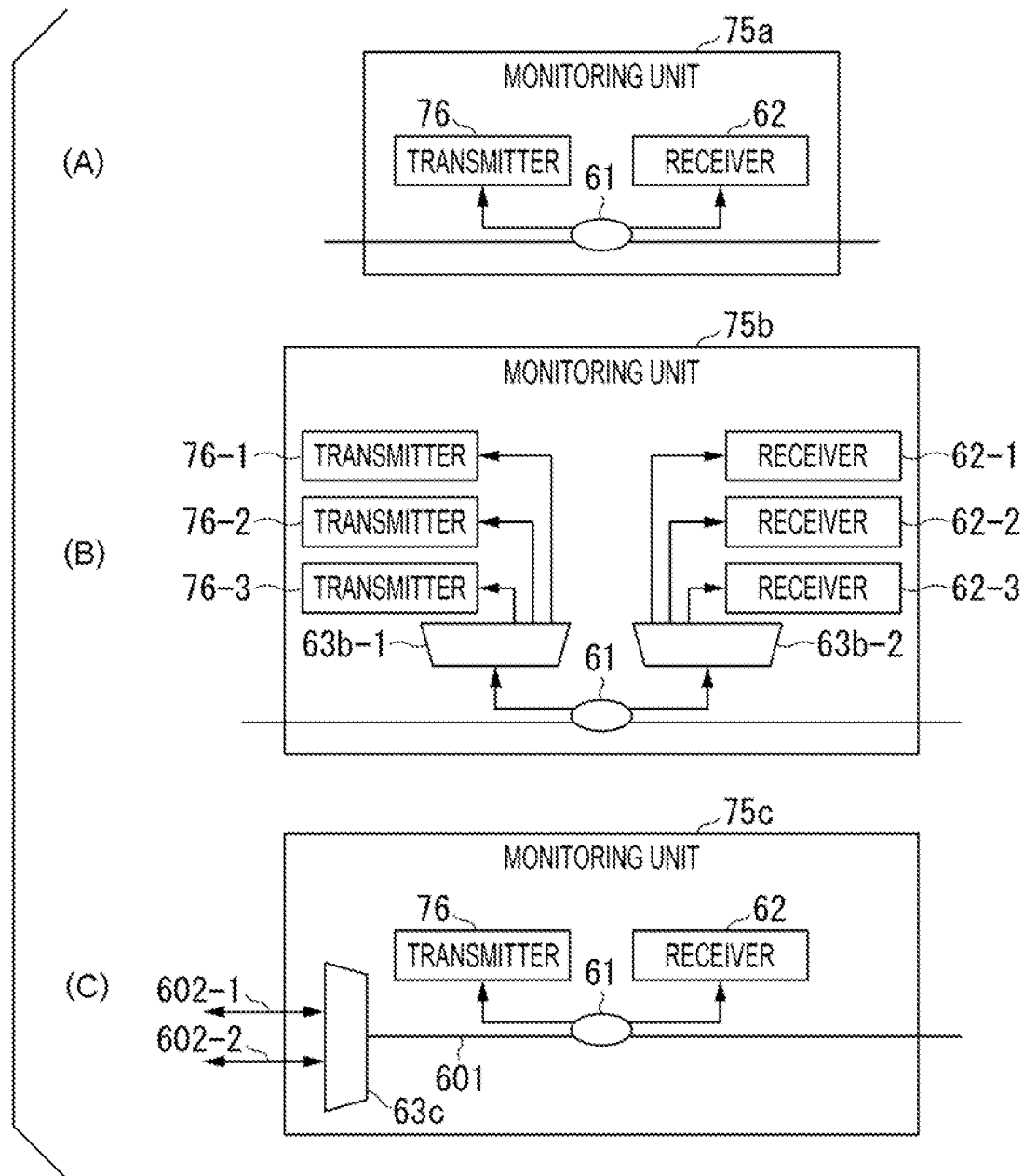
FIG. 67 is a diagram illustrating another aspect of the monitoring unit.
Figure 68:
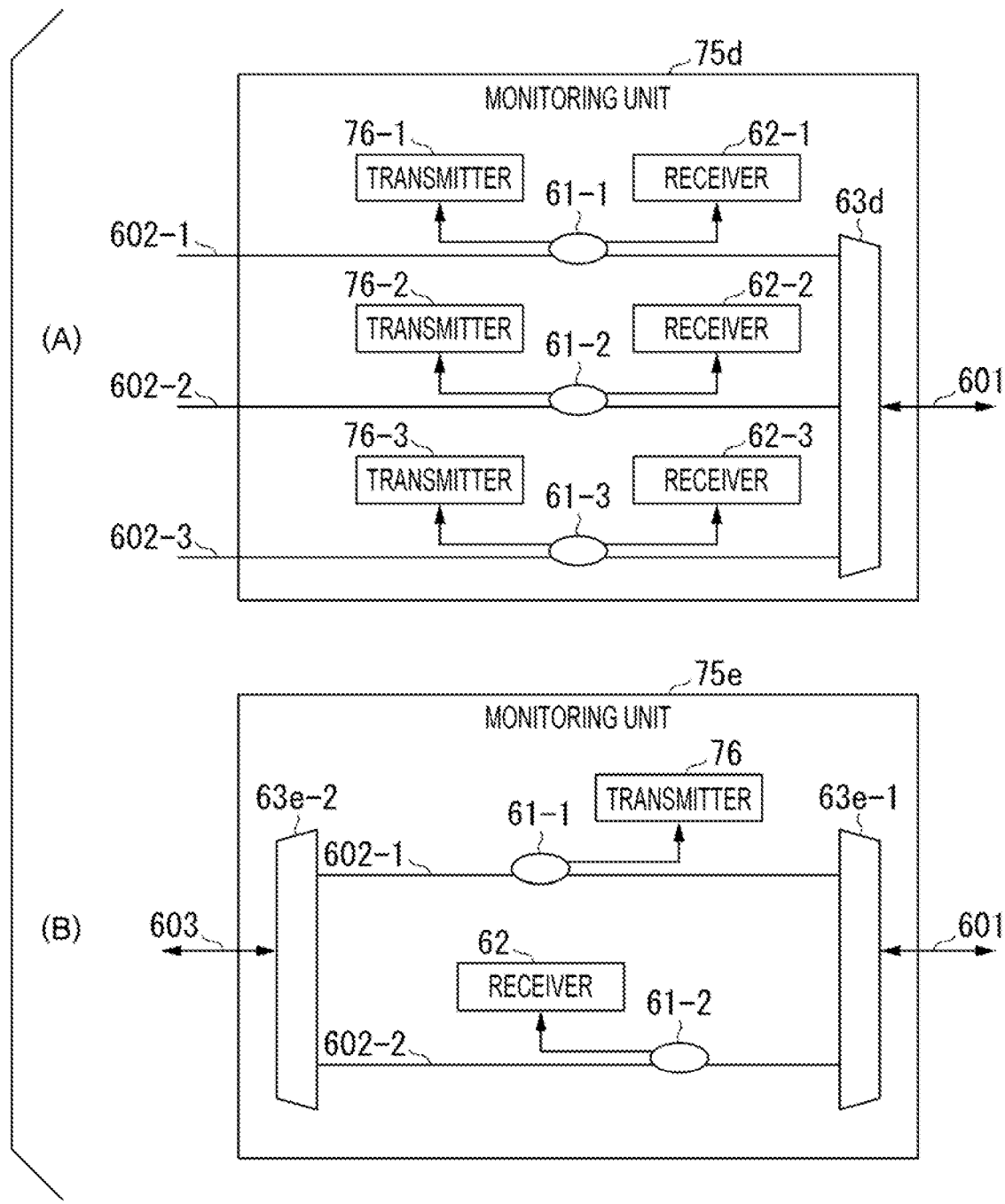
FIG. 68 is a diagram illustrating still another aspect of the monitoring unit.
Figure 69:
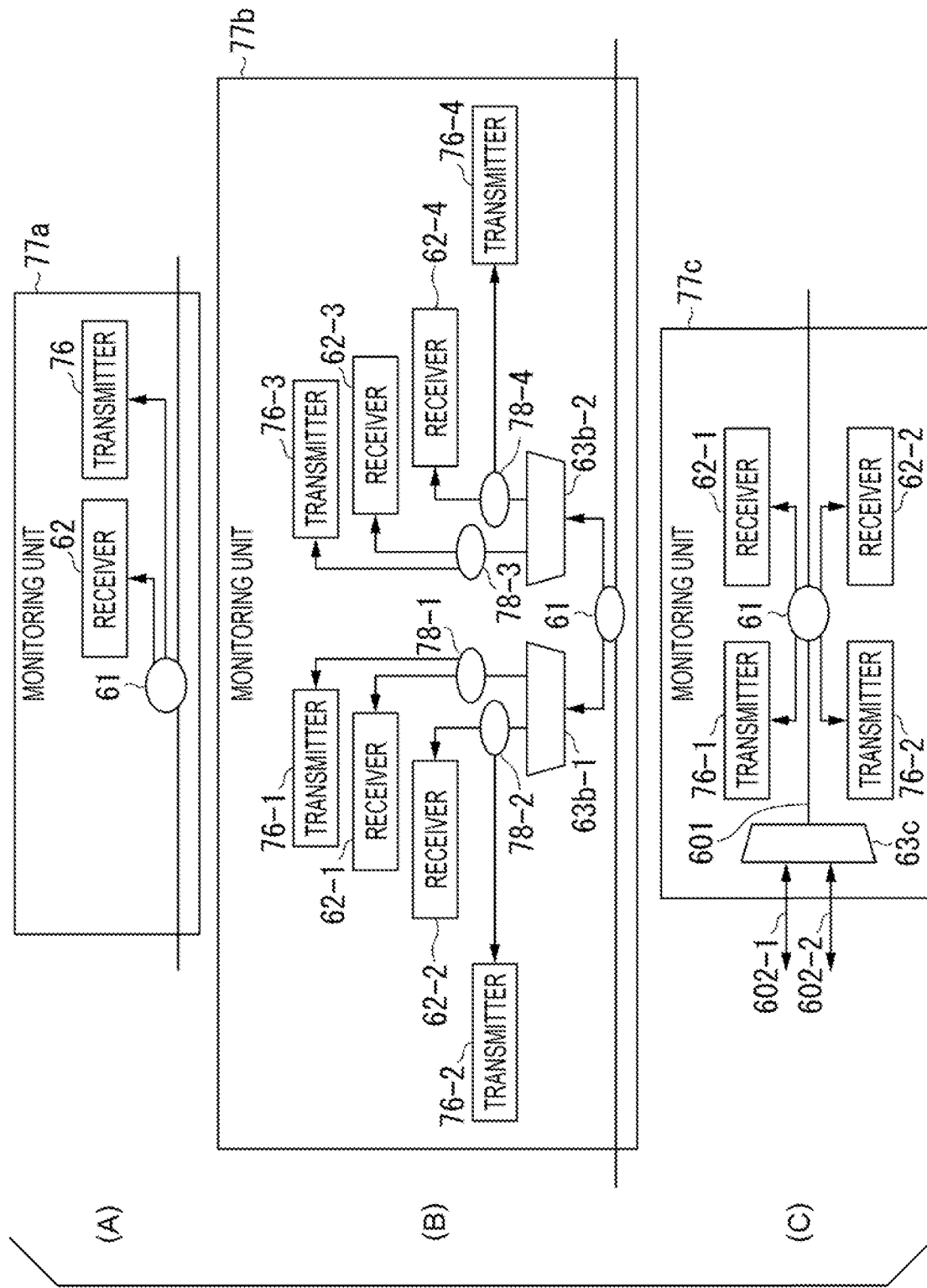
FIG. 69 is a diagram illustrating still another aspect of the monitoring unit.

Next, as another aspect (modification example) of the monitoring unit 60 illustrated in FIGS. 33 to 36, a configuration in which the monitoring unit includes a transmitter will be specifically described with reference to FIGS. 67 to 69. FIGS. 67 to 69 are configuration diagrams of another aspect (modification example) of the monitoring unit 60.

Although the monitoring unit 60 will be described as an example in FIGS. 67 to 69, the monitoring unit 260 may be used instead of the monitoring unit 60, and a configuration of the monitoring unit 260 may be the configuration illustrated in FIGS. 67 to 69. FIGS. 67 and 68 illustrate an example in which a transmitter and a receiver are connected to a transmission line on the same side in opposite directions as a configuration for transmitting a signal toward a monitoring target. FIG. 69 illustrates a configuration in which a transmitter and a receiver are connected in the same direction in a case of merging into a transmission line on an opposite side to the input of a main signal in the same direction as the main signal.

A monitoring unit 75a illustrated in FIG. 67(A) includes a power splitter 61, a receiver 62, and a transmitter 76. The monitoring unit 75a illustrated in FIG. 67(A) is different from the monitoring unit 60a illustrated in FIG. 33(A) in that one transmitter 76 and one receiver 62 are provided. The transmitter 76 transmits an optical signal input via the power splitter 61 toward a monitoring target (for example, the control unit 20 or the OPS 300). As illustrated in FIG. 67(A), the transmitter 76 and the receiver 62 are connected to the transmission line on the same side in opposite directions.

A monitoring unit 75b illustrated in FIG. 67(B) includes a power splitter 61, a plurality of receivers 62-1 to 62-3, a plurality of WDM devices 63b-1 to 63b-2, and a plurality of transmitters 76-1 to 76-3. The monitoring unit 75b illustrated in FIG. 67(B) is different from the monitoring unit 60b illustrated in FIG. 33(B) in that the three receivers 62-1 to 62-3 and the three transmitters 76-1 to 76-3 are provided instead of the six receivers 62-1 to 62-6. The transmitters 76-1 to 76-3 are connected to the WDM device 63b-1. The receivers 62-1 to 62-3 are connected to the WDM device 63b-2. The WDM device 63b-1 demultiplexes an optical signal branched by the power splitter 61 and outputs the demultiplexed optical signals to the transmitters 76-1 to 76-3. As illustrated in FIG. 67(B), the transmitters 76-1 to 76-3 and the receivers 62-1 to 62-3 are connected to the transmission line on the same side in opposite directions.

A monitoring unit 75c illustrated in FIG. 67(C) includes a power splitter 61, a receiver 62, a WDM device 63c, and a transmitter 76. The monitoring unit 75c illustrated in FIG. 67(C) is different from the monitoring unit 60c illustrated in FIG. 33(C) in that the receiver 62 and the transmitter 76 are provided instead of the two receivers 62-1 and 62-2.

A monitoring unit 75d illustrated in FIG. 68(A) includes a plurality of power splitters 61-1 to 61-3, a plurality of receivers 62-1 to 62-3, a WDM device 63d, and a plurality of transmitters 76-1 to 76-3. The monitoring unit 75d illustrated in FIG. 68(A) is different from the monitoring unit 60d illustrated in FIG. 34(A) in that the three receivers 62-1 to 62-3 and the three transmitters 76-1 to 76-3 are provided instead of the six receivers 62-1 to 62-6. The power splitter 61-1 is provided in the transmission line 606-1, and the receiver 62-1 and the transmitter 76-1 are connected to the power splitter 61-1. The power splitter 61-2 is provided in the transmission line 606-2, and the receiver 62-2 and the transmitter 76-2 are connected to the power splitter 61-2. The power splitter 61-3 is provided in the transmission line 606-3, and the receiver 62-3 and the transmitter 76-3 are connected to the power splitter 61-3.

A monitoring unit 75e illustrated in FIG. 68(B) includes a plurality of power splitters 61-1 and 61-2, a receiver 62, a plurality of WDM devices 63e-1 and 63e-2, and a transmitter 76. The monitoring unit 75e illustrated in FIG. 68(B) is different from the monitoring unit 60e illustrated in FIG. 34(B) in that the receiver 62 and the transmitter 76 are provided instead of the two receivers 62-1 and 62-2. The power splitter 61-1 is provided in the transmission line 602-1, and the transmitter 76 is connected to the power splitter 61-1. The power splitter 61-2 is provided in the transmission line 602-2, and the receiver 62 is connected to the power splitter 61-2.

A monitoring unit 77a illustrated in FIG. 69(A) includes a power splitter 61, a receiver 62, and a transmitter 76. The monitoring unit 77a illustrated in FIG. 69(A) is different from the monitoring unit 60a illustrated in FIG. 33(A) in that the receiver 62 and the transmitter 76 are provided instead of the two receivers 62-1 and 62-2. As illustrated in FIG. 69(A), the transmitter 76 and the receiver 62 are connected to the transmission line on the same side in the same direction.

A monitoring unit 77b illustrated in FIG. 69(B) includes a power splitter 61, a plurality of receivers 62-1 to 62-4, a plurality of WDM devices 63b-1 and 63b-2, a plurality of transmitters 76-1 to 76-4, and a plurality of power splitters 78-1 to 78-4. The monitoring unit 77b illustrated in FIG. 69(B) is different from the monitoring unit 60b illustrated in FIG. 33(B) in that the four receivers 62-1 to 62-4, the four transmitters 76-1 to 76-4, and the four power splitters 78-1 to 78-4 are provided instead of the six receivers 62-1 to 62-6. The power splitters 78-1 and 78-2 are connected to the WDM device 63b-1, and the power splitters 78-3 and 78-4 are connected to the WDM device 63b-2. The transmitter 76-1 and the receiver 62-1 are connected to the power splitter 78-1, the transmitter 76-2 and the receiver 62-2 are connected to the power splitter 78-2, the transmitter 76-3 and the receiver 62-3 are connected to the power splitter 78-3, and the transmitter 76-4 and the receiver 62-4 are connected to the power splitter 78-4. As illustrated in FIG. 67(B), the transmitters 76-1 to 76-4 and the receivers 62-1 to 62-4 are connected to the transmission line on the same side in the same direction as that of the set of the transmitter 76 and the receiver 62. In FIG. 69(B), the transmitters 76-2 and 76-4 are provided outside the monitoring unit 77b, but may be provided inside the monitoring unit 77b.

A monitoring unit 77c illustrated in FIG. 69(C) includes a power splitter 61, a plurality of receivers 62-1 and 62-2, a WDM device 63c, and a plurality of transmitters 76-1 and 76-2. The monitoring unit 77c illustrated in FIG. 69(C) is different from the monitoring unit 60c illustrated in FIG. 33(C) in that the two transmitters 76-1 and 76-2 are further provided. The monitoring unit 77c illustrated in FIG. 69(C) has a different connection relationship from the receivers 62-1 and 62-2 of the monitoring unit 60c illustrated in FIG. 33(C). Specifically, in the monitoring unit 77c, the receivers 62-1 and 62-2 and the transmitters 76-1 and 76-2 are connected to the power splitter 61, the receiver 62-1 and the transmitter 76-1 are connected to the transmission line on the same side, and the receiver 62-2 and the transmitter 76-2 are connected to the transmission line on the same side.

The number of the power splitters 61, the receivers 62, the WDM devices 63, and the transmitters 76 illustrated in FIGS. 67 to 69 is an example, and may be changed according to a situation.

Superimposition of an AMCC signal on a main signal will be described. Since the main signal and the AMCC signal are superimposed, the main signal and the AMCC signal are carried by optical signals having the same wavelength. The main signal is, for example, a signal such as a common public radio interface (CPRI) such as an on-off keying (OOK) signal of 10 Gbit/s (gigabits per second). The AMCC signal has a frequency that does not overlap, for example, that of an electrical main signal, and is superimposed on the main signal with a carrier wave having a carrier frequency such as 1 MHz or 500 kHz. A modulation method is intensity modulation, phase modulation, or the like. In the superimposition, for example, an electrical main signal of 10 GHz and an electrical AMCC signal of 1 MHz are combined by a power combiner and modulated with the combined signal, and thus the main signal on which the AMCC signal is superimposed is generated. The superimposed AMCC signal can be separated from the main signal.

In the electrical region, the AMCC signal and the main signal use different frequencies. The AMCC signal has a narrower band than the main signal. For example, as disclosed in the OITDA standard TP 20 Active Parts for Optical Transmission-Performance Standard-Optical Transceiver for GPON (Reference Literature 1: http://www.oitda.or.jp/main/st/TP20-1.pdf) or ITU-T G.958 Appendix I, assuming that the reference of the consecutive identical digit immunity is 72 bits, a lower limit of GE-PON of 1.25 Gbit/s may be sufficiently lower than about 20 MHz, for example, half thereof or sufficiently higher than 1.25 GHz, for example, twice thereof, or sufficiently lower than 720 kHz of the lower limit of STM-0 of 51.84 Mbit/s of a low-speed signal, for example, half thereof or sufficiently higher than 51.84 MHz, for example, twice thereof.

As the carrier frequency, another frequency that does not overlap that of an electrical main signal, such as 500 kHz, may be used, and as a modulation method, another modulation method such as phase modulation may be used.

In each of the above embodiments, in a case where the subscriber device 40 and the control unit 20 have a single-core bidirectional transceiver, the power splitters used for both the uplink and downlink directions may be connected via the same path of the optical SW 210 in the single-core bidirectional state, or may be separated into two cores and connected via the respective paths. In a case where the subscriber device 40 and the control unit 20 have a double-core bidirectional transceiver, the power splitters may be bundled in a one-core bidirectional manner and then connected via the same path of the optical SW 210, or may be connected via each path in a double-core state. In a case where one of the subscriber device 40 and the control unit 20 has a single-core bidirectional transceiver and the other thereof has a bidirectional transceiver, the double-core bidirectional directions may be bundled to form a single core and then the power splitters may be connected via the same path of the optical SW 210, or the single-core bidirectional directions may be separated into two cores and then the power splitters may be connected via the respective paths.

The power splitters used in both uplink and downlink directions are suitable in a case where wavelength bands that can be used do not overlap each other in the uplink direction and the downlink direction, such as the 1.3 micron band and the 1.55 micron band. In a case where at least one the subscriber device 40 and the control unit 20 transmits and receives an optical signal with a single-core bidirectional optical transceiver, they may be connected via a set of ports of the optical SW, or may be connected via two sets of ports and multiplexes signals in opposite directions with a multiplexer/demultiplexer (for example, a WDM device or a WDM filter) or a power splitter. Every transmission and reception, different sets of ports may be used for connection, one optical transmitter and the other optical receiver may be connected, and the other optical transmitter and the one optical receiver may be connected. This is suitable in a case where a double-core optical transceiver is used. In this case, different paths may be used on the transmission side and the reception side.

A plurality of sets may be connected on the transmission side or a plurality of sets may be connected on the reception side. In this case, it is possible to connect or control a plurality of devices or functional units. Demultiplexing of connection or control can employ a transmission source, a destination port, a wavelength, a device, a function unit, or, for example, an identifier for identifying a subscriber device such as a MAC address.

The optical SW, the port, the transmission line, or the connection point thereof may include a power splitter or a multiplexer/demultiplexer between a transmission line connected to another ground or optical SW or a higher network and the optical SW. The multiplexer/demultiplexer multiplexes optical signals having different wavelengths output from different subscriber devices or the like from a plurality of ports of the optical SW, and outputs the multiplexed optical signal to a transmission line connected to another ground or optical SW or a higher network. The multiplexer/demultiplexer demultiplexes an optical signal transmitted from any of another ground, the optical SW, or the higher network according to wavelengths, and inputs the demultiplexed optical signals to the optical SW from ports corresponding to the wavelengths. In each of the above embodiments, the multiplexer/demultiplexer and the power splitter have been described. However, in a case where multiplexing/demultiplexing is not performed according to wavelengths, the multiplexer/demultiplexer may be a power splitter. In a case where only multiplexing or only demultiplexing is performed according to wavelengths, only merging multiplexing is performed regardless of a wavelength, and only branching is performed regardless of a wavelength, the multiplexer/demultiplexer may be a multiplexer, a demultiplexer, a merging device, and the branching device, respectively.

The power splitter is suitable in a case where an uplink signal and a downlink signal are multiplexed according to, for example, time division multiplexing other than wavelength division multiplexing and a case where wavelength bands used by the uplink signal and the downlink signal at least partially overlap. In the latter case, it is sufficient to perform filtering in the optical receiver, the transmission line before reaching the optical receiver, between the power splitter and the transmission line, and the like. In a case where a signal passes through a plurality of sections, it is desirable to filter the signal before being multiplexed in order not to influence other signals when the signal is multiplexed with other signals. In a case where a wavelength to be filtered by a combination of a multiplexer/demultiplexer or a power splitter and a filter can be changed, the subscriber device may change the wavelength according to a wavelength to be transmitted and received, or the control unit may change the wavelength.

Each configuration described above with reference to FIGS. 1 to 69 may be modified as follows. In FIGS. 1 to 69, the monitoring unit 260 is mainly provided at the output of the port of the opposing transmission line in which the transmission line connected to the subscriber device 40 is connected to the port connected to the optical SW. Hereinafter, the monitoring unit 260 is disposed in a transmission line connected to the subscriber device 40 or between ports connected to the transmission line. That is, in FIGS. 1 to 69, the monitoring unit 260 is mainly provided in the opposing transmission line connected via the optical SW to the transmission line connecting the subscriber device 40 and the optical SW. However, in the following modification, the monitoring unit 260 is provided in a transmission line connecting the subscriber device 40 and the optical SW. The processes in steps S1 and S3 to S6 in the flowchart of FIG. 42 may be performed in other aspects. Step S2 in the flowchart of FIG. 42 is not executed. Hereinafter, another aspect (modification example) of the processes in steps S1 and S3 to S6 will be described. Hereinafter, a portion described as the control unit 301 may be replaced with the control unit 230 or the control unit 235. A portion described as the monitoring unit 260 may be replaced with the monitoring unit 60, the monitoring unit 65, the monitoring unit 265, or the monitoring unit 267.

Figure 70:
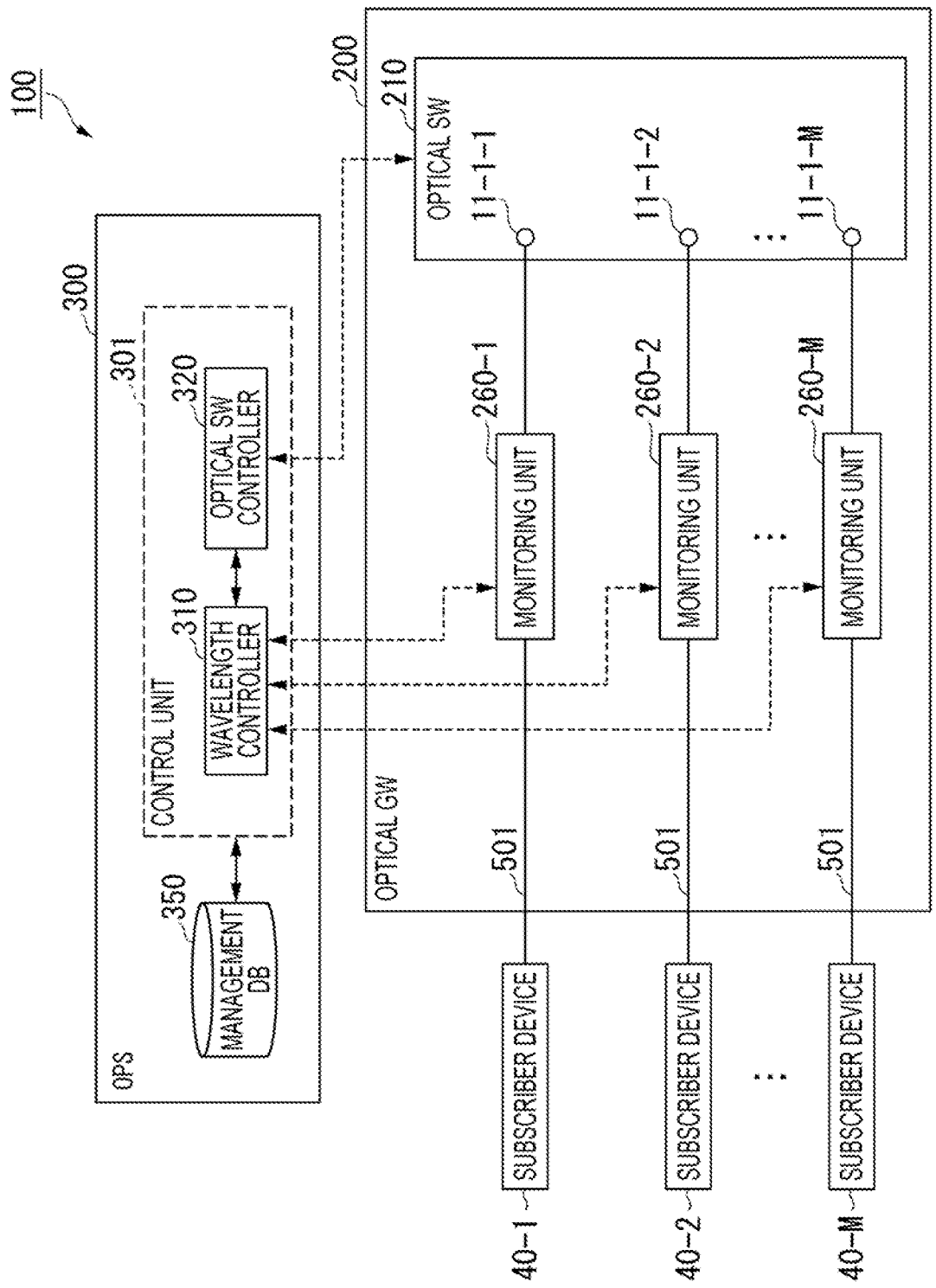
FIG. 70 is a diagram illustrating a configuration example in a first modification example of the subscriber device and the optical GW control unit.

FIG. 70 is a diagram illustrating a configuration example in a first modification example of the subscriber device 40 and the control unit. In the first modification example, not only an optical signal can be transmitted according to a destination, but also the number of times of switching of an optical switch at the time of setting a wavelength of the optical signal transmitted from the subscriber device can be reduced. As illustrated in FIG. 38, the control unit 301 is a functional unit that instructs another control unit such as the control unit 230, and the control unit 301 gives an instruction to another control unit that controls the monitoring unit 260.

In the optical access system 100 (optical communication device), the optical GW 200 includes the monitoring unit 260 for each input path in the transmission line 501 between the optical SW 210 and the subscriber device 40. That is, the monitoring unit 260 is connected to the port 11 on the input side of the optical SW 210. Consequently, the control unit 301 is connected to the subscriber device 40 via the monitoring unit 260. The control unit 301 does not have to be connected for each subscriber device 40 as long as it can be connected to each subscriber device 40. For example, even in a case where the control unit 301 is simultaneously connected to a plurality of subscriber devices 40, the optical SW 21 or the like may be able to select the subscriber device 40 that is a connection target, or the optical SW 21 or the like may be able to select the path to be connected, as in the initial connection of the PON. Depending on a configuration of the monitoring unit 260, the monitoring unit 260 and the subscriber device 40 do not necessarily have a one-to-one correspondence. For example, a plurality of input paths may correspond to one monitoring unit 260. In this case, the monitoring unit 260 may monitor an optical signal of the input path according to settings of switching of the input path. In a case where switching of the input path is not set, the monitoring unit 260 may collectively monitor optical signals of the plurality of input paths.

As illustrated in FIG. 70, the control unit 301 is connected to the subscriber device 40 via the monitoring unit 260. Specifically, at the time of allocation of a wavelength or the like, since an output of an allocation target device of a wavelength or the like such as the subscriber device 40 is not connected inside the optical SW 210 according to setting by the control unit 301, only the monitoring is executed by the monitoring unit 260 installed on the input side of the optical SW 210 in a state of not being connected to another port of the optical SW 210. After the wavelength or the like is allocated, a path to another port of the optical SW 210 is set for the output of the allocation target device of a wavelength or the like such as the subscriber device 40 according to the setting by the control unit 301.

The optical GW 200 may include the monitoring unit 260 instead of the monitoring unit 260. The optical GW 200 may include, instead of the monitoring unit 260, a power splitter 502 (monitoring unit 260) for branching and inputting a part of the optical signal from/to the subscriber device to the control unit 301.

The monitoring unit 260 modulates an optical signal transmitted and received by the subscriber device 40 with a control signal, receives a part of the optical signal, multiplexes a signal that is modulated with the control signal with the optical signal, transfers a part of the optical signal to the control unit 301, or multiplexes the control signal transferred from the control unit 301 with the optical signal. In a case where some optical signals are received by the monitoring unit 260, and the monitoring unit 260 transfers an optical signal on the basis of some received optical signal, the control unit 301 monitors a wavelength or the like of the optical signal of the subscriber device 40 on the basis of the optical signal transferred from the monitoring unit 260.

In the first modification example of the subscriber device 40 and the control unit 301, a wavelength allocation process (wavelength setting) and a path setting process are executed in this order. More specifically, the control unit 301 brings the transmission line connected to the subscriber device 40 into a disconnected state in the optical SW and performs exchange with the subscriber device 40. In an initial state, the transmission line connected to the subscriber device 40 is in a disconnected state in the optical SW, and thus the subscriber device 40 is left as it is. At the time of change, basically, the transmission line connected to the subscriber device 40 is temporarily brought into a disconnected state in the optical SW. Only in a case where there is no influence, the control unit 301 may perform exchange with the subscriber device 40 while keeping the transmission line connected to the subscriber device 40 in a connected state in the optical SW, or by bringing the transmission line connected to the subscriber device 40 into a connected state on a changed path in the optical SW. The optical SW controller 320 switches an output destination (path) of the optical SW 210 after the wavelength change such that there is no particular influence even if the output destination of the optical SW 210 is switched.

For example, in a case where the first port and the first wavelength "λ1" are used before switching, and the second port and the second wavelength "λ2" are used after switching, the following is obtained.

(1) In a case where there is no subscriber device 40 using the first port and the second wavelength "λ2":

Switching from the first wavelength "λ1" to the second wavelength "λ2" at the first port has no influence. In this case, it is possible to perform wavelength switching before port switching.

(2) In a case where there is the subscriber device 40 using the first port and the second wavelength "λ2":

Switching from the first wavelength "λ1" to the second wavelength "λ2" at the first port has influence. In this case, it is not possible to perform wavelength switching before port switching.

(3) In a case where there is no subscriber device 40 using the second port and the first wavelength "λ1":

Switching from the first wavelength "λ1" to the second wavelength "λ2" at the second port has no influence. In this case, it is possible to perform wavelength switching before port switching.

(4) In a case where there is the subscriber device 40 using the second port and the first wavelength "λ1":

Switching from the first wavelength "λ1" to the second wavelength "λ2" at the second port has influence. In this case, it is not possible to perform wavelength switching before port switching.

In the above "(1)" and "(3) or (4)", wavelength switching can be performed before port switching.

In the above "(1) or (2)" and "(3)", wavelength switching can be performed before port switching.

In the above "(2)" and "(4)", it is not possible to perform wavelength switching before port switching.

In the wavelength allocation process, the optical SW controller 320 controls the path in the optical SW 210 such that the optical SW 210 does not transmit the optical signal of the subscriber device 40 that is a wavelength allocation target.

In a case where there is no particular influence even if an output destination of the optical SW 210 is switched before the wavelength is set (before the wavelength is allocated), the optical SW controller 320 may switch an output destination of the optical SW 210 before the wavelength is changed. At the time of the wavelength allocation process, a functional unit other than the optical SW 210 may stop transmission of the optical signal transmitted from the subscriber device 40. In a case where a blocking unit is provided and the optical signal is blocked by the blocking unit, if the blocking unit blocks the optical signal, the optical SW controller 320 can basically perform exchange with the subscriber device 40. As an exception, the blocking unit may not be able to selectively block an output of the subscriber device 40. This case is, for example, a case where the blocking unit shares a plurality of wavelengths and the like (a wavelength, a time, polarizations orthogonal to each other, modes orthogonal to each other, codes orthogonal to each other, frequencies, cores, core wires, or a combination thereof) with the subscriber device 40 and the other sharing partner of the subscriber device 40 is in operation, a case where a wavelength output at the time of initial setting is uncertain and there is a possibility that a wavelength and the like (a wavelength, a time, polarizations orthogonal to each other, modes orthogonal to each other, codes orthogonal to each other, frequencies, cores, core wires, or a combination thereof) of other subscriber devices 40 overlap, a case where outputs at the time of changing wavelengths or the like overlap beyond an unallowable time for another wavelength or the like in operation, and a case where an abnormality occurs and what is output is unknown. In such a case, after connection is established without influence (for example, after reconnection to a non-operating port), the optical SW controller 320 performs exchange with the subscriber device 40. The core is a multicore fiber in which one fiber has a core through which a plurality of optical signals propagate. The core wire is each fiber in a cable including a plurality of fibers.

In the wavelength allocation process, the control unit 301 executes the wavelength allocation process on the subscriber device 40 that is a wavelength allocation target via the monitoring unit 260. For example, the control unit 301 executes a process of allocating the same wavelength as or a new wavelength different from a wavelength used when the abnormality is detected on the subscriber device 40 that is a wavelength allocation target.

In the path setting process, the optical switch controller 320 controls the optical SW 210 such that an optical signal input from the transmission line 501 of the subscriber device 40 that is a wavelength allocation target is output to the port 11 (another port) specified according to a transfer destination. Here, the transfer destination is specified according to a subscriber, the subscriber device 40, the port 11 of the optical SW 210, a wavelength of an optical signal, a combination of the subscriber device 40 and the wavelength of the optical signal, a combination of the port 11 and the wavelength of the optical signal, or the like.

In step S3, in a case where the subscriber device 40 that is a wavelength allocation target is connected, the optical SW controller 320 causes the transmission line connected to the subscriber device 40 to be disconnected in the optical SW. In a case where a blocking unit is provided instead, the blocking unit may block the optical signal. Here, in the optical SW 210, in a case where the transmission line connected to the port 11-1 connected to the monitoring unit 260 is disconnected to another port 11 in the optical SW, the control unit 301 maintains the disconnected state. The subscriber device 40 that is a wavelength allocation target executes an initialization process before being connected to the monitoring unit 260. The subscriber device 40 that is a wavelength allocation target may execute the initialization process immediately after being connected to the monitoring unit 260. In a case where a wavelength or the like is set at the time of the initialization process, or in a case where at least a part of the initialization process such as allocation is executed after reception of an allocation request permission in a downlink signal or a downlink signal, at least a part of the initialization process is executed after connection. The subscriber device 40 that is a wavelength allocation target transmits a connection request (register request) by using an optical signal.

In step S4, the control unit 301 receives the connection request from the subscriber device 40 that is a wavelength allocation target via the monitoring unit 260. The phrase "via the monitoring unit 260" means that, for example, the monitoring unit 260 transfers the optical signal branched by a combining/branching device to the control unit 301. For example, the monitoring unit 260 may include a reception unit, the reception unit may convert an optical signal into an electrical signal, and the reception unit may transfer the electrical signal to a connection unit. The control unit 301 analyzes the received optical signal and determines an initially set wavelength. The control unit 301 may analyze the received optical signal and check whether there is a problem in the optical power.

In step S6, the control unit 301 transmits a wavelength instruction indicating information regarding the wavelength determined (selected) by the control unit 301 to the subscriber device 40 that is a wavelength allocation target. The combining/branching device of the monitoring unit 260 may merge the optical signal of the control unit 301. The monitoring unit 260 may include a transmission unit, the transmission unit may convert an electrical signal into an optical signal, and a combining/branching unit may merge the optical signal. In a case where the wavelength instruction is transmitted by using an optical signal via a wavelength selective element in a path from the monitoring unit 260 to the subscriber device 40, the wavelength instruction is transmitted to the subscriber device 40 by using an optical signal having a wavelength addressed to the subscriber device 40. The wavelength instruction is transmitted to the subscriber device 40 that is a wavelength allocation target via the monitoring unit 260. The monitoring unit 260 outputs the optical signal input from the control unit 301 to the subscriber device 40. The optical signal indicating the wavelength instruction may be branched in the middle of the transmission line 501. In a case where a transmission wavelength is set in the wavelength instruction, the subscriber device 40 that is a wavelength allocation target sets the transmission wavelength of the optical signal of the optical transceiver according to the wavelength instruction.

In step S7, in a case where a notification signal is transmitted by using the optical signal, the subscriber device 40 transmits the notification signal for notifying that the wavelength is set to the control unit 301 via the monitoring unit 260 by using the optical signal having the wavelength designated in the wavelength instruction. The control unit 301 checks whether or not the designated wavelength is correctly set on the basis of the notification signal. The control unit 301 may check whether the output power of the optical signal is sufficient on the basis of the notification signal.

In step S8, the control unit 301 transmits optimum connection information (path information) of each port 11 of the optical SW 210 to the optical SW 210 according to a transmission destination (destination) of the optical signal of the subscriber device 40. The optical SW 210 sets an uplink port and a downlink port of the subscriber device 40 on the basis of the connection information.

Figure 71:
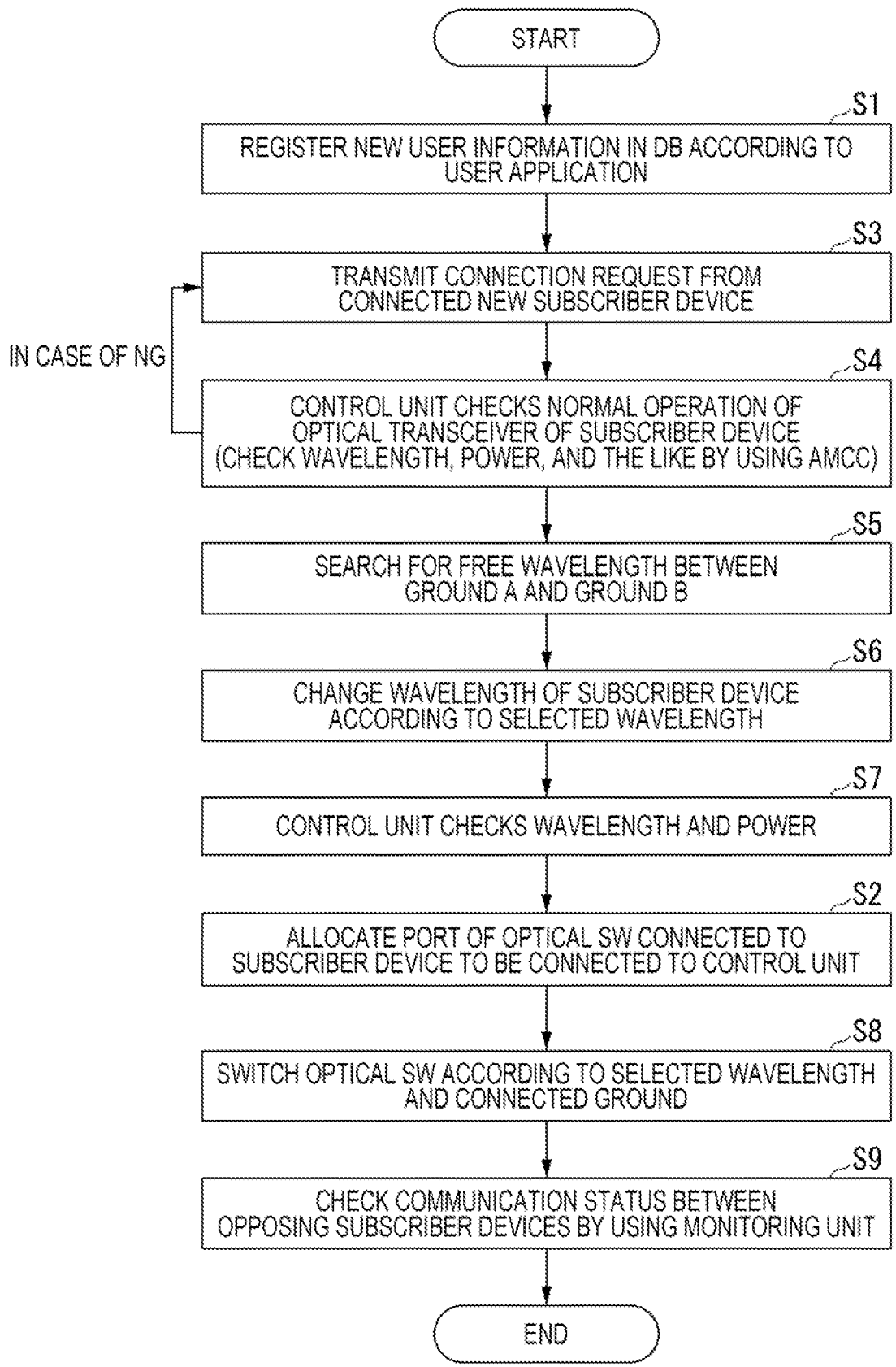
FIG. 71 is a flowchart illustrating an initial setting process of the optical access system according to the first modification example of the subscriber device and the optical GW control unit.

FIG. 71 is a flowchart illustrating an initial setting process of the optical access system according to the first modification example of the subscriber device 40 and the optical GW control unit 302. The reference signs illustrated in FIG. 71 are similar to the reference signs illustrated in FIG. 42. A port is connected between step S1 and step S3 illustrated in FIG. 71. In step S4, the present invention is not limited to the AMCC. The main signal is dripped, and the control unit 301 and the input monitoring unit autonomously check the main signal. In step S7, the control unit 301, the input monitoring unit, the output monitoring unit, the communication unit, or the subscriber device 40 autonomously performs checking.

As described above, in the first modification example of the subscriber device 40 and the control unit 301, the optical SW 210 outputs the optical signal input from any one of the plurality of transmission lines 501 to another transmission line 501 among the plurality of transmission lines 501. The monitoring unit 260 relays the optical signal between another control unit that receives an instruction from the control unit 301 and the subscriber device 40 in the transmission line 501 on the side where the optical signal transmitted from the subscriber device 40 is input to the optical SW 210. The monitoring unit 260 relays the optical signal between the subscriber device 40 and the optical SW 210 in the transmission line 501 on the side where the optical signal is input to the optical SW 210. The control unit 301 allocates a wavelength to the optical signal of the subscriber device 40 via the monitoring unit 260. After the wavelength is allocated to the optical signal of the subscriber device 40, the control unit 301 controls the optical SW 210 such that the optical signal input to the optical SW 210 via the transmission line 501 on the input side is output to another transmission line 501. The optical GW 200 may include a first optical SW 210 and a second optical SW 210 cascade-connected to the first optical SW 210. Before the wavelength is allocated to the optical signal of the subscriber device 40, the optical SW controller 320 may control the optical SW 210 such that the optical signal input to the optical SW 210 via the transmission line 501 on the input side is not output to another transmission line 501.

Consequently, in the first modification example of the subscriber device 40 and the control unit 301, it is possible not only to transmit an optical signal according to a destination but also to reduce the number of times of switching of the optical switch at the time of setting a wavelength of the optical signal transmitted from the subscriber device.

Hereinafter, a second modification example will be described.

Each configuration described above with reference to FIGS. 1 to 69 may be modified as follows.

Figure 33:
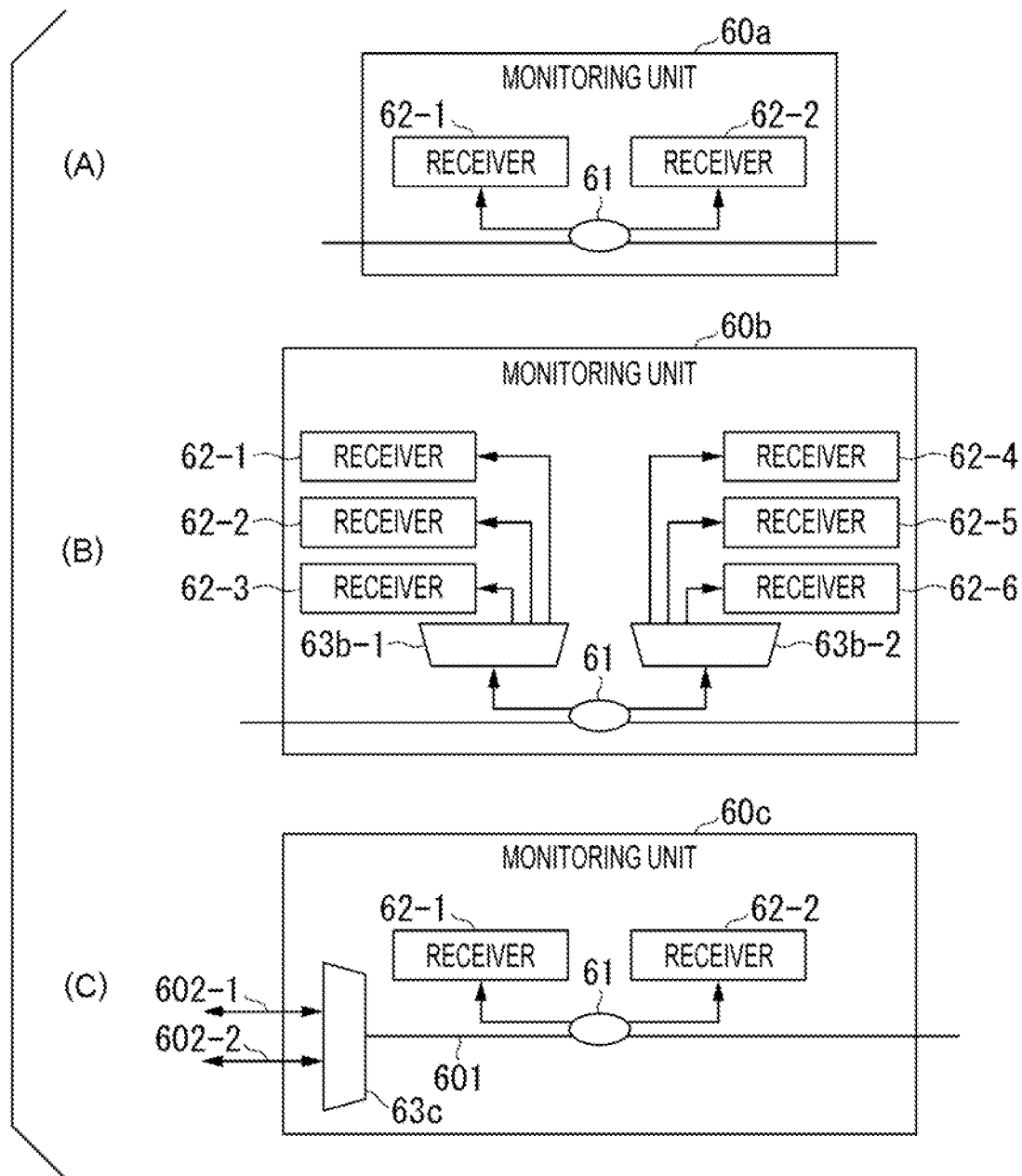
FIG. 33 is a diagram illustrating a configuration example of a monitoring unit according to a basic configuration.
Figure 34:
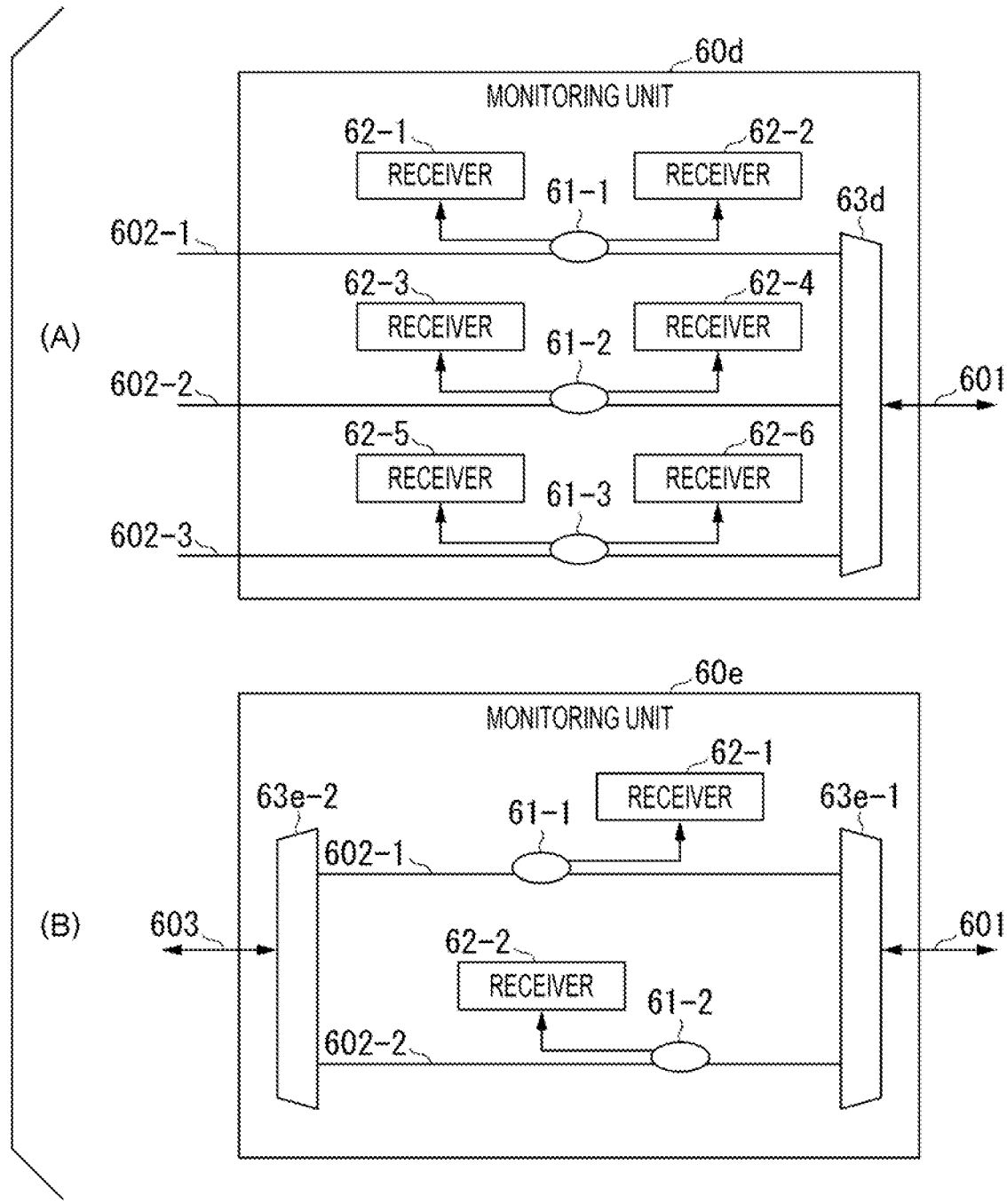
FIG. 34 is a diagram illustrating a configuration example of a monitoring unit according to a basic configuration.
Figure 35:
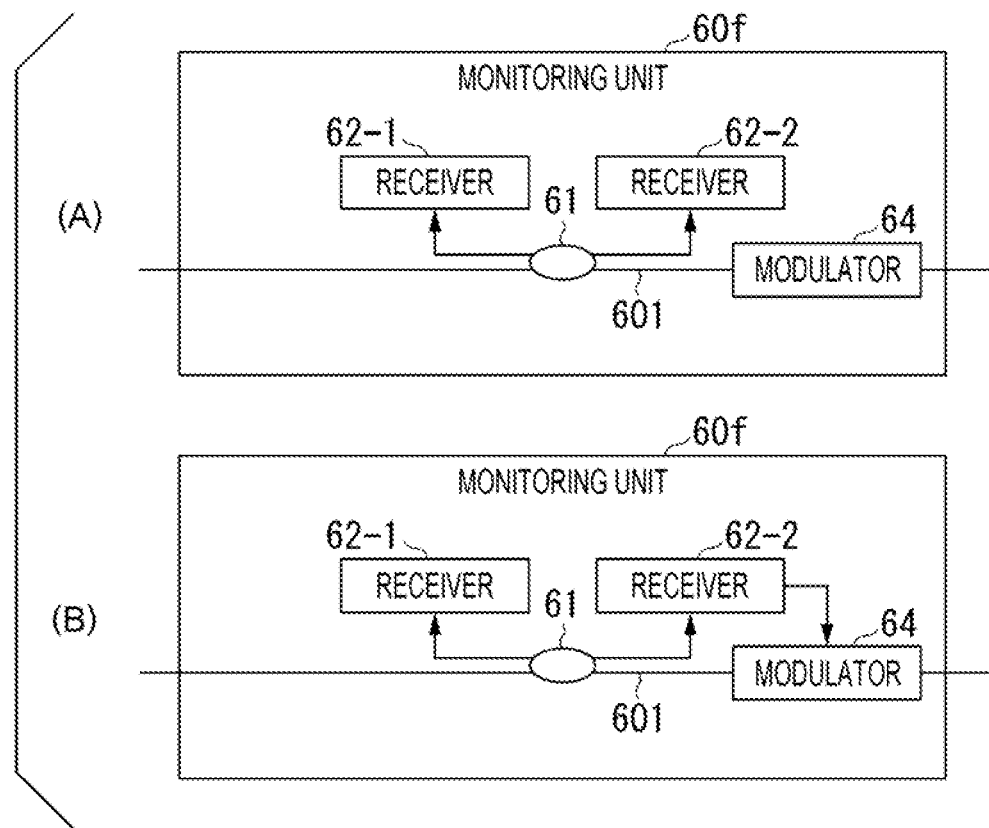
FIG. 35 is a diagram illustrating a configuration example of a monitoring unit according to a basic configuration.

In this case, for example, in the monitoring unit illustrated in FIGS. 33, 67, and 69, when viewed from the direction in which the optical signal is input; in the monitoring unit illustrated in FIGS. 34(A) and 68(A), the blocking unit is provided at the subsequent stage of the power splitter 61 in a case where the blocking unit is individually provided and is provided at the subsequent stage of the WDM device 63$d$ in a case where the blocking unit is collectively provided for a plurality of wavelengths; in the monitoring unit illustrated in FIGS. 34(B) and 68 (B), in a case where the blocking unit is separately provided in uplink and downlink paths, the blocking unit is provided between the power splitter and the WDM device 63$e$-1 at the subsequent stage thereof in the uplink path and is provided between the power splitter and WDM device 63$e$-2 at the subsequent stage thereof in the downlink path, and in a case where the other direction may be blocked at the time of setting one direction, the blocking unit is provided the subsequent stage of the WDM device 63$e$-1 in the uplink path and is provided at the subsequent stage of the WDM device 63$e$-2 in the downlink path; in the monitoring unit illustrated in FIG. 35, the blocking unit is provided at the preceding stage or the subsequent stage (also used as a modulator) of the modulator 64; and in the monitoring unit illustrated in FIG. 36, the blocking unit is provided at the preceding stage of the WDM devices 63$g$-1 and 63$g$-2 and at the preceding stage or the subsequent stage (also used as a modulator) of the modulator 64.

The processes in steps S1 to S8 in the flowchart of FIG. 42 may be performed in another aspect. Hereinafter, another aspect (modification example) of the processes in steps S1 to S8 will be described.

Figure 72:
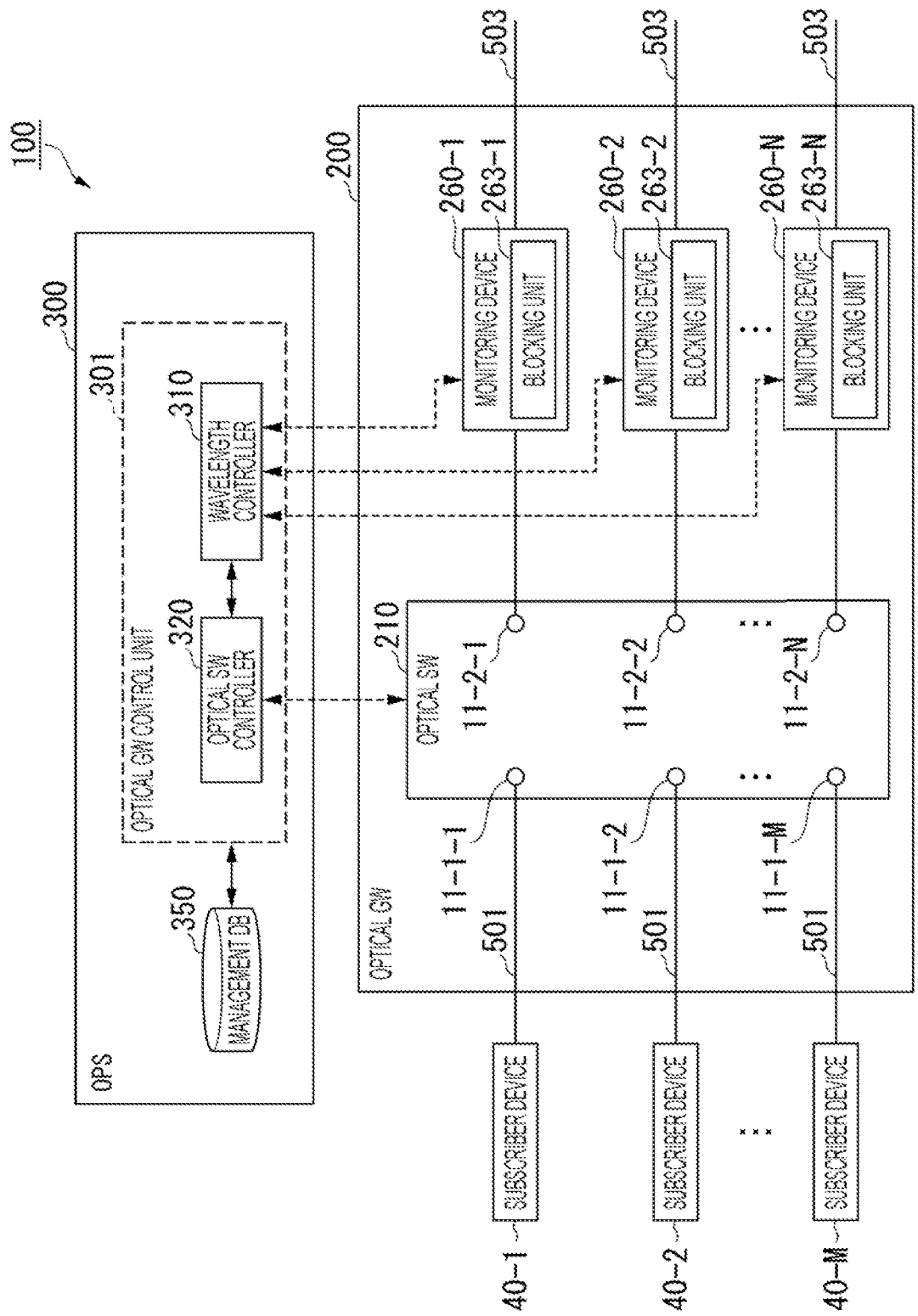
FIG. 72 is a diagram illustrating a configuration example in a second modification example of the subscriber device and the optical GW control unit.

FIG. 72 is a diagram illustrating a configuration example in a second modification example of the subscriber device 40 and the control unit. In the second modification example, not only an optical signal can be transmitted according to a destination, but also the number of times of switching of the optical switch at the time of setting a wavelength of the optical signal transmitted from the subscriber device can be reduced in some cases.

In the optical access system 100 (optical communication device), the optical GW 200 includes a monitoring unit for each output path in the transmission line 503 on the output side of the optical SW 210. That is, the monitoring unit is connected to the port 11 on the output side of the optical SW 210. Consequently, the wavelength controller 310 is connected to the subscriber device 40 via the monitoring unit. Depending on a configuration of the monitoring unit, the monitoring unit and the output path do not necessarily correspond to each other on a one-to-one basis. For example, in a case where the target subscriber device 40 can be selected as in the initial connection of the PON, or in a case where a path to be connected via the optical SW 210 or the like can be selected, a plurality of output paths and one monitoring unit may correspond to each other. In this case, the monitoring unit may monitor an optical signal on the output path according to setting of switching of the output paths. In a case where the switching of the output paths is not set, the monitoring unit may collectively monitor optical signals on the plurality of output paths.

As illustrated in FIG. 72, the control unit is connected to the subscriber device 40 via the monitoring unit. Specifically, at the time of wavelength allocation, an output of a wavelength allocation target device such as the subscriber device 40 is input to another port in the optical SW 210 according to setting by the control unit. However, the output is only monitored by the monitoring unit installed on the output side, and transmission through the transmission line 503 is blocked by the blocking unit 263. The blocking is canceled after the allocation.

The optical GW 200 may include a monitoring unit instead of the monitoring unit. Instead of the monitoring unit, the optical GW 200 may include a power splitter 502 (monitoring unit) for branching and inputting some optical signals from/to the subscriber device to the control unit.

The monitoring unit transfers some optical signals transmitted and received by the subscriber device 40 to the control unit. The wavelength controller 310 monitors a wavelength or the like of an optical signal of the subscriber device 40 on the basis of an optical signal transferred from the monitoring unit.

The monitoring unit includes a blocking unit 263. The blocking unit 263 can block transmission of an optical signal in the transmission line 503. The blocking unit 263 blocks transmission of the optical signal before the path setting process and the wavelength allocation process (wavelength setting) are performed under the control of the wavelength controller 310. The blocking unit 263 cancels the blocking of the transmission of the optical signal after the path setting process and the wavelength allocation process are performed.

For example, an optical switch may be used as the blocking unit 263. Alternatively, for example, a semiconductor optical amplifier (SOA) may be used as the blocking unit 263. In this case, an amplification factor in the semiconductor optical amplifier is set to a value (for example, −10 dB) equal to or less than an extinction ratio of the modulator in a case where a single path is provided or outputs of the subscriber devices 40 are combined, a value (for example, −25 dB in a case of 32) smaller by several outputs in a case where a plurality of outputs are combined, and −35 dB or the like in a case where there is a difference of 10 dB due to perspective difference or the like, and thus the transmission of the optical signal is blocked.

In a case where a disposition position of the blocking unit 263 is set and changed, for example, in both uplink and downlink directions, the blocking unit is preferably disposed at a position at a subsequent stage of multiplexing or merging of optical signals. On the other hand, in a case where a disposition position of the blocking unit 263 is set and changed separately in the uplink and downlink directions, for example, the blocking unit is preferably disposed at a position at a subsequent stage of demultiplexing or branching of an optical signal. In a case where a combination of a plurality of outputs is blocked, the number of blocking units 263 is reduced. On the other hand, in a case where a divided output is blocked, setting can be individually performed, and the degree of freedom is increased.

The blocking unit 263 may be a functional unit or a device provided outside the monitoring unit. In a case where an extinction ratio of the modulator is high enough not to affect other optical signals, the modulator may also serve as the blocking unit 263.

Hereinafter, blocking transmission of an optical signal may be simply referred to as "blocking". Hereinafter, canceling blocking of transmission of an optical signal may be simply referred to as "blocking cancelation".

In the first modification example of the subscriber device 40 and the control unit, the blocking, the path setting process, the wavelength allocation process (wavelength setting), and the blocking cancellation are performed in this order. With such an order, even if the path setting process is performed, an optical signal before wavelength setting is not transmitted to the outside of the optical GW 200 via the transmission line 503.

In a case where an optical signal is blocked by the blocking unit, if the blocking unit blocks the optical signal, the optical SW controller 320 can basically perform exchange with the subscriber device 40. As an exception, the blocking unit may not be able to selectively block an output of the subscriber device 40. This case is, for example, a case where the blocking unit shares a plurality of wavelengths and the like (a wavelength, a time, polarizations orthogonal to each other, modes orthogonal to each other, codes orthogonal to each other, frequencies, core wires (cores), or a combination thereof) with the subscriber device 40 and the other sharing partner of the subscriber device 40 is in operation, a case where a wavelength output at the time of initial setting is uncertain and there is a possibility that a wavelength and the like (a wavelength, a time, polarizations orthogonal to each other, modes orthogonal to each other, codes orthogonal to each other, frequencies, core wires (cores), or a combination thereof) of other subscriber devices 40 overlap, a case where outputs at the time of changing wavelengths or the like overlap beyond an allowable time for another wavelength or the like in operation, and a case where an abnormality occurs and what is output is unknown. In such a case, after connection is established without influence (for example, after reconnection to a non-operating port), the optical SW controller 320 performs exchange with the subscriber device 40.

As an exception, when there is no influence even if it is not blocked, blocking may not be performed. Alternatively, it may be configured to be connected to an output port that is not affected even if the output port is not blocked, and set by a monitoring unit of the output port.

In the path setting process, the optical switch controller 320 controls a path in the optical SW 210 such that the subscriber device 40 that is a wavelength allocation target is connected to the port 11 (another port) other than the port 11 connected to the monitoring unit of the subscriber device 40 that is a wavelength allocation target. For example, the optical switch controller 320 controls the optical SW 210 to output an optical signal input from the transmission line 501 of the subscriber device 40 that is a wavelength allocation target to the port 11 (another port) specified according to a transfer destination. Here, the transfer destination is specified according to a subscriber, the subscriber device 40, the port 11 of the optical SW 210, a wavelength of an optical signal, a combination of the subscriber device 40 and the wavelength of the optical signal, a combination of the port 11 and the wavelength of the optical signal, or the like.

In the wavelength allocation process, the wavelength controller 310 executes the wavelength allocation process on the subscriber device 40 that is a wavelength allocation target. For example, the wavelength controller 310 executes a process of allocating the same wavelength as or a new wavelength different from a wavelength used when the abnormality is detected on the subscriber device 40 that is a wavelength allocation target.

Figure 73:
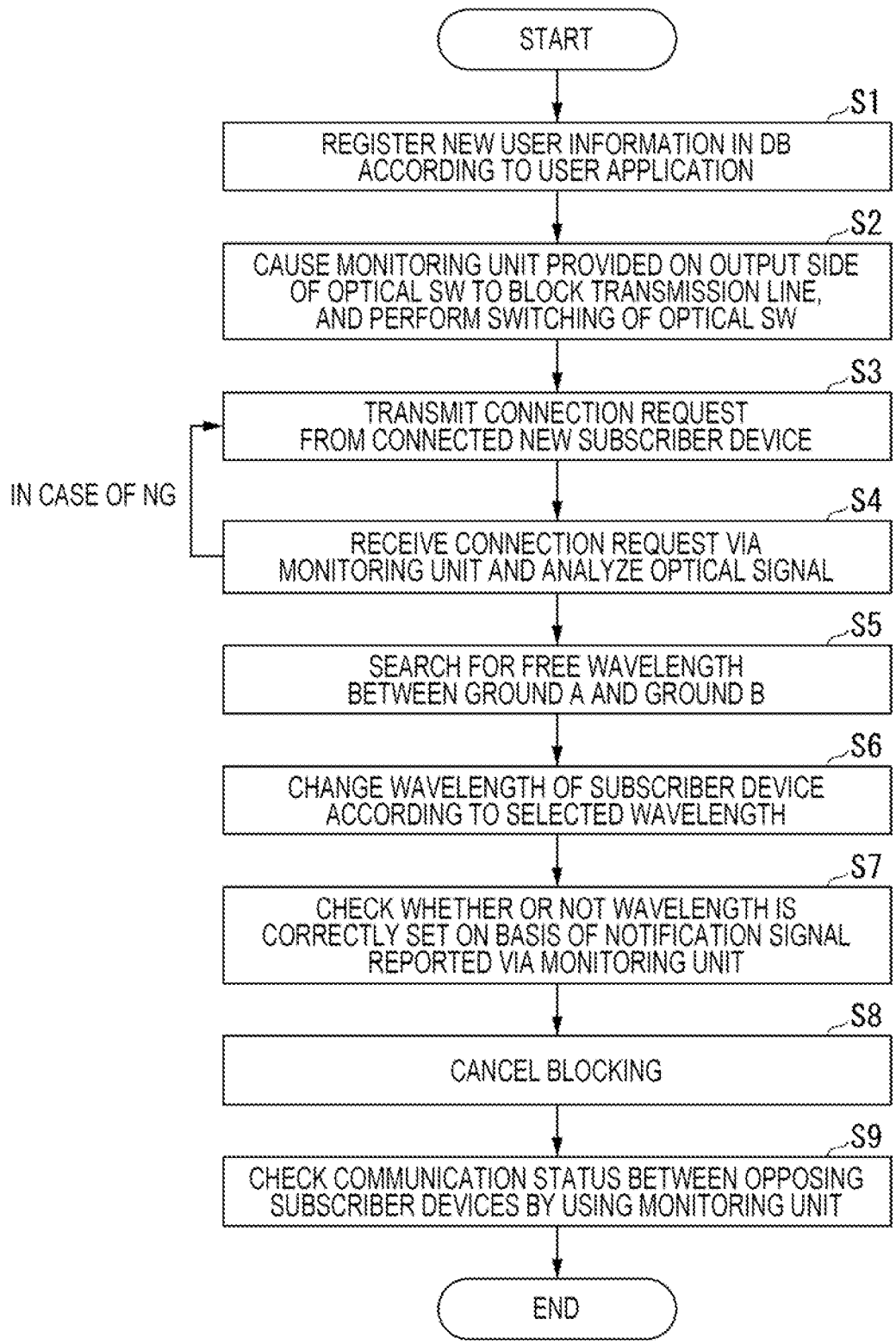
FIG. 73 is a flowchart illustrating an initial setting process of the optical access system according to the same configuration example.

FIG. 73 is a flowchart illustrating an initial setting process of an optical access system according to a second modification example. A description will focus on differences from the initial setting process illustrated in the flowchart of FIG. 42.

In step S2, the control unit controls the monitoring unit installed on the output side of the optical SW 210, and causes the blocking unit 263 to block transmission in the transmission line 503 such that the optical signal of the subscriber device 40 is not transmitted through the transmission line 503. The optical SW controller 320 executes a path setting process in the optical SW 210.

In step S3, the wavelength controller 310 receives a connection request from the subscriber device 40 that is a wavelength allocation target. The subscriber device 40 that is a wavelength allocation target executes an initialization process before being connected to the optical SW 210. The subscriber device 40 that is a wavelength allocation target may execute an initialization process immediately after being connected to the optical SW 210. In a case where a wavelength or the like is set at the time of the initialization process, or in a case where at least a part of the initialization process such as allocation is executed after reception of an allocation request permission in a downlink signal or a downlink signal, at least a part of the initialization process is executed after connection. The subscriber device 40 that is a wavelength allocation target transmits a connection request (register request) by using an optical signal.

In step S4, the wavelength controller 310 receives the connection request from the subscriber device 40 that is a wavelength allocation target via the monitoring unit. The phrase "via the monitoring unit" means that, for example, the monitoring unit transfers an optical signal branched by the combining/branching device to the wavelength controller 310. For example, a state of an electrical signal may be used (the monitoring unit includes a receiving unit, the receiving unit converts an optical signal into an electrical signal, and the receiving unit transfers the electrical signal to the connection unit). The wavelength controller 310 analyzes the optical signal received by the monitoring unit and determines an initially set wavelength. The wavelength controller 310 may analyze the received optical signal and check whether there is a problem in the optical power.

In step S6, the wavelength controller 310 (control unit) transmits a wavelength instruction indicating information regarding the wavelength determined (selected) by the control unit 301 to the subscriber device 40 that is a wavelength allocation target. The optical signal of the wavelength controller 310 may be merged by the combining/branching device of the monitoring unit. The monitoring unit may include a transmission unit, the transmission unit may convert an electrical signal into an optical signal, and a combining/branching unit may merge the optical signal. In a case where the wavelength instruction is transmitted by using an optical signal, the wavelength instruction is transmitted to the subscriber device 40 by using an optical signal having a wavelength addressed to the subscriber device 40. The wavelength instruction is transmitted to the subscriber device 40 that is a wavelength allocation target via the monitoring unit. The monitoring unit outputs the optical signal input from the wavelength controller 310 to the subscriber device 40. The optical signal indicating the wavelength instruction may be branched in the middle of the transmission line 501. In a case where a transmission wavelength is set in the wavelength instruction, the subscriber device 40 that is a wavelength allocation target sets the transmission wavelength of the optical signal of the optical transceiver according to the wavelength instruction.

In step S7, in a case where a notification signal is transmitted by using an optical signal, the subscriber device 40 transmits, to the wavelength controller 310 via the monitoring unit, the notification signal for notifying that the wavelength is set by using the optical signal having the wavelength designated in the wavelength instruction. The wavelength controller 310 checks whether or not the designated wavelength is correctly set on the basis of the notification signal. The wavelength controller 310 may check whether the output power of the optical signal is sufficient on the basis of the notification signal.

In step S8, in a case where the designated wavelength is correctly set, the wavelength controller 310 controls the blocking unit 263 to cancel the blocking. Consequently, communication between the subscriber device 40 that is a wavelength allocation target and the subscriber device 40 that is a communication destination is started.

As described above, in the second modification example of the subscriber device 40 and the control unit, the optical SW 210 outputs an optical signal input from any one transmission line 501 among the plurality of transmission lines 501 to any one transmission line 503 among the plurality of transmission lines 503. The monitoring unit relays an optical signal between the optical SW 210 and the subscriber device 40 that is a communication destination in the transmission line 503 on the side where the optical signal transmitted from the subscriber device 40 is output from the optical SW 210. The wavelength controller 310 controls the blocking unit 263 to block transmission of the optical signal output from the monitoring unit. After the blocking by the blocking unit 263 is performed, the optical SW controller 320 executes a path setting process of the optical signal in the optical SW 210. Next, the wavelength controller 310 allocates a wavelength to the optical signal of the subscriber device 40 on the basis of the monitoring result from the monitoring unit. Next, the wavelength controller 310 controls the blocking unit 263 to cancel the blocking of the transmission of the optical signal output from the monitoring unit. As described above, the control unit causes the blocking unit 263 to perform blocking before the wavelength is allocated, and thus prevents the optical signal input from the transmission line 501 to the optical SW 210 from being output to the other transmission line 503. After the blocking is performed, the control unit executes the path setting process and the wavelength allocation process (wavelength setting) in this order. The control unit causes the blocking unit 263 to perform blocking cancelation after the wavelength is allocated such that the optical signal input from the transmission line 501 to the optical SW 210 is output to the other transmission line 503. The optical GW 200 may include the first optical SW 210 and the second optical SW 210 cascade-connected to the first optical SW 210.

Consequently, in the second modification example of the subscriber device 40 and the control unit, it is possible not only to transmit an optical signal according to a destination but also to reduce the number of times of switching of the optical switch at the time of setting a wavelength of the optical signal transmitted from the subscriber device in some cases.

Although the wavelength change process performed by the subscriber device 40 requesting wavelength change has been described above, the same applies to a wavelength change process performed by the control unit 20 on the basis of monitoring information or the like.

The control signal is exchanged between the control unit 20 and the subscriber device 40. For example, the subscriber device 40 transmits a connection request to the control unit 20, and the control unit 20 transmits a control signal to the subscriber device 40. For example, the control unit 20 allocates a wavelength used for communication by the subscriber device 40.

The control signal may be monitored by the monitoring unit 60 and exchanged between the monitoring unit 60 and the subscriber device 40 and between the monitoring unit 60 and the control unit 20.

The wavelength controller 310 and the optical SW controller 320 may be implemented by using one information processing device, or may be implemented by using a plurality of information processing devices communicatively connected via a network.

Figure 74:
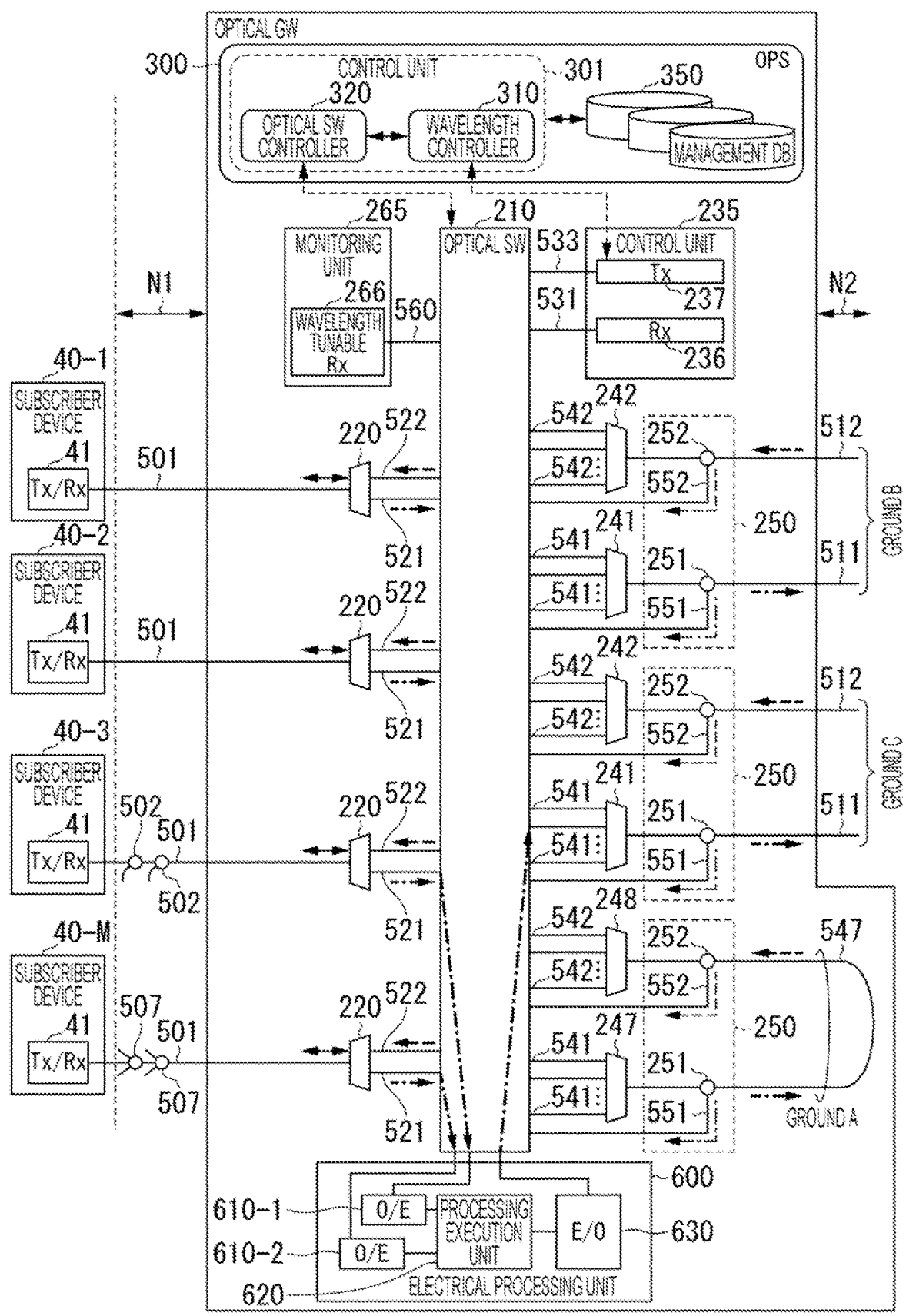
FIG. 74 is a diagram illustrating a modification example of the optical access system.

As illustrated in FIG. 74, the optical GW may be configured as a device (an optical communication device of the present invention) including any or all of the OPS 300 or the control unit 20, the optical SW, the monitoring unit, the electrical processing unit, the return transmission line, the combining/branching device (power splitter), and the multiplexer/demultiplexer (the WDM device or the WDM filter).

In each of the above embodiments, allocation of a wavelength to the subscriber device 40 has been described as an example. However, a wavelength and the like that are a wavelength, a time, a polarization orthogonal to each other, modes orthogonal to each other, codes orthogonal to each other, frequencies, cores, core wires, or a combination thereof may be allocated. For example, the same applies to a multiplexer/demultiplexer in a case where a time, a polarization, a mode, a code, a core, or a core wire is allocated if the multiplexer/demultiplexer is replaced with a combination of a combining/branching device and a delay line, a polarization mode coupler, a mode coupler, a decoder/encoder, an inter-core combining/branching device, an inter-core wire combining/branching device, or the like.

The control units 20, 230, and 235, the monitoring units 260, 265, and 267, the wavelength controller 310, and the optical SW controller 320 described above may include a CPU, a memory, an auxiliary storage device, and the like connected via a bus, and may realize some or all of the above-described functions by executing a program. Some or all of the functions of the control units 20, 230, and 235, the monitoring units 260, 265, and 267267, the wavelength controller 310, and the optical SW controller 320 may be realized by using hardware such as ASIC, PLD, or FPGA. The program for the control units 20, 230, and 235, the monitoring units 260, 265, and 267, the wavelength controller 310, and the optical SW controller 320 may be recorded in a computer-readable recording medium. The computer-readable recording medium is, for example, a portable medium such as a magneto-optical disk, a ROM, or a CD-ROM, or a storage device such as a hard disk built in a computer system. The program may be transmitted via an electrical communication line.

Although the embodiments of the present invention have been described in detail with reference to the drawings so far, specific configurations are not limited to these embodiments, and include designs and the like without departing from the spirit of the present invention.

INDUSTRIAL APPLICABILITY

The present invention is applicable to an optical access system technique using an optical switch.

REFERENCE SIGNS LIST

1 Optical communication system
10, 10a, 10b, 10c, 10d, 10e, 10f, 10g, 34, 95a-1, 95a-2, 95b-1, 95b-2, 96a-1, 96a-2, 96b-1, 96b-2, 210, 211, 212a, 212b, 212c, 1001, 1002, 1003, 1004, 1005, 1006, 1007, 1008, 1009a, 1009b, 1010-1 to 1010-4 Optical switch
11-1, 11-1-1 to 11-1-P, 11-2, 11-2-1 to 11-2-Q Port
20 Control unit
21, 41, 411, 412 Optical transceiver
22, 42, 237 Optical transmitter
23, 43, 232, 236, 262 Optical receiver
25 Wavelength controller
26, 320 Optical SW controller 30 Optical communication network
31 WDM access ring network
32-1 to 32-r Add/drop node
33 Demultiplexing unit
35 Multiplexing unit
40, 40-1 to 40-M, 40a-1 to 40a-3, 40b-1 to 40b-3, 40c-1 to 40c-3, 40a-1-1, 40a-1-2, 40-p-1 to 40-p-Np, 40-p-N, 40-p to 40-(p+N) Subscriber device
46-1, 46-3 User
46-2 Mobile base station
50, 50-1, 50-2, 50-1-p to 50-1-(p+N), 50-1-p1 to 50-1-pN, 50-1-p-1 to 50-p-Np, 50-2-1 to 50-2-q, 50-2-(N−1), 50-2-N, 50-2-q-1 to 50-2-q-N, 50-2-(1+N), 53, 54a, 54b, 54c, 54d, 92, 93-1 to 93-N, 501, 503, 504, 511, 512, 521, 522, 531, 533, 534, 540, 541, 542, 543-1, 543-2, 544, 545, 546, 547, 548, 549, 551, 551a, 552, 552b, 555, 560, 561, 562, 563, 570, 571, 572, 573, 574, 575, 581, 582, 583, 584, 585, 586, 587, 588, 589 Transmission line
51, 73 Return transmission line
55, 55-1, 55-2, 55-p, 55-(p+1), 56, 57a, 57b, 61, 66, 69, 71, 72, 251, 251a, 251b, 252, 252b, 254, 258, 259, 270, 271, 272, 273, 502, 507 Power splitter
58, 59 Distribution unit
60, 60a to 60h, 65 Monitoring unit
67, 68, 80, 80a, 80b, 80c, 81, 89, 97 WDM device
82a-1 to 82a-n, 82b-1 to 82b-m, 241, 247, 458 Multiplexer
83a-1 to 83a-n, 83b-1 to 83b-m, 242, 248, 457 Demultiplexer
85, 610 O/E conversion unit
86, 620 Processing execution unit
87, 630 E/O conversion unit
88 Storage unit
90, 91 Multiplex communication transmission line
100, 101, 102, 103, 104, 105, 106, 107, 108, 109, 110, 111, 112, 113, 114, 115, 116, 117 Optical access system
200, 201, 202, 203, 204, 205, 206, 207, 208, 209, 2010, 2011, 2012, 2013, 2014, 2015, 2016 Optical gateway
220, 238, 243, 244, 245, 249, 256, 257 Wavelength multiplexer/demultiplexer
230, 235 Control unit
231, 261 Wavelength demultiplexer
233, 269 Wavelength tunable transmitter
250, 250a, 250b, 253, 255 Branching unit
260, 265 Monitoring unit
263 Blocking unit
266 Wavelength tunable optical receiver
267 Monitoring unit
268 Wavelength tunable receiver
300 Operation system
301 Optical GW control unit
310 Control unit
350 Management database
452 Variable wavelength receiver
453 Wavelength tunable filter
459, 459a to 459e WDM filter
84, 600 Electrical processing unit
861 Processor
862 Accelerator

The invention claimed is:

1. An optical communication device comprising:
an optical switch that outputs an optical signal input from one of a plurality of transmission lines to another transmission line among the plurality of transmission lines;
a monitoring unit that relays an optical signal in a transmission line on a side where the optical signal is output from the optical switch;
a blocking unit that blocks transmission of an optical signal output from the monitoring unit;
a wavelength controller that allocates a wavelength and the like that are a wavelength, a time, a polarization, a mode, a code, a frequency, a core, a core wire, or a combination thereof to an optical signal of a subscriber device via the monitoring unit; and
an optical switch controller that controls the optical switch such that the optical signal input from the transmission line to the optical switch is output to the another transmission line, and cancels the blocking by the blocking unit.

2. The optical communication device according to claim 1, wherein
the optical switch controller causes the blocking unit to perform the blocking before the wavelength and the like are allocated, and cancels the blocking by the blocking unit after the wavelength is allocated.

3. The optical communication device according to claim 1, wherein
the blocking unit includes an optical switch different from the optical switch or a semiconductor optical amplifier.

4. An optical communication system comprising:
a plurality of subscriber devices; and
the optical communication device according to claim 1.

5. An optical communication device comprising:
a first optical switch that outputs an optical signal input from one of a plurality of transmission lines to another transmission line among the plurality of transmission lines;
a second optical switch that is cascade-connected to the first optical switch;
a monitoring unit that relays an optical signal in a transmission line on a side where the optical signal is output from the first optical switch or the second optical switch;
a blocking unit that blocks transmission of an optical signal output from the monitoring unit;
a wavelength controller that allocates a wavelength and the like that are a wavelength, a time, a polarization, a mode, a code, a frequency, a core, a core wire, or a combination thereof to an optical signal of a subscriber device via the monitoring unit; and
an optical switch controller that controls the first optical switch and the second optical switch such that the optical signal input from the transmission line to the first optical switch is output to the another transmission line, and cancels the blocking by the blocking unit.

6. The optical communication device according to claim 5, wherein
the optical switch controller causes the blocking unit to perform the blocking before the wavelength and the like are allocated, and cancels the blocking by the blocking unit after the wavelength is allocated.

7. An optical communication method executed by an optical communication device, comprising:
an optical switch step of outputting an optical signal input from one of a plurality of transmission lines to another transmission line among the plurality of transmission lines;
a monitoring step of relaying an optical signal in a transmission line on a side where the optical signal is output from the optical switch;

a blocking step of blocking transmission of an optical signal output in the monitoring step;

a wavelength control step of allocating a wavelength and the like that are a wavelength, a time, a polarization, a mode, a code, a frequency, a core, a core wire, or a combination thereof to an optical signal of a subscriber device; and an optical switch control step of controlling the optical switch such that an optical signal input from the transmission line to the optical switch is output to the another transmission line, and canceling the blocking.

* * * * *